US005764892A

United States Patent [19]

Cain et al.

[11] Patent Number: 5,764,892

[45] Date of Patent: Jun. 9, 1998

[54] SECURITY APPARATUS AND METHOD

[75] Inventors: Fraser Cain; Christian Cotichini, both of Vancouver; Thanh Cam Nguyen, New Westminster, all of Canada

[73] Assignee: Absolute Software, Vancouver

[21] Appl. No.: 558,432

[22] Filed: Nov. 15, 1995

Related U.S. Application Data

[63] Continuation-in-part of Ser. No. 339,978, Nov. 15, 1994.

[51] Int. Cl.[6] .............................. H04M 3/00; G08B 13/22

[52] U.S. Cl. .................................. 395/200.3; 340/825.34; 340/825.36; 340/571; 340/572; 364/222.5; 379/106

[58] Field of Search ............................ 364/514 R, 222.5, 364/286.4, 709.05; 379/37, 39, 40, 45, 56, 57, 58, 95, 93, 106, 142; 342/450, 451; 307/10.2; 326/8; 180/287; 116/5, 6, 75; 340/426, 506, 503, 571, 572, 568, 825.44, 825.36, 825.34, 825.54, 825.48, 825.52; 380/4, 23, 25; 395/200.3, 200.31, 200.47, 200.49, 200.57

[56] References Cited

U.S. PATENT DOCUMENTS

| | | | |
|---|---|---|---|
| 3,925,763 | 12/1975 | Wadhwani et al. | 340/164 R |
| 4,999,621 | 3/1991 | Loeb | 340/825.34 |
| 5,077,788 | 12/1991 | Cook et al. | 379/142 |
| 5,511,109 | 4/1996 | Hartley et al. | 379/40 |
| 5,566,339 | 10/1996 | Perholtz et al. | 395/750 |

FOREIGN PATENT DOCUMENTS 0588519 8/1993 European Pat. Off. .

*Primary Examiner*—James P. Trammell
*Assistant Examiner*—Tony M. Cole
*Attorney, Agent, or Firm*—Irell & Manella LLP

[57] ABSTRACT

A system for locating and monitoring electronic devices utilizing a security system that is secretly and transparently embedded within the software, firmware, or hardware of a computer. This security system causes the client computer to periodically and conditionally call a host system to report its serial number via an encoded series of dialed numbers. A host monitoring system receives calls from various clients and determines which calls to accept and which to reject. This determination is made by comparing the decoded client serial numbers with a predefined and updated list of numbers corresponding to reported stolen computers. Only calls from clients on the predefined list are accepted. The host also concurrently obtains the caller ID of the calling client to determine the physical location of the client computer. The caller ID, indicating the physical location of the stolen device, and the serial number are subsequently transmitted to a notifying station in order to facilitate the recovery of the stolen device. The security system remains hidden from the user, and actively resists attempts to disable it.

47 Claims, 18 Drawing Sheets

FIG. 3E(1)
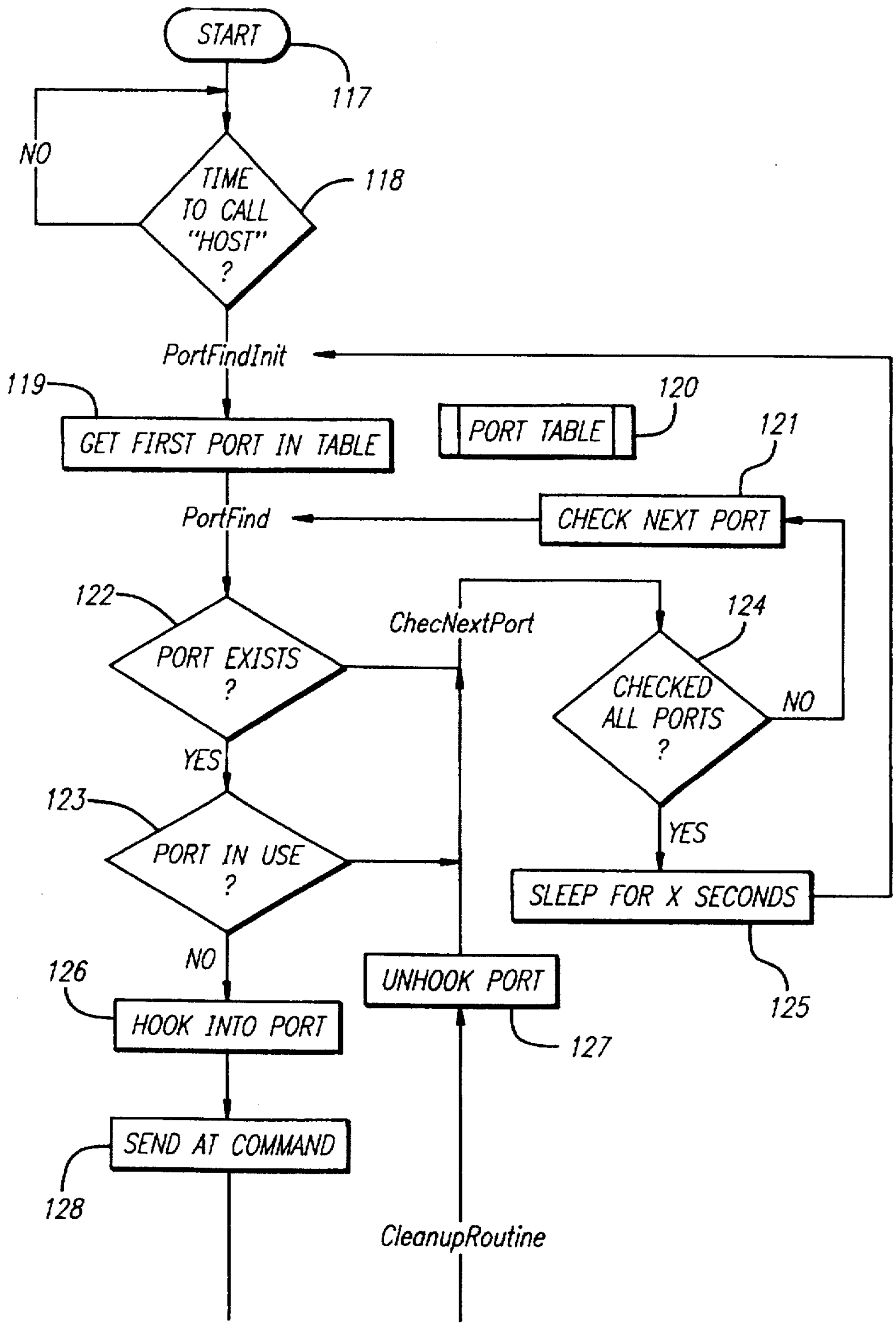

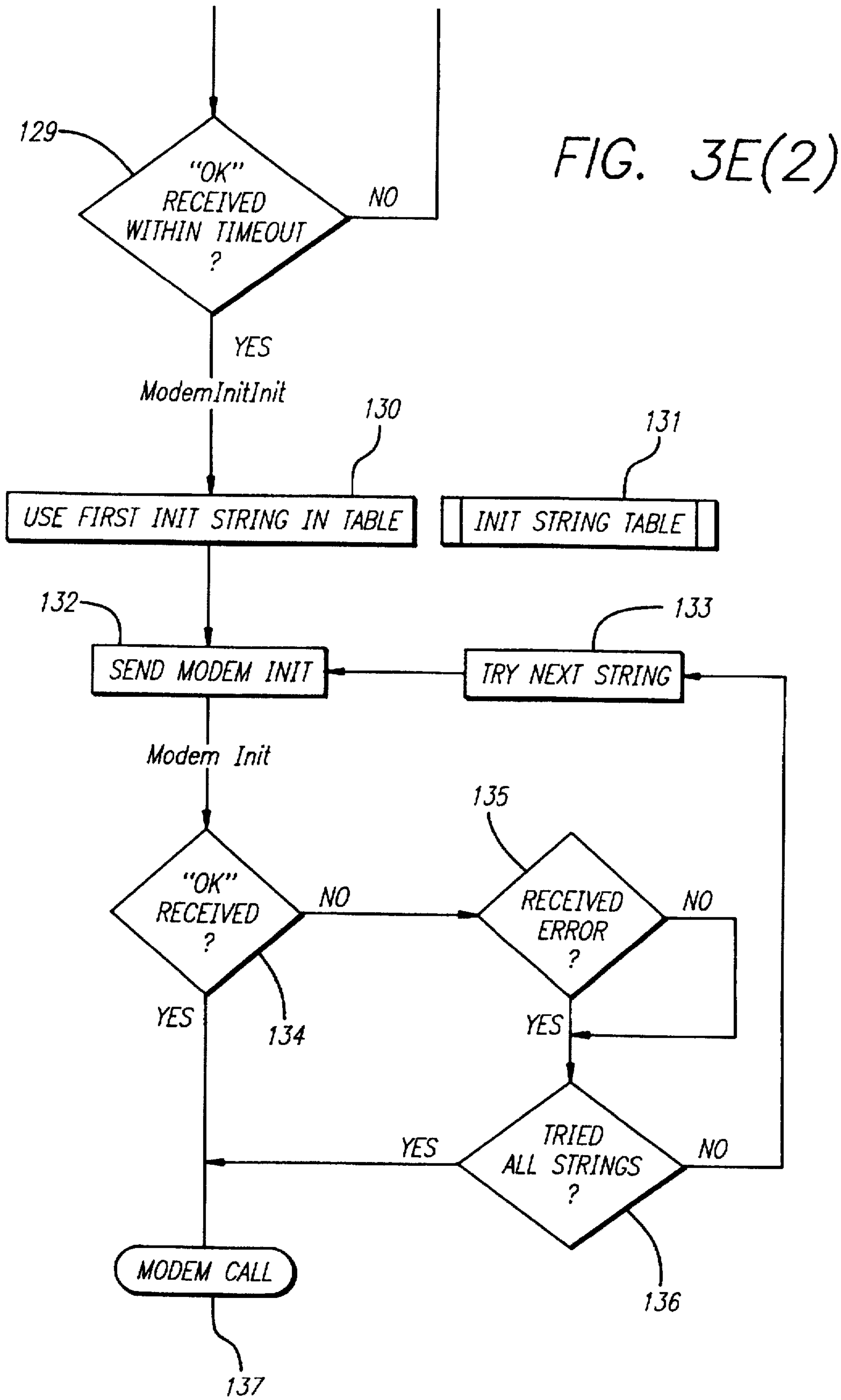
FIG. 3E(2)

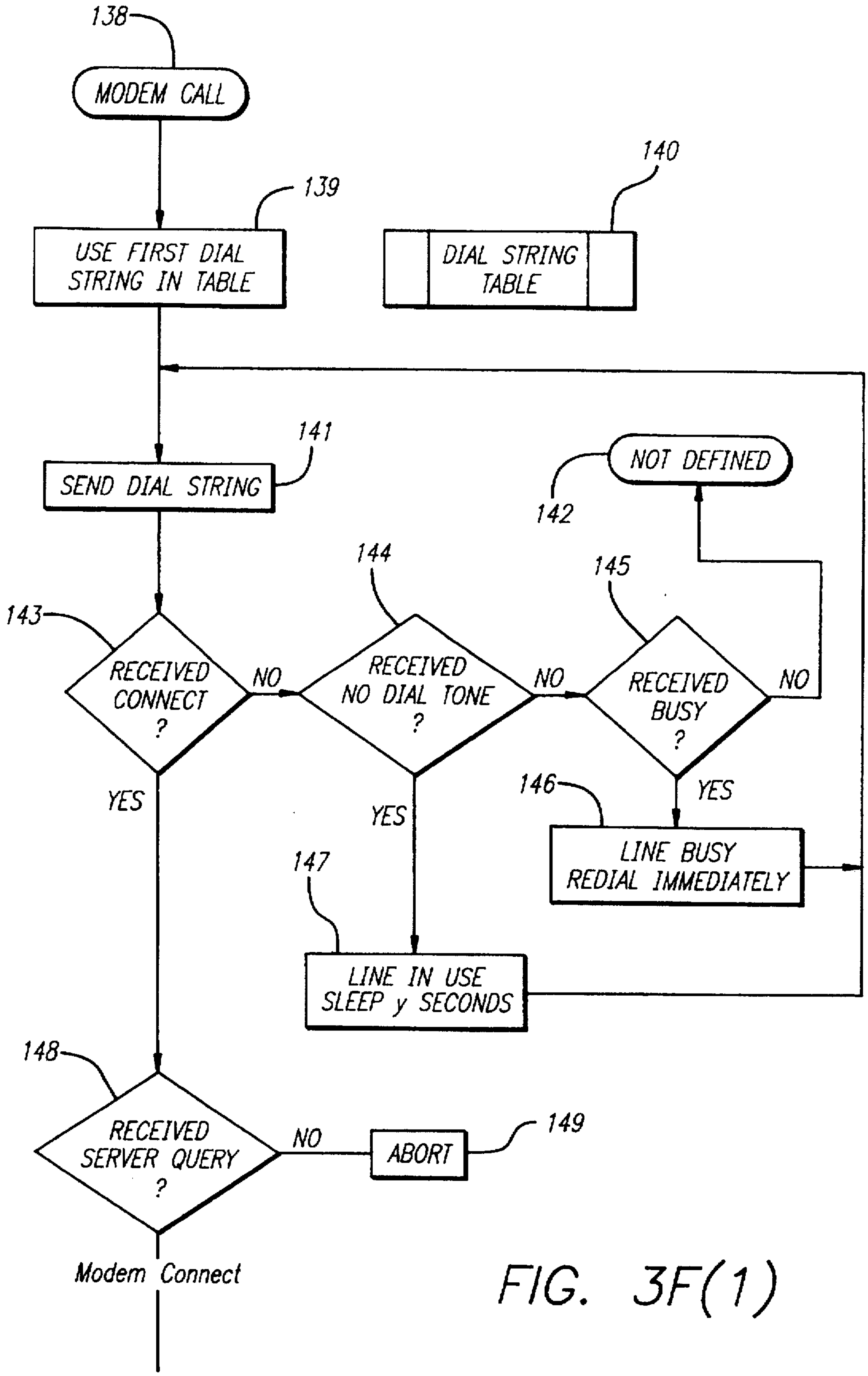
FIG. 3F(1)

FIG. 3F(2)
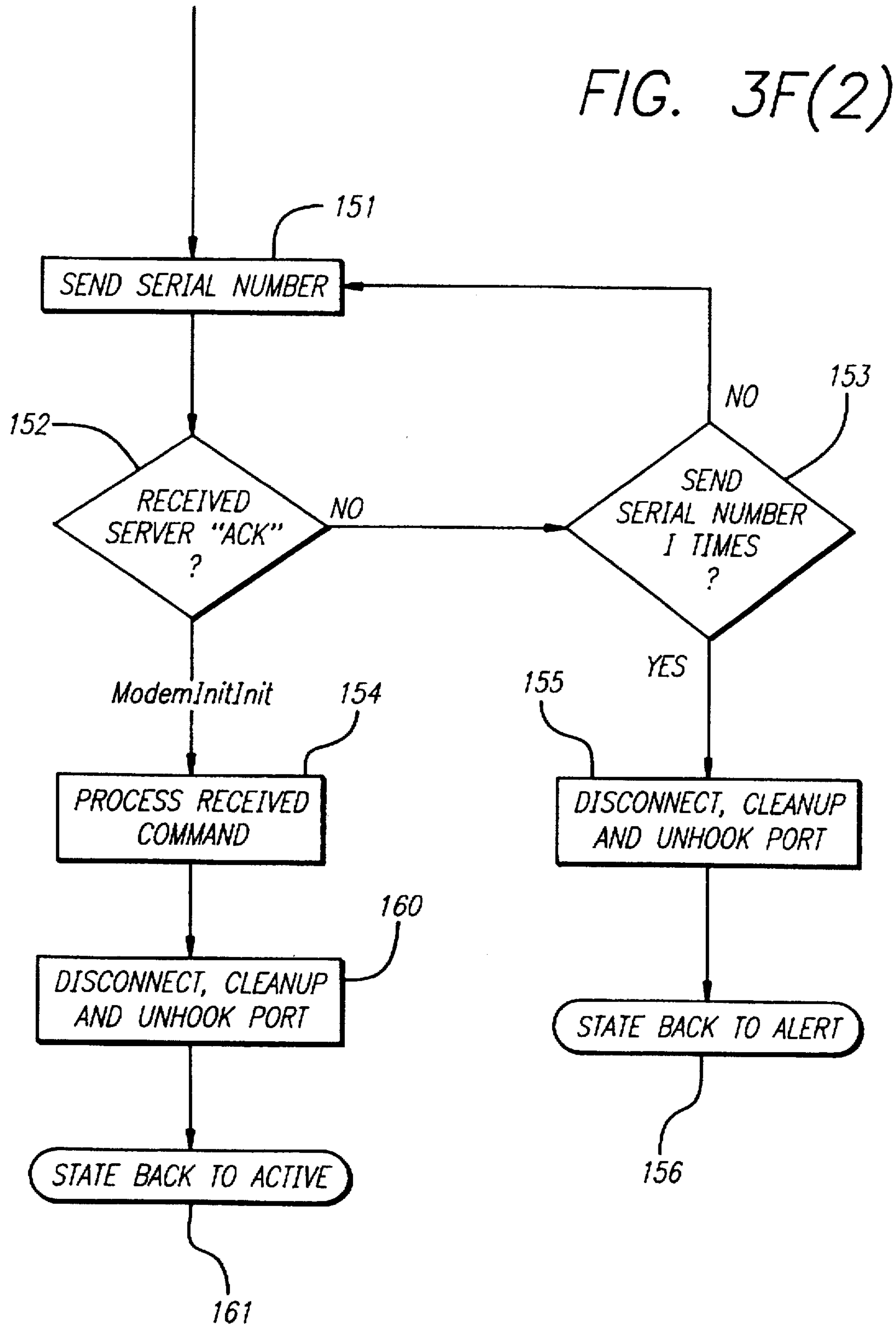

SECURITY APPARATUS AND METHOD

This application is a continuation-in-part of application Ser. No. 08/339,978, filed Nov. 15, 1994.

BACKGROUND OF THE INVENTION

Many electronic devices, such as laptop computers and cellular telephones, are becoming more compact and portable. While such portability is extremely convenient for the user, it has given rise to an increased risk of theft. These electronic devices are often very expensive and are easily lost or stolen.

Previously, attempts have been made to provide means for retrieving lost or stolen items of various types. The simplest approach is marking the item with the name and the address of the owner, or some other identification such as a driver's license number. If the item falls into the hands of an honest person, then the owner can be located. However, this approach may not deter a thief who can remove visible markings on the device.

Password protection schemes are of dubious value in discouraging theft or retrieving an item. Although the data can be protected from theft, the computer hardware cannot be found or retrieved.

Another approach has been to place a radio transmitter on the item. This has been done in the context of automobile anti-theft devices. The police or a commercial organization monitors the applicable radio frequency to try to locate a stolen vehicle. This method is not suitable for smaller items such as cellular telephones or laptop computers. First, it is inconvenient to disassemble such devices in order to attempt to install a transmitter therein. Second, there may not be any convenient space available to affix such a transmitter. Furthermore, a rather elaborate monitoring service, including directional antennas or the like, is required to trace the source of radio transmissions.

It is therefore an object of the invention to provide an improved means for tracing or locating smaller lost or stolen objects, particularly laptop computers, cellular telephones, desktop computers and other small, portable electronic devices or expensive home and office electronic equipment.

It is also an object of the invention to provide an improved means for tracing such electronic devices which can be installed without disassembly or physical alteration of the devices concerned.

It is a further object of the invention to provide an improved means for locating lost or stolen items, this means being hidden from unauthorized users in order to reduce the risk of such means being disabled by the unauthorized user.

It is a still further object of the invention to provide an improved means for locating lost or stolen items which actively resist attempts to disable the means by an unauthorized user.

It is a still further object of the invention to provide an improved means for inexpensively and reliably locating lost or stolen items.

The invention overcomes disadvantages associated with the prior art by yielding a security device for small computers, cellular telephones or the like which can be programmed onto existing memory devices such as ROM devices, hard disks or the like. Accordingly, no physical alteration is necessary or apparent to a thief. The existence of the security device is well cloaked and it cannot be readily located or disabled even if the possibility of its existence is suspected. Apparatuses and methods according to the invention can be very cost effective, requiring relatively inexpensive modifications to software or hardware and operation of relatively few monitoring devices.

SUMMARY OF THE INVENTION

This invention, Electronic Article Surveillance System, relates to a security apparatus and method for retrieving lost or stolen electronic devices, such as portable computers. This invention enables electronic articles to be surveyed or monitored by implanting an intelligent Agent with a predefined task set onto an electronic device. This Agent communicates with a preselected Host Monitoring System which is capable of multiple services including; tracing location, identifying the serial number, and electronically notifying the end user/owner of its location. The Agent hides within the software/firmware/hardware of the electronic device, and operates without interfering with the regular operation of the device. The Agent is designed to evade detection and resist possible attempts to disable it by an unauthorized user.

According to one aspect of the invention there is provided an electronic device with an integral security system. The security system includes means for sending signals to a remote station at spaced apart intervals of time. The signals including identifying indicia for the device. Preferably, the means for sending signals includes a telecommunications interface connectable to a telecommunications system, and means for dialing a preselected telecommunications number. The remote station includes a telecommunications receiver having said preselected telecommunications number.

Where the electronic device is a computer, the means for sending signals includes means for providing signals to the telecommunication interface to dial the preselected telecommunication number and send the identifying indicia. The telecommunication interface may include a modem. The means for providing signals may include security software programmed on the computer.

The Agent security system may be recorded on the boot sector of a hard disk or, alternatively, on a hidden system file such as IO.SYS, MSDOS.SYS, IBMBIO.COM or IBMDOS.COM.

There is provided according to another aspect of the invention a method for tracing lost or stolen electronic devices whereby a telecommunications interface is connectable to a telecommunications system at a first telecommunications station. The method includes providing the electronic device with means for sending signals to the telecommunications interface. The means is instructed by the program to send first signals to the telecommunications interface which dials a remote telecommunications station. These first signals contain the encoded identification (serial number) of the sending computer. The telecommunications interface then dials a remote telecommunications station corresponding to the intended receiving computer. Upon detecting a ring signal, the remote computer retrieves the caller phone number and the identification of the sending computer from the telephone company. The remote computer decodes the serial number of the sending computer, and compares it with a predefined listing of serial numbers of lost or stolen computers. The call will only be answered if the sending computer is on the predefined list.

In an alternative embodiment, if the remote computer answers the ring then the means for sending signals automatically sends second signals to the telecommunications interface, which transmits to the remote telecommunications station identifying indicia for the device as well as any other pertinent information.

There is provided according to another aspect of the invention a method for encoding the serial number of the sending computer within a sequential series of dialed numbers. In this method, a predetermined digit within the dialed number sequence corresponds to one of the digits of the serial number. The preceding digit within the encoded signal indicates which digit within the serial number sequence that the predetermined digit represents.

BRIEF DESCRIPTION OF THE DRAWINGS

These and other objects and advantages will become apparent by reference to the following detailed description and accompanying drawings, in which:

FIGS. 3E, 3F are portions of a flowchart showing the Agents' work cycle apparatus and method according to an embodiment of the invention. [Are these schematics discussed?]

DESCRIPTION OF THE PREFERRED EMBODIMENTS

System Overview

Figure 1:
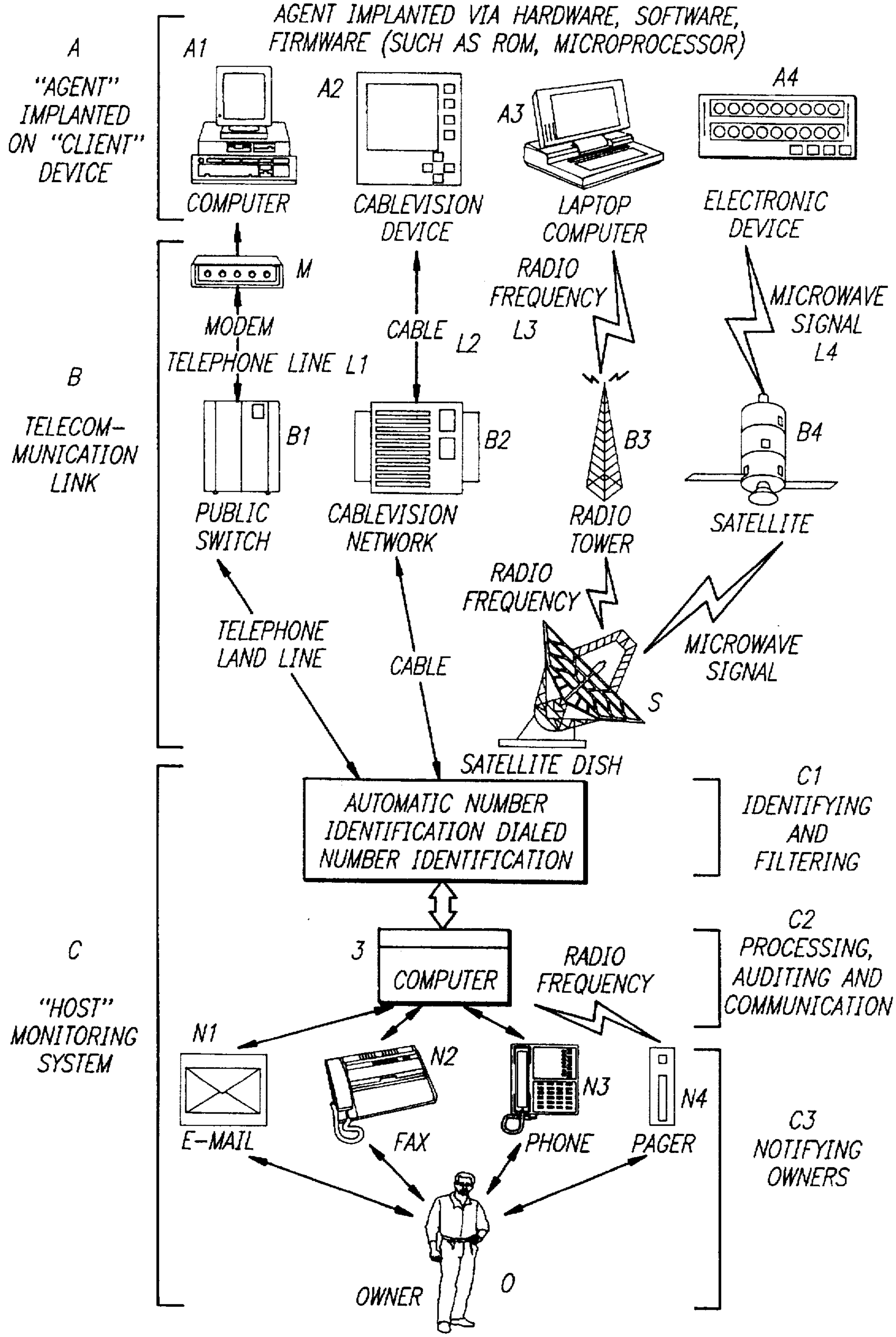
FIG. 1 is a functional block diagram of the Electronic Article Surveillance System in accordance with the teachings of this invention.

Referring to FIG. 1, the Electronic Article Surveillance System is comprised of three main components: (1) Client device A consisting of any electronic device which has been implanted with the Agent; (2) A telecommunication link B such as a switched communications system, cable networks, radio/microwave signal; and (3) The host monitoring system C which controls the communications between the client device A and the host monitoring system C.

Referring to FIG. 1, the client device can be a cablevision device A2, laptop computer A3, or other type of electronic device A4. However, for illustrative purposes, the client device consists of a computer A1 attached to modem M. The host monitoring system C sends and receives data packets from the client computer 10 over a suitable bi-directional transmission medium, such as a common telephone line L1. Telephone line L1 couples the client device C to the host monitoring system C, and the host computer 3, through Public Switch B1 (telephone company). The host monitoring system C notifies the appropriate parties C3 (owner O, law enforcement agency, or monitoring company) of the status of the client device A via suitable communication means such as electronic mail N1, fax N2, telephone N3 or pager N4. Host monitoring system C also identifies and filters incoming calls C1, and also provides processing, auditing and communication functions C2.

In another embodiment of the invention cablevision device A2 is connected to cablevision network B2 via cable L2. This cable L2 further connects cablevision network L2 to the host monitoring system C.

In another embodiment of the invention laptop computer A3 is connected to radio tower B3 via radio frequency (RF) transmissions L3. These RF transmissions are received by satellite dish S at the host monitoring system C.

In yet another embodiment of the invention electronic device A4 is connected to satellite B4 via microwave signal L4. Microwave signal L4 further connects satellite B4 to satellite dish S at the host monitoring system C.

Figure 2:
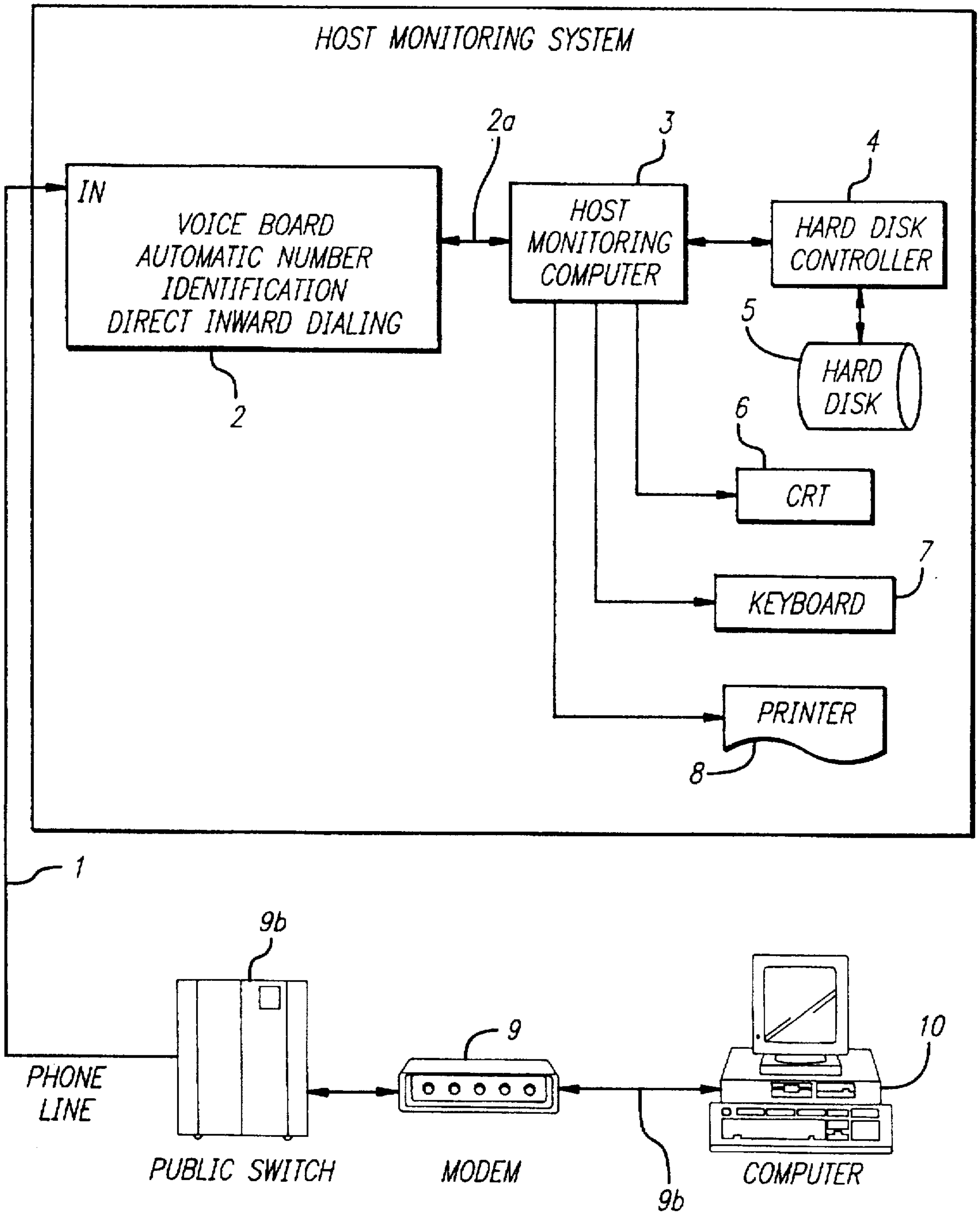
FIG. 2 is a simplified illustration of FIG. 1 for the purpose of showing an illustrative embodiment of the present invention.

Referring to FIG. 2, the Host Monitoring system C is comprised of a Voice Board 2, Host Monitoring Computer 3, Hard Disk Controller 4, Hard Disk 5, CRT 6, Keyboard 7, and Printer 8. The host monitoring computer 3 is coupled to a suitable display device, such as a CRT monitor 6, keyboard 7, and to printer 8. The keyboard 7 permits the operator to interact with the Host Monitoring System C. For example, the operator may use keyboard 7 to enter commands to print out a log file of the clients that have called into the system. The host computer 3 illustratively takes the form of an IBM personal computer. The source codes for the host monitoring system C, in Visual C++ by MicroSoft, are attached in Appendix I.

Telephone line 1 is connected to the computer 3 by a voice board 2 adapted to receive and recognize the audible tones of both caller ID and dialed numbers transmitted via the telephone line 1. Client computer 10 is connected to modem 9 via serial ports 9*a*. Host computer 3 is connected to voice board 2 via serial port 2*a*. The modem 9 and voice board 2 are connected to telephone line 1 which is routed through public switch 9*b* in accordance with a conventional telephone system. Computer 10 and modem 9 form a first telecommunication station, while computer 3 and voice board 2 form a second, or remote telecommunications system. The Host Monitoring System C sends and receives data packets from client computer 10.

Ring signals are received on phone line 1 as an input to voice board 2. In an illustrative embodiment of the invention, voice board 2 may take the form of the DID/120, DTI/211 and D/12X Voice boards manufactured by Dialogic Corporation. The voice board 2 is coupled to host computer 3 via data bus 2*a*. The voice board 2 is operative to recognize the ring signal. Then it receives the caller ID and dialed numbers and converts them into corresponding digital signals. Host computer 3 uses these signals for comparison against a list stored in hard disk 5.

In an illustrative embodiment of the invention, the hard disk controller 4 may comprise memory control boards manufactured by Seagate Tech under the designation Hard Disk Controller. The hard disk controller 4 is particularly suitable to control the illustrative embodiment of the hard disk memory 5 manufactured by Seagate Tech under their designation ST-251.

The Agent is a terminated and stay resident program which is installed on hardware, software, or firmware. The alternative methods of installation are described in detail in FIGS. 3A, 3B, 3C, and 3D. Once the Agent is installed it will report its identity and its location to the host after specified periods of time have elapsed, and upon the occurrence of certain predetermined conditions. This is further illustrated in FIG. 2A. Client source codes are disclosed, in Tazam Assembler Code by Borland, in the Appendix.

Installing and Loading the Agent

Figure 3:
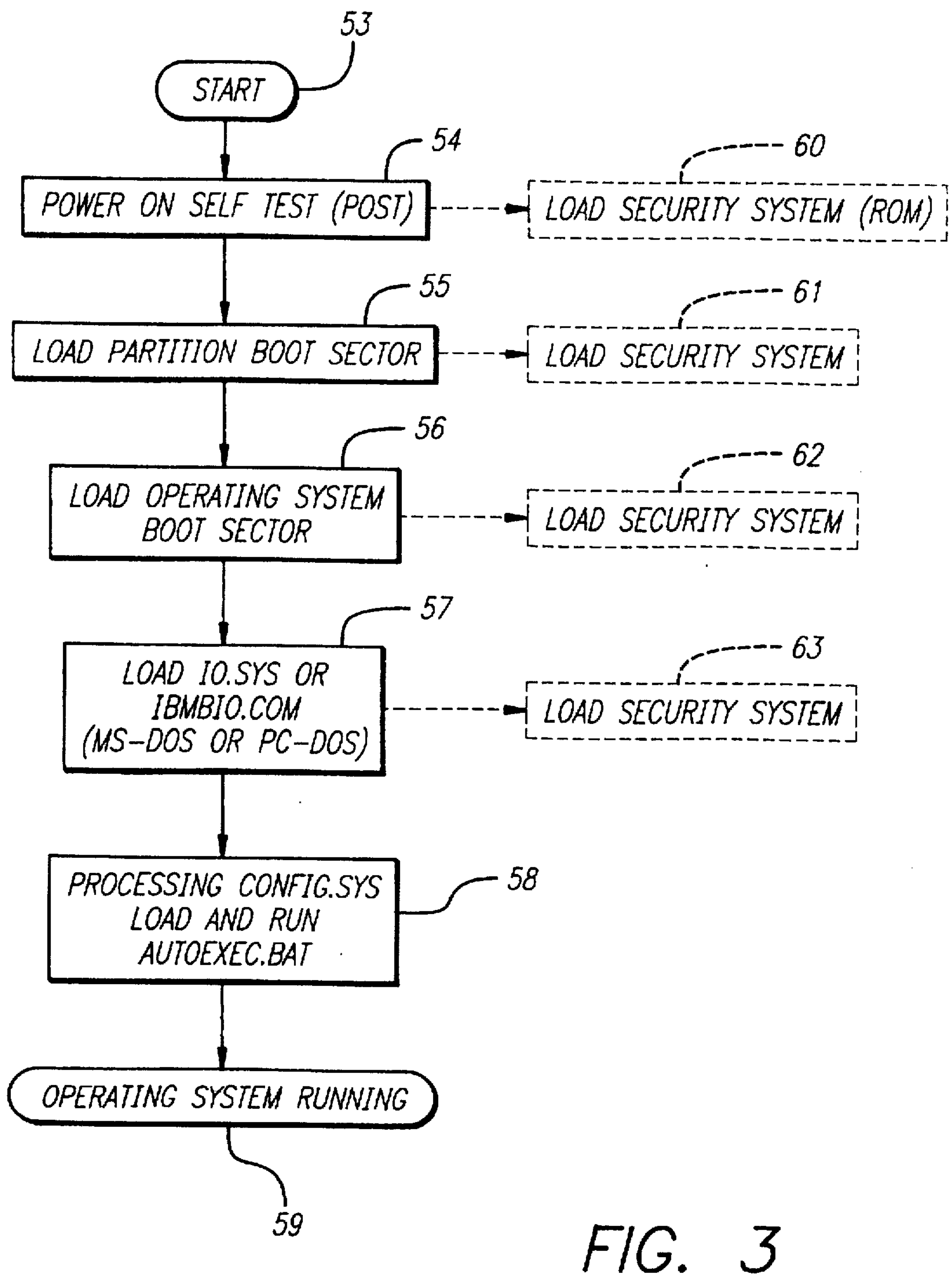
FIG. 3 is a flowchart showing the conventional method of booting up a personal computer with alternative loading points for the Agent security system shown in broken lines.

The Agent is installed during a typical boot up sequence to the operating system of a computer. FIG. 3 shows a boot-up process for a typical personal computer. The details of the boot up process are discussed below. It should be understood that this invention is applicable to other types of computers and electronic devices presently available or as marketed in the future with suitable modifications. The aspect of the invention described below is the process of installing the security software onto a portable computer such as client computer 10. The method of installation is crucial because the software must remain undetectable once installed. Furthermore, the software should be as difficult as possible to erase. In summary, the invention achieves these objects by installing the software in such a manner that it remains hidden to the operating system, such as MS-DOS.

Figure 3A:
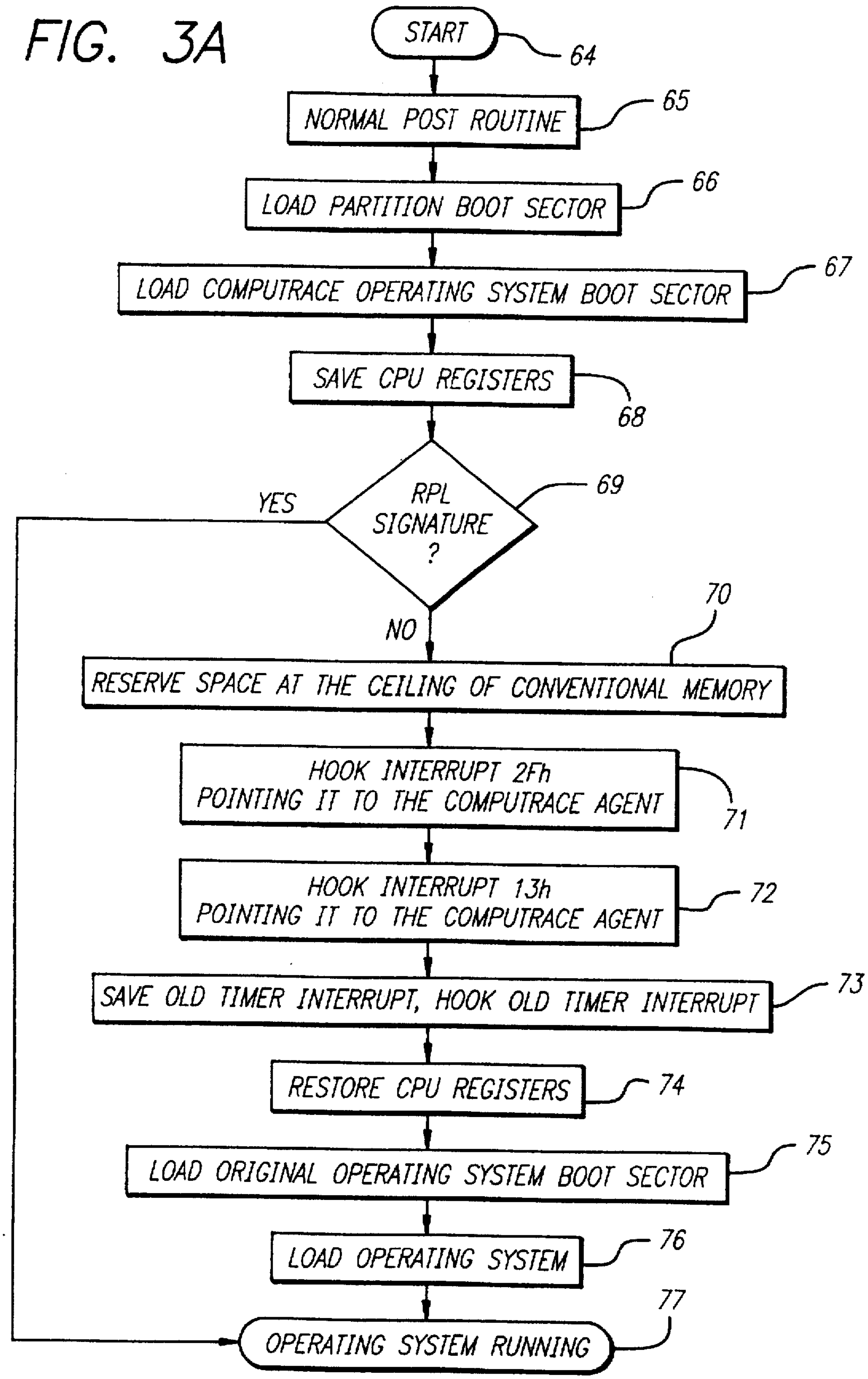
FIG. 3A is a flowchart showing a method for startup loading of an Agent security system according to an embodiment of the invention wherein the operating system boot sector is loaded with the Agent.
Figure 3B:
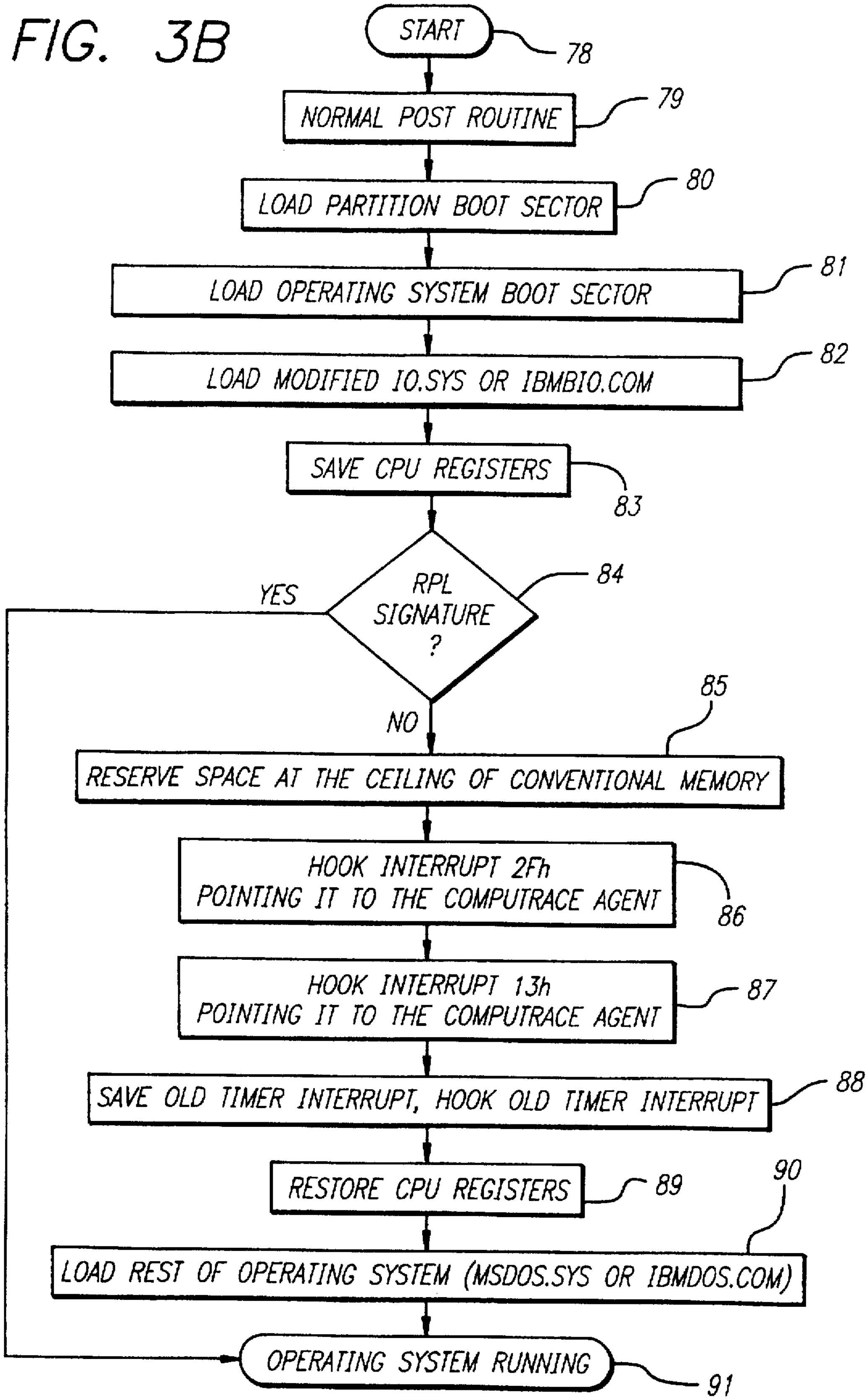
FIG. 3B is a flowchart similar to FIG. 3A wherein the hidden system file IO.SYS or IBMBIO.COM is modified to be loaded with the Agent.
Figure 3C:
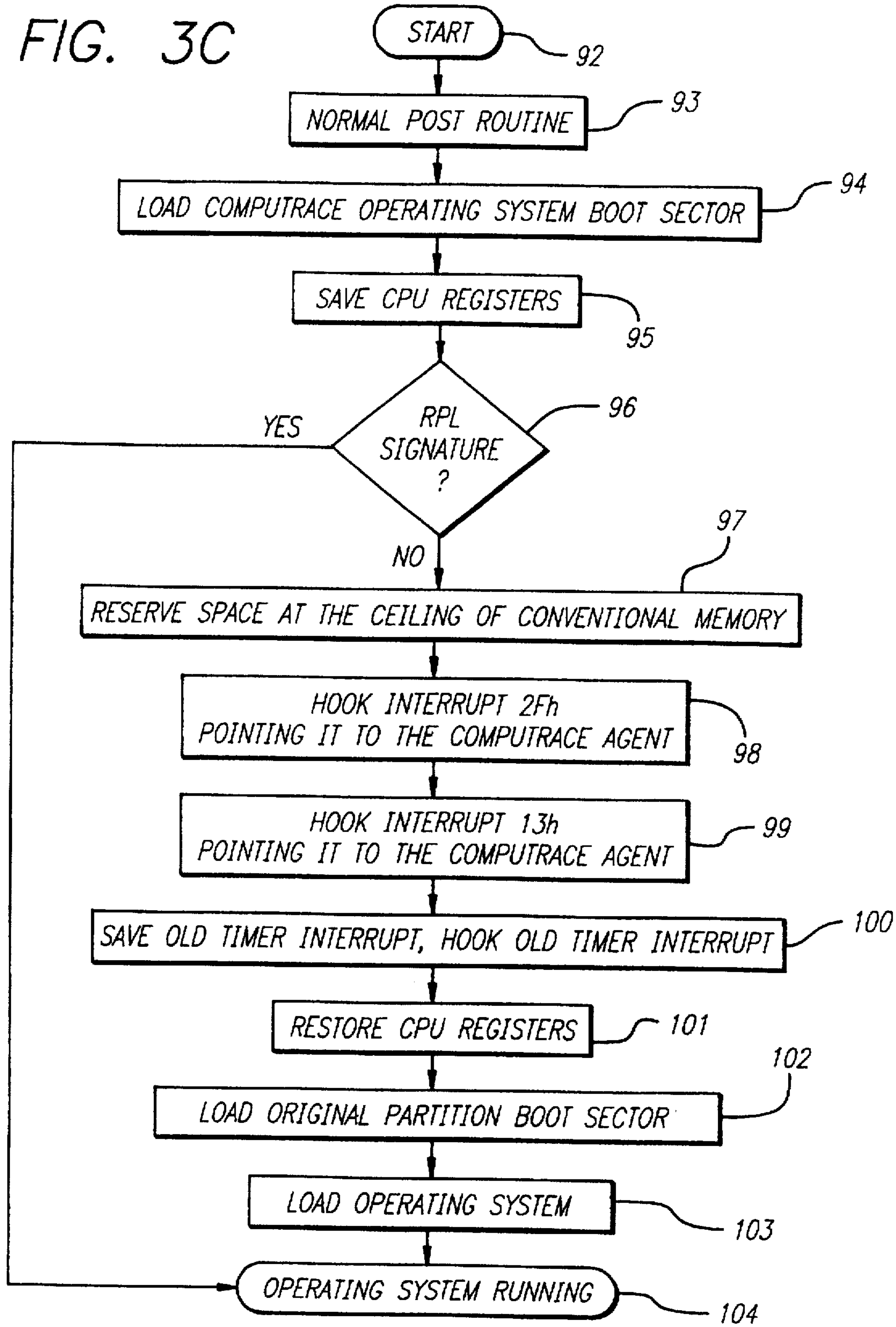
FIG. 3C is a flowchart similar to FIGS. 3A and 3B wherein the partition boot sector is modified to be loaded with the Agent.
Figure 3D:
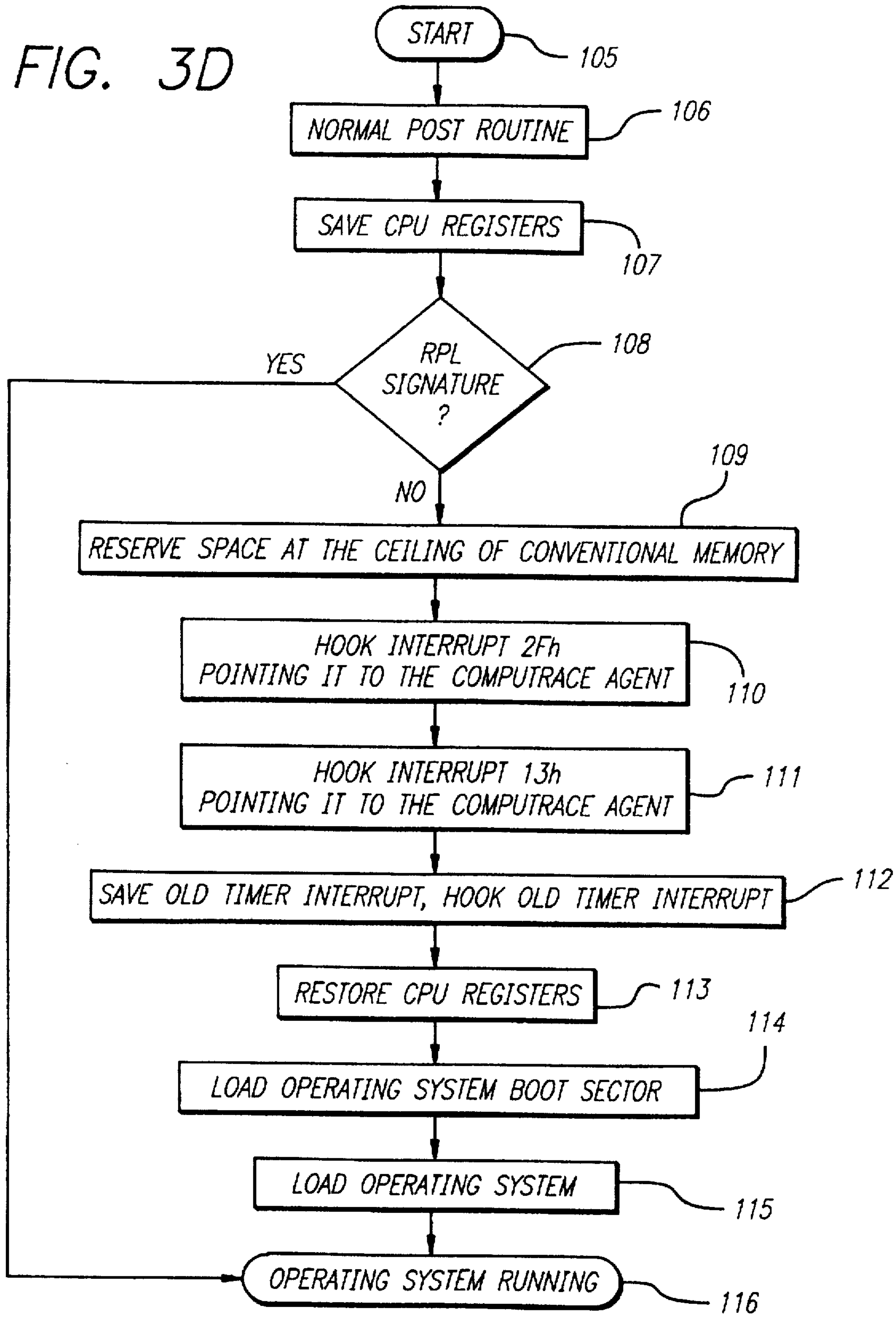
FIG. 3D is a flowchart similar to FIGS. 3B and 3C wherein the Agent security system is ROM BIOS based.

Three alternative ways of installing the Agent security system during the disk boot are illustrated in FIGS. 3A–3C respectively. A conventional boot up method is described in detail below. A fourth alternative, installing via ROM, is shown in FIG. 3D. The system can also be installed with MS.SYS or IBMDOS.COM, but these are more difficult and less preferred than the three alternatives set out below. The loading program TENDER (further described in the Appendix) can be used to install the Agent by one or more of these alternative installation methods. Thus, the Agent may be installed in a variety of locations whereby second and third Agents can provide back up support for the primary Agent. The three locations where the Agent can be installed on the client device are as follows:

1. The operating system boot sector—See FIG. 3A.

2. A hidden system file such as IO.SYS for MS-DOS or IBMBIO.COM for PC-DOS—See FIG. 3B.

3. The partition boot sector—See FIG. 3C.

Referring to FIG. 3A, the Agent loading sequence is described for loading the Agent on the operating system boot sector. The computer 10 is powered on and the loading sequence begins 64. As is well known in the art, the computer 10 performs an initial testing routine to assure that all components are working properly 65. Illustratively, the program incorporated is the IBM-PC compatible Power-On Self Test (POST) routine. The partition boot sector is loaded 66. Next the operating system boot sector with the installed Agent is loaded 67. In an effort to maintain the transparency of the Agent, the CPU registers (corresponding to the current state of the computer) are saved 68. Before the Agent is installed there is a check for a Remote Procedure Load (RPL) signature 69. If the signature is present this indicates that the Agent is already in memory and will not be loaded again. However, if there is no RPL signature then preparation is made to load the Agent. First, space is reserved for the Agent at the ceiling of conventional memory 70. Next, Interprocess Communication Interrupt (2Fh) is hooked 71 which enables communication with other programs. Interrupt 13h, which is the disc input/output handler, is hooked 72. The old timer interrupt is saved, and new hook timer interrupt is put into place 73. Now the CPU registers are restored 74 in order to maintain the transparency of the system. The original operating system boot sector is loaded 75. The original operating system had been moved to accommodate the Agent installation. Finally, the operating system is loaded 76 and running 77 again.

Referring to FIG. 3B, the Agent loading sequence is described 78–91 for loading the Agent on a hidden system file such as IO.SYS for MS-DOS or IBMBIO.COM for PC-DOS. The sequence is analogous to that disclosed above for the operating system boot sector. However, instead of lading the Agent with the operating system boot sector, the Agent is loaded with the operating system file 82 (load modified IO.SYS or IBMBIO.COM).

Referring to FIG. 3C, the Agent loading sequence is described 92–104 for loading the Agent on the partition boot sector. The sequence is analogous to that disclosed above for the operating system boot sector. However, instead of loading the Agent with the operating system boot sector, the Agent is loaded with the operating system partition boot sector 94.

Referring to FIG. 3D, the Agent loading sequence is described 105–116 for loading the Agent via ROM BIOS. This schematic illustrates an embodiment of this invention on firmware. The sequence is analogous to that disclosed above for the operating boot sector. However, the Agent is loaded from the ROM after the CPU registers are saved 107. At that time the ROM can take control of the system and load the Agent. Once the CPU registers are restored 113, the ROM can no longer load the Agent.

Figure 2A:
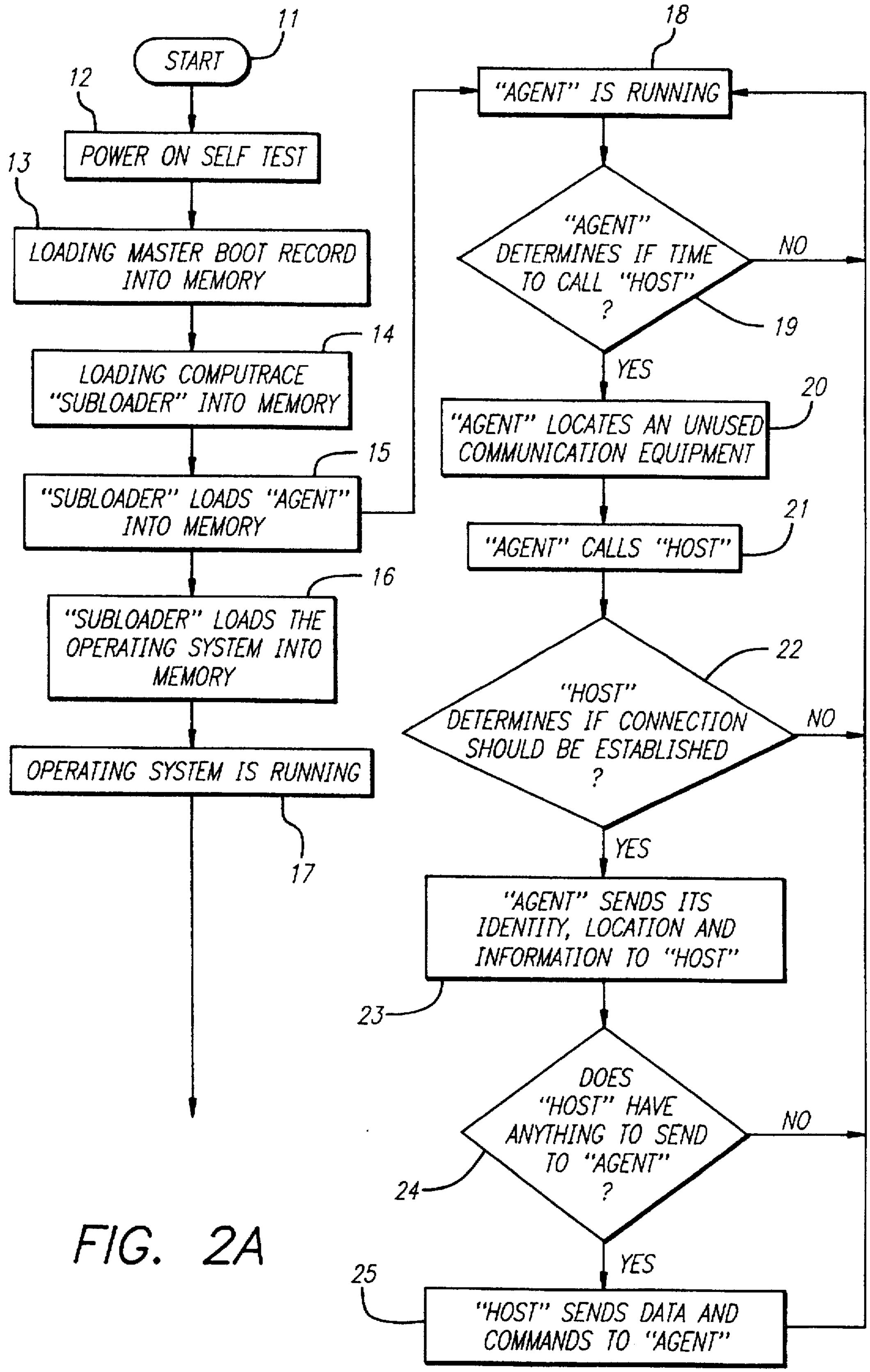
FIG. 2A is a flowchart of the process by which the operating system and Agent are able to start up and run simultaneously.

FIG. 2A is a flow chart of the Agent Work Cycle. This Work Cycle describes the method by which the Agent is loaded when the computer 10 is initially turned on, and the manner in which the operating system and the Agent run simultaneously. Once the client computer 10 is powered on 11, it performs a power on self-test (POST) 12. The POST tests the system hardware, initializes some of the devices for operation, and loads the master boot record (MBR) 13. Since the MBR was installed with an Agent Subloader, the Subloader is loaded into memory 14 and executed. The Subloader's first task is to load the Agent 15 into memory. Then the Subloader loads the operating system (OS) into memory 16 and returns control to the operating system. Now both the operating system 17 and the Agent 18 are running simultaneously.

Functions of the Agent

Referring to FIG. 2A, the Agent's primary job is to determine the appropriate time for it to call the Host Monitoring System (Host) 19 to report its status (such as identity, location and other information). Secondarily, like any terminated and stay resident program, the Agent will not interfere with any running applications unless designed to interfere. Thus, the Agent can avoid being detected. The Agent will determine if it should call the Host 18 times per second. The Agent will only call the host when a pre-defined time period has elapsed, or a pre-determined event has occurred which triggers the client to contact the host. The Agent compares the current date and time with the date and time corresponding to the next time that the Agent is due to call the host. If the Agent determines that it is time to call the Host, it will do a thorough search within the computer 10 to find free (not currently being used by any running application) communication equipment 20. In an illustrative embodiment, the communication equipment is a modem 9. If the agent fails to find any free equipment, then it will abort its attempt to call the Host and repeat the cycle 18. However if the Agent locates free communication equipment, it will call the Host 21. Upon receiving a call from the client 10, the Host examines the Agent identity and determines if a connection should be established 22. If the Host does not accept the call then the Agent will not call back until the next appropriate time (after predetermined time period has elapsed) 18. If the Host accepts the call, then the Agent will send the Host its encoded identity (serial number), location (caller ID) and any other pertinent information such as local date and time 23. The Agent then checks if the Host has any data or commands for the client 24. If the Host has no data or commands to be sent, then the Agent will terminate the call and repeat the cycle 18. Otherwise, the client will receive the data or commands from the Host before it terminates the call and repeats the cycle 18. This Work Cycle is described in much greater detail in FIGS. 3E and 3F and is described in the Detailed Operation section.

The system remains transparent to an unauthorized user via implementation of well known deflection methods. Attempts to read or write to the location where the Agent has been installed are deflected in order to prevent discovery of the Agent. When read attempts are made to the Agent location the system generates meaningless bytes of data to be returned to the user. When write attempts are made to the location where the Agent is installed, the client computer 10 accepts the input data and informs the user that the write has been successful. However, the data is not really stored, and thus the Agent is preserved. In the Appendix, the source code for the disk deflection routines are disclosed within file SNTLI13V.ASM.

Detailed Operation of Agent Work Cycle

Referring to FIG. 3E, the following is a description of what happens during the period of time when the Agent security system is in "active" mode 117, 118.

Once the system is powered on, the timer interrupt will occur 18.2 times per second 117. Every 18 timer interrupts, the complementary metal-oxide semiconductor (CMOS) real-time clock will be accessed, and the time and date will be stored for comparison with the previous real-time clock access. If the date and/or time changes towards the future, no action will be taken to track the time displacement. In this way the Agent determines whether it is time to call the host 118. Thus if the current date has advanced far enough into the future (past the date and time to call the host), the Agent security system will change its mode of operation from active to alert 119 whereby calls will be regularly attempted until a call is made and a transaction with the host server has been completed. If the system time has been backdated, this will also cause a modal change from active to alert.

Referring to FIGS. 3E and 3F, the following is a description of what happens when the Agent security system is in "alert" mode 119–161.

The communications ports are checked 119–125 (via a port address table 120) to see if they exist. If the first one encountered is not in use 123, it will be dynamically hooked 126 into by swapping the appropriate interrupt handler and unmasking the appropriate interrupt request line. If an error occurs, the next port will be checked 124 until either a valid port is found or the port address table has been exhausted 125. Appropriate cleanup routines restore "swapped" ports to their initial settings.

If the communications port responds properly, the system will then attempt to connect to a modem via issue of the Hayes compatible AT command 128. If the modem does not exist, then the next port will be checked 124. If the modem responds with an 'OK' to the AT command 129, the system will attempt to initialize the modem by sending it a modem initialization string 130, 132 (from a table of initialization strings 131). If the modem does not respond with an "OK" 134, this indicates that the initialization attempt failed 135. If the initialization attempt failed, then the next string in the table will be tried 136, and so on until a valid initialization string is found 134, or the modem initialization string table is exhausted 136 (at which point, the routine will delay for some seconds then try again from the start, using the first initialization string 130).

Once a valid and available communications port has been found, and it has been verified that a functional modem is associated with that port, the system will attempt to dial out to the remote host server 137, 138.

A dial string table 140 is used 139 to attempt the call since a PBX or switchboard etc. may need to be exited via a dialing prefix. If successful 141–143, the CONNECT result code (numeric or letters) from the remote host server will be received by the client 143. The host will send a signal ("Query") to the client requesting its serial number. If the client does not receive the query signal 148 it will abort 149 and repeat the cycle 119. If the client receives the "Query" signal, then the serial number is sent 151. At this point, telecommunications have been established and the client-server transaction begins. If the transaction succeeds, the resultant state will be "active", otherwise "alert". If, for some reason, a "NO DIALTONE" event happens 144, a delay will occur 147 and the next dial string 141 will be attempted. If the line is "BUSY" 145, then a redial attempt 146 will occur using the same dial string for a predefined number of attempts or a telecommunications connection is made, whichever comes first.

The client to remote host server transaction involves the sending of the computer serial number 151 via the telephone company or carrier service. The "Caller ID" is implicitly received by the remote server (typically during the initial telecommunications event known as "RING"). Upon the telecommunications event called "CONNECT", the remote host server sends the Agent security system client a vendor specific message called "QUERY" 148 which in effect tells the client to send the serial number. The sending of this serial number 151 involves the server acknowledging that it has indeed received 152 and processed 154 the serial number (validating it). The client computer will attempt to send this serial number a predefined number of times 153 before it gives up (disconnect, cleanup, unhooks port 127, 155 and returns to "alert" mode 156). At this point, the modem disconnects 160. Any other cleanup necessary (such as changing the date of the last call to the present) will also be done here 160. Finally, the resultant state will be reset to active 161.

If the computer that called in was not reported stolen, no further action with regard to the computer system that called in will be taken. If, however, the serial number transmitted to the remote host server matches one of the serial numbers on a currently valid list of stolen computers, further processing will occur to facilitate the recovery of the missing equipment. Such processing includes, but is not limited to, placing either an automatic or manual call to the local authorities in the vicinity of the missing equipment or the owner of such equipment.

Host Identification and Filtering System

Figure 2B:
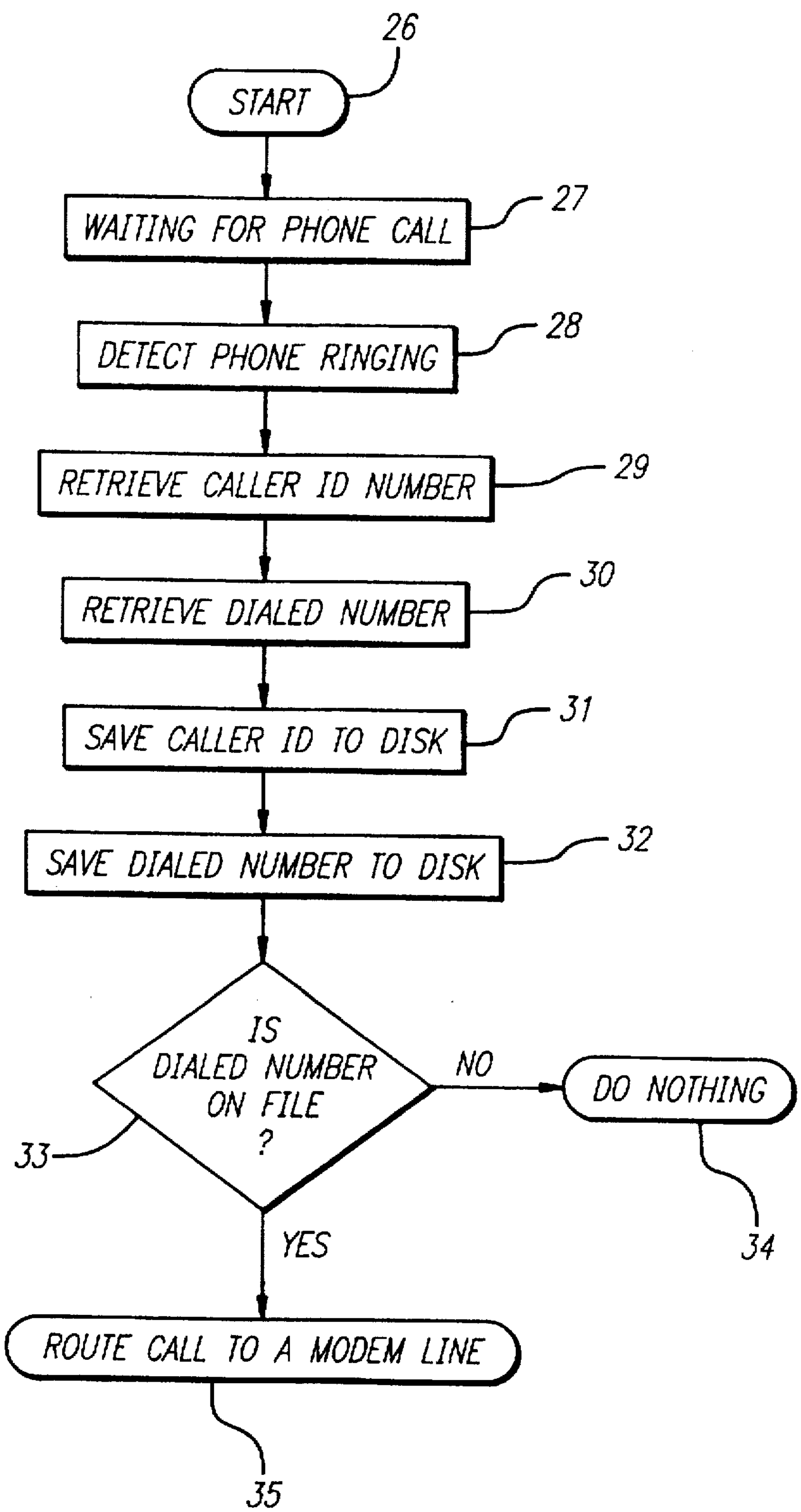
FIG. 2B is a flowchart of the process by which the Host Identification and Filtering Subsystem identifies and filters out unwanted calls from Agents.

The Host Identification and Filtering System identifies and filters out unwanted calls from Agents. FIG. 2B is a flow diagram of the Host Identification and Filtering program executed by host computer 3. Once the security program is executed 26, the voice board waits 27 for the ring signal on the telephone line 1. When a ring signal is detected 28, the voice board 2 acknowledges the incoming call by sending a signal to the telephone company 9B via telephone line 1 requesting that the caller ID and the dialed numbers be sent to it. The voice board then waits until these numbers are received 29, 30.

Once the caller ID and the dialed numbers have been received, they are saved to the hard disk 31, 32. The security program then compares the dialed numbers 33, which provide a coded version of the serial number of the client computer 10 (coding scheme explained in detail below), against a list of serial numbers stored on the hard disk 4. If no match is found, the program lets the phone ring until the client computer 10 hangs up the telephone line 1. In the preferred embodiment, the client computer is programmed to hang up after 30 seconds of unanswered ringing. However, if a match is found, the security program routes the call to an appropriate receiving line connected to a modem 35, which answers the call.

Encoding of the client computer serial number

Figure 4:
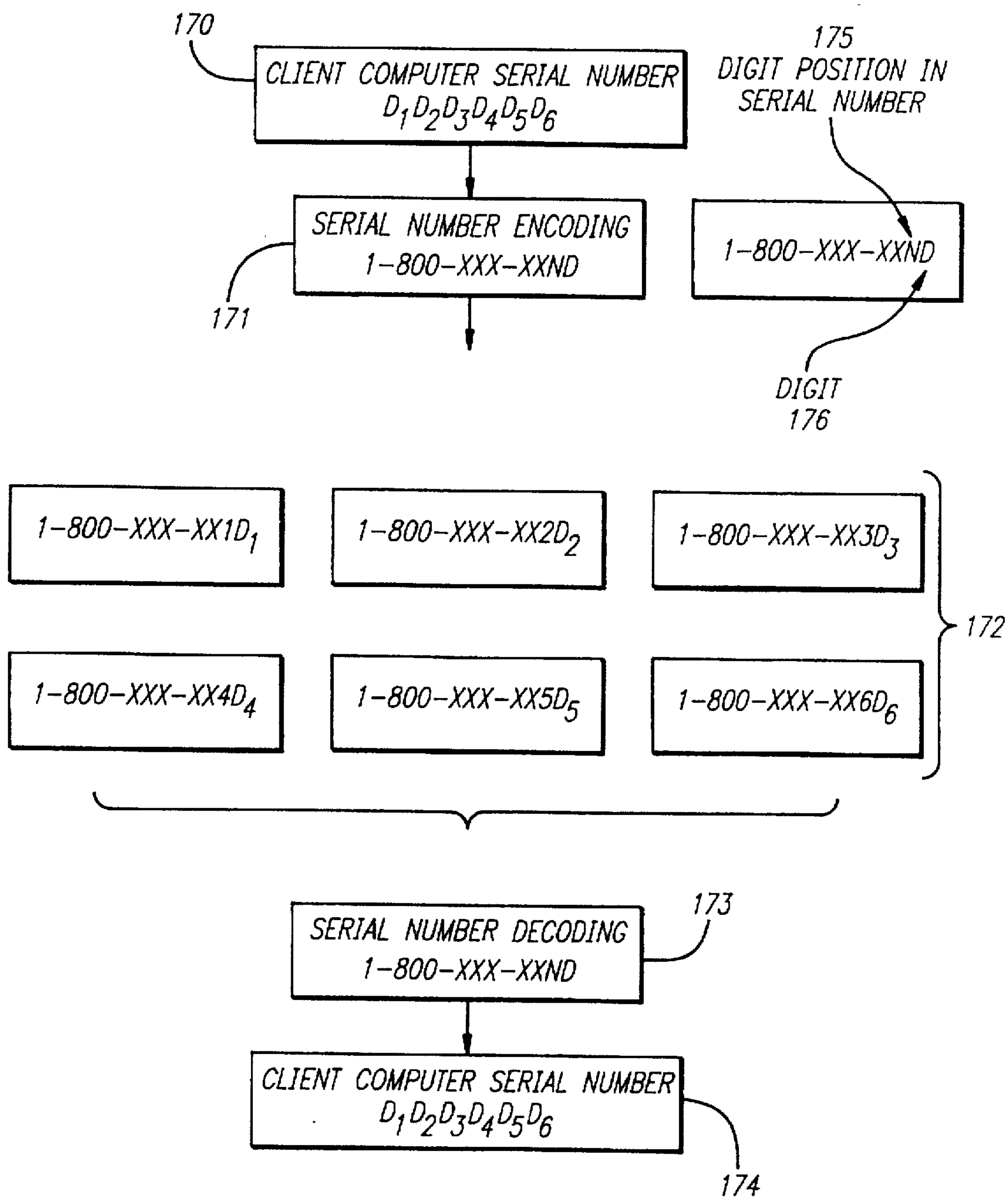
FIG. 4 is a schematic showing the encoding/decoding method whereby the monitoring service would have to subscribe to 60 telephone numbers.

Referring to FIG. 4, the serial number of client computer 10 is encoded within the dialed numbers it sends to the host 3. In the preferred embodiment of the invention, the client computer transmits its six digit serial number 170 to the host via a series of six complete dialed phone numbers 172. The first eight dialed digits after the first "1" are meaningless. The ninth dialed digit "N" 175, indicates which digit position within the serial number that the tenth dialed number corresponds to. The tenth dialed digit "D" provides the Nth digit of the serial number. The host computer 3 receives the six complete dialed phone numbers 172 and decodes them 173 by looking at only the ninth and tenth dialed digits. The client computer serial number 174 is thus reproduced.

For example, in the sequence "800-996-5511", the only relevant digits are the "11" portion. The first "1" indicates that the digit immediate to its right (1) is the first digit in the serial number. Similarly, in the sequence "800-996-5526", the "2" indicates that the number immediate to its right (6) is the second number in the serial number. The client 10, in total, dials six numbers 172 in order to convey its six-digit serial number to the host.

In order to accommodate this method of serial number coding, the host monitoring system needs to subscribe to sixty different phone numbers. All sixty numbers should have the same first eight digits, and only vary from one another with respect to the last two digits. The ninth digit need only vary from "1" through "6" corresponding to the six digits within a serial code. However, the last digit must vary from "0" to "9".

Figure 4A:
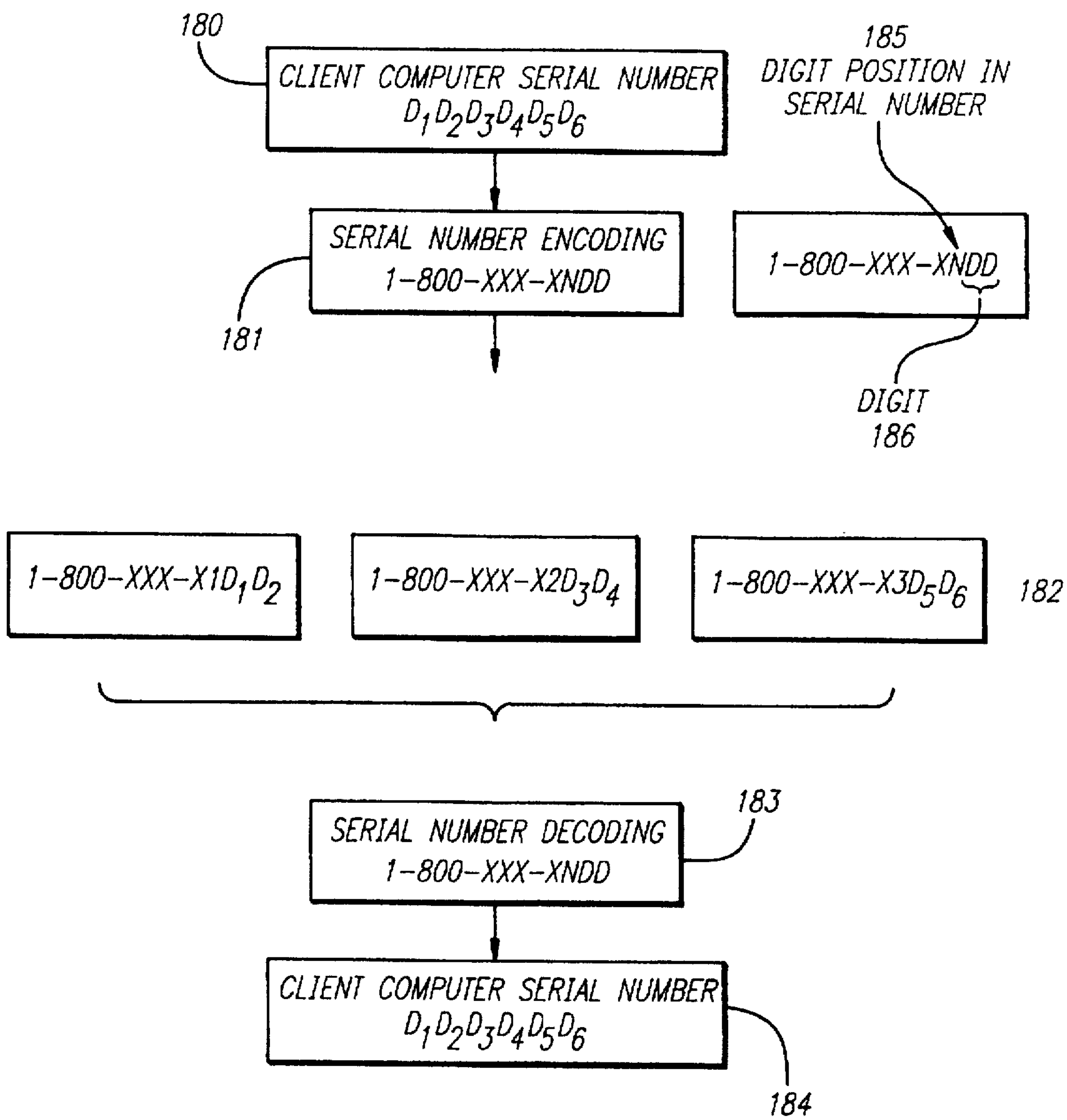
FIG. 4A is a schematic showing the encoding/decoding method whereby the monitoring service would have to subscribe to 300 telephone numbers.

Referring to FIG. 4A, the coding system can alternatively be modified such that the client computer 10 need only call the host three times to convey its serial number 180. According to this coding method, two digits of the serial number 186 would be transmitted in each call. Thus, the eighth dialed digit 185 would vary from "1" to "3", corresponding to the three packets of two digits 186 that make up the serial number 180. The ninth and tenth dialed digits 186 would vary from "0" through "9". However, this would require the operator of the monitoring system to subscribe to three hundred different phone numbers.

Host Processing, Auditing and Communication Subsystem

Figure 2C:
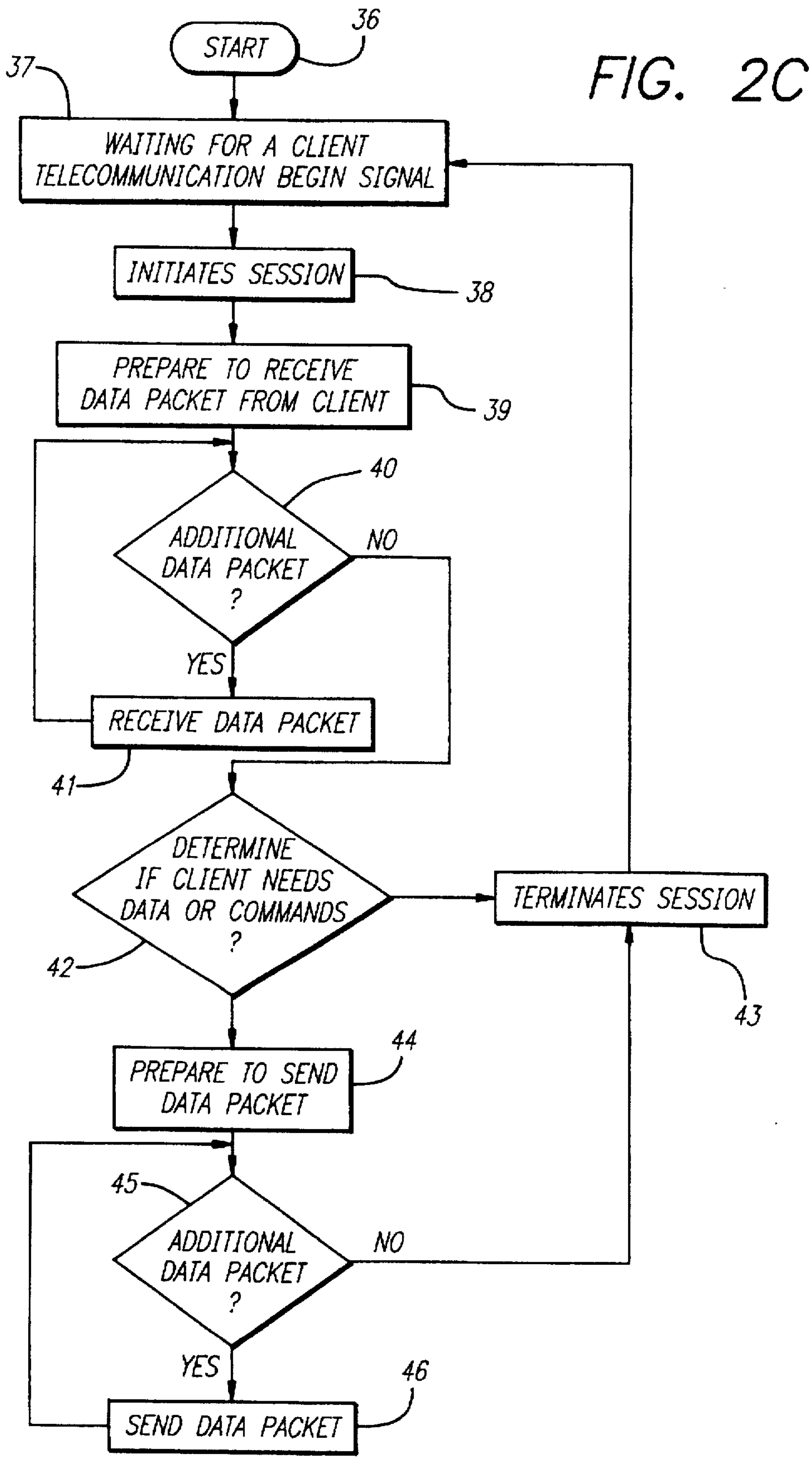
FIG. 2C is a flowchart of the process by which the Host Processing, Auditing and Communication Subsystem, contained within the host computer, exchanges data with an Agent.

Referring to FIG. 2C, the Host Processing, Auditing and Communication Subsystem receives and transmits information to and from clients. FIG. 2C is a flow diagram of the Host Communication program executed by host computer 3. After the host computer 3 is powered on 36, communication equipment is instructed to wait 37 for the telecommunication begin signal from the client computer 10. The telecommunication equipment acknowledges the begin signal by initiating a session to communicate with the client computer 38. The program first checks the client computer 39 to establish that it is sending data packets 40, and then receives the packets 41. Next, the program determines if the client has any data or commands to be sent to the host 42. If not, the session is terminated 43, and the cycle is repeated 37. When all data packets have been received, the program permits the host to send data packets to the client computer. The program prepares to send data packets 44, and then establishes that there are more data packets to be sent 45 before sending each packet 46. Once all data packets have been sent, the program terminates the session 43, hangs up the phone, and prepares to repeat the entire cycle 37. Host-side source codes are disclosed in the Appendix in Visual C++ (Microsoft) Code.

Host Notification Subsystem

Figure 2D:
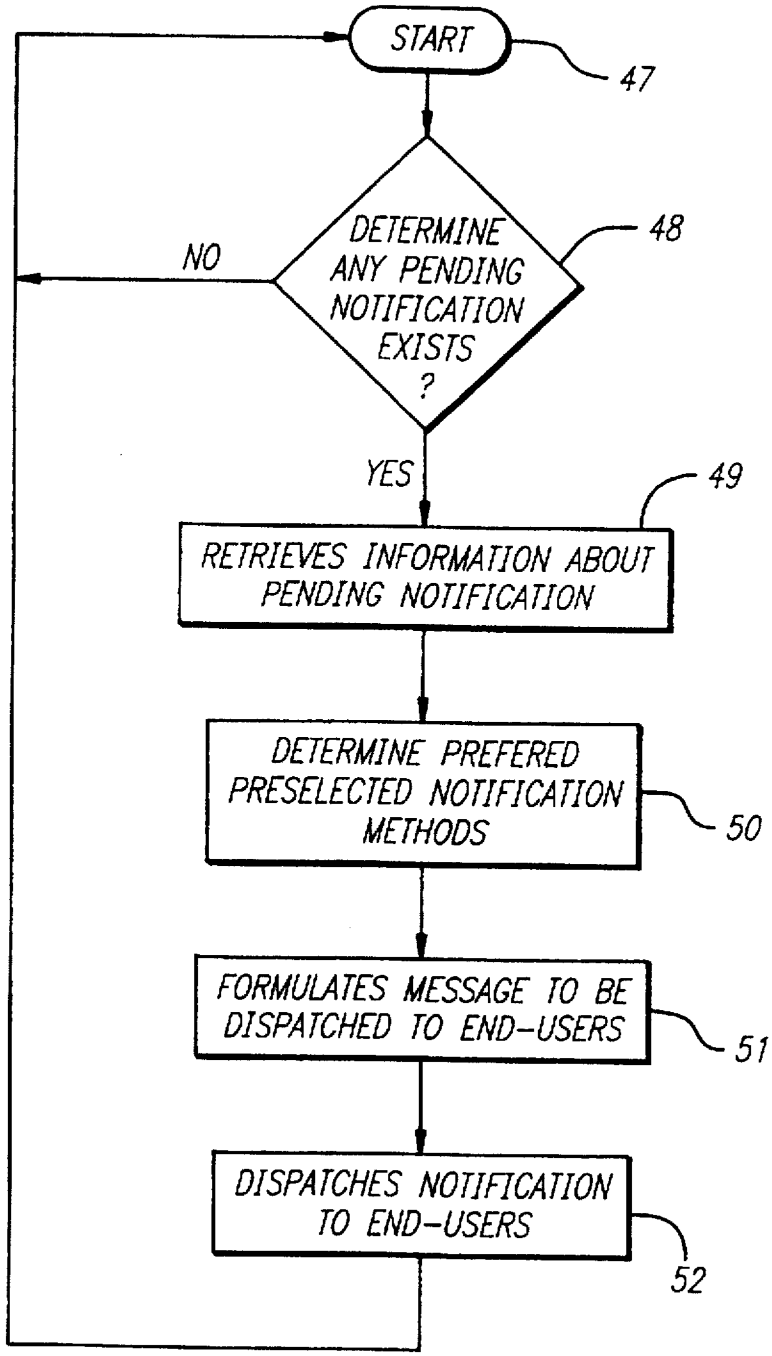
FIG. 2D is a flowchart of the process by which the Host Notification Subsystem, contained within the host computer, notifies end-users of the status of monitored devices.

The Host Notification Subsystem notifies the end-users regarding the status of their electronic devices. In FIG. 1, various methods of notification such as; electronic mail N1, fax N2, paging N4, and telephone call N3, are depicted. FIG. 2D is a flow diagram of the Host Notification program executed by host computer 3. The Host Notification program determines whether there are any pending notification instructions or commands 48. If there are pending notifications, the information is retrieved 49. The program then determines the preferred preselected notification method 50, and formulates the message to be dispatched 51 according to the preselected notification method. This message is dispatched to the end-user 52. After dispatching the message, the program repeats the entire cycle 47. Host-side source codes are disclosed in the Appendix in Visual C++ (Microsoft) Code.

Variations and Alternatives

The above description relates to the Agent security system installed and operating in a conventional PC with an Intel 80X86 microprocessor or equivalent and with a conventional MS-DOS or PC-DOS operating system. It will be recognized that the system can be modified to fit other types of computers including, for example, those sold under the trademark Macintosh. The system can easily be modified to suit other types of operating systems or computers as they develop in this rapidly advancing art.

The above system is also intended to be added to existing computers without physical alteration. Another approach is to modify the ROM of such computers to contain the Agent security system as shown in FIG. 3D. This is generally not considered to be feasible for computers sold without the security feature, but is a theoretical possibility. More likely is the possibility of incorporating the Agent security system into the ROM of portable computers, cellular telephones or other such items when they are manufactured. FIG. 3D above describes the loading of the system from such a modified ROM.

The description above also assumes that the computer device has a modem connected thereto or includes an internal modem. In the future it is likely that telephone systems will be digitized, thus obviating the need for a modem.

The system could also be included in the ROM of a cellular telephone. In this case, the program should be designed to hide the outgoing calls from the user by silencing audio signals and maintaining a normal screen display. It is also conceivable that portable computers can be supplied with integral cellular telephones modified in this manner or with some other telecommunication device. It is not clear at the time of this invention exactly which direction the field of telecommunications will likely go in the immediate future. The main telecommunication criteria for this Agent security system is that the outgoing transmission (wire, radio signal or otherwise), be received by a switching mechanism, and contain information that causes the switching mechanism to forward the information received to a remote station. Presently, this information is a telephone number. But other indicia of the remote station may be substituted in alternative switchable communications systems.

Attached hereto are descriptions relating to the following: (1) Description of the conventional boot up method; (2) Details of agent installation; (3) Brief description of the routines; (4) Copy of the source code (Appendix I) of both the client-side and host-side. This host-side source code is in Visual C++ (MicroSoft). The client-side source code is in Tazam Assembler Code by Borland.

It will be understood by someone skilled in the art that many of the details described above are by way of example only and are not intended to limit the scope of the invention which is to be interpreted with reference to the following claims.

Conventional Boot Up Method

Figure 3G:
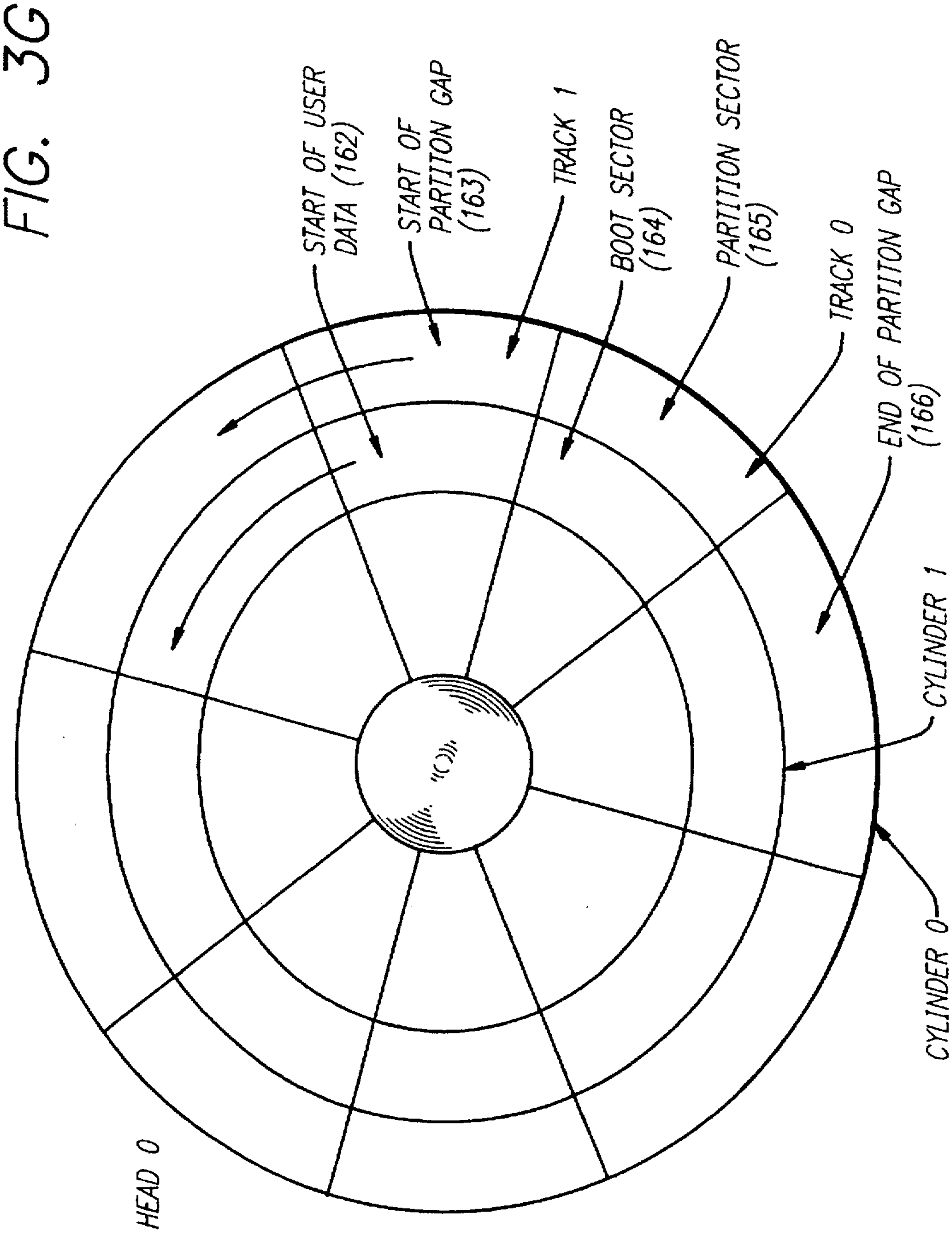
FIG. 3G is an isometric view, partly diagrammatic, of the physical structure of a computer disc.

Referring to FIG. 3G, an isometric view of a computer disc is shown. This figure illustrates the location of the start of user data 162, partition gap 163, boot sector 164, partition sector 165, and partition gap 166.

Referring to FIG. 3, upon hitting the on switch of a personal computer (PC) 53, the computer first goes through a conventional power-on self-test (POST) 54. At this point the Agent could be loaded if ROM-BIOS loading is used 60. POST ensures that all hardware components are running and that the central processing unit (CPU) and memory are functioning properly. Upon completion of the POST, the next task is to load software onto the random access memory (RAM) of the computer. Conventionally, there is a read-only memory (ROM) device which contains a boot program. The boot program searches specific locations on the hard disk, diskette or floppy disk for files which make up the operating system. A typical disk is shown in FIG. 3G. Once these files are found, the boot program on the ROM reads the data stored on the applicable portions of the disk and copies that data to specific locations in RAM. The first portion of the disk boot sector to be loaded is the partition boot sector 55 shown in FIG. 3G as 165. At this point the load partition boot sector method could be used 61. The partition boot sector 165 then loads the remaining boot sector 164 from the disk, namely the operating system boot sector 56. Now the Agent could be loaded according to the load operating system boot sector method 62. The operating system boot sector 164 loads into memory a system file, normally named IO.SYS on personal computers or IBMBIO.COM on IBM computers 57. Now the Agent could be loaded according to the IO.SYS or IBMMIO.COM methods. Each of these files is marked with a special file attribute that hides it from the DOS Dir. The IO.SYS or equivalent then loads the rest of the operating system, conventionally called MSDOS.SYS on MS-DOS systems, and IBMDOS.COM for PC-DOS systems. Next the AUTOEXEC.BAT is processed and run 58. Now the operating system is running 59. The Agent security system according to the invention is loaded during the boot up process and accordingly is transparent to the operating system.

Details of Agent Installation

Once the TENDER program, which enables the Agent to be installed, has been run and the Agent has been determined to be loaded via one, two or three of these alternatives, the system is primed and proceeds to attempt to install the Agent security system according to the present state of the computer memory and the instructions given by the programmer. The SNTLINIT routine initializes the Agent security system and is passed one of three possible loading options via the AX microprocessor register by the calling program (SUBLOADR), which itself was loaded on any one of the three enumerated locations described above. The SUBLOADR program reads the configuration file (which may be encrypted) that was generated for user input. The validity of the configuration file is checked at this point to see if it is corrupted or not. If for some reason it cannot read the configuration file, it initializes the Agent security system from a table of default settings.

The SUBLOADR program then checks to see if the Agent security system is in memory by looking for the "RPL" signature. SUBLOADR saves the application programmer interface (API) entry point and then determines which version of the security program, if any, is in memory. If not in memory, the SUBLOADR program searches the disk for the SNTLINIT routine. Depending upon the version of the SUBLOADR program, it may perform a validity check on the SNTLINIT routine. This routine may be a cyclical redundancy check (CRC) of 16 or 32 bits, a checksum check or a hash count.

The TENDER program checks the partition boot sector, the operating system boot sector, and the IO.SYS (or IBMBIO.COM on PC-DOS systems) to see if any of them have been modified to contain the SNTLINIT code. A comparison to the configuration file is made to determine if the Agent has already been installed in any of the alternative locations. If the Agent has already been installed, the TENDER program takes no action. It then tracks the level of modification that was requested by the user (i.e. whether one, two or three areas were to be modified). Each of these areas has all the modem related information written to it amongst other user selected settings. At this point it writes the current configuration file to disk.

The TENDER program then takes a system snapshot of the partition boot sector, the operating system boot sector and the IO.SYS or IBMMIO.COM file, validating them, determines and then writes this file to disk. It then checks the partition gap between the partitions, calculating the number of unused sectors between the valid boot sectors (be they partition or operating system boot sectors).

There is almost certainly at least 8K of space in the partition gap 163. The Agent security system requires only 4K. The SNTLINIT module is usually stored here. If for some reason there is not enough space in the partition gap, or if the data area is physically unusable, the TENDER program will pick a suitable cluster of sectors, mark the data area logically as being unusable, then store SNTLINIT in the cluster of sectors. The TENDER program sets out the attributes to system, hidden etc in order to hide the program image. It then calculates the physical coordinates of the cluster that was used and writes this information to the configuration file. At this point the system is ready to proceed and will be loaded prior to the completion of the loading of the operating system regardless of what strategy the programmer has chosen.

In a manner similar to how viruses reinfect the boot sector 164 of the hard disk drive, the Agent security system according to the invention uses such technology to help protect against theft of the computer. Other technologies such as system timer programming and communications programing are bound to this virus like technology to create a new technology. It should also be understood that a security company which handles incoming calls from clients may readily redefine the time period between successive calls from a client to its host.

The system is typically in one of two modes of operation: (1) Waiting until it is time to call/report into the server—"active mode"; (2) Calling or attempting to call the server—"alert mode". When the Agent security system changes it mode of operation from active to alert mode, the activation period is reduced to a minimal period such that the Agent calls the host eighteen times per second until a successful connection is made. The activation period in active mode is predetermined, and likely to be days if not weeks. This shortened activation period (time between successive calls) is necessary to prevent busy signals and other temporal error conditions from precluding transaction attempts. The system will stay in this alert mode until a valid transaction has been completed.

Since MS-DOS and PC-DOS were designed to be single-user, single-tasking operating systems, the timer interrupt is used to run the system unattended and automatically in the background to provide multi-tasking. Neither the user nor a potential thief would notice this background process although registered owners will be aware of its existence.

In a standard personal computer, routine housekeeping tasks are performed periodically and automatically by the CPU without instructions from the user. There is a timer routine which is called 18.2 times per second to perform such tasks as turning off the floppy disk motor after a certain period of inactivity. The Agent security system hooks into this timer routine. The total timer routine takes about 55 milliseconds and the Agent security system utilizes a small portion of CPU time during that period; this is limited to less than 0.5% of the total timer routine. This is not sufficient time to run the entire security program. Accordingly, the security program is run in small increments with each timer routine. It is important that the security program not "steal" enough computer time to be noticed. Otherwise the computer would be noticeably slowed and the existence of the program might be suspected.

Serial port and modem setup routines must be called by the timer interrupt. Once this is done, the serial interrupt handler that is being used will handle the details of data transfer between the client and host systems. Once the system is set up, the serial port interrupt handler does most of the work with the timer interrupt acting as a monitor watching the transaction when it happens between the client and the server. It analyzes the receive buffer and takes the appropriate actions as necessary. The communication portion of the system can handle outgoing and incoming data transfers on its own since it has its own access to the CPU via its own interrupt request (IRQ) line, typically IRQ3 or IRQ4. Therefore the system can handle the data flow between the client machine and the server unattended.

At the start of its time-slice, the timer interrupt checks the flag, which is set when a user uses the modem, in the Agent security system, the InComISR flag byte (In Communications Interrupt Service Routine). If the flag is set, the timer interrupt exits immediately so as not to interfere with the progress of any serial communications that may be occurring, therefore not disrupting any transaction in progress. If the flag is not set, the timer interrupt routine will check to see if the Agent security system is in an error state. If not in error, a flag called TimerISR count is set to indicate that a timer interrupt is in progress.

A deferred execution function pointer is used to point to the upcoming routine to be executed. Just before the timer interrupt routine finishes, it points to the next routine to be executed. When the next timer interrupt occurs the routine that was pointed to will be executed. The routine must complete in less than 55 milliseconds so that the next timer interrupt does not occur while the routine is still executing.

Attached to the PC's system bus are communications ports, all of which are optional and typically called COM1, COM2, COM3, COM4 for the first four ports. It is unusual to have more than four serial ports in a PC that is using only MS-DOS or PC-DOS as its operating system. The Agent security system also requires that a modem be connected to one of these serial ports so that calls can be made to a remote host server using normal telephone lines or dedicated telecommunications lines. When alerted 118, the Agent security system needs to be able to find an available serial port 119–122, once it does so it checks to see if a modem is attached 128–129 and tries to initialize it by sending it an initialization string 132. If successful, it checks for a dialtone, then tries to make a quiet call to a remote host server 141. Once the server has been connected, the client machine attempts to initiate a data transaction with the server so it can send its serial number and other data defined to be part of the transaction 151. The server is configured to connect at 2400 bps with no parity, 8 data bits and 1 stop bit. Thus the client matches this configuration. This allows a high connection reliability.

Description of Routines

SNTLINIT:

After this routine has been loaded high into conventional memory 67 and execution has been passed to it, the machine state is saved 68. Conventional memory is the first 640 kilobytes (655,360 bytes) of memory on an Intel 80X86 compatible computer for example. Registers 15 that are affected by this routine are saved on the stack, "saving the machine state". The stack referred to is a LIFO structure, where the LIFO stands for "last in first out". It is where you can temporarily save the contents of CPU registers so that you can restore their initial values.

The microprocessor register AX is used to pass one of three values to the SNTLINIT routine. Depending upon which of the three values are passed to this routine, three different courses of action will be taken. Each course of action describes how the program will initialize itself. To summarize, this routine initializes the Agent security system from either the partition boot sector 55, the operating system boot sector 56 or the input/output module of the operating system 57.

If the microprocessor register AX contains the value 0:

The partition sector 165 is loaded into memory (which has been overwritten on the disc with the boot sector version of the SUBLOADR module). On execution of this code, the SNTLINIT is called.

If the microprocessor register AX contains the value 1:

The boot sector 55 of the hard disk (which has been overwritten on the disc with the boot sector version of the SUBLOADR module) is loaded into memory. On execution of this code, the SNLINIT routine is called.

If the microprocessor register AX contains the value 2:

The first sector of IO.SYS/IBMBIO.COM 57 (which has been overwritten on the disk with the IO version of the SUBLOADR module) is loaded into memory.

This routine then tests to see if it is in memory already by checking for the 'RPL' signature 69, 84, 96, 108 located at the start of the address for Interrupt 2FH. If it is in memory, this routine exits 77 (to avoid loading more than one copy of the program into memory). If it is not already in memory, then it points (hooks) Interrupt 2FH to an internal routine 71, and does the same with Interrupt EAH 72. It then hooks Interrupt 8 after saving the original Interrupt 8 vector to an internal memory location (internal to the Agent security system).

The machine state is restored 74 and the routine exits by jumping to memory location 0000:7C00H for the partition table and boot sector execution paths or 0070:0000H for the IO execution path 75, 76.

SNTLAPI:

This API is for use by an external program. It has three functions as follows:

1. Get state of Agent security system. (Checks to see if Agent is already installed.)
2. Set state of Agent security system.
3. Set serial number of system.

SWAPINT:

SwapInt stores the existing interrupt vector by replacing the vector for the interrupt number in the CPU register BX with the new vector pointed to by the CPU register pair DS:CX after it stores the current vector at a location pointed to by the register pair DS:DI. If the CPU register DI contains 0 then the vector for the interrupt number contained in the CPU register BX is not stored.

DELAYFUNC:

This is a delay function used for hardware timing purposes. This routine is used in FIG. 3F, block 125.

TIMERISR:

Interrupt 8h/1Ch is the System Timer Interrupt which executes 18.2 times per second 117 and is used to do the following:

1. Call the old system timer interrupt.
2. Check to see if a communications interrupt is occurring, exiting immediately if so.
3. Save affected CPU registers.
4. Check for an internal state error, exiting immediately if so.
5. Call the state routine.
6. Restore the saved CPU registers.

ACTIVEROUTINE:

The ActiveRoutine checks to see if the activation period has been exceeded 118. By activation period we mean a period of time that has elapsed since the last valid security call. This period of time is set during the transaction to the server, but is initially set to approximately 7 days.

CHECKNEXT PORT:

This is a check for valid serial ports, and involves checking a table of serial port addresses 120 and then testing them to ensure their functionality 122. If a valid serial port cannot be found, a sleep state is entered 125. Upon awakening, this routine is repeated 119.

DELAYLOOP:

This delay is used for communications delays due to busy signals or no dial-tone and other problems that can affect the communications link.

PORTFINDINIT:

This procedure calls the previously described CHECKNEXTPORT function 118, 119 in its quest for a valid serial port to initialize. On finding a valid serial port, it stores the ports address, and its corresponding interrupt vector.

PORTFIND:

This is a check to see if the serial communications port is in use 123 by dynamically testing the registers in the universal asynchronous receiver—transmitter (UART) that is associated with the current serial port address. Specifically, it tests the Interrupt Enable Register of the UART. This UART register is read into the AL register of the CPU, and if any of the bits are set (logical 1), then the port is in use, otherwise the port is idle. It also tests the interrupt enable bit of the modem control register in the UART. If the bit is not set (logical 1) then the port is idle and available for use.

Each serial port in the port table 120 is checked until either a valid one is found 123, or the routine goes to sleep 125. If a serial port is found 123, this routine will decide whether or not to initialize the UART using the system BIOS. Interrupt 14H routine, or bypass this routine, programming the UART registers directly. If an error occurs during this process, the routine is exited, and CHECKNEXT PORT is invoked.

If the serial port is successfully initialized 128, 129 to the predefined bit rate, parity, word size, number of stop bits etc., the UART is cleared of any pending errors. The serial port buffer is flushed (emptied), so there is no chance of old data being picked up a second time. The state flag that the timer interrupt checks on each clock tick is cleared, as interrupt driven communications have not yet been set up. The appropriate interrupt number is selected and the old interrupt vector is swapped with the new one by calling SWAPINT. The statuses RTS (Request to Send) and DTR (Data Terminal Ready), are enabled in the UART. The 8259 PIC is then unmasked, interrupts are enabled in the UART, then the hardware interrupts for the CPU are enabled. Then this routine exits.

MODEMFINDDELAY:

This procedure sets the [state-routine] function pointer to point to the MODEMFINDINIT routine, delaying execution until the next interrupt.

MODEMFINDINIT:

This routine points to a string to send to the modem, then calls the COMTRANSINIT routine.

MODEMINITINIT:

This procedure tries to initialize the modem 130 with an appropriate initialization string from a table of initialization strings 131, and will try until either the modem is initialized or there are no more initialization strings in the table to try. The COMTRANSINIT routine is called from within this procedure 132–136.

MODEMINIT:

This procedure checks the state of the transmission, and checks for incoming data by calling the COMTRANS and COMTRANSCHECK routines 132. This procedure ends by jumping to a jump table which points to the next appropriate routine.

MODEMCALLINIT:

This routine attempts to place a call 137, 138 by selecting a telephone number 139 (and its appropriate prefix if necessary) from a table of dial strings 140. It will continue to do so until either a call is completed 148 or there are no more initialization strings in the table to try. If a call could not be made 144 then the CLEANUPROUTINE and ERRORROUTINE procedures are to be run during the next state(s) (Interrupt 8 system timer ticks) 155.

MODEMCALLINIT2:

This routine checks the state of the transmission, ending if it is complete. This procedure is called from within the MODEMCALLINIT routine. It in turn calls the MODEMCALL procedure.

MODEMCALL:

This routine checks the state of the transmission, ending if it is incomplete. It also checks to see if data has been received yet or not.

MODEMCONNECTINIT:

This procedure waits for a query from the host server 148 (at the other end of the communications link), and sends the serial number 151 of the computer. If a call could not be made then the CLEANUPROUTINE and ERRORROUTINE procedures 155 are to be run during the next state(s) (Interrupt 8 system timer ticks).

MODEMCONNECT:

This routine checks the state of the transmission, ending if the transmission is incomplete.

CLEANUPROUTINE:

This routine resets the Agent security system 155, 156 (sometimes referred to as Sentinel in the source code) back to a known state (ACTIVE), zeroes the transmissionstate flags, flushes the UART buffer. Then it disables all interrupts, restores the old communications interrupt service routine via the SWAPINT procedure. It then sets the state routine function pointer to the CLEANUPROUTINE (to be rim during the next Interrupt 8).

ERRORROUTINE:

The Agent security system state is set to SNTL STATEERROR (the Agent security system is put in an error state).

COMISR:

The interrupt service routine used to control one of the systems serial communications ports (and one of the Interrupt Request lines) in order to provide telecommunications services to the Agent security system. It calls the SENDBYTE and BUT PUTCHAR procedures. It handles the low-level details of sending and receiving data during the transmission when it happens.

SENDBYTE:

This procedure attempts to send a byte of data to the referenced serial communications port (a variable containing the port address). This routine is used in 141, 151.

COMTRANSINIT:

This procedure initializes a transaction between the Agent security system and the modem. A transaction involves sending a string of data 151 to the modem to be sent via telecommunications link to a host server, which after receiving the string of data, in return, sends back a string of data to the client machine 152 containing the Agent security system. The returned string can then be analyzed by the Agent security system to determine what action should be taken next.

COMTRANS:

This procedure handles much of the technical details regarding the maintenance of the transaction between the Agent security system and the host server 129, 134, 135, 143, 144, 145, 152, 157. It is primarily responsible for error handling such as incomplete transactions and stalled transmissions.

COMTRANSCHECK:

Checks the results of a completed transaction between the host server, and the client security system against a table of strings. Three possible outcomes are allowed for:

1. If the incoming data has not been completely received, the carry flag of the client CPU is set (logical 1).
2. If the function timed out (exceeded a time threshold value) and no Agent security system internal string matched the string received from the host server, the carry flag of the client CPU is set, and the AH register is zeroed.
3. If a matching string was found, the carry flag on the client CPU is reset (local O), and the AL register contains a value that matches the internal table entry.

BUF_FLUSH:

Flushes the internal serial port communications receive buffer on the client machine (containing Agent security system).

The buffer is a circular queue. A circular queue is a data structure that has what is called a head pointer and a tail pointer where the head pointer chases the tail pointer around the queue, never really catching it, but processes each byte of the data stored in it. As a byte of data is received by the serial port, it is latched and must be put into a buffer (an area of memory reserved for this purpose) before the next byte arrives (which overwrites the existing latched byte).

Whenever a communications session starts, it is important that both the input and output buffers are flushed so that all new incoming and outgoing data are not contaminated by old data still sitting in the buffer.

BUF_GETCHAR:

Gets a character from the internal serial port communications receive buffer, removing it from the buffers as it does so.

BUF_PUTCHAR:

Adds a character to the internal serial port communications receive buffer. Increments the head pointer, checking to see if the buffer is full, and setting the carry flag it if it is.

BUF_INC_PTR:

Increments the receive buffer pointer assigned to the client CPU register SI, and wraps it if necessary.

INT2FVECT:

Reserves the required space at the top of conventional memory for the RAM resident portion of the Agent security system. The undocumented Interrupt 21 H, Function 4AH, SubFunction 06 is used to do this.

APPENDIX [illegible] - SOURCE CODES

Electronic Article Surveillance System
Source Code for Client-side
(Tazam Assembler Code by Borland)

```
;***************************************************************************
*
;* Copyright (c) Absolute Software 1994, 1995
;*
;* SENTINEL.INC - Sentinel definition file
;*
;* PURPOSE:
;*    This file contains or INCLUDEs all constants, macros, and directives
used
;*    by the Sentinel Module.
;*
;* HISTORY:
;*    1995.09.05 - CCOTI
;*              New source file taken from build 63a.
;*              See the subdirectory OldFiles for the original
;*              SENTINEL.INC
;*
;* NOTES:
;*
;***************************************************************************
*

IDEAL                                                  ; Set parsing mode.
JUMPS                                                  ; Allow local jumps.
P286N                                                  ; Allow 286
instructions only.

INCLUDE "UART.INC"                                     ; RS232 UART
constants.

; Enable Debugging.
      Debug = 0

; Sentinel Signature.
      SNTL_SIG1            = 0FDFEh
      SNTL_SIG2            = 0EFCDh

; Sentinel Version number.
      SNTL_VERSION = 0 * 256 + 100

; Conditional compilation switches.
      EMIT_ON = 0                    ; enables debugging.
      IODELAY_ON = 1                 ; enables io delays.
      TWODSKHKS = 0                  ; to maintain deflection with 32-bit disk
access

; Timing & Delays.
      PORT_LOOP_DELAY = 18           ; 1 second delay
      DIAL_LOOP_DELAY = 18 * 5       ; provide an inter-dial delay of 5 seconds

      PREINT13_TIMEOUT = 18 * 120    ; Timeout before sentinel hook the system.

; Magic Numbers and Fixed Offsets.
      DATA_SECTOR_OFFSET = 130h      ; MUST Be Sector aligned for disk write
                                     ; (see Int13ISR)

; Debug macros.
MACRO EMIT ch
   IF EMIT_ON
      PUSH      AX
      MOV       AL,ch
      CALL      PutChar
      POP       AX
```

```
   ENDIF
ENDM

MACRO IODELAY
   IF IODELAY_ON
      CALL      DelayFunc
   ENDIF
ENDM

;***********DO NOT CHANGE WITHOUT UPDATING SUBLOADR.H***********
; Sentinel State constants.
SNSTACTIVE     = 0
SNSTALERT      = 1
SNSTCALLING    = 2
SNSTCONNECT    = 3
SNSTERROR      = 4                ; Check for error: >= SNTL_STATE_ERROR

;**************************************************************

; Bit flag settings for <xmit state flags>.
XMIT_RECEIVE_BIT      = 00000001b
XMIT_SEND_BIT         = 00000010b
XMIT_SENT_AWK_BIT     = 00000100b
XMIT_RECEIVE_AWK_BIT  = 00001000b

IFDEF Testing
   RECEIVE_TIMEOUT       = 0FFFFh       ; test timeout huge
ELSE
   RECEIVE_TIMEOUT       = 18 * 40      ; timeout ~= 40 seconds.
ENDIF
                                        ; timer values (based on 18
ticks/second)
TM1SEC       = 18 * 1
TM2SEC       = 18 * 2
TM3SEC       = 18 * 3
TM4SEC       = 18 * 4
TM5SEC       = 18 * 5
TM6SEC       = 18 * 5
TM2SEC       = 18 * 5
TM10SEC      = 18 * 10
TM30SEC      = 18 * 30
TM40SEC      = 18 * 40
TM1MIN       = 18 * 60
TM2MIN       = 18 * 60 * 2
                                        ; timeouts
SNMDMFINDTO   = 18 * 5                  ; modem find timeout ~5 seconds
SNMDMINITTO   = 18 * 5                  ; modem initialization timeout ~5
seconds
SNMDMDLTO     = 18 * 40                 ; modem dial out timeout ~40 seconds
SNRESPONSETO = 18 * 40                  ; server response timeout ~40 seconds
SNPWRUPDLYTO = 18 * 10                  ; power-up delay before hooking int 2F
~10 seconds

                                        ; call status
SNCALLNA     = 0                        ; no attempt yet
SNPRTSRCH    = 1                        ; searching for an available port
SNMDMSRCH    = 2                        ; searching fo a modem on the port
SNMDMINIT    = 3                        ; initializing modem
SNMDMPD      = 4                        ; sending predial string to modem
SNMDMDL      = 5                        ; sending dial string to modem
SNWTCON      = 6                        ; waiting for modem to connect to
server
SNWTENQ      = 7                        ; waiting for ENQ from server
```

```
SNWTACK    = 8                          ; waiting for ACK from server
SNWTNCD    = 9                          ; waiting for next-call-date from
server
SNCALLPASS = 10                         ; call passed
SNCALLFAIL = 11                         ; call failed


STRUC RXZCM                             ; receiver structure
   rxxstate    DW ?                     ; receiver state
   rxxtmr      DW ?                     ; receive timer
   rxxlrc      DB ?                     ; received packet running-sum LRC
   rxxpktlen   DW ?                     ; packet length to receive
   rxxbytcnt   DW ?                     ; received bytes in current packet
   rxxtype     DB ?                     ; packet type
   rxxstype    DB ?                     ; packet subtype
   rxxbufp     DW BYTE PTR ?            ; pointer to receive buffer
ENDS RXZCM

STRUC TXZCM                             ; transmit structure
   txxstate    DW ?                     ; current transmitter state
   txxnxtst    DW ?                     ; next transmitter state
   txxtmr      DW ?                     ; transmit timer
   txxpkttyp   DB ?                     ; packet type to transmit
   txxtxing    DB 0                     ; transmission in progress flag
   txxnakcnt   DB 0                     ; transmit NAK count
   txxenqcnt   DB 0                     ; transmit ENQ count
   txxlrc      DB ?                     ; transmit packet running-sum LRC
   txxpktlen   DW ?                     ; remaining data bytes to transmit
   txxdatcnt   DW ?                     ; index of next data byte to transmit
   txxtype     DB ?                     ; packet type
   txxstype    DB ?                     ; packet subtype
   txxbufp     DW BYTE PTR ?            ; pointer to transmit buffer
ENDS TXZCM

                                        ; transmit packet types:
CMTXDATPKT = 0                          ;     data packet
CMTXMDMPKT = 1                          ;     modem packet
CMTXDLACK  = 2                          ;     datalink ACK
CMTXDLNAK  = 3                          ;     datalink NAK
CMTXDLENQ  = 4                          ;     datalink ENQ
CMTXDLEOT  = 5                          ;     datalink EOT

                                        ; protocol control characters
DLSTX      = 2h                         ; STX character
DLETX      = 3h                         ; ETX character
DLEOT      = 4h                         ; EOT character
DLENQ      = 5h                         ; ENQ character
DLACK      = 6h                         ; ACK character
DLNAK      = 15h                        ; NAK character

                                        ; protocol message types
SNSERVER     = 80h                      ; message from the server

                                        ; protocol message subtypes
SNNEXTCALL   = 0h                       ; next call packet
SNDISABLE    = 1h                       ; disable sentinel packet


SNSNTLSIZE   = 11                       ; Sentinel sector size
```

```
;****************************************************************************
*
;* Copyright (c) Absolute Software 1994, 1995
;*
;* SNTLAPI.INC
;*
;* Contains global labels for the api module.
;*
;* HISTORY:
;*    1995.09.05 - CCOTI
;*             Created.
;*
;****************************************************************************
*

SEGMENT SNTL_SEG BYTE PUBLIC 'CODE'

   GLOBAL SntlAPI                          : FAR

   GLOBAL SwapInt                          : NEAR

IF IODELAY_ON
   GLOBAL DelayFunc                        : NEAR
ENDIF

   GLOBAL CmpDates                         : NEAR

ENDS
```

```
;***************************************************************************
*
;* Copyright (c) Absolute Software 1994, 1995
;*
;* SNTLBUFF.INC
;*
;* Contains global labels for the buffer module.
;*
;* HISTORY:
;*    1995.09.05 - CCOTI
;*             Created.
;*
;***************************************************************************
*

SEGMENT SNTL_SEG BYTE PUBLIC 'CODE'

   GLOBAL buf_flush                    : NEAR
   GLOBAL buf_getchar                  : NEAR
   GLOBAL buf_putchar                  : NEAR
   GLOBAL buf_inc_ptr                  : NEAR

ENDS
```

```
;*****************************************************************************
*
;* Copyright (c) Absolute Software 1994, 1995
;*
;* SNTLCOMM.INC
;*
;* Contains the global labels for the comm module.
;*
;* HISTORY:
;*    1995.09.05 - CCOTI
;*             Created.
;*
;*****************************************************************************
*

SEGMENT SNTL_SEG BYTE PUBLIC 'CODE'

   GLOBAL cmftxnak                          : NEAR
   GLOBAL cmftxenq                          : NEAR
   GLOBAL cmfprpmdm                         : NEAR
   GLOBAL cmftx                             : NEAR
   GLOBAL cmfpack                           : NEAR

ENDS
```

```
;****************************************************************************
*
;* Copyright (c) Absolute Software 1994, 1995
;*
;* SNTLCOMV.INC
;*
;* Contains global lable for the Comm ISR.
;*
;* HISTORY:
;*     1995.09.05 - CCOTI
;*              Created.
;*
;****************************************************************************
*

SEGMENT SNTL_SEG BYTE PUBLIC 'CODE'

   GLOBAL cmfisr                          : FAR

ENDS
```

```
;***************************************************************************
*
;* Copyright (c) Absolute Software 1994, 1995
;*
;* SNTLDATA.INC
;*
;* PURPOSE:
;*    Contains the global labels for the data segment.
;*
;* HISTORY:
;*    1995.09.05 - CCOTI
;*             Created.
;*
;***************************************************************************
*

SEGMENT SNTL_SEG BYTE PUBLIC 'CODE'

   GLOBAL sngstftn             : WORD
   GLOBAL Sentinel_state       : BYTE

;Scatch vars to store the current port info being used.
   GLOBAL sngmdmprt            : WORD
   GLOBAL sngmdmprtint         : WORD
   GLOBAL sngmdmprtadd         : WORD

;Previous ISR vectors.
   GLOBAL sngprvtmr            : DWORD
   GLOBAL sngprvcom            : DWORD
   GLOBAL sngprvdsk1           : DWORD

IF TWODSKHKS
   GLOBAL sngprvdsk2           : DWORD
   GLOBAL sng2dskhks           : BYTE
   GLOBAL sngdskskip           : BYTE
ENDIF

   GLOBAL sngprvint2f          : DWORD

;ROR'd to limit updating the real-time clock once every 16 ticks (see
ActiveRoutine).
   GLOBAL cycle_var            : WORD

   GLOBAL win_flag             : BYTE
   GLOBAL win_vm               : BYTE

   GLOBAL sngincmisr           : BYTE

   GLOBAL send_buf_len         : WORD
   GLOBAL send_buf_ptr         : WORD

   GLOBAL sngcomcnt            : WORD
   GLOBAL sngcomerr            : BYTE
   GLOBAL TimerISR_count       : WORD
   GLOBAL sent_count           : WORD
   GLOBAL received_count       : WORD
   GLOBAL sngflcnt             : BYTE
   GLOBAL sngclst              : BYTE
   GLOBAL sngcomhk             : BYTE
   GLOBAL sngsuspend           : BYTE
   GLOBAL sngdlytmr            : WORD
   GLOBAL sngint2ftmr          : WORD
   GLOBAL sngprtdlytmr         : WORD
```

```
    GLOBAL sngdeflect           : BYTE
    GLOBAL dkgcyl               : WORD
    GLOBAL dkgsctr              : BYTE
    GLOBAL sngapifl             : BYTE
    GLOBAL sngpwd1              : WORD
    GLOBAL sngpwd2              : WORD

;Sentienl Settings.

    GLOBAL modem_default_port   : WORD

    GLOBAL port_table           : WORD
    PORT_TABLE_SIZE = 4

; Disk location of data sector.

    GLOBAL data_cyl_sect        : WORD
    GLOBAL data_head_drive      : WORD
    GLOBAL sngdskwrt            : BYTE

; Output strings.

    GLOBAL init_str_num         : WORD
    GLOBAL init_str_table       : WORD : 5
    INIT_STR_TABLE_SIZE = 6

    GLOBAL dial_str_num         : WORD
    GLOBAL dial_str_table       : WORD : 4
    DIAL_STR_TABLE_SIZE = 5

    GLOBAL dial_number          : BYTE

    GLOBAL sn_packet_start      : UNKNOWN
    GLOBAL stx_byte             : BYTE
    GLOBAL lsb_length_byte      : BYTE
    GLOBAL msb_length_byte      : BYTE
    GLOBAL sn_text_start        : UNKNOWN
    GLOBAL text_type            : BYTE
    GLOBAL text_sub_type        : BYTE
    GLOBAL sn_data_start        : UNKNOWN
    GLOBAL sngsernum            : BYTE : 6
    GLOBAL now_date             : UNKNOWN
    GLOBAL now_year             : BYTE
    GLOBAL now_month            : BYTE
    GLOBAL now_day              : BYTE
    GLOBAL now_hour             : BYTE
    GLOBAL now_minute           : BYTE
    GLOBAL sn_data_end          : UNKNOWN
    GLOBAL etx_byte             : BYTE
    GLOBAL lrc_byte             : BYTE
    GLOBAL sn_packet_end        : UNKNOWN
    GLOBAL sngsernum_str        : UNKNOWN
    GLOBAL sngsernum_str_len    : BYTE
    GLOBAL sngdatalen           : BYTE

    GLOBAL rx                   : RXZCM

    GLOBAL tx                   : TXZCM

; Result tables.
    GLOBAL command_result_table_len      : BYTE
    GLOBAL command_result_table          : UNKNOWN
```

```
GLOBAL mdm_init_result_table_len     : BYTE
GLOBAL mdm_init_result_table         : UNKNOWN

GLOBAL dial_result_table_len         : BYTE
GLOBAL dial_result_table             : UNKNOWN

GLOBAL connect_result_table_len      : BYTE
GLOBAL connect_result_table          : UNKNOWN

; Modem and result string pool.
GLOBAL string_pool                   : BYTE : 127

GLOBAL modem_find_str                : UNKNOWN

; next call date
GLOBAL next_call_date                : UNKNOWN
GLOBAL next_call_year                : BYTE
GLOBAL next_call_month               : BYTE
GLOBAL next_call_day                 : BYTE
GLOBAL next_call_hour                : BYTE
GLOBAL next_call_minute              : BYTE

GLOBAL sngrxbufhd                    : WORD
GLOBAL sngrxbuftl                    : WORD
GLOBAL sngrxbufst                    : UNKNOWN
GLOBAL sngrxbuf                      : BYTE
GLOBAL sngrxbufend                   : UNKNOWN

GLOBAL nextcall_text                 : BYTE : 5

GLOBAL sngtxindex                    : BYTE
GLOBAL sngtxbufst                    : UNKNOWN
GLOBAL sngtxbuf                      : BYTE
GLOBAL sngtxbufend                   : UNKNOWN


; Result jump tables.

    ; Table for ModemFind
GLOBAL find_jump_table               : CODEPTR

    ; Table for ModemInit.
GLOBAL init_jump_table               : CODEPTR

    ; Table for dial results.
GLOBAL dial_jump_table               : CODEPTR

GLOBAL cnct_jump_table               : CODEPTR

ENDS
```

```
;*****************************************************************************
*
;* Copyright (c) Absolute Software 1994, 1995
;*
;* SNTLI13V.INC
;*
;* PURPOSE:
;*    Contains INT 13 ISRs and disk deflection routines.
;*
;* HISTORY:
;*    1995.09.05 - CCOTI
;*              Created.
;*
;*****************************************************************************
*

SEGMENT SNTL_SEG BYTE PUBLIC 'CODE'

   GLOBAL load_time         : WORD
   GLOBAL Int13ISR          : FAR

ENDS
```

```
;*****************************************************************************
*
;* Copyright (c) Absolute Software 1994, 1995
;*
;* SNTLI2FV.INC - SNTLI2FV.ASM global lables.
;*
;* PURPOSE:
;*
;* HISTORY:
;*    1995.09.05 - CCOTI
;*              Created.
;*
;* NOTES:
;*
;*****************************************************************************
*

SEGMENT SNTL_SEG BYTE PUBLIC 'CODE'

   GLOBAL Int2FVect      : FAR
   GLOBAL snfint2f       : FAR

ENDS
```

```
;****************************************************************************
*
;* Copyright (c) Absolute Software 1994, 1995
;*
;* SNTLJTBL.INC
;*
;* Contains the global labels for the jump table.
;*
;* HISTORY:
;*    1995.09.05 - CCOTI
;*             Created.
;*
;****************************************************************************
*

SEGMENT SNTL_SEG BYTE PUBLIC 'CODE'

   GLOBAL JumpTable                    : NEAR

   GLOBAL cleanup                      : NEAR

   GLOBAL find_ok                      : NEAR
   GLOBAL find_timeout                 : NEAR

   GLOBAL init_ok                      : NEAR
   GLOBAL init_error                   : NEAR

   GLOBAL dial_server                  : NEAR
   GLOBAL dial_busy                    : NEAR
   GLOBAL dial_error                   : NEAR
   GLOBAL dial_no_carr                 : NEAR
   GLOBAL dial_no_tone                 : NEAR

   GLOBAL cnct_ack                     : NEAR
   GLOBAL cnct_enq                     : NEAR
   GLOBAL cnct_error                   : NEAR
   GLOBAL cnct_eot                     : NEAR
   GLOBAL cnct_nak                     : NEAR
   GLOBAL cnct_resend                  : NEAR

   GLOBAL cmrxpktto                    : NEAR

ENDS
```

```
;*****************************************************************************
*
;* Copyright (c) Absolute Software 1994, 1995
;*
;* SNTLSTRT.INC
;*
;* Contains global lables for the string table module.
;*
;* HISTORY:
;*    1995.09.05 - CCOTI
;*              Created.
;*
;*****************************************************************************
*

SEGMENT SNTL_SEG BYTE PUBLIC 'CODE'

   GLOBAL ComTransCheck                    : NEAR

ENDS
```

```
;*****************************************************************************
*
;* Copyright (c) Absolute Software 1994, 1995
;*
;* SNTLTIMR.ASM
;*
;* Contains the global labels for the TimerISR.
;*
;* HISTORY:
;*    1995.09.05 - CCOTI
;*             Created.
;*
;*****************************************************************************
*

SEGMENT SNTL_SEG BYTE PUBLIC 'CODE'

   GLOBAL tmfisr                        : FAR
   GLOBAL ActiveRoutine                 : NEAR
   GLOBAL snfsnrst                      : NEAR
   GLOBAL ModemInitInit                 : NEAR
   GLOBAL ModemCallInit                 : NEAR
   GLOBAL ModemFindInit                 : NEAR
   GLOBAL snftxchkin                    : NEAR
   GLOBAL snfgetpkt                     : NEAR

ENDS
```

```
;
; UART.INC -- Asm header file for programming the UART chip.
;

; UART memory port base addresses
  COM1_ADDRESS     equ    3F8h
  COM2_ADDRESS     equ    2F8h
  COM3_ADDRESS     equ    3E8h
  COM4_ADDRESS     equ    2E8h

; UART port interupts
  COM1_INTERUPT    equ    04h
  COM2_INTERUPT    equ    03h
  COM3_INTERUPT    equ    04h
  COM4_INTERUPT    equ    03h

; UART memory port offsets
  THR    equ   0          ; Transmitter holding register (out).
  RDR    equ   0          ; Receiver data register (in).
  BRDL   equ   0          ; Low byte, baud rate divisor (alternate port).
  IER    equ   1          ; Interupt enable register.
  BRDH   equ   1          ; High byte, baud rate divisor (alternate port).
  IIR    equ   2          ; Interupt ID register.
  LCR    equ   3          ; Line control register.
  MCR    equ   4          ; Modem control register.
  LSR    equ   5          ; Line status register.
  MSR    equ   6          ; Modem status register.

; UART memory bit masks

; Interupt enable register.
  IER_RDR_FULL          equ    00000001b
  IER_THR_EMPTY         equ    00000010b
  IER_DATA_ERR          equ    00000100b
  IER_MSR_CHANGED       equ    00001000b

; Interupt ID register.
  IIR_MULT_INT          equ    00000001b

  IIR_INT_ID_MASK       equ    00000110b
     IIR_MSR_CHANGED    equ    00000000b
     IIR_THR_EMPTY      equ    00000010b
     IIR_RDR_FULL       equ    00000100b
     IIR_DATA_ERR       equ    00000110b

; Line control register.
  LCR_CHAR_MASK         equ    00000011b
     LCR_CHAR_5         equ    00000000b
     LCR_CHAR_6         equ    00000001b
     LCR_CHAR_7         equ    00000010b
     LCR_CHAR_8         equ    00000011b

  LCR_STOP_BIT_MASK     equ    00000100b
     LCR_1STOP_BIT      equ    00000000b
     LCR_2STOP_BIT      equ    00000100b

  LCR_PARITY_MASK       equ    00111000b
     LRC_NO_PARITY      equ    00000000b
     LRC_ODD_PARITY     equ    00100000b
     LRC_EVEN_PARITY    equ    00110000b
     LRC_MARK_PARITY    equ    00101000b
     LRC_SPACE_PARITY   equ    00111000b
```

```
    LCR_BREAK_MASK          equ     01000000b
       LCR_BREAK_OFF        equ     00000000b
       LCR_BREAK_ON         equ     01000000b

    LCR_PORT_MASK           equ     10000000b
       LCR_NORMAL_PORT      equ     00000000b
       LCR_ALT_PORT         equ     10000000b

; Modem control register.
    MCR_DTR_ON              equ     00000001b
    MCR_RTS_ON              equ     00000010b   ;NOT CONFIRMED!!!
    MCR_USER_OUT_1          equ     00000100b
    MCR_ENABLE_INT          equ     00001000b
    MCR_UART_TEST           equ     00010000b

; Line status register.
    LSR_RDR_FULL            equ     00000001b
    LSR_OVER_ERR            equ     00000010b
    LSR_PARITY_ERR          equ     00000100b
    LSR_FRAMING_ERR         equ     00001000b
    LSR_BREAK               equ     00010000b
    LSR_THR_EMPTY           equ     00100000b
    LSR_TSR_EMPTY           equ     01000000b

; Modem status register.
    MSR_CTS_CHANGED         equ     00000001b
    MSR_DSR_CHANGED         equ     00000010b
    MSR_RI_CHANGED          equ     00000100b
    MSR_DCD_CHANGED         equ     00001000b
    MSR_CTR_ACTIVE          equ     00010000b
    MSR_DSR_ACTIVE          equ     00100000b
    MSR_RI_ACTIVE           equ     01000000b
    MSR_DCD_ACTIVE          equ     10000000b


; BIOS services.
    BIOS_INIT_PORT          equ     00h
    BIOS_WRITE_PORT         equ     01h
    BIOS_READ_PORT          equ     02h
    BIOS_STATUS_PORT        equ     03h

; BIOS initialization values.
    BIOS_7BITS              equ     00000010b
    BIOS_8BITS              equ     00000011b
    BIOS_1STOP              equ     00000000b
    BIOS_2STOP              equ     00000100b

    BIOS_PARITY_MASK        equ     00011000b
       BIOS_NO_PARITY       equ     00000000b
       BIOS_ODD_PARITY      equ     00001000b
       BIOS_EVEN_PARITY     equ     00011000b

    BIOS_BAUD_MASK          equ     11100000b
       BIOS_110_BAUD        equ     00000000b
       BIOS_150_BAUD        equ     00100000b
       BIOS_300_BAUD        equ     01000000b
       BIOS_600_BAUD        equ     01100000b
       BIOS_1200_BAUD       equ     10000000b
       BIOS_2400_BAUD       equ     10100000b
       BIOS_4800_BAUD       equ     11000000b
       BIOS_9600_BAUD       equ     11100000b
```

```
;***************************************************************************
*
;* Copyright (c) Absolute Software 1994, 1995
;*
;* SENTINEL.ASM - Sentinel Initialization and TSR Code
;*
;* PURPOSE:
;*    This is the main build file for the Sentinel module.
;*
;* HISTORY:
;*    1995.09.05 - CCOTI
;*             Source taken from build 63a and broken up into separate source
;*             files.  See the subdirectory OldFiles for the original
;*             SNTLINIT.ASM
;*
;***************************************************************************
*

IDEAL
include "SENTINEL.INC"

;...
;...
;***************************************************************************
*
;*
;* SNTL_SEG - Resident segment.
;*
;***************************************************************************
*
SEGMENT SNTL_SEG PARA PUBLIC 'CODE'

;==========================================================================
=
include "SNTLJTBL.ASM"

;==========================================================================
=
include "SNTLCOMV.ASM"

;==========================================================================
=
include "SNTLSTRT.ASM"

;==========================================================================
=
include "SNTLBUFF.ASM"

;==========================================================================
=
include "SNTLI2FV.ASM"

;==========================================================================
=
include "SNTLI13V.ASM"

ENDS

   END
```

```
;******************************************************************************
*
;* Copyright (c) Absolute Software 1994, 1995
;*
;* SNTLAPI.ASM
;*
;* Contains the sentinel API routine and general purpose routines used by all
;*  modules.
;*
;* HISTORY:
;*    1995.09.05 - CCOTI
;*             Created.
;*
;******************************************************************************
*

IDEAL

%NOLIST
include "SENTINEL.INC"
include "SNTLAPI.INC"
include "SNTLDATA.INC"
include "SNTLTIMR.INC"
%LIST

SEGMENT SNTL_SEG BYTE PUBLIC 'CODE'

;******************************************************************************
*
;*
;* SNTLAPI
;*
;* PURPOSE:
;*    This function provides an external API for the Ward and Tender modules,
;*    as well as development software tools, to gain access to the Sentinel.
;*
;*    The following functions are supported:
;*
;*    Function 0 - Get Sentinel State
;*       returns AL = Sentinel_state
;*               BX = sngstftn
;*
;*    Function 1 - Set Sentinel State to ALERT
;*       returns CF = 0 if successful
;*               CF = 1 if failed
;*
;*    Function 2 - Get Sentinel Version Number
;*       returns AH = major version number
;*               AL = minor version number
;*
;*    Function 3 - Get Sentinel Serial Number
;*       returns ES:DI = pointer to serial number
;*
;*    Function 4 - Cancel Sentinel ALERT
;*       returns CF = 0 if successful
;*               CF = 1 if failed
;*
;*    Function 5 - Set next-call date and time
;*       returns ES = Sentinel data segment
;*               DI = offset of next_call_date
;*               SI = offset of sngdskwrt
;*
;*    Function 6 - Get call status
```

```
;*      returns AL = sngclst: SNCALLNA   = 0  no call attempt yet
;*                            SNPRTSRCH  = 1  searching for an available port
;*                            SNMDMSRCH  = 2  searching fo a modem on the
port
;*                            SNMDMINIT  = 3  initializing modem
;*                            SNMDMPD    = 4  sending predial string to modem
;*                            SNMDMDL    = 5  sending dial string to modem
;*                            SNWTCON    = 6  waiting for modem to connect to
server
;*                            SNWTENQ    = 7  waiting for ENQ from server
;*                            SNWTACK    = 8  waiting for ACK from server
;*                            SNWTNCD    = 9  waiting for next-call-date from
server
;*                            SNCALLPASS = 10 call passed
;*                            SNCALLFAIL = 11 call failed
;*
;*
;*    Function 7 - Disable Sentinel disk deflection
;*       returns CF = 0 if successful
;*               CF = 1 if failed
;*
;*    Function 8 - Enable Sentinel disk deflection
;*       returns CF = 0 if successful
;*               CF = 1 if failed
;*
;*    Function 9 - return data segment pointers
;*       returns ES:DI = Sentinel Data Segment (SntlDataSeg in sentinel.h)
;*               ES:SI = Sentinel Settings (SntlSettings in sentinel.h)
;*
;* PARAMETERS:
;*    None
;*
;* Registers destroyed: none
;*
;* Globals referenced:
;*       Sentinel_state
;*
;* Globals modified:
;*       Sentinel_state - set to SNSTALERT by function 1
;*       sngstftn - set to
;*
;* BIOS calls: none
;*
;* DOS calls: none
;*
;* proc calls: none
;*
;* hardware access: none
;*
;*****************************************************************************
*
      ASSUME CS:SNTL_SEG, DS:NOTHING, ES:NOTHING
PROC SntlAPI FAR
@@check0:                               ; Return the state.
      CMP      AH,0
      JNE      @@check1
      MOV      AL,[Sentinel_state]
      MOV      BX,[sngstftn]
      RET

@@check1:                               ; Attempt to set the state to ALERT.
      CMP      AH,1
      JNE      @@check2
```

```
        CMP     [Sentinel_state],SNSTACTIVE
        JNE     @@exit_w_error
        MOV     [Sentinel_state],SNSTALERT
;        MOV     [sngstftn], OFFSET snfsnrst
        CLC
        RET

@@check2:                                       ; Return the version number.
        CMP     AH,2
        JNE     @@check3                        ; MOD CCOTI 48:95.01.27
        MOV     AX,SNTL_VERSION
        RET

@@check3:                                       ; Return the serial number.
        CMP     AH,3
        JNE     @@check4
        PUSH    CS
        POP     ES
        MOV     DI,OFFSET sngsernum
        RET

@@check4:
        CMP     AH,4
        JNE     @@check5
        CMP     [Sentinel_state], SNSTACTIVE
        JE      @@check4_done
        MOV     [Sentinel_state], SNSTACTIVE
        MOV     [sngstftn], OFFSET snfsnrst
@@check4_done:
        RET

@@check5:
        CMP     AH,5                            ; test for function 5
        JNE     @@check6                        ; not detected, continue

                                                ; prepare to copy string
        PUSH    CS                              ; get ES = CS
        POP     ES                              ; ES:DI points to next_call_date
        MOV     DI, OFFSET next_call_date
                                                ; ES:SI points to data_write flag
        MOV     SI, OFFSET sngdskwrt

        RET                                     ; exit

@@check6:
        CMP     AH,6                            ; test for function 6
        JNE     @@check7                        ; not detected, continue

        MOV     AL, [sngclst]                   ; get the call status into AL
        RET                                     ; exit

@@check7:
        CMP     AH, 7                           ; test for function 7
        JNE     @@check8                        ; not detected, continue
        MOV     [sngdeflect], 0                 ; clear the Sentinel disk deflection
flag
        CLC                                     ; clear the carry flag
        RET                                     ; exit

@@check8:
        CMP     AH, 8                           ; test for function 8
        JNE     @@check9                        ; not detected, exit with error
```

```
      MOV      [sngdeflect], 1           ; set the Sentinel disk deflection
flag
;This is commented out to maintain the data segment offset with the CTM.EXE
(See CCOTI).
;      CLC                                ; clear the carry flag
      RET                                ; exit

@@check9:
      CMP      AH, 9                     ; test for function 9
      JNE      @@exit_w_error            ; not detected, exit with error
      PUSH     CS                        ; get ES = CS
      POP      ES                        ; ES:DI points to data segment
      MOV      DI, OFFSET sngstftn
                                         ; ES:SI points to sentinel settings
      MOV      SI, OFFSET modem_default_port
      CLC                                ; clear the carry flag
      RET                                ; exit

@@exit_w_error:
      STC

@@exit:
      RET

ENDP SntlAPI
      ASSUME NOTHING
;******************************************************************************
*
;Routine: SwapInt
;
;Descript: SwapInt stores the existing vector
;     replaces the vector for the interrupt in BX with the new vector DS:CX
after
;     it stores the current vector at [DS:DI].  If DI = 0 the current vector
is
;     not stored.
;
;Arguments:
;     BX = the interrupt to hook into
;     DS:DI = address to save the existing vector; if DI = 0 the existing
vector
;           if not stored.
;     DS:CX = the new vector to install
;
;Registers destroyed: AX, BX, ES, FLAGS
;
;Returns: nothing
;
;BIOS calls: none
;
;DOS calls: none
;
;proc calls: none
;******************************************************************************
*
      ASSUME CS:SNTL_SEG, DS:NOTHING, ES:NOTHING
PROC SwapInt
      XOR      AX,AX
      MOV      ES,AX
      SHL      BX,2                                  ; BX = address of
vector
; load the existing vector and save it to DS:DI (if requested).
```

```
        OR          DI,DI
        JZ          @@no_store
        MOV         AX, [ES:BX]
        MOV         [DS:DI],AX
        MOV         AX, [ES:BX+2]
        MOV         [DS:DI+2],AX
@@no_store:
; install the new vector
        CLI
        MOV         [ES:BX],CX
        MOV         [ES:BX+2],DS
        STI
        RETN
ENDP SwapInt
        ASSUME NOTHING

;*******************************************************************************
*
;Routine: DelayFunc
;
;Descript: DelayFunc - introduces an delay.
;
;Arguments: none
;
;Registers destroyed: none
;
;Returns: nothing
;
;BIOS calls: none
;
;DOS calls: none
;
;proc calls: none
;*******************************************************************************
*
IF IODELAY_ON
        ASSUME CS:SNTL_SEG, DS:NOTHING, ES:NOTHING
PROC DelayFunc
        PUSH        CX
        MOV         CX,1
@@loop_start:
        LOOP        @@loop_start
        POP         CX
        RETN
ENDP DelayFunc
        ASSUME NOTHING
ENDIF

;*******************************************************************************
*
;Routine: CmpDates
;
;Descript: CmpDates - compares two dates and sets the CF=1 if date1 < date2.
;
;Arguments: [SI] -> date1
;           [DI] -> date2
;
;Registers destroyed: SI, DI, CX, ES
;
;Returns: CF = 1 if date1 < date2
;
;BIOS calls: none
;
```

```
;DOS calls: none
;
;proc calls: none
;******************************************************************************
*
      ASSUME CS:SNTL_SEG, DS:NOTHING, ES:NOTHING
PROC CmpDates
      PUSH      DS
      POP       ES
      CLD
      MOV       CX,5
@@cmp_loop:
      CMPSB                           ; CMP [SI],[DI]
      JB        @@cmp_exit            ; CF = 1?
      LOOPE     @@cmp_loop
@@cmp_exit:
      RETN
ENDP CmpDates

   ASSUME NOTHING

ENDS

   END
```

```
;*****************************************************************************
*
;* Copyright (c) Absolute Software 1994, 1995
;*
;* SNTLBUFF.ASM
;*
;* Contains the circular buffer access routines.
;*
;* HISTORY:
;*    1995.09.05 - CCOTI
;*              Created.
;*
;*****************************************************************************
*

IDEAL

%NOLIST
include "SENTINEL.INC"
include "SNTLBUFF.INC"
include "SNTLDATA.INC"
%LIST

SEGMENT SNTL_SEG BYTE PUBLIC 'CODE'
      ASSUME CS:SNTL_SEG, DS:SNTL_SEG, ES:NOTHING

;*****************************************************************************
*
;
;  BUF_FLUSH - flush receive buffer
;
;  PURPOSE:
;     This function flushses the receive buffer by setting the tail index
equal
;     to the head index.
;
;  PARAMETERS:
;     None
;
;  RETURNS:
;     Nothing
;
;  REGISTERS DESTROYED:
;     None
;
;  GLOBALS REFERENCES:
;     None
;
;  GLOBALS MODIFIED:
;     sngrxbufhd
;     sngrxbuftl
;
;  BIOS CALLS:
;     None
;
;  DOS CALLS:
;     None
;
;  PROCEDURE CALLS:
;     None
;
;  HARDWARE ACCESS:
;     None
```

```
;
;  NOTES:
;
;*****************************************************************************
*

PROC buf_flush NEAR
      MOV      [sngrxbufhd],OFFSET sngrxbuf
      MOV      [sngrxbuftl],OFFSET sngrxbuf
      RET                                  ; exit
ENDP buf_flush

;*****************************************************************************
*
;
;  BUF_GETCHAR - get a character from receive buffer
;
;  PURPOSE:
;     This function returns the next available character in the receive buffer
;     and increments the tail pointer.
;
;Arguments: none
;
;Registers destroyed: AL, SI
;
;Globals referenced:
;     sngrxbuftl
;     sngrxbufhd
;
;Globals modified:
;     received_buf_tail - moved to the location of the next character
;
;Returns: AL = the character taken, CF=0
;         If the buffer is empty CF=1
;
;BIOS calls: none
;
;DOS calls: none
;
;proc calls: buf_inc_ptr
;
;hardware access: none
;*****************************************************************************
*

PROC buf_getchar NEAR

      MOV      SI, [sngrxbuftl]        ; get the tail pointer
      CMP      SI, [sngrxbufhd]        ; is it the same as the head
      JE       @@empty                 ; yes, exit with status

      MOV      AL,[SI]                 ; no, get the next byte
      CALL     buf_inc_ptr             ; increment tail pointer
      MOV      [sngrxbuftl], SI        ; set new tail pointer position
      CLC                              ; set status
      RET                              ; exit

@@empty:
      STC                              ; set status
      RET                              ; exit

ENDP buf_getchar
```

```
;*******************************************************************************
*
;Routine: buf_putchar
;
;Descript: Adds a character to the buffer.
;
;Arguments: AL = the character to add
;
;Registers destroyed: SI
;
;Globals referenced:
;     sngrxbuftl
;     sngrxbufhd
;
;Globals modified:
;     received_buf_head - moved to the location of the next free space
;
;Returns: CF=0 if the character is stored correctly.
;         CF=1 if the buffer is full.
;
;BIOS calls: none
;
;DOS calls: none
;
;proc calls: buf_inc_ptr
;
;hardware access: none
;*******************************************************************************
*

PROC buf_putchar NEAR

     MOV     SI, [sngrxbufhd]          ; point to the head of the buffer
     MOV     [SI], AL                  ; store the received character
     CALL    buf_inc_ptr               ; increment the head
     MOV     [sngrxbufhd],SI           ; set new head pointer

     CLC                               ; set return status
     RET                               ; exit

ENDP buf_putchar

;*******************************************************************************
*
;*
;* BUF_INC_PTR - increment bffer pointer
;*
;* PURPOSE:
;*    This function increments the head or tail pointerassociated with the
;*    receive buffer.
;*
;* PARAMETERS:
;*    SI = the pointer to increment
;*
;* RETURNS:
;*    SI = the next location in sngrxbuf
;*
;* REGISTERS DESTROYED:
;*    SI
;*
;* GLOBALS REFERENCED:
;*    OFFSET sngrxbuf
;*    OFFSET sngrxbufend
```

```
;*
;* GLOBALS MODIFIED:
;*     None
;*
;* BIOS CALLS:
;*     None
;*
;* DOS CALLS:
;*     None
;*
;* PROCEDURE CALLS:
;*     None
;*
;* HARDWARE ACCESS:
;*     None
;*
;* NOTES:
;*
;******************************************************************************
*

PROC buf_inc_ptr NEAR
      INC      SI                       ; increment SI
      CMP      SI,OFFSET sngrxbufend    ; check if the pointer has wrapped
      JNE      @@no_buf_wrap            ; no, continue
      MOV      SI,OFFSET sngrxbuf       ; yes, set back to beginning of buffer

@@no_buf_wrap:
      RET                               ; exit
ENDP buf_inc_ptr

ENDS

   END
```

```
;***************************************************************************
*
;* Copyright (c) Absolute Software 1994, 1995
;*
;* SNTLCOMM.ASM
;*
;* Contains comm routines.
;*
;* HISTORY:
;*     1995.09.05 - CCOTI
;*              Created.
;*
;***************************************************************************
*

IDEAL

%NOLIST
include "SENTINEL.INC"
include "SNTLCOMM.INC"
include "SNTLDATA.INC"
include "SNTLTIMR.INC"
%LIST

SEGMENT SNTL_SEG BYTE PUBLIC 'CODE'

;***************************************************************************
*
;*
;* CMFTMOUT - transmit a NAK
;*
;* PURPOSE:
;*     This functions transmits a NAK.  If 3 NAK's have already been
transmitted,
;*     the transaction is terminated with an EOT.
;*
;* PARAMETERS:
;*     DX = UART Transmit Holding Register
;*
;* RETURNS:
;*     Nothing
;*
;* NOTE:
;*
;***************************************************************************
*

   ASSUME CS:SNTL_SEG, DS:NOTHING, ES:NOTHING

PROC cmftxnak NEAR

   CMP    [tx.txxnakcnt], 3              ; only send 3 NAK's before aborting
   JE     @@aborttx

   MOV    AL, DLNAK                      ; send another NAK
   OUT    DX, AL
   INC    [tx.txxnakcnt]
   MOV    [tx.txxnxtst], OFFSET snfgetpkt  ; set state function following tx
   MOV    [rx.rxxtmr], TM10SEC           ; set response to NAK timeout
   JMP    @@exit

@@aborttx:
   MOV    AL, DLEOT                      ; send EOT to terminate transaction
```

```
   OUT    DX, AL
   MOV    [tx.txxnxtst], OFFSET snfsnrst   ; set state function following tx

@@exit:
   MOV    [sngstftn], OFFSET cmftx         ; set next state function
   MOV    [tx.txxstate], OFFSET CS:cmtxcomp; set transmitter state: tx complete
   MOV    [rx.rxxstate], OFFSET cmfpstx    ; reset receiver
   RETN

ENDP cmftxnak

   ASSUME NOTHING

;*****************************************************************************
*
;*
;* CMFTXENQ - transmit an ENQ
;*
;* PURPOSE:
;*    This functions transmits a NAK.  If 3 NAK's have already been
transmitted,
;*    the transaction is terminated with an EOT.
;*
;* PARAMETERS:
;*    DX = UART Transmit Holding Register
;*
;* RETURNS:
;*    CF = 0 if not timed out
;*    CF = 1 if timed out
;*
;* NOTE:
;*
;*****************************************************************************
*

   ASSUME CS:SNTL_SEG, DS:NOTHING, ES:NOTHING

PROC cmftxenq NEAR

   CMP    [tx.txxenqcnt], 3                ; only send 3 NAK's before aborting
   JE     @@aborttx

   MOV    AL, DLENQ                        ; send another ENQ
   OUT    DX, AL
   INC    [tx.txxenqcnt]                   ; increment transmitted ENQ count
   MOV    [tx.txxnxtst], OFFSET snfgetpkt  ; set state function following tx
   MOV    [rx.rxxtmr], TM10SEC             ; set response to ENQ timeout
   JMP    @@exit

@@aborttx:
   MOV    AL, DLEOT                        ; send EOT to terminate transaction
   OUT    DX, AL
   MOV    [tx.txxnxtst], OFFSET snfsnrst   ; set state function following tx
   MOV    [rx.rxxstate], OFFSET cmfpstx    ; reset receiver

@@exit:
   MOV    [sngstftn], OFFSET cmftx         ; set next state function
   MOV    [tx.txxstate], OFFSET CS:cmtxcomp; set transmitter state: tx complete
   RETN

ENDP cmftxenq
```

```
ASSUME NOTHING

;*****************************************************************************
**
;*
;* CMFPRPMDM - prepare to transmit modem string
;*
;* PURPOSE:
;*    This function prepares the transmit structure before initiating
;*    transmission of a string to the modem.
;*
;* PARAMETERS:
;*    BX => the string to transmit (see note below)
;*
;* RETURNS:
;*    Nothing
;*
;* REGISTERS DESTROYED:
;*
;* GLOBALS REFERENCED:
;*
;* GLOBALS MODIFIED:
;*
;* BIOS CALLS:
;*    None
;*
;* DOS CALLS:
;*    None
;*
;* PROCEDURE CALLS:
;*    None
;*
;* HARDWARE ACCESS:
;*    None
;*
;* NOTE:
;*    BX points to the length of the string to transmit, which is preceeded in
;*    memory by the string (eg. AT<CR>3).
;*
;*****************************************************************************
*

     ASSUME CS:SNTL_SEG, DS:SNTL_SEG, ES:NOTHING

PROC cmfprpmdm

   MOV   AL, [BX]                           ; get the length of the packet
   MOV   [BYTE LOW tx.txxpktlen], AL
   MOV   [BYTE HIGH tx.txxpktlen], 0
   SUB   BX, [tx.txxpktlen]                 ; set pointer to start of string
   MOV   [tx.txxbufp], BX
   MOV   [tx.txxpkttyp], CMTXMDMPKT         ; transmitting modem packet
   MOV   [tx.txxtmr], TM1SEC                ; set maximum transmit time
   MOV   [tx.txxtxing], 0                   ; clear transmission in  progress
flag

   MOV   [sngstftn],OFFSET cmftx            ; next state: transmit
   MOV   [rx.rxxtmr], TM6SEC                ; wait 5 seconds after tx for rx

   RETN

ENDP cmfprpmdm
```

```
     ASSUME NOTHING

;*****************************************************************************
**
;*
;* CMFTX - transmit state machine
;*
;* PURPOSE:
;*    This function acts as the transmitter state machine performing all
packet
;*    transmissions and data-link ACK's, NAK's, and ENQ's.
;*
;* PARAMETERS:
;*    None
;*
;* RETURNS:
;*    Nothing
;*
;* REGISTERS DESTROYED:
;*
;* GLOBALS REFERENCED:
;*
;* GLOBALS MODIFIED:
;*
;* BIOS CALLS:
;*    None
;*
;* DOS CALLS:
;*    None
;*
;* PROCEDURE CALLS:
;*    None
;*
;* HARDWARE ACCESS:
;*    UART (IN LSR, OUT THR)
;*
;* NOTE:
;*
;*****************************************************************************
*

     ASSUME CS:SNTL_SEG, DS:SNTL_SEG, ES:NOTHING

PROC cmftx

   CMP    [tx.txxtmr], 0                  ; has the transmitter been on too
long?
   JE     cmtxrst                         ; yes, reset transmitter and
Sentinel
                                          ; no, continue
                                          ; ensure THR is empty.
   MOV    DX, [sngmdmprtadd]              ; get DX = LSR
   ADD    DX, LSR                         ; and determine if the THR is empty
   IN     AL, DX                          ; and load another byte if it is
   TEST   AL, 00100000b                   ; not needy for DOS world where TX
ISR
   JZ     @@exit                          ; works fine but in WINDOWS world
the
                                          ; TX ISR chokes and this routine is
                                          ; called by ComTrans()

   MOV    DX, [sngmdmprtadd]              ; THR empty, get THR address
```

```
   CMP   [tx.txxtxing], 1                  ; transmission in progress?
   JE    cmcont                            ; yes, continue
   MOV   [tx.txxdatcnt], 0                 ; no, clear data bytes tx'd count
   MOV   [tx.txxtxing], 1                  ; set transmission in progress flag
   CMP   [tx.txxpkttyp], CMTXDLNAK         ; transmitting a NAK?
   JE    cmtxnak                           ; yes
   CMP   [tx.txxpkttyp], CMTXDLACK         ; transmitting an ACK?
   JE    cmtxack                           ; yes
   CMP   [tx.txxpkttyp], CMTXDLENQ         ; transmitting an ENQ?
   JE    cmtxenq                           ; yes
   CMP   [tx.txxpkttyp], CMTXDLEOT         ; transmitting an EOT?
   JE    cmtxeot                           ; yes
   CMP   [tx.txxpkttyp], CMTXMDMPKT        ; transmitting modem packet?
   JNE   cmprpdata                         ; no, must be data packet
   MOV   [tx.txxstate], OFFSET CS:cmtxdata; yes, just transmit data segment
   JMP   cmcont
cmprpdata:
   MOV   [tx.txxstate], OFFSET CS:cmtxstx ; transmitting data packet
cmcont:
   JMP   [tx.txxstate]

cmtxstx:
   MOV   AL, DLSTX
   OUT   DX, AL
   MOV   [tx.txxlrc], 0                    ; clear LRC checksum
   MOV   [tx.txxstate], OFFSET CS:cmtxlenlsb
   JMP   @@exit

cmtxlenlsb:
   MOV   AL, [BYTE LOW tx.txxpktlen]
   OUT   DX, AL
   XOR   [tx.txxlrc], AL
   MOV   [tx.txxstate], OFFSET CS:cmtxlenmsb
   JMP   @@exit

cmtxlenmsb:
   MOV   AL, [BYTE HIGH tx.txxpktlen]
   OUT   DX, AL
   XOR   [tx.txxlrc], AL
   MOV   [tx.txxstate], OFFSET CS:cmtxtype
   JMP   @@exit

cmtxtype:
   MOV   AL, [tx.txxtype]
   OUT   DX, AL
   XOR   [tx.txxlrc], AL
   MOV   [tx.txxstate], OFFSET CS:cmtxstype
   JMP   @@exit

cmtxstype:
   MOV   AL, [tx.txxstype]
   OUT   DX, AL
   XOR   [tx.txxlrc], AL
   MOV   [tx.txxstate], OFFSET CS:cmtxdata
   JMP   @@exit

cmtxdata:
   MOV   SI, [tx.txxbufp]                  ; transmit the next byte
   ADD   SI, [tx.txxdatcnt]
   MOV   AL, [SI]
   OUT   DX, AL
   XOR   [tx.txxlrc], AL                   ; update the LRC
   INC   [tx.txxdatcnt]                    ; increment data byte index
```

```
   DEC    [tx.txxpktlen]                     ; decrement data bytes to transmit
   JNZ    @@exit                             ; and exit if more to send
                                             ; transmission complete,
   CMP    [tx.txxpkttyp], CMTXMDMPKT         ; transmitting modem packet?
   JNE    cmtxsetetx                         ; no, data packet, set to finish tx
   MOV    [tx.txxstate], OFFSET CS:cmtxcomp; yes, transmission complete
   JMP    @@exit
cmtxsetetx:
   MOV    [tx.txxstate], OFFSET CS:cmtxetx ; or set next state tx data packet
   JMP    @@exit

cmtxetx:
   MOV    AL, DLETX
   OUT    DX, AL
   XOR    [tx.txxlrc], AL
   MOV    [tx.txxstate], OFFSET CS:cmtxcomp
   JMP    @@exit

cmtxlrc:
   MOV    AL, [tx.txxlrc]
   OUT    DX, AL
   MOV    [tx.txxstate], OFFSET CS:cmtxcomp
   JMP    @@exit

cmtxack:
   MOV    AL, DLACK
   OUT    DX, AL
   MOV    [tx.txxstate], OFFSET CS:cmtxcomp
   JMP    @@exit

cmtxnak:
   CALL   cmftxnak
   JMP    @@exit

cmtxenq:
   CALL   cmftxenq
   JMP    @@exit

cmtxeot:
   MOV    AL, DLEOT
   OUT    DX, AL
   MOV    [tx.txxstate], OFFSET CS:cmtxcomp
   JMP    @@exit

cmtxcomp:                                    ; transmission complete
   MOV    [tx.txxtxing], 0                   ; clear transmission in progress
flag
   MOV    AX, [tx.txxnxtst]                  ; move onto the next state function
   MOV    [sngstftn], AX
   JMP    @@exit

cmtxrst:                                     ; transmitter timeout
   MOV    [tx.txxtxing], 0                   ; clear transmission in progress
flag
   MOV    [sngstftn], OFFSET snfsnrst        ; next state: reset Sentinel

@@exit:
   RET

ENDP cmftx

       ASSUME NOTHING
```

```
;*****************************************************************************
*
;*
;* CMFPACK - process expected ACK
;*
;* PURPOSE:
;*    This functions tests for an acknowledgement from the CT Server.
;*
;* PARAMETERS:
;*    None
;*
;* RETURNS:
;*    Nothing
;*
;* NOTE:
;*
;*****************************************************************************
*

   ASSUME CS:SNTL_SEG, DS:NOTHING, ES:NOTHING

PROC cmfpack NEAR

   CMP   AL, DLACK                         ; ACK received?
   JNE   @@testnak                         ; no, test for NAK

   MOV   [rx.rxxstate], OFFSET cmfpstx     ; yes, transfer complete go
   RETN                                    ; await another packet

@@testnak:
   CALL  cmfpnak                           ; treat as potential NAK

@@exit:
   RETN

ENDP cmfpack
   ASSUME NOTHING
;*****************************************************************************
*
;*
;* CMFPNAK - process NAK
;*
;* PURPOSE:
;*    This functions tests for a negative-acknowledgement from the CT Server.
;*
;* PARAMETERS:
;*    AL contains the character that may be a NAK
;*
;* RETURNS:
;*    Nothing
;*
;* NOTE:
;*
;*****************************************************************************
*

   ASSUME CS:SNTL_SEG, DS:NOTHING, ES:NOTHING

PROC cmfpnak NEAR

   CMP   AL,DLNAK                          ; NAK received?
   JNE   @@exit                            ; no, exit
```

```
@@cont:
;   MOV    BX, OFFSET sngsernum_str          ; point to string to send
;   CALL   ComTransInit                      ; initiate retransmission
   MOV    [sngstftn], OFFSET snftxchkin

@@exit:
   RETN
ENDP cmfpnak
   ASSUME NOTHING

;****************************************************************************
*
;*
;* CMFPSTX - process STX
;*
;* PURPOSE:
;*    This functions tests for a start-of-text character.
;*
;* PARAMETERS:
;*    None
;*
;* RETURNS:
;*    Nothing
;*
;* NOTE:
;*
;****************************************************************************
*

   ASSUME CS:SNTL_SEG, DS:NOTHING, ES:NOTHING

PROC cmfpstx NEAR

   CMP    AL, DLSTX                         ; STX received?
   JE     @@cont                            ; yes, continue

   CALL   cmfrstrx                          ; no, reset receiver
   RETN                                     ; exit

@@cont:
   MOV    [rx.rxxlrc], 0                    ; clear LRC checksum
   MOV    [rx.rxxstate], OFFSET cmfplen1    ; set next state

@@exit:
   RETN

ENDP cmfpstx
   ASSUME NOTHING

;****************************************************************************
*
;*
;* CMFPLEN1 - process first byte of length
;*
;* PURPOSE:
;*    This functions accepts the least significant byte of the length field of
;*    a packet.
;*
;* PARAMETERS:
;*    None
;*
;* RETURNS:
;*    Nothing
```

```
;*
;* NOTE:
;*
;*****************************************************************************
*

   ASSUME CS:SNTL_SEG, DS:NOTHING, ES:NOTHING

PROC cmfplen1 NEAR

   MOV    [BYTE LOW rx.rxxpktlen], AL       ; store LSB of length
   XOR    [rx.rxxlrc], AL                   ; update LRC

   MOV    [rx.rxxstate], OFFSET cmfplen2    ; set next state

@@exit:
   RETN

ENDP cmfplen1
   ASSUME NOTHING

;*****************************************************************************
*
;*
;* CMFPLEN2 - process second byte of length
;*
;* PURPOSE:
;*    This functions accepts the most signifcant byte of the length field of
;*    a packet.
;*
;* PARAMETERS:
;*    None
;*
;* RETURNS:
;*    Nothing
;*
;* NOTE:
;*****************************************************************************
*

   ASSUME CS:SNTL_SEG, DS:NOTHING, ES:NOTHING

PROC cmfplen2 NEAR

   MOV    [BYTE HIGH rx.rxxpktlen], AL      ; store LSB of length
   XOR    [rx.rxxlrc], AL                   ; update LRC

   MOV    [rx.rxxstate], OFFSET cmfptype    ; set next state

@@exit:
   RETN

ENDP cmfplen2
   ASSUME NOTHING

;*****************************************************************************
*
;*
;* CMFPTYPE - process packet type
;*
;* PURPOSE:
;*    This functions accepts the packet type field.
;*
```

```
;* PARAMETERS:
;*    None
;*
;* RETURNS:
;*    Nothing
;*
;* NOTE:
;*
;***************************************************************************
*

   ASSUME CS:SNTL_SEG, DS:NOTHING, ES:NOTHING

PROC cmfptype NEAR

   MOV    [rx.rxxtype], AL                  ; store packet type
   XOR    [rx.rxxlrc], AL                   ; update LRC
   DEC    [rx.rxxpktlen]                    ; decrement bytes remaining
   MOV    [rx.rxxstate], OFFSET cmfpstyp    ; set next state

@@exit:
   RETN

ENDP cmfptype
   ASSUME NOTHING

;***************************************************************************
*
;*
;* CMFPSTYP - process packet subtype
;*
;* PURPOSE:
;*    This functions accepts the packet subtype field.
;*
;* PARAMETERS:
;*    None
;*
;* RETURNS:
;*    Nothing
;*
;* NOTE:
;*
;***************************************************************************
*

   ASSUME CS:SNTL_SEG, DS:NOTHING, ES:NOTHING

PROC cmfpstyp NEAR

   MOV    [rx.rxxstype],AL                  ; store packet subtype
   XOR    [rx.rxxlrc],AL                    ; update LRC

   DEC    [rx.rxxpktlen]                    ; decrement bytes remaining
   JNZ    @@cont                            ; continue if more data
   MOV    [rx.rxxstate], OFFSET cmfpetx     ; expect ETX next if over
   JMP    @@exit

@@cont:
   MOV    [rx.rxxstate], OFFSET cmfpdata    ; set next state
   MOV    [rx.rxxbytcnt], 0                 ; clear the received byte count

@@exit:
   RETN
```

```
ENDP cmfpstyp
   ASSUME NOTHING

;*****************************************************************************
*
;*
;* CMFPDATA - process packet data
;*
;* PURPOSE:
;*    This functions accepts the packet data field.
;*
;* PARAMETERS:
;*    None
;*
;* RETURNS:
;*    Nothing
;*
;* NOTE:
;*
;*****************************************************************************
*

   ASSUME CS:SNTL_SEG, DS:NOTHING, ES:NOTHING

PROC cmfpdata NEAR

   MOV    SI, [rx.rxxbufp]                 ; get offset to store data
   ADD    SI, [rx.rxxbytcnt]
   MOV    [SI], AL                         ; store packet data
   XOR    [rx.rxxlrc], AL                  ; update LRC
   INC    [rx.rxxbytcnt]                   ; increment data byte count

   DEC    [rx.rxxpktlen]                   ; decrement bytes remaining to
receive
   JNZ    @@exit                           ; and exit if more to come
   MOV    [rx.rxxstate], OFFSET cmfpetx    ; or set next state if finished

@@exit:
   RETN

ENDP cmfpdata
   ASSUME NOTHING

;*****************************************************************************
*
;*
;* CMFPETX - process ETX
;*
;* PURPOSE:
;*    This functions accepts the packet ETX delimiter.
;*
;* PARAMETERS:
;*    None
;*
;* RETURNS:
;*    Nothing
;*
;* NOTE:
;*
;*****************************************************************************
*

   ASSUME CS:SNTL_SEG, DS:NOTHING, ES:NOTHING
```

```
PROC cmfpetx NEAR

   XOR    [rx.rxxlrc],AL                    ; update LRC
   CMP    AL,DLETX                          ; test for ETX
   JE     @@cont                            ; ETX rx'd, continue

   CALL   cmfrstrx                          ; ETX not rx'd, reset rx'r
   JMP    @@exit

@@cont:
   MOV    [rx.rxxstate], OFFSET cmfplrc     ; set next state

@@exit:
   RETN

ENDP cmfpetx
   ASSUME NOTHING
;*****************************************************************************
*
;*
;* CMFPLRC - process LRC
;*
;* PURPOSE:
;*    This functions accepts the packet LRC checksum.
;*
;* PARAMETERS:
;*    None
;*
;* RETURNS:
;*    Nothing
;*
;* NOTE:
;*
;*****************************************************************************
*

   ASSUME CS:SNTL_SEG, DS:NOTHING, ES:NOTHING

PROC cmfplrc NEAR

IF 0
   CMP    AL, [rx.rxxlrc]                   ; test for valid LRC
   JE     @@cont                            ; LRC valid, continue
   CALL   cmfrstrx                          ; LRC invalid, reset rx'r
   RETN                                     ; and exit
ELSE
   CMP    AL, 0                             ; test for 0 for now
   JE     @@cont                            ; LRC valid, continue

@@nak:                                      ; LRC invalid, send a NAK
   MOV    [sngstftn], OFFSET cmftx          ; set next state: transmit
   MOV    [tx.txxpkttyp], CMTXDLNAK         ; set packet type: send NAK
   RETN                                     ; exit
ENDIF

@@cont:
   MOV    [sngstftn], OFFSET cmftx          ; set next Sentinel state function
   MOV    [tx.txxpkttyp], CMTXDLACK         ; transmitting an ACK
   MOV    [tx.txxtmr], TM1SEC               ; give tx one second to complete
   MOV    [tx.txxnxtst], OFFSET cmfprsdata  ; set state fuction following tx

@@exit:
```

```
   RETN

ENDP cmfplrc
   ASSUME NOTHING

;****************************************************************************
*
;*
;* CMFGETNEXT - get next call date
;*
;* PURPOSE:
;*    This functions extracts the next call date from a received packet.
;*
;* PARAMETERS:
;*    None
;*
;* RETURNS:
;*    Nothing
;*
;* NOTE:
;*
;****************************************************************************
*

   ASSUME CS:SNTL_SEG, DS:NOTHING, ES:NOTHING

PROC cmfgetnext NEAR

   PUSH  DS                              ; get ES = DS
   POP   ES

   MOV   DI, OFFSET next_call_date       ; ES:DI points to next_call_date
   MOV   SI, [rx.rxxbufp]                ; DS:SI points to received data

   CLD                                   ; move up through pointers
   MOV   CX, 5                           ; copy five bytes of BCD data:
                                         ;       YYMMDDHHMM
   REP   MOVSB                           ; copy the new date/time

   INC   [sngdskwrt]                     ; set the disk write flag
   MOV   [sngclst], SNCALLPASS           ; set the call status

   MOV   AX, [sngmdmprt]                 ; set default modem for next call
   MOV   [modem_default_port], AX        ; call based upon current port

@@exit:
   RETN

ENDP cmfgetnext
   ASSUME NOTHING

IF 0
;****************************************************************************
*
;*
;* CMFDISABLE - disable Sentinel
;*
;* PURPOSE:
;*    This functions disables the Sentinel based upon a packet received fron
;*    the tracking server.  The Sentinel is disabled by recording a call date
;*    and time of 0xFFFFFFFFFF.
;*
;* PARAMETERS:
```

```
;*    None
;*
;* RETURNS:
;*    Nothing
;*
;* NOTE:
;*
;****************************************************************************
*

   ASSUME CS:SNTL_SEG, DS:NOTHING, ES:NOTHING

PROC cmfdisable NEAR

   PUSH  DS                              ; get ES = DS
   POP   ES

   MOV   DI, OFFSET next_call_date       ; ES:DI points to next_call_date
   MOV   SI, OFFSET rx.rxxdata           ; DS:SI points to received data

   CLD                                   ; move up through pointers
   MOV   CX, 5                           ; copy five bytes of BCD data:
                                         ;        YYMMDDHHMM
   REP   MOVSB                           ; copy the new date/time

   INC   [sngdskwrt]                     ; set the disk write flag

@@exit:
   RETN

ENDP cmfdisable
   ASSUME NOTHING
ENDIF
;****************************************************************************
*
;*
;* CMFPRSDATA - parse received data
;*
;* PURPOSE:
;*    This functions parses received data and takes appropriate action.
;*
;* PARAMETERS:
;*    None
;*
;* RETURNS:
;*    Nothing
;*
;* NOTE:
;*
;****************************************************************************
*

   ASSUME CS:SNTL_SEG, DS:NOTHING, ES:NOTHING

PROC cmfprsdata NEAR

   MOV   AL, [rx.rxxtype]                ; test for valid data type
   CMP   AL, SNSERVER
   JNE   @@reset

   MOV   AL, [rx.rxxstype]               ; test for valid subtype
   CMP   AL, SNNEXTCALL                  ; test for next call packet
```

```
   JNE    @@nxtest1
   CALL   cmfgetnext                        ; extract next call date from packet
   JMP    @@reset

@@nxtest1:
IF 0
   CMP    AL, SNDISABLE                     ; test for disable packet
   JNE    @@nxtest2
   CALL   snfdisable                        ; disable Sentinel
ENDIF

@@reset:
   CALL cmfrstrx                            ; reset receiver

@@exit:
   RETN

ENDP cmfprsdata
   ASSUME NOTHING

;******************************************************************************
*
;*
;* CMFRSTRX - reset the receiver
;*
;* PURPOSE:
;*    This functions resets the receiver.
;*
;* PARAMETERS:
;*    None
;*
;* RETURNS:
;*    Nothing
;*
;* NOTE:
;*
;******************************************************************************
*

   ASSUME CS:SNTL_SEG, DS:NOTHING, ES:NOTHING

PROC cmfrstrx NEAR

   MOV    [rx.rxxstate],OFFSET cmfpstx      ; reset receiver state machine

   MOV    [sngstftn],OFFSET snfsnrst        ; reset the Sentinel to active mode
   MOV    [Sentinel_state],SNSTACTIVE

@@exit:
   RETN

ENDP cmfrstrx
   ASSUME NOTHING

ENDS

   END
```

```
;****************************************************************************
*
;* Copyright (c) Absolute Software 1994, 1995
;*
;* SNTLCOMV.ASM
;*
;* Contains the comm ISR routine.
;*
;* HISTORY:
;*    1995.09.05 - CCOTI
;*              Created.
;*
;****************************************************************************
*

IDEAL

%NOLIST
include "SENTINEL.INC"
include "SNTLCOMV.INC"
include "SNTLDATA.INC"
include "SNTLBUFF.INC"
include "SNTLAPI.INC"
%LIST

SEGMENT SNTL_SEG BYTE PUBLIC 'CODE'

;****************************************************************************
;
;  CMFISR - communications interrupt service routine
;
;  PURPOSE:
;     This function implements the communications ISR that supports bith
;     receiving and transmitting data.  This function hooks the system's
;     communications port interrupt (IRQ 4/3).
;
;  PARAMETERS:
;     None
;
;  RETURNS:
;     Nothing
;
;  GLOBALS REFERENCED:
;     sngmdmprtadd
;
;  GLOBALS MODIFIED:
;     sngincmisr - Incremented on entrance, decremented on exit.
;     sngstftn - set to error handler if error is detected.
;
;  BIOS CALLS:
;     None
;
;  DOS CALLS:
;     NONE
;
;  PROCEDURE CALLS:
;     cmftxbyte, buf_putchar
;
;  HARDWARE ACCESS:
;     UART (IN IIR, I/O MCR, IN RDR)
;
;****************************************************************************
*
```

```
     ASSUME CS:SNTL_SEG, DS:NOTHING, ES:NOTHING

PROC cmfisr FAR

      PUSH      AX                        ; save registers
      PUSH      DX
      PUSH      SI
      PUSH      DS

      PUSH      CS                        ; set DS
      POP       DS
      ASSUME DS:SNTL_SEG

      INC       [sngincmisr]              ; set ISR in progress flag

IFDEF Debug
      INC       [sngcomcnt]               ; increment comm ISR count
ENDIF

@@check_iir:
; Check the reason for the call (error, ready to send, data received).
      MOV       DX,[sngmdmprtadd]         ; get interrupt identification
register
      ADD       DX,IIR
      IN        AL,DX

      TEST      AL,00000100b              ; test for receive interrupt
      JNZ       DataReceive               ; proceed with data reception

      TEST      AL,00000010b              ; test for transmit interrupt
      JNZ       DataSend                  ; proceed with data transmission

@@error:
IFDEF Debug
      INC       [sngcomerr]
ENDIF
; Check the status of the error.
      MOV       DX, [sngmdmprtadd]        ; reading the register clears the
error
      ADD       DX, LSR
      IN        AL, DX
      JMP       @@end

DataSend:
;       CALL     cmftxbyte
      JMP       @@end

DataReceive:
; First, turn off RTS.
      MOV       DX, [sngmdmprtadd]
      ADD       DX, MCR                   ; Move DX to MCR.
      IN        AL, DX
      IODELAY
      AND       AL, 11111101b             ; turn off RTS
      OUT       DX, AL
      IODELAY
Receive:
IFDEF Debug
      INC       [received_count]
ENDIF
      MOV       DX,[sngmdmprtadd]         ; DX = RDR.
      IN        AL, DX                    ; AL = received byte.
      IODELAY
```

```
        CALL    buf_putchar                  ; Put the byte into the buffer.

; Check if there is another request pending.
        ADD     DX, 2                        ; Move to IIR reg.
        IN      AL, DX
        IODELAY
        TEST    AL,00000001b
        JZ      @@check_iir

@@end:
        MOV     AL,20h                       ; signal end of interrupt to PIC
        OUT     20h,AL

        MOV     DX,[sngmdmprtadd]            ; get the modem control register
        ADD     DX,MCR
        IN      AL,DX
        IODELAY

        OR      AL,00000010b                 ; turn RTS back on
        OUT     DX,AL                        ; set the modem control register
        IODELAY

        DEC     [sngincmisr]                 ; clear ISR in progress flag

        ASSUME DS:NOTHING

        POP     DS                           ; recover registers
        POP     SI
        POP     DX
        POP     AX
        IRET                                 ; exit

ENDP cmfisr
        ASSUME NOTHING

ENDS

   END
```

```
;*****************************************************************************
*
;* Copyright (c) Absolute Software 1994, 1995
;*
;* SNTLDATA.ASM
;*
;* Contains the global data segment for the sentinel.
;*
;* HISTORY:
;*    1995.09.05 - CCOTI
;*          Created.
;*
;*****************************************************************************
*

IDEAL

%NOLIST
include "SENTINEL.INC"
include "SNTLTIMR.INC"
include "SNTLJTBL.INC"
include "SNTLCOMM.INC"
%LIST

SEGMENT SNTL_SEG BYTE PUBLIC 'CODE'

; Transient variables *******************************************************

      sngstftn          DW NEAR PTR OFFSET ActiveRoutine    ; CCOTI
      Sentinel_state    DB SNSTACTIVE

;Scatch vars to store the current port info being used.
      sngmdmprt         DW ?
      sngmdmprtint      DW ?
      sngmdmprtadd      DW ?

;Previous ISR vectors.
            sngprvtmr         DD FAR PTR 0
            sngprvcom         DD FAR PTR 0
            sngprvdsk1        DD FAR PTR 0
            sngprvint2f       DD FAR PTR 0

;ROR'd to limit updating the real-time clock once every 16 ticks (see
ActiveRoutine).
            cycle_var                   DW 0001h

      win_flag                DB 0          ;
      win_vm                  DB 1          ;

      sngincmisr              DB 0

      send_buf_len            DW 0
      send_buf_ptr            DW BYTE PTR 0

            sngcomcnt               DW 0          ; comm. interrupt count
      sngcomerr             DB 0          ; comm. error count
      TimerISR_count        DW 0          ; timer interrupt count
      sent_count            DW 0          ; bytes transmitted
      received_count        DW 0          ; byte received
      sngflcnt              DB 0
      sngclst               DB SNCALLNA
      sngcomhk              DB 0
      sngsuspend            DB 0
```

```
      sngdlytmr                 DW 0
      sngint2ftmr               DW TM2MIN    ; wait 2 minutes for an XMS manager
      sngprtdlytmr              DW 0
            sngdeflect                DB 1        ; Sentinel disk deflection
flag
      dkgcyl                    DW ?         ; disk access cylinder
      dkgsctr                   DB ?         ; disk access sector
      sngapifl                  DB 0         ; API fialed request count
            sngpwd1                   DW 'FO'     ; API request user password1
      sngpwd2                   DW 'AD'      ; API request user password2

; Port info..
      modem_default_port        DW 0

      port_table                DW 03F8h, 000Ch, \
                                   02F8h, 000Bh, \
                                   0000h, 0000h, \
                                   02E8h, 000Dh
      PORT_TABLE_SIZE = 4

; Disk location of data sector.

      data_cyl_sect             DW 0
      data_head_drive           DW 0
      sngdskwrt                 DB 0

; Output strings.

      init_str_num              DW 0
      init_str_table            DW 5 DUP( 0 )
      INIT_STR_TABLE_SIZE = 6

      dial_str_num              DW 0
      dial_str_table            DW 4 DUP( 0 )
      DIAL_STR_TABLE_SIZE = 5

            dial_number_start         DB "18003396122", 0Dh
LABEL dial_number               BYTE
      dial_number_len           DB 12


LABEL sn_packet_start           UNKNOWN
      stx_byte                  DB 02h
      lsb_length_byte           DB ?
      msb_length_byte           DB ?
LABEL sn_text_start             UNKNOWN
      text_type                 DB 0
      text_sub_type             DB 0
LABEL sn_data_start             UNKNOWN
      sngsernum                 DB 6 DUP( 0 )
LABEL now_date                  UNKNOWN
      now_year                  DB 1
      now_month                 DB 1
      now_day                   DB 1
      now_hour                  DB 1
      now_minute                DB 1
LABEL sn_data_end               UNKNOWN
      etx_byte                  DB 03h
      lrc_byte                  DB ?
LABEL sn_packet_end             UNKNOWN
LABEL sngsernum_str             UNKNOWN
      sngsernum_str_len         DB sn_packet_end - sn_packet_start
      sngdatalen                DB sn_data_end - sn_data_start
```

```
;END MOD
                                        ; initialize receive structure
     rx                       RXZCM   < OFFSET cmfpack, \
                                       0, 0, 0, 0, 0, 0, \
                                       OFFSET CS:nextcall_text >

                                        ; initialize transmit structure
     tx                       TXZCM   < 0, 0, 0, 0, 0, 0, 0, 0, \
                                       0, 0, 0, 0, \
                                       OFFSET CS:sngtxbuf >

; Result tables.
     command_result_table_len   DB 3
     command_result_table       DW 3 DUP( 0 )

     mdm_init_result_table_len  DB 2
     mdm_init_result_table      DW 2 DUP( 0 )

     dial_result_table_len      DB 6
     dial_result_table          DW 6 DUP( 0 )

     connect_result_table_len   DB 4
     connect_result_table       DW 10 DUP( 0 )

; Modem and result string pool.
     string_pool                DB 127 DUP( 0 )

     modem_find_str_start       DB 'ATZ', 0Dh
LABEL modem_find_str            UNKNOWN
     modem_find_str_len         DB 4

; next call date
LABEL next_call_date            UNKNOWN
     next_call_year             DB 0FFh
     next_call_month            DB 0FFh
     next_call_day              DB 0FFh
     next_call_hour             DB 0FFh
     next_call_minute           DB 0FFh

     sngrxbufhd           DW 0           ; receive buffer
     sngrxbuftl           DW 0
LABEL sngrxbufst          UNKNOWN
     sngrxbuf             DB 80h DUP( 0 )
LABEL sngrxbufend         UNKNOWN

     nextcall_text        DB 05h DUP( 0 )

     sngtxindex           DB 0           ; transmit buffer
LABEL sngtxbufst          UNKNOWN
     sngtxbuf             DB 7Bh DUP( 0 )
LABEL sngtxbufend         UNKNOWN


; Result jump tables.

     ; Table for ModemFind
     find_jump_table            DW NEAR PTR find_timeout   ; TIMEOUT
                                DW NEAR PTR find_ok        ; NO CARRIER (NOTE
1)
                                DW NEAR PTR find_timeout   ; ERROR
                                DW NEAR PTR find_ok        ; OK

     ; NOTE 1: 29 March 1995 - DBOYD
```

```
;          USR modem (and maybe others) does not return <NO CARRIER>
;          when the server disconnects.  <NO CARRIER> returned when next
;          signal (command or control line) sent to modem.  Sometimes
this
;          response is sent before the next command, sometimes after.
When
;          the Sentinel receives this response to a modem query (<AT>) it
;          should interpret it as <OK>.

; Table for ModemInit.
init_jump_table              DW NEAR PTR init_error      ; TIMEOUT
                             DW NEAR PTR init_error      ; ERROR
                             DW NEAR PTR init_ok         ; OK

; Table for dial results.
dial_jump_table              DW NEAR PTR dial_error      ; TIMEOUT
                             DW NEAR PTR dial_error      ; ERROR
                             DW NEAR PTR dial_busy       ; BUSY
                             DW NEAR PTR dial_no_tone    ; NO DIAL TONE
                             DW NEAR PTR dial_no_carr    ; NO CARRIER
                             DW NEAR PTR dial_server     ; Server Query
(NAK)
                             DW NEAR PTR dial_server     ; Server Query
(ENQ)

cnct_jump_table              DW NEAR PTR cnct_error      ; TIMEOUT
                             DW NEAR PTR cnct_error      ; NO CARRIER
                             DW NEAR PTR cnct_eot        ; Server EOT
                             DW NEAR PTR cnct_enq        ; Server ENQ
                             DW NEAR PTR cnct_nak        ; Server NAK
                             DW NEAR PTR cnct_ack        ; Server ACK

ENDS

include "SNTLDATA.INC"

   END
```

```
;****************************************************************************
*
;* Copyright (c) Absolute Software 1994, 1995
;*
;* SNTLI13V.ASM
;*
;* Contains INT 13 ISRs and disk deflection routines.
;*
;* HISTORY:
;*     1995.09.05 - CCOTI
;*              Created.
;*
;****************************************************************************
*

IDEAL

%NOLIST
include "SENTINEL.INC"
include "SNTLI13V.INC"
include "SNTLDATA.INC"
include "SNTLI2FV.INC"
include "SNTLTIMR.INC"
include "SNTLAPI.INC"
%LIST

SEGMENT SNTL_SEG BYTE PUBLIC 'CODE'

;****************************************************************************
*
;
;  DKFDFLRD - Disk deflect read
;
;  PURPOSE:
;     This function performs disk read deflections by filling up the
destination
;     buffer with erroneous characters.
;
;  PROTOTYPE:
;
;  PARAMETERS:
;     AL = number of sectors to read (must be non-zero)
;     CH = low eight bits of cylinder number
;     CL = sector number 1-63 (bits 0-5)
;          high two bits of cylinder number (bits 6-7, hard disk only)
;     DH = head number
;     DL = drive number (bit 7 set for hard disk)
;     ES:BX => data destination
;
;  RETURNS:
;     The flags register as set by the ROM interrupt 13 handler:
;          - CF = 0 if successful
;     AH = status
;     AL = number of sectors transferred
;
;  NOTE:
;
;****************************************************************************
*

      ASSUME CS:SNTL_SEG, DS:NOTHING, ES:NOTHING

PROC dkfdflrd  NEAR
```

```
      MOV      DI, BX                        ; get offset of destination buffer
      PUSH     AX                            ; store disk access parameters
      PUSH     DS                            ; store register
      PUSH     CS                            ; set DS:SI pointer
      POP      DS
      MOV      SI, OFFSET fillr

@@dflloop:                                   ; deflect loop
      CLD                                    ; set pointers to increment
      MOV      CX, 100h                      ; fill 256 words (512 bytes = 1
sector)

@@dflsct:                                    ; single sector deflection
      MOVSW                                  ; copy filler to destination
      DEC      SI                            ; decrement source pointer
      DEC      SI                            ; by 2 for word moves
      LOOP     @@dflsct

      DEC      AL                            ; decrement the number of sectors to
fill
      JNZ      @@dflloop

      POP      DS                            ; restore register
      POP      AX                            ; restore disk access parameters
      MOV      AH, 0                         ; set success parameters and exit
      CLC
      RET

fillr:
      FILL  EQU   0f6f6h

ENDP dkfdflrd
      ASSUME NOTHING

;****************************************************************************
*
;
;  DKFDFLMBR - Disk deflect MBR access
;
;  PURPOSE:
;     This function performs disk deflection on attempted access to MBR
sector.
;     Access is deflected from our subloader in the MBR to the original MBR.
;
;  PROTOTYPE:
;
;  PARAMETERS:
;     AH = disk function: 0x02 = disk read
;                         0x03 = disk write
;     AL = number of sectors to read (must be non-zero)
;     CH = low eight bits of cylinder number
;     CL = sector number 1-63 (bits 0-5)
;          high two bits of cylinder number (bits 6-7, hard disk only)
;     DH = head number
;     DL = drive number (bit 7 set for hard disk)
;     ES:BX => the data source (writes) or data destination (reads)
;
;  RETURNS:
;     The flags register as set by the ROM interrupt 13 handler:
;        - CF = 0 if successful
;     AH = status
;     AL = number of sectors transferred
```

```
;
;   NOTE:
;
;*****************************************************************************
*

     ASSUME CS:SNTL_SEG, DS:NOTHING, ES:NOTHING

PROC dkfdflmbr   NEAR

        CMP     AH, 02h                 ; read access to MBR?
        JE      @@dflmbrrd              ; yes, deflect read
        CMP     AH, 03h                 ; write access to cylinder 0?
        JE      @@dflmbrwrt             ; yes, deflect write

@@dflmbrrd:
        PUSH    CX                      ; save disk access parameters
        PUSH    AX
        MOV     CX, 0002h               ; load CX to access deflected MBR
        MOV     AL, 1                   ; load AL to access a single sector
        PUSHF                           ; push flags because IRET
        CALL    [DWORD CS:sngprvdsk1]   ; from original handler pops flags
        JNC     @@dflrdcnt              ; error?, no, continue
        POP     CX                      ; yes, recover access parameters
        POP     CX                      ; discard original AX
        JMP     @@exit                  ; exit

@@dflrdcnt:
        POP     AX                      ; recover disk access parameters
        POP     CX
        MOV     AH, 0                   ; set success indication
        CMP     AL, 1                   ; all sectors read?
        JE      @@exit                  ; yes, exit
                                        ; no, load crap to the next 10
sectors
        PUSH    AX                      ; save disk access parameters
        MOV     AX, ES                  ; increment destination buffer by
        ADD     AX, 200h                ; by 512 (512 bytes = 1 sector)
        MOV     ES, AX
        POP     AX                      ; recover disk access parameters

        DEC     AL                      ; fill one less sector than required
        CALL    dkfdflrd                ; fill destination buffer with junk

        PUSH    AX
        MOV     AX, ES                  ; reset destination buffer pointer
        SUB     AX, 200h
        MOV     ES, AX
        POP     AX
        INC     AL                      ; increment number of sectors read
        MOV     AH, 0                   ; set success indication
        CLC
        JMP     @@exit                  ; exit

@@dflmbrwrt:
        PUSH    CX                      ; save disk access parameters
        PUSH    AX
        MOV     CX, 0002h               ; load CX to access deflected MBR
        MOV     AL, 1                   ; load AL to access a single sector
        PUSHF                           ; push flags because IRET
        CALL    [DWORD CS:sngprvdsk1]   ; from original handler pops flags
        JNC     @@dflwrtcnt             ; error? no, continue
        POP     CX                      ; yes, recover access parameters
```

```
        POP     CX                          ; discard original AX
        JMP     @@exit                      ; exit

@@dflwrtcnt:
        MOV     AH, 2                       ; read in the (possibly) modified
        MOV     CX, 0002h                   ; image of true MBR
        MOV     AL, 1
        PUSHF                               ; push flags because IRET
        CALL    [DWORD CS:sngprvdsk1]       ; from original handler pops flags
        JC      @@exit                      ; error? yes, exit

                                            ; get copy of partition table
        PUSH    DS                          ; save register
        PUSH    ES                          ; save disk access parameter
        PUSH    ES                          ; set DS
        POP     DS
        PUSH    CS                          ; set ES
        POP     ES
        MOV     AX, BX
        ADD     AX, 0FCh
        MOV     SI, AX
        MOV     DI, OFFSET sngrxbuf         ; get a pointer to a buffer
        MOV     CX, 100h                    ; prepare to move 256 bytes
        REP     MOVSB                       ; do the move

                                            ; get copy of subloader
        POP     ES                          ; restore disk access parameter
        MOV     AH, 2                       ; read subloader from the MBR
        MOV     CX, 0001h
        MOV     AL, 1
        PUSHF                               ; push flags because IRET
        CALL    [DWORD CS:sngprvdsk1]       ; from original handler pops flags
        JC      @@exit2                     ; error? yes, exit

                                            ; copy partition table into
subloader
        PUSH    CS                          ; set DS
        POP     DS
        MOV     SI, OFFSET sngrxbuf         ; DS:SI => partition table in
subloader
        MOV     AX, BX
        ADD     AX, 0FCh
        MOV     DI, AX                      ; ES:DI => partition table in MBR
        MOV     CX, 100h                    ; prepare to move 256 bytes
        REP     MOVSB                       ; do the move

        MOV     AH, 3                       ; write the subloader
        MOV     CX, 0001h
        MOV     AL, 1
        PUSHF                               ; push flags because IRET
        CALL    [DWORD CS:sngprvdsk1]       ; from original handler pops flags
        JC      @@exit2                     ; error? yes, exit

        MOV     AH, 2                       ; read new MBR back into ES:BX
        MOV     AL, 1
        PUSHF                               ; push flags because IRET
        CALL    [DWORD CS:sngprvdsk1]       ; from original handler pops flags
        JC      @@exit2                     ; error? yes, exit

        POP     DS                          ; recover register
        POP     AX                          ; recover disk access parameters
        POP     CX
        MOV     AH, 0                       ; set success indication
```

```
      CLC
      JMP       @@exit

@@exit2:                                ; if exiting due to disk write
      POP       DS                      ; deflection error

@@exit:
      RET

ENDP dkfdflmbr
      ASSUME NOTHING

;*****************************************************************************
*
;
;  INT13ISR - Sentinel interrupt 13 ISR
;
;  PURPOSE:
;     This function provides the Sentinel's interrupt 13 hook for disk access.
;     It serves two purposes: to store next-call information to disk after a
;     transaction with the Sentinel server, and to prevent disk reads of the
;     sectors that contain the Sentinel.
;
;     After a tracking transaction with the server, the Sentinel will have
;     received a next-call-date that must be recorded to disk. The Sentinel
;     disk access is piggy-backed onto a disk read or write to the disk that
;     the Sentinel is installed on.
;
;     If a program (such as a Norton Disk Editor or Anit-Virus) attempts to
;     read a section of the hard disk that the Sentinel occupies, this
function
;     will deflect the read to the original code that occupied the Sentinel's
;     disk space.
;
;     Disk access other than read/writes is passed through to the original
;     interrupt 13h handler.
;
;  PROTOTYPE:
;
;  PARAMETERS:
;     AH = disk function: 0x02 = disk read
;                         0x03 = disk write
;     AL = number of sectors to read (must be non-zero)
;     CH = low eight bits of cylinder number
;     CL = sector number 1-63 (bits 0-5)
;          high two bits of cylinder number (bits 6-7, hard disk only)
;     DH = head number
;     DL = drive number (bit 7 set for hard disk)
;     ES:BX => the data source (writes) or data destination (reads)
;
;  RETURNS:
;     The flags register as set by the ROM interrupt 13 handler:
;        - CF = 0 if successful
;     AH = status
;     AL = number of sectors transferred
;
;  NOTE:
;
;*****************************************************************************
*

   ASSUME CS:SNTL_SEG, DS:NOTHING, ES:NOTHING
```

```
     OFFSET_TO_PREHANDLER  = PreInt13Handler  - JMP_REL_OFFSET
     OFFSET_TO_FULLHANDLER = FullInt13Handler - JMP_REL_OFFSET

     load_time          DW ?                  ; the time the system loaded.

PROC Int13ISR  FAR
           JMP_SHORT_REL_OPCODE        DB 0EBh
     Int13_RelOffset              DB OFFSET_TO_PREHANDLER
JMP_REL_OFFSET:

PreInt13Handler:
     PUSH      AX
     PUSH      ES
     PUSH      DS
     PUSH      CS
     POP       DS
  ASSUME DS:SNTL_SEG
; Check for an XMS manager.
     MOV       AX, 4300h
     INT       2Fh
     CMP       AL, 80h
     JE        @@XMS_Detected            ; XMS loaded, re-hook INT 2Fh.
; Check for timeout.
     MOV       AX, 0040h
     MOV       ES, AX                    ; ES = bios segment.
     MOV       AX, [ES:006Ch]            ; Load current bios time.
     SUB       AX, [load_time]           ; Find delta since sntlinit.
     CMP       AX, PREINT13_TIMEOUT      ; Check for timeout.
  JMP       @@jmp_to_full_isr
     JB        @@jmp_to_full_isr          ; If timeout, continue and hook
sentinel.

@@XMS_Detected:
     PUSH      BX
     PUSH      CX
     PUSH      DI
@@hook2F:
     MOV       BX, 002Fh
     MOV       DI, OFFSET sngprvint2f
     MOV       CX, OFFSET snfint2f
     CALL      SwapInt

@@hook1C:
     MOV       BX, 001Ch
     MOV       DI, OFFSET sngprvtmr
     MOV       CX, OFFSET tmfisr
     CALL      SwapInt
; Enable full int13 handler.
     MOV       [Int13_RelOffset], OFFSET_TO_FULLHANDLER
     POP       DI
     POP       CX
     POP       BX

@@jmp_to_full_isr:
  ASSUME DS:NOTHING
     POP       DS
     POP       ES
     POP       AX
;     JMP       [DWORD CS:sngprvdsk1]      ; pass control to original handler

FullInt13Handler:
IF TWODSKHKS
```

```
        CMP         [CS:sngdskskip], 0          ; this invocation directed to skip
test?
        JNE         @@passthru1                 ; yes, pass control through to first
disk hook
        MOV         [CS:sngdskskip], 1          ; set flag for (possible) second
hook
ENDIF

@@dsktst1:
        OR          AL, AL                      ; is the sector quantity zero?
        JNZ         @@dsktst2                   ; no, continue
        JMP         @@passthru                  ; pass control through

@@dsktst2:
        CMP         [CS:sngdeflect], 1          ; disk deflection enabled?
        JNE         @@piggyback                 ; no, check for piggy-back access

@@dsktst3:
        CMP         DX, 0080h                   ; access to Sentinel head and drive?
        JNE         @@piggyback                 ; no, check for piggy-back access

@@dsktst4:
        CMP         CX, 000Ch                   ; access to first 12 sectors?
                                                ; (MBR subloader and Sentinel
location)
        JA          @@piggyback                 ; no, check for piggy-back access

        PUSH        BX                          ; save important register
        MOV         [BYTE LOW CS:dkgcyl], CH    ; get the cylinder
        MOV         BL, CL
        SHR         BL, 6
        AND         BL, 03h
        MOV         [BYTE HIGH CS:dkgcyl], BL
        MOV         [CS:dkgsctr], CL            ; get the sector
        AND         [CS:dkgsctr], 3fh
        POP         BX                          ; recover important register

@@deflect:                                      ; at this point it has been
determined
                                                ; that the system is attempting to
                                                ; access the first 12 sectors of
                                                ; cylinder 0 and we must deflect

        CMP         [dkgsctr], 1                ; access starting on MBR?
        JE          @@dflmbr                    ; yes, go deflect read/write
        CMP         AH, 02h                     ; read access to cylinder 0?
        JE          @@dflrd                     ; yes, deflect read
        CMP         AH, 03h                     ; write access to cylinder 0?
        JE          @@dflwrt                    ; yes, deflect write
        JMP         @@passthru                  ; pass control through

@@dflmbr:                                       ; deflect access from MBR sector
        CALL        dkfdflmbr                   ; to original MBR
        JMP         @@return2                   ; exit

@@dflrd:                                        ; deflect a read
        CALL        dkfdflrd
        JMP         @@return2                   ; exit

@@dflwrt:                                       ; deflect a write
        MOV         AH, 0                       ; set success parameters and exit
        CLC
        JMP         @@return2
```

```
@@piggyback:
      CMP      [CS:sngdskwrt], 1          ; does the Sentinel need disk
access?
      JE       @@contpb                   ; yes, continue piggy-back
      JMP      @@passthru                 ; pass control through

@@contpb:
                                          ; write next-call-date to disk
                                          ; at this point we are ready to
                                          ; piggy-back onto a write to the
                                          ; same drive that the Sentinel is on

IF TWODSKHKS
      CMP      [sng2dskhks], 1            ; are we hooked twiced?
      JE       @@dskacc2                  ; yes, execute second handler

@@dskacc1:                                ; execute first disk handler
      PUSHF                               ; push flags because IRET
      CALL     [DWORD CS:sngprvdsk1]      ; from original handler pops flags
      JC       @@return                   ; exit if disk access error
      JMP      @@contpb2

@@dskacc2:                                ; execute second handler
      PUSHF                               ; push flags because IRET
      CALL     [DWORD CS:sngprvdsk2]      ; from original handler pops flags
      JC       @@return                   ; exit if disk access error
ELSE
      PUSHF                               ; push flags because IRET
      CALL     [DWORD CS:sngprvdsk1]      ; from original handler pops flags
      JC       @@return                   ; exit if disk access error
ENDIF

@@contpb2:
      PUSHA
      PUSH     DS
      PUSH     ES
      PUSH     CS                         ; set DS
      POP      DS
      PUSH     CS
      POP      ES                         ; set ES
   ASSUME   DS:SNTL_SEG
      MOV      [sngdskwrt], 0             ; clear the Sentinel flag

                                          ; Load registers for int13 call.
      MOV      AX, 0301h                  ; 03=disk write; 01=1 sector
      MOV      CX, [data_cyl_sect]        ; set cylinder and sector to write
      MOV      DX, [data_head_drive]      ; set the head and drive
      MOV      BX, DATA_SECTOR_OFFSET

      PUSHF                               ; push flags because IRET
      CALL     [sngprvdsk1]               ; from original handler pops flags
      JC       @@write_error              ; disk access error, jmp here for
now
      JMP      @@cleanup                  ; disk write successful

@@write_error:
@@cleanup:
      ASSUME NOTHING
      POP      ES
      POP      DS
      POPA

@@return:
```

```
IF TWODSKHKS
      MOV       [CS:sngdskskip], 0          ; clear disk access skip flag
ENDIF
      RET       2                           ; discard FLAGS from stack and
return

@@return2:
      ASSUME NOTHING
IF TWODSKHKS
      MOV       [CS:sngdskskip], 0          ; clear disk access skip flag
ENDIF
      RET       2                           ; discard FLAGS from stack and
return


IF TWODSKHKS
@@passthru:                                 ; cannot piggy-back this time
    ASSUME    CS:SNTL_SEG
      CMP       [CS:sng2dskhks], 0          ; is disk access hooked twice?
      JNE       @@sechandle                 ; yes, pass control to second hook
      JMP       [DWORD CS:sngprvdsk1]       ; no, pass control to original
handler
@@sechandle:
      PUSHF
      CALL      [DWORD CS:sngprvdsk2]
      JMP       @@cleanup

@@passthru1:                                ; earlier disk hook handling access
      JMP       [DWORD CS:sngprvdsk1]       ; pass control to original handler
                                            ; and it will IRET
ELSE
@@passthru:                                 ; cannot piggy-back this time
      JMP       [DWORD CS:sngprvdsk1]       ; pass control to original handler
ENDIF

ENDP Int13ISR

      ASSUME NOTHING

ENDS

   END
```

```
;***************************************************************************
*
;* Copyright (c) Absolute Software 1994, 1995
;*
;* SNTLI2FV.ASM
;*
;* PURPOSE:
;*    Contians INT 2F ISRs used by the sentinel.
;*
;* HISTORY:
;*    1995.09.05 - CCOTI
;*             Created.
;*
;***************************************************************************
*

IDEAL

%NOLIST
include "SENTINEL.INC"
include "SNTLI2FV.INC"
include "SNTLDATA.INC"
include "SNTLTIMR.INC"
include "SNTLAPI.INC"
%LIST

SEGMENT SNTL_SEG BYTE PUBLIC 'CODE'

;**********************************************************
; Unmovable code.
;**********************************************************

;**********************************************************
;Routine: Int2FVect
;
;Descript: Provides an API and RPL 2F/4A06 support
;
;**********************************************************

      ASSUME CS:SNTL_SEG, DS:NOTHING, ES:NOTHING

PROC Int2FVect FAR
      JMP       SHORT @@entry
      NOP
      rpl_sig     DB 'RPL'

@@entry:
      CMP       AX,4A06h
      JNE       @@next_check
      MOV       DX,CS

@@next_check:                       ; must be a Sentinel check
IF 0
      CMP       AX,SNTL_SIG1        ; proper signature provided?
      JNE       @@exit              ; no, exit
      CMP       DX,SNTL_SIG2        ; proper signature provided?
      JNE       @@exit              ; no, exit
      MOV       AX,OFFSET CS:SntlAPI ; yes, return API address
      MOV       DX,CS
ENDIF

@@exit:
      IRET
```

```
ENDP Int2FVect
      ASSUME NOTHING

;*****************************************************************************
*
;*
;* SNFINT2F - interrupt 2F hook
;*
;* PURPOSE:
;*    This is the interrupt 2F hook that supports the Sentinel API request and
;*    monitors WINDOWS activation/deactivation
;*
;* PARAMETERS:
;*    None
;*
;* RETURNS:
;*    Nothing
;*
;* REGSITERS DESTROYED:
;*
;* GLOBALS REFERENCED:
;*
;* GLOBALS MODIFIED:
;*
;* BIOS CALLS:
;*    None
;*
;* DOS CALLS:
;*    None
;*
;* PROCEDURE CALLS:
;*    None
;*
;* HARDWARE ACCESS:
;*    None
;*
;*****************************************************************************
*

      ASSUME CS:SNTL_SEG, DS:NOTHING, ES:NOTHING

PROC snfint2f FAR

            CMP      AX, 1605h                    ; check if WINDOWS is starting
to load
            JNE      @@check1
            MOV      [BYTE CS:sngsuspend], 1      ; suspend Sentinel until
WINDOWS is loaded
            PUSHF                                 ; push flags because IRET from
call
            CALL     [DWORD CS:sngprvint2f]       ; to previous handler pops
flags
            IRET                                  ; return from interrupt

@@check1:
            CMP      AX, 1608h                    ; check if WINDOWS has
finished loading
            JNE      @@check2
            MOV      [BYTE CS:sngsuspend], 0      ; allow Sentinel to resume
            MOV      [BYTE CS:sngdlytmr], 90      ; set the delay timer

      ; reset after delay
            MOV      [WORD CS:sngstftn], OFFSET snfsnrst
```

```
                PUSHF                                   ; push flags because IRET from
call
                CALL     [DWORD CS:sngprvint2f]         ; to previous handler pops
flags
                MOV      [BYTE CS:win_flag], 1          ; set WINDOWS status flag
                MOV      [sngincmisr], 0                ; clear communications ISR
flag
                IRET                                    ; return from interrupt

@@check2:
                CMP      AX, 1606h                      ; check if WINDOWS has exited
                JNE      @@check3
                MOV      [BYTE CS:sngsuspend], 0        ; allow Sentinel to resume
                MOV      [BYTE CS:sngdlytmr], 90        ; set the delay timer

        ; reset after delay
                MOV      [WORD CS:sngstftn], OFFSET snfsnrst
                PUSHF                                   ; push flags because IRET from
call
                CALL     [DWORD CS:sngprvint2f]         ; to previous handler pops
flags
                MOV      [BYTE CS:win_flag], 0          ; clear WINDOWS status flag
                MOV      [sngincmisr], 0                ; clear communications ISR
flag
                IRET                                    ; return from interrupt

@@check3:
                CMP      AX, 1609h                      ; check if WINDOWS is starting
exit
                JNE      @@check4
                MOV      [BYTE CS:sngsuspend], 1        ; suspend Sentinel until
WINDOWS has exiited
                PUSHF                                   ; push flags because IRET from
call
                CALL     [DWORD CS:sngprvint2f]         ; to previous handler pops
flags
                IRET                                    ; return from interrupt

@@check4:
                CMP      AX, 1607h                      ; check if WINDOWS is testing
for 32
                JNE      @@check5                       ; bit disk access support
                CMP      BX, 0010h
                JNE      @@check5
                CMP      CX, 0003h
                JNE      @@check5
                MOV      CX, 0000h                      ; set return value to indicate
32-bit support
                IRET                                    ; return from interrupt

@@check5:                                         ; check for API request
                CMP      AX, SNTL_SIG1                  ; check for signature in AX:DX
                JNE      @@org                          ; no match, go to previous
handler
                CMP      DX, SNTL_SIG2
                JNE      @@org                          ; no match, go to previous
handler

        ; AX:DX match, but no access yet
                CMP      [sngapifl], 10                 ; more than ten failed API
requests?
                JAE      @@apifail                      ; yes, jump to original
handler
```

```
            CMP     BX, [sngpwd1]               ; check for passwords in BX:CX
            JNE     @@bkdr                      ; no match, check for backdoor
password
            CMP     CX, [sngpwd2]               ; check for passwords in BX:CX
            JNE     @@bkdr                      ; no match, check for backdoor
password
            JMP     @@apipass                   ; ok!

@@bkdr:                                    ; check for backdoor access
            CMP     BX, [WORD sngsernum]
            JNE     @@apifail                   ; no match, increment failure
count
            CMP     CX, [WORD sngsernum + 2]
            JNE     @@apifail                   ; no match, increment failure
count

@@apipass:
            MOV     AX,OFFSET CS:Sntl API       ; signature and password match
            MOV     DX,CS                       ; return API entry point
            IRET                                ; return from interrupt

@@apifail:
            MOV     DX, 0F0ADh                  ; alert CTM to presence but
failed access
            INC     [sngapifl]
            IRET                                ; return from interrupt

@@org:
            JMP     [DWORD CS:sngprvint2f]      ; pass control to previous
handler

ENDP snfint2f
            ASSUME NOTHING

ENDS

   END
```

```
;***************************************************************************
*
;* Copyright (c) Absolute Software 1994, 1995
;*
;* SNTLINIT.ASM
;*
;* contains all initialization code that is discarded from memory.
;*
;* HISTORY:
;*    1995.09.05 - CCOTI
;*            File created from the old SNTLINIT.ASM.
;*
;***************************************************************************
*

SEGMENT SNTL_INIT_SEG PARA PUBLIC 'CODE'
ENDS

IDEAL

%NOLIST
include "SENTINEL.INC"
include "SNTLDATA.INC"
include "SNTLI2FV.INC"
include "SNTLI13V.INC"
%LIST

;***************************************************************************
*
;*
;* SNTL_INIT_SEG - Transient segment.
;*
;***************************************************************************
*
SEGMENT SNTL_INIT_SEG PARA PUBLIC 'CODE'
   ASSUME CS:SNTL_INIT_SEG, DS:NOTHING

;***************************************************************************
*
; Sntlinit Header

            part_sector    DB 512 DUP( 0 )
            boot_sector    DB 512 DUP( 0 )
            io_sector      DB 512 DUP( 0 )

      SntlSignature  DW SNTL_SIG1, SNTL_SIG2
            JMP        NEAR SntlInit

fdddataseg:                                ; sentinel source image parameters
      fdgssihddrv        DW 0000h          ; determined with Norton Disk Editor
      fdgssicylsec       DW 0101h          ; determined with Norton Disk Editor
      fdgssisec          DB 11             ; written by CTM

                                           ; sentinel target image parameters
      fdgstihddrv        DW 0000h          ; written by CTM
      fdgsticylsec       DW 0000h          ; written by CTM
      fdgstisec          DB 00             ; written by CTM

                                           ; subloader source image parameters
      fdgslsihddrv       DW 0100h          ; determined with Norton Disk Editor
      fdgslsicylsec      DW 0010h          ; determined with Norton Disk Editor
      fdgslsisec         DB 1              ; written by CTM
```

```
                                            ; subloader target image parameters
     fdgsltihddrv        DW 0000h           ; written by CTM
     fdgslticylsec       DW 0000h           ; written by CTM
     fdgsltisec          DB 0               ; written by CTM

     fdginstall          DB 0               ; written by CTM to activate HDD
                                            ; infection by FDD boot program
     fdgdskerr           DB 0               ; disk access error count

           fdghddbshd          DW ?               ; HDD Boot Sector head and
drive
     fdghddbscs          DW ?               ; HDD Boot Sector cylinder and
sector

     fdghddid            DD ?               ; HDD volume ID written by CTM to
prevent
                                            ; FDD boot program from infecting
wrong disk

;***************************************************************************
*
; SntlInit entry points (stack= AX,BX,CX,DX,DS,ES)
SntlInit:
     EMIT      'S'
     PUSH      SI
     PUSH      DI
     PUSH      CS
     POP       DS
   ASSUME DS:SNTL_INIT_SEG

     XOR       BX, BX                  ; copy original MBR over the subloader
     MOV       ES, BX                  ; at location 0000:7C00h
     MOV       DI, 7C00h

     MOV       AX, OFFSET part_sector
     MOV       SI, AX                  ; SI = sector to copy.
     MOV       CX, 100h                ; 256 words to copy.
     CLD
     REP MOVSW
     EMIT      'M'
; Check if sntlinit is already in memory.
     XOR       BX, BX
     MOV       ES, BX
     MOV       BX, [ES:00BCh]
     MOV       ES, [ES:00BEh]
     CMP       [WORD ES:BX+3], 'PR'
     JNZ       RPL_check_fail
     CMP       [BYTE ES:BX+5], 'L'
     JNZ       RPL_check_fail
RPL_exist:
; Check if the sentinel acknowledges.
     EMIT      'R'
     MOV       AX, SNTL_SIG1
     MOV       DX, SNTL_SIG2
     INT       2Fh
     CMP       DX, SNTL_SIG2           ; Is the sentinel installed?
     JNE       exit                    ; Yes, exit now.
     EMIT      '!'

RPL_check_fail:

           XOR       AX, AX
           MOV       ES, AX                  ; ES = IVT segment.
```

```
; Calculate and assign SNTL_SEG to DS.
            MOV      AX, CS
            MOV      BX, OFFSET SNTL_SEGMENT
            SHR      BX, 4
            ADD      AX, BX
            MOV      DS, AX
      ASSUME DS:SNTL_SEG

; Hook the interrupt handlers into the system:
            CLI                               ; DISABLE INTERRUPTS
; Hook 2Fh.
            MOV      [WORD ES:00BCh], OFFSET Int2FVect
            MOV      [WORD ES:00BEh], AX
; Hook 13h.
            MOV      AX, [WORD ES:004Ch]       ; first hook of INT 13h to
control disk access
            MOV      [WORD sngprvdsk1], AX
            MOV      AX, [WORD ES:004Eh]
            MOV      [WORD sngprvdsk1+2], AX
            MOV      [WORD ES:004Ch], OFFSET Int13ISR
            MOV      [WORD ES:004Eh], DS

;***************************************
;       MOV      AX,[WORD ES:0064h]        ; hook INT 19h to track reboot
;       MOV      [WORD sngprvint19],AX
;       MOV      AX,[WORD ES:0066h]
;       MOV      [WORD sngprvint19+2],AX
;       MOV      [WORD ES:0064h],OFFSET snfint19
;       MOV      [WORD ES:0066h],DS
;
;                                          ; QEMM requirement
;       MOV      [BYTE ES:03C4h], 'N'      ; to work with QEMM DOSDATA look
like
;       MOV      [BYTE ES:03C5h], 'e'      ; a Novell NetWare RPL by loading
;       MOV      [BYTE ES:03C6h], 't'      ; this string at INT F1h and our
code
;       MOV      [BYTE ES:03C7h], 'W'      ; segment (less DOS wrapper) at
;                                          ; segment portion of INT F3h
;
;       MOV      AX, DS                    ; Novell puts its INT 13h address
at
;       SUB      AX, 0001h                 ; INT F3h, so try that for our hook
;       MOV      [WORD ES:03CCh + 2], AX
;       MOV      [WORD ES:03CCh], OFFSET Int13ISR
;***************************************

; Initialize runtime variables (if any).
      MOV      AX, [modem_default_port]   ; set first port to attempt dial out
      MOV      [sngmdmprt], AX
;Set the load_time variable for the preint12_handler.
;           MOV      AX, 0040h
;           MOV      ES, AX                    ; ES = bios segment.
;           MOV      AX, [ES:006Ch]            ; Load current bios time.
;       MOV      [load_time], AX

      STI                                 ; ENABLE INTERRUPTS.

      EMIT     'H'

exit:
; Jump to io.sys
      EMIT     'X'
      POP      DI
```

```
      POP       SI
   ASSUME ES:NOTHING
      POP       ES
   ASSUME DS:NOTHING
      POP       DS
      POP       DX
      POP       CX
      POP       BX
      POP       AX
; Jump back to sector.
      JmpOpcode       DB 0EAh
      EntryPnt        DW 7C00h
      SectSeg         DW 0000h

IF EMIT_ON ;Only needed for EMIT macro ===================
;
; Puts the character in AL to the console.
;
PROC PutChar NEAR
      PUSH      AX
      PUSH      BX
      MOV       AH,0Eh                  ;Output a character
      MOV       BH,0
      push      bp                      ;TCN - For old BIOS
      INT       10h
      pop       bp                      ;TCN - For old BIOS
      POP       BX
      POP       AX
      RETN
ENDP PutChar

ENDIF ;EMIT_ON=========================================

; Padding to maintain segment offset that matches the current CTM.EXE
      Padding DB 20h DUP( 90h )

;Following statments must be at the end of the SNTL_INIT_SEG.
   ALIGN 16
SNTL_SEGMENT:                           ; Used to calculate the location of
SNTL_SEG.
ENDS

   END
```

```
;*****************************************************************************
*
;* Copyright (c) Absolute Software 1994, 1995
;*
;* SNTLJTBL.ASM
;*
;* Contains the main jumptable code used by TimerISR.
;*
;* HISTORY:
;*    1995.09.05 - CCOTI
;*              Created.
;*
;*****************************************************************************
*

IDEAL

%NOLIST
include "SENTINEL.INC"
include "SNTLJTBL.INC"
include "SNTLDATA.INC"
include "SNTLTIMR.INC"
%LIST

SEGMENT SNTL_SEG BYTE PUBLIC 'CODE'
      ASSUME CS:SNTL_SEG, DS:SNTL_SEG, ES:NOTHING
;
;
; Enter: AL = table index, BX = table offset.
PROC JumpTable NEAR
      XOR      AH,AH                     ; zero AH
      SHL      AX,1                      ; multiply AX by 2 to get offset
      ADD      BX,AX                     ; add offset to the table base
      JMP      [WORD BX]                 ; jump the indexed address
ENDP JumpTable

cleanup:
      MOV      [sngstftn],OFFSET snfsnrst
;      MOV      [cleanup_routine],OFFSET ActiveRoutine
      MOV      [Sentinel_state],SNSTACTIVE
      RETN

find_timeout:
IF 1
      MOV      [sngstftn],OFFSET snfsnrst
ELSE
      MOV      [sngstftn],OFFSET snfsnrst
      MOV      [cleanup_routine],OFFSET CheckNextPort
ENDIF
      RETN

find_ok:
; Modem successfully initialized.
      MOV      [BYTE init_str_num],INIT_STR_TABLE_SIZE ;reset modem init
string table index

init_error:
      MOV      [sngstftn],OFFSET ModemInitInit
      RETN

init_ok:
IF 0
;MOD DBOYD 55:95.04.12
```

```
;  reset the dial string number when the Sentinel goes active, doing this will
;  allow the system to search for another port and continue on from the last
;  pre-dial string used
      MOV       [BYTE dial_str_num],DIAL_STR_TABLE_SIZE
ENDIF
      MOV       [sngstftn],OFFSET ModemCallInit
      RETN

IF 0
;MOD DBOYD 50:95.02.22:
;  to allow direct dial and PBX dial to work on opposite system, treat <BUSY>
;  the same as <NO_DIAL_TONE> so that the next pre-dial string will be used
dial_busy:
      DEC       [dial_str_num]                   ; reuse the last dial string
      MOV       [sngstftn],OFFSET ModemCallInit
      RETN
ENDIF

IF 1
dial_busy:                    ;MOD DBOYD 50:95.02.22
dial_error:                   ;MOD DBOYD 55:95.04.12
dial_no_carr:                 ;MOD DBOYD 55:95.04.12
cnct_error:                   ;MOD DBOYD 55:95.04.13
ENDIF
dial_no_tone:
      MOV       [sngdlytmr], TM1SEC        ; delay 1 second before redialing
      MOV       [sngstftn], OFFSET ModemFindInit ; search for modem before
redialing

      RETN

IF 0
;MOD DBOYD 55:95.04.12:
;  to allow 8 prefix to work on 9 prefix PBX's and direct dial, treat
;  the responses below the same as no dial tone so that the next pre-dial
;  string will be used
dial_error:
dial_no_carr:
ENDIF
cmrxpktto:                              ;ADD CCOTI 48:95.02.07
      MOV       [sngstftn],OFFSET snfsnrst
;      MOV       [cleanup_routine],OFFSET ActiveRoutine
      MOV       [sngclst], SNCALLFAIL
      RETN

IF 0                          ;MOD DBOYD 55:95.04.13
cnct_error:
ENDIF
cnct_eot:
      MOV       [sngstftn],OFFSET snfsnrst
;      MOV       [cleanup_routine],OFFSET ActiveRoutine
      RETN

dial_server:
cnct_enq:
cnct_nak:
cnct_resend:
      MOV       [sngstftn],OFFSET snftxchkin
      RETN

cnct_ack:
      MOV       [sngstftn],OFFSET snfgetpkt
      RETN
```

```
IF 0
cnct_hold:
      MOV      [receive_tick_count],0          ; Reset timeout.
      RETN
ENDIF

ENDS

   END
```

```
;************************************************************************
*
;* Copyright (c) Absolute Software 1994, 1995
;*
;* SNTLSTRT.ASM
;*
;* Contians routines for using the sentinel's string tables.
;*
;* HISTORY:
;*    1995.09.05 - CCOTI
;*           Created.
;*
;************************************************************************
*

IDEAL

%NOLIST
include "SENTINEL.INC"
include "SNTLSTRT.INC"
include "SNTLDATA.INC"
include "SNTLBUFF.INC"
%LIST

SEGMENT SNTL_SEG BYTE PUBLIC 'CODE'

;************************************************************************
*
;
;  COMTRANSCHECK - check result of transmission
;
;  PURPOSE:
;     This function checks the result of a transmission between the Sentinel
;     and the modem.  It test modem responses against a table of strings.
More
;
;  PARAMETERS:
;     BX = the beginning of the string table (more than one table is
supported)
;
;  RETURNS:
;     CF = 1 if response is not completely received
;     CF = 0 and AL = 0 if time-out without a match
;     CF = 0, AL = index of match in response table (1 = last string in table)
;
;  GLOBALS REFERENCES:
;     receive_tick_count
;     sngrxbuftl
;     sngrxbufhd
;
;  GLOBALS MODIFIED:
;     sngrxbuftl - if a string is found, set past the found string.
;
;  BIOS CALLS:
;     None
;
;  DOS CALLS:
;     None
;
;  PROCEDURE CALLS:
;     buf_inc_ptr, buf_getchar
;
;  HARDWARE ACCESS:
```

```
;       None
;
;  NOTES:
;
;*****************************************************************************
*

      ASSUME CS:SNTL_SEG, DS:SNTL_SEG, ES:NOTHING

PROC ComTransCheck

      CLD                                  ; set CMPSB pointers to increment
      PUSH      DS                         ; get ES = DS
      POP       ES
      MOV       AL, [BX-1]                 ; AL = the number of strings to compare
      XOR       CH, CH                     ; zero CH (CL is defined below)
      XOR       AH, AH                     ; make AH zero

@@str_loop_start:
; Initialize the inner loop.
      MOV       SI,[sngrxbuftl]
      MOV       DI,[BX]                    ; DI = the string to check
      ADD       BX,2
      MOV       CL,[DI-1]                  ; CX = the string len

@@char_loop_start:
      CMP       SI,[sngrxbufhd]
      JE        @@buffer_overrun           ; at the end of the buffer
      CMPSB                                ; this increments SI and DI
      JNE       @@unmatched_byte           ; this string doesn't match
      LOOP      @@char_loop_start

@@found_match:
      MOV       [sngrxbuftl],SI

@@clear_carry:
      CLC                                  ; set return status
      RET                                  ; exit

@@buffer_overrun:
      INC       AH                         ; AH != 0 if no match has been found

@@unmatched_byte:
; Have we checked all of the strings?
      DEC       AL                         ; decrement string counter
      JNZ       @@str_loop_start

@@no_match:                                ; AL = 0
; Check if we have timed out.
   CMP    [rx.rxxtmr], 0
   JE     @@clear_carry                    ; timed out, exit

; Check if we need to consume a character.
      OR        AH,AH                      ; AH != 0 if no match was found
      JNZ       @@exit
      CALL      buf_getchar

@@exit:
      STC                                  ; set return status
      RET                                  ; exit

ENDP ComTransCheck
      ASSUME NOTHING
```

```
ENDS
  END
```

```
;***************************************************************************
*
;* Copyright (c) Absolute Software 1994, 1995
;*
;* SNTLTIMR.ASM
;*
;* Contains Timer ISR and related subroutines.
;*
;* HISTORY:
;*    1995.09.05 - CCOTI
;*            Created.
;*
;***************************************************************************
*

IDEAL

%NOLIST
include "SENTINEL.INC"
include "SNTLTIMR.INC"
include "SNTLDATA.INC"
include "SNTLJTBL.INC"
include "SNTLAPI.INC"
include "SNTLCOMM.INC"
include "SNTLCOMV.INC"
include "SNTLBUFF.INC"
include "SNTLSTRT.INC"
%LIST

;TCN Nov 1/95
MACRO TCN_EMIT ch
      PUSH      AX
      MOV       AL,ch
      CALL      TCN_PutChar
      POP       AX
ENDM
;TCN Nov 1/95


SEGMENT SNTL_SEG BYTE PUBLIC 'CODE'
      ASSUME CS:SNTL_SEG, DS:NOTHING, ES:NOTHING

;TCN Nov 1/95
PROC TCN_PutChar NEAR
      PUSH      AX
      PUSH      BX
      MOV       AH,0Eh                  ;Output a character
      MOV       BH,0
      push      bp                      ;TCN - For old BIOS
      INT       10h
      pop       bp                      ;TCN - For old BIOS
      POP       BX
      POP       AX
      RETN
ENDP TCN_PutChar
;TCN Nov 1/95

;***************************************************************************
*
;*
;* TMFISR - timer interrupt service routine
;*
;*  PURPOSE:
```

```
;*    This function implements the timer ISR that is hooked to the system
;*    timer.  This function and performs the following:
;*
;*  Checks the Sentinel's state <Sentinel state>
;*  Executes one of the following subroutines based on the state:
;*    SNSTACTIVE
;*       ActiveRoutine:
;*
;*    SNSTALERT
;*       PortFindInit:
;*       PortFind
;*       CheckNextPort:
;*
;*    SNSTCALL
;*       ModemFindInit:
;*       ModemFind:
;*       ModemFindError:
;*
;*       ModemInitInit:
;*       ModemInit:
;*       ModemInitError:
;*       ModemCallInit:
;*       ModemCall:
;*       ModemDialError:
;*
;*    SNSTCONNECT
;*       snftxchkin:
;*       ModemConnect:
;*       ModemConnectError:
;*
;*    SNSTERROR
;*       ErrorRoutine:
;*
;* PARAMETERS:
;*    None
;*
;* RETURNS:
;*    Nothing
;*
;* REGISTERS DETROYED:
;*    None
;*
;* GLOBALS REFERENCED:
;*    sngincmisr
;*    Sentinel_state
;*    sngstftn
;*    time_count
;*    activation_period
;*    modem_default_port
;*    port_table
;*    sngmdmprtadd
;*    sngmdmprtint
;*    modem_init_str
;*    init_result_table
;*
;* GLOBALS MODIFIED:
;*    sngmdmprt - set to the port currently being used.
;*    Sentinel_state - set to the now state of the Sentinel
;*    sngstftn - set to the routine that will perform the next action.
;*    sngmdmprtadd - set to the address used by the current port (sngmdmprt)
;*    sngmdmprtint - set to the interrupt used by the current port (sngmdmprt)
;*    sngincmisr - reset to 0 before cmfisr is hooked in.
;*    send_buf_len - reset before cmfisr is hooked in.
```

```
;*    sngprvcom - stores the old com ISR before hooking in cmfisr.
;*
;*
;* BIOS CALLS:
;*    None
;*
;* DOS CALLS:
;*    None
;*
;* PROCEDURE CALLS:
;*    buf_flush
;*    SwapInt
;*    ComTransInit
;*    ComTransCheck
;*
;* HARDWARE ACCESS:
;*    UART (I/O MCR, OUT IER), I/O PIC
;*
;*******************************************************************************
*

PROC tmfisr FAR                          ; Entry point for TimerISR.

IF Debug
      INC       [CS:TimerISR_count]      ; increment debug timer
ENDIF

      CMP       [CS:sngsuspend], 0       ; is the Sentinel suspended?
      JNE       TimerAbort               ; yes, exit

      CMP       [CS:sngincmisr], 0       ; is the Sentinel in the comm. ISR?
      JNE       TimerAbort               ; yes, exit

      PUSH      DS                       ; save registers
      PUSH      ES
      PUSHA

      PUSH      CS                       ; set DS = CS = SNTL_COM_SEG
      POP       DS
      ASSUME DS:SNTL_SEG

      CLI                                ; halt interrupts
      CMP       [sngcomhk], 0            ; have we hooked the comm.
interrupt?
      JE        @@tmcont                 ; no, continue

                                         ; yes, determine if we still have
the hook
      MOV       BX, [sngmdmprtint]       ; the IVT entry to test
      SHL       BX, 2                    ; BX = the IVT offset to get ISR
vector
      XOR       AX, AX                   ; clear ES
      MOV       ES, AX

      MOV       AX, [ES:BX]              ; get offset of installed vector
      CMP       AX, OFFSET cmfisr        ; is it our routine?
      JNE       @@tmrst                  ; no, Reset sentinel
      MOV       AX, DS                   ; get our segment
      CMP       AX, [ES:BX+2]            ; compare to installed vector
segment
      JNE       @@tmrst                  ; if not equal, reset Sentinel
```

```
        JMP      @@tmcont                   ; we still have the interrupt,
continue

@@tmrst:                                    ; reset the Sentinel and continue
        MOV      [sngstftn], OFFSET ActiveRoutine
        MOV      [Sentinel_state], SNSTACTIVE
        MOV      [sngcomhk], 0              ; clear the the comm. hooked flag

@@tmcont:
        STI                                 ; restore interrupts
        CMP      [win_flag],0               ; are we in Windows?
        JE       @@chktmrs                  ; no, go check running timers
        MOV      AX,1683h                   ; yes, determine virtual machine
        INT      2Fh
        CMP      BL,[win_vm]                ; should be a word!!
        JNE      TimerExit                  ; not in virtual machine 1, exit

@@chktmrs:
        CMP      [tx.txxtmr], 0             ; is the transmit timer running?
        JE       @@nxtmr0                   ; no, continue
        DEC      [tx.txxtmr]                ; yes, decrement the transmit timer

@@nxtmr0:
        CMP      [rx.rxxtmr], 0             ; is the receive timer running?
        JE       @@nxtmr1                   ; no, continue
        DEC      [rx.rxxtmr]                ; yes, decrement the port delay
timer

@@nxtmr1:
        CMP      [sngprtdlytmr], 0          ; is the port delay timer running?
        JE       @@nxtmr2                   ; no, continue
        DEC      [sngprtdlytmr]             ; yes, decrement the port delay
timer

@@nxtmr2:
        CMP      [sngdlytmr], 0             ; is the Sentinel delay timer
running?
        JE       @@gostate                  ; no, execute state function
        DEC      [sngdlytmr]                ; yes, decrement timer
        JMP      TimerExit                  ; no, call previous timer handler

@@gostate:
        CALL     [sngstftn]                 ; execute the state function

TimerExit:
        POPA                                ; recover registers
        ASSUME DS:NOTHING, ES:NOTHING
        POP      ES
        POP      DS

TimerAbort:
        JMP      [DWORD CS:sngprvtmr]

ENDP tmfisr
        ASSUME NOTHING

;****************************************************************************
*
;*
;* SNFWTFORXMS - wait for XMS
;*
;* PURPOSE:
```

```
;*    This function waits for the extended memory manager (XMS) to be loaded
;*    and then hooks interrupt 2Fh.  This hook allows the Sentinel to track
the
;*    PC moving in and out of WINDOWS, and allows ASC utilities to communicate
;*    with the utility.
;*
;* PARAMETERS:
;*    None
;*
;* RETURNS:
;*    Nothing
;*
;* GLOBALS REFERENCED:
;*
;* GLOBALS MODIFIED:
;*
;* BIOS CALLS:
;*    None
;*
;* DOS CALLS:
;*    None
;*
;* PROCEDURE CALLS:
;*    None
;*
;* HARDWARE ACCESS:
;*    Nothing
;*
;*****************************************************************************
*

      ASSUME CS:SNTL_SEG, DS:SNTL_SEG, ES:NOTHING

;*** STOLEN BY CCOTI ***

      ASSUME NOTHING

;*****************************************************************************
*
;*
;* SNFWAIT - wait for timer to expire
;*
;* PURPOSE:
;*    This function waits for the delay timer, sngdlytmr, to expire before
;*    allowing the Sentinel to proceed. This function is used to delay the
;*    Sentinel from activating on power-up and when entering and exiting
;*    WINDOWS.  Since the delay may be started at any time for a number of
;*    reasons, when the delay expires the Sentinel goes to snfsnrst()
;*    before going back to ActiveRoutine().
;*
;* PARAMETERS:
;*    None
;*
;* RETURNS:
;*    Nothing
;*
;* GLOBALS REFERENCED:
;*
;* GLOBALS MODIFIED:
;*
;* BIOS CALLS:
;*    None
;*
```

```
;* DOS CALLS:
;*     NONE
;*
;* PROCEDURE CALLS:
;*     None
;*
;* HARDWARE ACCESS:
;*     None
;*
;*****************************************************************************
*

      ASSUME CS:SNTL_SEG, DS:SNTL_SEG, ES:NOTHING

IF 0
PROC snfwait NEAR

      CMP      [sngdlytmr], 0              ; wait for delay timer to expire
      JNE      @@exit                      ; not yet expired, exit

@@reset:                                   ; reset the Sentinel
      MOV      [sngstftn],OFFSET snfsnrst
;      MOV      [cleanup_routine],OFFSET ActiveRoutine

@@exit:
      RETN                                 ; exit

ENDP snfwait

      ASSUME NOTHING
ENDIF

      ASSUME CS:SNTL_SEG, DS:SNTL_SEG, ES:NOTHING

PROC ActiveRoutine NEAR

; Check if the activation period has been exceeded.
;      ROR      [cycle_var],1
;      JNC      @@end
; Get current date and time.
      MOV      AH,4
      INT      1Ah                         ; Get RTC date.
      JC       @@end
      MOV      [now_year],CL               ; Store year.
      XCHG     DL,DH
      MOV      [WORD now_month],DX         ; Store month and day.
      MOV      AH,2
      INT      1Ah
      JC       @@end
      XCHG     CL,CH
      MOV      [WORD now_hour],CX          ; Store hour and minute.

; Check if next_call_date has been passed.
      MOV      SI, OFFSET next_call_date
      MOV      DI, OFFSET now_date
      CALL     CmpDates
      JNC      @@end

@@alert:
      MOV      [Sentinel_state],SNSTALERT         ; Date passed, set to alert.

@@end:
```

```
; Check if we've been activated.
      CMP      [Sentinel_state],SNSTALERT         ; Check state.
      JNE      @@exit

@@activated:

; Set the Sentinel to the ALERT state.
IF 0
      MOV      AX,[modem_default_port]
      MOV      [sngmdmprt],AX                          ; set first port
ENDIF
      MOV      [BYTE dial_str_num],DIAL_STR_TABLE_SIZE    ; set first pre-dial
string
      MOV      [sngstftn],OFFSET PortFindInit        ; set next state function

@@exit:
      RETN
ENDP ActiveRoutine

;
;
;
PROC CheckNextPort NEAR
      MOV      AX,[sngmdmprt]
      INC      AX
      CMP      AL,PORT_TABLE_SIZE
      JB       @@assign_port
      XOR      AX,AX                      ; start back at first port
@@assign_port:
      MOV      [sngmdmprt],AX             ; set the modem port to check
                                          ; go look for modem on the port
      MOV      [sngstftn],OFFSET PortFindInit
      RETN                                ; exit

ENDP CheckNextPort


;
;
;
PROC PortFindInit NEAR
; initialize PortFind variables (based on sngmdmprt which was set previously).

      MOV      [sngclst], SNPRTSRCH       ; set call status

      MOV      BX, [sngmdmprt]
      SHL      BX, 2
      ADD      BX, OFFSET port_table
      MOV      AX, [BX]
      OR       AX, AX                     ; check if port is valid

      JZ       CheckNextPort
      MOV      [sngmdmprtadd], AX         ; store current port address
      MOV      AX, [BX+2]
      MOV      [sngmdmprtint], AX         ; store current port interrupt
      MOV      [sngstftn],OFFSET PortFind ; set next state
      MOV      [sngprtdlytmr], TM5SEC     ; set port delay timer to 5 seconds
      RETN
ENDP PortFindInit

;
;
```

```
;
PROC PortFind NEAR
; Check if the port exists.
      ; ...
      ; NOT IMPLEMENTED - NEEDED FOR PCMCIA
      ; ...

;      TCN_EMIT      '1'                    ;TCN Nov 1/95

      MOV      DX,[sngmdmprtadd]            ; DX = current port's address
      INC      DX                           ; DX = current port's IER
      IN       AL, DX                       ; AL = IER port status
      IODELAY
      AND      AL, 0FFh                     ; if IER = 0xff, UART does not exist
      CMP      AL, 0FFh
      JNE      @@chkprtavl                  ; port exists, go check availability
      JMP      CheckNextPort                ; port does not exist, go check next
port

@@chkprtavl:                                ; check if the port is in use

;      TCN_EMIT      '2'                    ;TCN Nov 1/95

                                            ; test PIC IMR first
      MOV      CX,[sngmdmprtint]            ; get bit of interest
      SUB      CL,08h
      MOV      BL,01h
      SHL      BL,CL                        ; bit mask ready

      IN       AL,21h                       ; get primary PIC IMR
      IODELAY
      AND      AL,BL                        ; bit set => interrupt disabled
      JNZ      @@port_idle

;      TCN_EMIT      '3'                    ;TCN Nov 1/95

                                            ; PIC IMR bit set, test IER next
      MOV      DX,[sngmdmprtadd]            ; DX = current port's address
      INC      DX                           ; DX = current port's IER
      IN       AL,DX                        ; AL = IER port status
      IODELAY
      OR       AL,AL                        ; Are any IER bits set?
      JZ       @@port_idle                  ; if no, port is idle

;      TCN_EMIT      '4'                        ;TCN Nov 1/95

                                            ; PIC IMR bit set, and IER bits
                                            ; set, test OUT2 next
      MOV      DX,[sngmdmprtadd]            ; DX = current port's address
      ADD      DX,MCR                       ; DX = current port's MCR
      IN       AL,DX                        ; AL = MCR port status
      IODELAY
      TEST     AL,08h                       ; is MCR OUT2 bit set?
      JZ       @@port_idle                  ; if no, port is idle

;      TCN_EMIT      '5'                    ;TCN Nov 1/95

      JMP      CheckNextPort                ; all checks failed

@@port_idle:
```

```
;       TCN_EMIT        '6'                 ;TCN Nov 1/95

        CMP     [sngprtdlytmr], 0           ; port must be available for a set
period
        JNE     @@exit                      ; before a call is attempted

                                            ; set port for no parity, eight
                                            ; data bits, and 1 stop bit
        MOV     DX, [sngmdmprtadd]          ; get address of LCR
        ADD     DX, LCR
        MOV     AL, 00000011b               ; set LCR for N81

        OR      AL, 80h                     ; set DLAB
        OUT     DX, AL                      ; set value in LCR
        IODELAY


                                            ; force 9600 bps
                                            ; DX = f / ( 16 * bps )
                                            ;    = 1.8432 MHZ ( 16 * 9600 bps )
                                            ;    = 0x000C
        MOV     DX, [sngmdmprtadd]          ; get address of DL LSB
        ADD     DX, BRDL
        MOV     AX, 000Ch                   ; set new divisor
        OUT     DX, AX
        IODELAY

        MOV     DX, [sngmdmprtadd]          ; get address of DL LSB
        ADD     DX, LCR
        IN      AL, DX                      ; get value in LCR
        IODELAY
        AND     AL, 7Fh                     ; clear DLAB
        OUT     DX, AL                      ; set value in LCR
        IODELAY

@@init_ok:
; Clear any pending errors in the UART.
        MOV     DX, [sngmdmprtadd]          ; get address of LSR
        ADD     DX,LSR
        IN      AL,DX
        IODELAY

; Hook into the port, first init and install the interrupt vector.
        CALL    buf_flush                   ; flush the receive buffer
        MOV     [sngincmisr],0
        MOV     [send_buf_len],0
        MOV     BX,[sngmdmprtint]           ; The int to install.
        MOV     DI,OFFSET sngprvcom         ; DS:DI = the address to store the
old vect.
        MOV     CX,OFFSET cmfisr            ; DS:CX = the new com vector.
        CALL    SwapInt
        MOV     [sngcomhk], 1               ; set the comm. hooked flag


        CLI                                 ; disable interrupts
        MOV     DX, [sngmdmprtadd]          ; get address of MCR
        ADD     DX, MCR
        IN      AL, DX
        IODELAY
        OR      AL, 00001011b
        OUT     DX, AL                      ; interrupts enabled in the UART
        IODELAY
```

```
        MOV     CX,[sngmdmprtint]           ; clear (enable) IRQ bit mask in PIC
        SUB     CL,08h
        MOV     BL,01h
        SHL     BL,CL
        NOT     BL
        IN      AL,21h
        IODELAY
        AND     AL,BL
        OUT     21h,AL                      ; interrupts enabled in the PIC
        IODELAY

        MOV     DX, [sngmdmprtadd]          ; get address of IER
        INC     DX
        MOV     AL,00000001b                ; interrupt when data received
        OUT     DX,AL
        IODELAY

        STI                                 ; enable interrupts

        MOV     [Sentinel_state], SNSTCALLING
        MOV     [sngdlytmr], TM1SEC         ; delay 1 second before attempting
to
        MOV     [sngstftn], OFFSET ModemFindInit ; find modem

@@exit:
        RETN
ENDP PortFind

;
;
;

PROC ModemFindInit NEAR

    MOV     [sngclst], SNMDMSRCH            ; set call status

    MOV     BX, OFFSET modem_find_str       ; get a pointer to modem string
    CALL    cmfprpmdm                       ; prepare transmit structure
    MOV     [tx.txcnxtst], OFFSET ModemFind ; set next state after transmission

    RETN

ENDP ModemFindInit

;
;
;

PROC ModemFind NEAR

    MOV     BX,OFFSET command_result_table  ; check for received data
    CALL    ComTransCheck
    JC      @@end                           ; data not received yet
    MOV     BX,OFFSET find_jump_table       ; check for acceptable response

    mov     [sngdlytmr], 9                  ;TCN Nov 1/95
                                            ;According to Hayes Modem spec.
                                            ;we should wait at least 0.5 secs
                                            ;after sending the "ATZ" command

    JMP     JumpTable
```

```
@@end:
   RETN

ENDP ModemFind


;
;
;
PROC ModemInitInit NEAR

; Attempt to initialize the modem (send modem_init_str).

   MOV    [sngclst], SNMDMINIT              ; set call status

   MOV    BX, OFFSET init_str_num           ; get the index of the next string
   DEC    [BYTE BX]
   JZ     @@reset                           ; wrap-around and start over

                                            ; prepare transmit structure
   MOV    AX, [BX]                          ; get a pointer to the next string
   SHL    AX, 1
   ADD    BX, AX
   MOV    BX, [BX]
   CALL   cmfprpmdm                         ; prepare transmit structure
   MOV    [tx.txxnxtst], OFFSET ModemInit   ; set state following transmission

   RETN

@@reset:
   MOV    [BYTE BX], INIT_STR_TABLE_SIZE    ; retry initialization strings
   MOV    [sngstftn], OFFSET ModemCallInit
   RETN

ENDP ModemInitInit


;
;
;
PROC ModemInit NEAR

; Check for reply.

   MOV    BX,OFFSET mdm_init_result_table
   CALL   ComTransCheck
   JC     @@end                                       ; data not received yet

   MOV    BX,OFFSET init_jump_table
   JMP    JumpTable

@@end:
      RETN
ENDP ModemInit


;
;
;
PROC ModemCallInit NEAR

; Attempt to dial (send modem pre-dial string).
```

```
   MOV    [sngclst], SNMDMPD                 ; set call status

@@getstr:
   MOV    BX, OFFSET dial_str_num            ; get the index of the next string
   DEC    [BYTE BX]
   JZ     @@reset                            ; wrap-around and start over

   MOV    AX, [BX]
   SHL    AX, 1
   ADD    BX, AX
   MOV    BX, [BX]
   CALL   cmfprpmdm                          ; prepare transmit structure
   MOV    [tx.txxnxtst], OFFSET ModemCallInit2  ; set state following
transmission

   RETN

@@reset:
   MOV    [BYTE dial_str_num],DIAL_STR_TABLE_SIZE
   JMP    @@getstr
   RETN

ENDP ModemCallInit


;
;
;
PROC ModemCallInit2 NEAR

   MOV    [sngclst], SNMDMDL                 ; set call status
   MOV    BX, OFFSET dial_number             ; get the packet length
   CALL   cmfprpmdm                          ; prepare transmit structure
   MOV    [tx.txxnxtst], OFFSET ModemCall    ; set state following transmission
                                             ; override default response time and
   MOV    [rx.rxxtmr], TM40SEC               ; wait 40 seconds for response

   RETN

ENDP ModemCallInit2


;
;
;
PROC ModemCall NEAR

   MOV    [sngclst], SNWTCON                 ; set call status
   MOV    BX,OFFSET dial_result_table
   CALL   ComTransCheck                      ; Check for reply.
   JC     @@end                              ; Data not received yet.

   MOV    BX,OFFSET dial_jump_table          ; attempt to parse data
   JMP    JumpTable

@@end:
   RETN

ENDP ModemCall

;
```

```
;
;
PROC snftxchkin NEAR

; Query from server received by this point, send data packet

                                          ; prepare transmit structure
   MOV   AL, [sngdatalen]                 ; get the data segment length
   ADD   AL, 2                            ; add 2 for type and subtype
   MOV   [BYTE LOW tx.txxpktlen], AL
   MOV   [BYTE HIGH tx.txxpktlen], 0
   MOV   [tx.txxbufp], OFFSET sn_data_start
   MOV   [tx.txxnxtst], OFFSET snfgetpkt  ; set state following transmission
   MOV   [tx.txxpkttyp], CMTXDATPKT       ; transmitting data packet
   MOV   [tx.txxtmr], TM3SEC              ; set transmission timeout

   MOV   [sngstftn], OFFSET cmftx         ; next state: transmit
   MOV   [rx.rxxtmr], TM10SEC             ; wait 10 seconds for response
   MOV   [rx.rxxstate], OFFSET cmfpack    ; receiver state: process expected
ACK

   RETN

ENDP snftxchkin

;******************************************************************************
*
;
;  SNFGETPKT - collect packet data
;
;  PURPOSE:
;     This functions collects packet data and determines if a receive timeout
;     has occurred.
;
;  PARAMETERS:
;     None
;
;  RETURNS:
;     Nothing
;
;  NOTE:
;
;******************************************************************************
*

PROC snfgetpkt NEAR

   MOV   [sngclst], SNWTNCD               ; set call status
   CMP   [rx.rxxtmr], 0                   ; test for timeout
   JE    @@timeout                        ; timed out

   CALL  buf_getchar                      ; retrieve a character
   JC    @@exit                           ; none available, exit

   CALL  [rx.rxxstate]                    ; run the rx state function
   RETN

@@timeout:
   MOV   [sngstftn], OFFSET cmftx         ; set next Sentinel state function
   MOV   [tx.txxpkttyp], CMTXDLENQ        ; set transmitter state: send ENQ
```

```
@@exit:
   RETN

ENDP snfgetpkt


;
;
;
PROC snfsnrst NEAR
; Reset the Sentinel to a known state (ACTIVE), assume nothing.
      CALL    buf_flush
      CMP     [sngcomhk], 1             ; have we hooked the comm. port
      JNE     @@cont                    ; no, continue

                                        ; yes, unhook the com interrupt
      MOV     BX,[sngmdmprtint]         ; the interrupt to install
      XOR     DI,DI
      PUSH    DS
      LDS     CX,[sngprvcom]            ; DS:CX = the com vector to install.
      CALL    SwapInt
      POP     DS
      MOV     [sngcomhk], 0             ; clear the comm. hooked flag

@@cont:
      MOV     DX,[sngmdmprtadd]
      INC     DX                        ; DX = IER
      XOR     AL,AL
      OUT     DX,AL                     ; Disable all interrupts.
      IODELAY
      ADD     DX,MCR-IER                ; DX = MCR
      OR      AL,03h                    ; leave RTS & DTR asserted to get
<NO CARRIER>
      OUT     DX,AL                     ; MCR OUT2 bit = 0
      IODELAY

      MOV     [sngstftn], OFFSET ActiveRoutine

      RETN
ENDP snfsnrst

ENDS

   END
```

Electronic Article Surveillance System

Source Code for Host-side

Visual C++ (MicroSoft)

```
/*=====================================================
====================*\

    Description:
        Source code for CompuTrace Server and DBServer.

    Copyright:
        Copyright 1993-1995 Absolute Software Inc. All
Rights Reserved.

\*=====================================================
====================*/

#define INCL_NOPMAPI            // no PM in this program.
#define INCL_DOS
#define INCL_BSE
#include <os2.h>
#include <fstream.h>
#include <time.h>

#include <server.h>
#include <DB_Objects.HPP>
#include <CTMessage.HPP>
//#include <packet.h>
#include "CT_Trans.H"

FLAG fQueryCTIDStatus( MessagePipe &Pipe, const
QueryCTIDStatusMsg &Status, CTIDStatusResultMsg &Result
);
FLAG fStoreMonitorEvent( MessagePipe &Pipe, const
StoreMonitorEventMsg &Store, StoreResultMsg &Result );
FLAG fSignalQuit( MessagePipe &Pipe );

void AssignTS( TTimestamp &ts, const SNTL_DATE &Date );
void AssignSNTL_DATE( SNTL_DATE &Date, const TTimestamp
&ts );

// Temp function.
void ProcessClient( TPort &Port, TConnectInfo
&ConnectInfo, CTID_TEXT *text );

extern MessagePipe *pipe;

//
// SntlConnect: called when a CONNECT comand has been
received, this function processes
//              a transaction between the server and a
Sentinel client.
//
void SntlConnect( TPort &Port, MessagePipe &Pipe,
TConnectInfo *cnct_info )
{
   WORD msg_type;
```

```
   DosGetDateTime( &cnct_info->start_time );            //
Fill start time.

   TPacket packet( Port );

   while (TRUE)  {
   // Get a packet.
      if (packet.rGetPacket() != TPacket::TRANS_ACK)  {
         cout << "Packet Error" << endl;
         return;
      }
   // Determine packet type.
      packet.cbCopyText( &msg_type, sizeof( msg_type ) );
      switch( msg_type )  {
         case CTID_TEXT_TYPE:
         // Create a new client object.
//             TClient Client( Port, Pipe, *cnct_info );
         // Get CTID Text and add to Client object.
            CTID_TEXT Text;
            packet.cbCopyText( &Text, sizeof( Text ) );
//             Client.SetCTID( Text );
         // ProcessClient.
//             ProcessClient( Client );
            ProcessClient( Port, *cnct_info, &Text );
            return;
         default:
            return;
      }
   }
}

void ProcessClient( TPort &Port, TConnectInfo
&ConnectInfo, CTID_TEXT *text )
{
   SNTL_DATE next_call;

// ENTER APPLICATION LAYER...

// Query the Client state.
   QueryCTIDStatusMsg StatusMsg;
   StatusMsg.CTID = (ULONG)text->sn[0] + ((ULONG)text-
>sn[1] << 16);

   CTIDStatusResultMsg Result;

   cout << "QueryCTIDStatus for CTID " << StatusMsg.CTID
<< "... ";

   if (!fQueryCTIDStatus( *pipe, StatusMsg, Result ))  {
      cout << "Error in QueryCTIDStatus!" << endl;
   }
   else  {
      cout << "CTIDStatusResult Received..." << endl;
```

```
      cout << "   Status = " << (STRING)Result.Status <<
endl;
      cout << "   PeriodDays = " << Result.PeriodDays <<
endl;
      cout << "   PeriodMinutes = " <<
Result.PeriodMinutes << endl;
      cout << "   StolenFlag = " <<
(STRING)Result.StolenFlag << endl;
      cout << "   SpecialProcess = " <<
Result.SpecialProcess << endl;
      cout << "   Orgnum = " << Result.Orgnum_n << endl;
   }

// Send NextCall Message back to the Client.
   CTTimestamp next_ts;
   AssignTS( next_ts, text->now_date );
   if (next_ts.usYear() < 1900)  {     // If date is not
valid substitute the local date instead.
      next_ts = ConnectInfo.start_time;
   }
   next_ts.AddToDate( 0, 0, Result.PeriodDays, 0,
Result.PeriodMinutes );
   AssignSNTL_DATE( next_call, next_ts );

   SendDatePacket( Port, next_call );
   SntlDisconnect( Port, ConnectInfo );

// Store the Monitor Event.
   StoreMonitorEventMsg Event;
   Event.StoreAsStolen = Result.StolenFlag;
   Event.StoreAsExpire = FALSE;

   Event.LicenseStatus = Result.Status;
   AssignTS( Event.ClientTS, text->now_date );
   Event.ServerTS = ConnectInfo.start_time;
   Event.NextCallTS_n = Event.ServerTS;
   Event.NextCallTS_n.AddToDate( 0, 0, Result.PeriodDays,
0, Result.PeriodMinutes );
   Event.NextCallClientTS_n = next_ts;
   Event.CTID = StatusMsg.CTID;
   Event.TelcoTS_n.Assign( Event.ServerTS.usYear(),
                           ConnectInfo.cnd.month,
                           ConnectInfo.cnd.day,
                           ConnectInfo.cnd.hour,
                           ConnectInfo.cnd.minute );
   Event.DurationSec_n = 0;
   Event.CallerID_n = (const
char(*)[CALLERID_SIZE])ConnectInfo.cnd.number;
   Event.LineNum = 1;
   Event.LogFlag = FALSE;
   Event.EnvironmentID = "DBS-9508";
   Event.ErrorCnt = 0;
```

```
   StoreResultMsg ResultMsg;

   cout << endl << "Storing the MonitorEvent... ";

   if (!fStoreMonitorEvent( *pipe, Event, ResultMsg )) {
      cout << "Error in StoreMonitorEvent!" << endl;
   }
   else  {
      cout << "StoreResult = " << (ResultMsg.Result ?
"TRUE" : "FALSE") << endl;
   }
}

void SendDatePacket( TPort& Port, const SNTL_DATE& date )
{
   NC_PACKET packet;

   packet.header.stx = STX;
   packet.header.lsb_length = sizeof( NC_TEXT );
   packet.header.msb_length = 0;

   packet.text.type = NC_TEXT_TYPE;
   packet.text.next_call_date = date;

   packet.footer.etx = ETX;
   packet.footer.lrc = 0;

   Port.fWritePort( (PVOID)&packet, sizeof( packet ) );
}

FLAG fQueryCTIDStatus( MessagePipe &Pipe, const
QueryCTIDStatusMsg &Status, CTIDStatusResultMsg &Result )
{
   TStream in_strm, out_strm;

   out_strm << Status;
   if (!Pipe.fTransact( out_strm, in_strm )) return
FALSE;
   in_strm >> Result;

   if (Result.eType() == CTID_STATUS_RESULT) return TRUE;
   else return FALSE;
}

FLAG fStoreMonitorEvent( MessagePipe &Pipe, const
StoreMonitorEventMsg &Store, StoreResultMsg &Result )
{
   TStream in_strm, out_strm;

   out_strm << Store;
```

```
   if (!Pipe.fTransact( out_strm, in_strm )) return
FALSE;
   in_strm >> Result;

   if (Result.eType() == STORE_RESULT) return TRUE;
   else return FALSE;
}

FLAG fSignalQuit( MessagePipe &Pipe )
{
   TStream stream;
   CliQuitMsg QuitMsg;

   stream << QuitMsg;
   return Pipe.fSendMessage( stream );
}

void SntlDisconnect( TPort &Port, TConnectInfo
&ConnectInfo )
{
// Drop DTR.
   DosSleep( 500 );     // Broc - 13 Feb 95
                        // Add delay to let modem clear xmt
buffer
                        // to fix intermittent modem fault.
   Port.fDropDTR();

   cout << "Disconnecting..." << flush;

   DosGetDateTime( &ConnectInfo.end_time );          //
Fill end time.
   DosSleep( 200 );

// Raise DTR.
   Port.fRaiseDTR();
}

// *** helper functions.
UCHAR BCD2ToUChar( BYTE bcd )
{
// Convert a two digit bcd number to decinal.
   return (bcd >> 4) * 10 + (bcd & 0x0F);
}

BYTE UCharToBCD2( UCHAR dec )
{
// Convert a 8 bit decimal number to bcd.
   return (dec % 10) + (((dec / 10) % 10) << 4);
}
```

```
USHORT BCD4ToUShort( WORD bcd )
{
// Convert a four digit bcd number to decimal.
   return (bcd >> 12) * 1000 + ((bcd & 0x0F00) >> 8) *
100 + ((bcd & 0x00F0) >> 4) * 10 + (bcd & 0x000F);
}

WORD UShortToBCD4( USHORT dec )
{
// Convert a 16 bit decimal number to a 4 digit decimal.
   return (dec % 10) + (((dec / 10) % 10) << 4) + (((dec
/ 100) % 10) << 8) + (((dec / 1000) % 10) << 12);
}

void AssignTS( TTimestamp &ts, const SNTL_DATE &Date )
{
   ts.Assign( BCD2ToUChar( Date.year ),
              BCD2ToUChar( Date.month ),
              BCD2ToUChar( Date.day ),
              BCD2ToUChar( Date.hour ),
              BCD2ToUChar( Date.minute ) );
}

void AssignSNTL_DATE( SNTL_DATE &Date, const TTimestamp
&ts )
{
   Date.year   = UCharToBCD2( ts.usYear() % 100 );
   Date.month  = UCharToBCD2( ts.usMonth() );
   Date.day    = UCharToBCD2( ts.usDay() );
   Date.hour   = UCharToBCD2( ts.usHour() );
   Date.minute = UCharToBCD2( ts.usMinute() );
}

/*
inline BYTE HiNibble( BYTE b ) { return (BYTE)((b & 0xF0)
>> 4); }
inline BYTE LoNibble( BYTE b ) { return (BYTE)(b & 0x0F);
}

void AddDays( SNTL_DATE *next_call, int days )
{
   static BYTE days_per_month[18] = {
      0x31,
      0x28,
      0x30,      // 0x03 - March
      0x31,
      0x30,
      0x31,      // 0x06 - June
      0x30,
      0x31,
      0x30,      // 0x09 - Sept
      0x00,      // 0x0A
      0x00,      // 0x0B
```

```
        0x00,       // 0x0C
        0x00,       // 0x0D
        0x00,       // 0x0E
        0x00,       // 0x0F
        0x31,       // 0x10 - Oct
        0x30,
        0x31        // 0x12 - Dec
    };

    BYTE old_day = next_call->day;
     // Save for BCD adjust.

// Add the days to the current date.
    next_call->day += days;
// Check if we passed the end of the current month.
    if (next_call->day > days_per_month[next_call->month])
{
    // Add one to month.
        if (++next_call->month > 12)  {
            next_call->month = 1;
            ++next_call->year;
        }
        next_call->day -= days_per_month[next_call->month]
- 1;        // Roll over to proper day.
    }
// Adjust the day back to BCD.
    if (LoNibble( next_call->day ) > 0x9 || HiNibble(
next_call->day ) != HiNibble( old_day ))
        next_call->day += 6;

// Adjust the month to BCD.
    if (LoNibble( next_call->month ) > 0x9) next_call-
>month += 6;

// Adjust the year back to BCD.
    if (LoNibble( next_call->year ) > 0x9) next_call->year
+= 6;
    if (HiNibble( next_call->year ) > 0x9) next_call->year
= LoNibble( next_call->year );
}
*/

#define INCL_DOSNMPIPES
#include <os2.h>

#include <iostream.h>
#include <fstream.h>
#include <string.h>

#include <server.h>

#include "DBServer.H"
```

```
#include <usertype.h>
#include <DB_Objects.HPP>
#include <CTID.H>
#include <CTIMS.HPP>
#include <CTMessage.HPP>
#include <MessagePipe.HPP>

FLAG fProcessClientEvent( MessagePipe &Pipe, TStream
&MsgStream );

FLAG fProcessQueryCTIDStatus( MessagePipe &Pipe,
QueryCTIDStatusMsg &Status );
FLAG fProcessStoreMonitorEvent( MessagePipe &Pipe,
StoreMonitorEventMsg &MEvent );
FLAG fUpdateLicenseStatus( StoreMonitorEventMsg& );

// Helper functions.
FLAG _fCopyTStoDBVars( char *tsstring, short *indicator,
CTTimestamp &ts, STRING varname = "Timestamp" );

DataBase DB;

int main( int argc, char *argv[] )
{
   if (argc != 3)  {
      cout << "Usage: dbserver <database_name>
<pipe_name>" << endl;
   }

   DB.SetName( argv[1] );
   SvrMsgPipeFactory Factory( argv[2], 512, 10 );
   MessagePipe *pipe;

   if (!DB.fConnect())  {
      cout << "Unable to connect to " << argv[1] << "
SQLCODE = " << (long)DB.ulSQLCode() << endl;
      return 1;
   }
   if (!Factory.fCreatePipe( pipe ))  {
      cout << "Unable to create pipe DosErrorCode = " <<
Factory.rcDosErrorCode() << endl;
      return 2;
   }

   cout << "Waiting for pipe to connect to client..." <<
endl;
   if (!pipe->fOpenPipe())  {
      cout << "Error connecting to the client
DosErrorCode = " << pipe->rcDosErrorCode() << endl;
      return 2;
   }
   cout << "Pipe connected to client." << endl;
```

```
   TStream MsgStream;
   while (fProcessClientEvent( *pipe, MsgStream ))
MsgStream.Reset();
   pipe->fClosePipe();
   return 0;
}

FLAG fProcessClientEvent( MessagePipe &Pipe, TStream
&MsgStream )
{
   if (!Pipe.fGetMessage( MsgStream ))   {
      cout << "Error reading message from pipe
DosErrorCode = " << Pipe.rcDosErrorCode() << endl;
      return FALSE;
   }

   CTMessageHeader Header;
   MsgStream >> Header;
   switch (Header.eType())   {
      case QUERY_CTID_STATUS:
      {
         QueryCTIDStatusMsg StatusMsg( Header );
         MsgStream >> *(QueryCTIDStatus*)&StatusMsg;
         if (!fProcessQueryCTIDStatus( Pipe, StatusMsg ))
            cout << "Error in fProcessQueryCTIDStatus,
SQLCODE = " << (long)ulGetSQLCode() << endl;
      }
      break;
      case STORE_MONITOREVENT:
      {
         StoreMonitorEventMsg EventMsg( Header );
         MsgStream >> *(StoreMonitorEvent*)&EventMsg;
         if (!fProcessStoreMonitorEvent( Pipe, EventMsg
))  {
            cout << "Error in fProcessStoreMonitorEvent,
SQLCODE = " << (long)ulGetSQLCode() << endl;
         }
      }
      break;
      case CLI_QUIT:
         return FALSE;
      default:
         cout << "Unknown Command Received!" << endl;
         return FALSE;
   }
   return TRUE;
}

FLAG fProcessQueryCTIDStatus( MessagePipe &Pipe,
QueryCTIDStatusMsg &CTID )
{
```

```
_CTlicense Rec;
CTIDStatusResultMsg ResultMsg;

if (!fXlatCliCTID( CTID.CTID, CTID.CTID ))  {
   cout << "Error converting client CTID to server
CTID" << endl;
   // Proccess error here.
}

ResultMsg.QueryResult = _fQueryLicense( &Rec,
CTID.CTID );

if (!ResultMsg.QueryResult)  {
   ResultMsg.CTID                  = CTID.CTID;
   ResultMsg.Status                =
CTLicStatus::ACTIVE;
   ResultMsg.PeriodDays            = 2;
   ResultMsg.PeriodMinutes         = 0;
   ResultMsg.StolenFlag            = FALSE;
   ResultMsg.SpecialProcess        = 0;
   ResultMsg.Orgnum_n               .fSetNull();
   ResultMsg.LastCallTS_n           .fSetNull();
   ResultMsg.NextCallTS_n           .fSetNull();
   ResultMsg.NextCallClientTS_n     .fSetNull();
   ResultMsg.ProductType            .fSetNull();
}
else  {
   ResultMsg.CTID                  = Rec.CTID;
   ResultMsg.Status                = Rec.LicStatus;
   ResultMsg.PeriodDays            = Rec.PeriodDays;
   ResultMsg.PeriodMinutes         = Rec.PeriodMinutes;
   ResultMsg.StolenFlag            = Rec.StolenFlag ==
'Y';
   ResultMsg.SpecialProcess        = Rec.SpecialProcess;
   ResultMsg.LastCallTS_n           .Assign(
Rec.LastCallTS_N, DB_ISNULL( Rec.IsNull_LastCallTS ) );
   ResultMsg.NextCallTS_n           .Assign(
Rec.NextCallTS_N, DB_ISNULL( Rec.IsNull_NextCallTS ) );
   ResultMsg.NextCallClientTS_n     .Assign(
Rec.NextCallClientTS_N, DB_ISNULL(
Rec.IsNull_NextCallClientTS ) );
   if (DB_ISNULL( Rec.IsNull_Orgnum ))
      ResultMsg.Orgnum_n            .fSetNull();
   else
      ResultMsg.Orgnum_n           = Rec.Orgnum_N;
   ResultMsg.ProductType           = Rec.ProductType;
}

cout << "SQLCODE = " << (long)ulGetSQLCode() << endl;

// Return Query results.
TStream Stream;
Stream << ResultMsg;
```

```
   return Pipe.fSendMessage( Stream );
}

FLAG fProcessStoreMonitorEvent( MessagePipe &Pipe,
StoreMonitorEventMsg &Msg )
{
   StoreResultMsg ResultMsg;

// Prepare reply message.
   ResultMsg.Result = TRUE;

// Prepare the monitorevent data.
   _CTmonitorEvent Rec;

   if (!fXlatCliCTID( (ULONG&)Rec.CTID, Msg.CTID ))  {
      cout << "Error converting client CTID to server
CTID" << endl;
      // Proccess error here.
   }

   _fCopyTStoDBVars( Rec.ServerTS,  NULL,
Msg.ServerTS,  "ServerTS" );
   _fCopyTStoDBVars( Rec.ClientTS,  NULL,
Msg.ClientTS,  "ClientTS" );
   _fCopyTStoDBVars( Rec.TelcoTS_N, &Rec.IsNull_TelcoTS,
Msg.TelcoTS_n, "TelcoTS"  );

   Rec.DurationSec_N = Msg.DurationSec_n;
   Rec.IsNull_DurationSec = DB_NOT_NULL;

   if (!Msg.CallerID_n)  {
      Rec.IsNull_CallerID = DB_NULL;
   }
   else {
      Rec.IsNull_CallerID = DB_NOT_NULL;
      strncpy( Rec.CallerID_N, Msg.CallerID_n, sizeof(
Rec.CallerID_N ) );
   }

   Rec.LineNum = Msg.LineNum;

   if (!Msg.LogFlag)  {
      cout << "INVALID_DATA_ERROR: LogFlag is NULL,
defaulting to FALSE" << endl;
      Rec.LogFlag = 'N';
   }
   else  {
      Rec.LogFlag = ((STRING)Msg.LogFlag)[0];
   }

   strncpy( Rec.EnvironmentID, Msg.EnvironmentID, sizeof(
Rec.EnvironmentID ) );
```

```
   Rec.ErrorCnt = Msg.ErrorCnt;

// Update the License Record.
   if (!fUpdateLicenseStatus( Msg ))  {
      if (ulGetSQLCode() != 100)  {
         cout << "DB2_ERROR: Error updating License
Table, CliCTID = " << Msg.CTID
              << " SQLCODE = " << (long)ulGetSQLCode() <<
endl;
      }
   }

// Perform the insert.
   if (!_fInsertIntoMonitorEvent( &Rec ))  {
      ResultMsg.Result = FALSE;
   }
   else  {
      if (Msg.StoreAsStolen)  {
         if (!_fInsertIntoMonitorEventStolen( &Rec ))  {
            ResultMsg.Result = FALSE;
         }
      }
      if (Msg.StoreAsExpire)  {
         if (!_fInsertIntoMonitorEventExpired( &Rec ))  {
            ResultMsg.Result = FALSE;
         }
      }
   }

   cout << "SQLCODE = " << (long)ulGetSQLCode() << endl;

   TStream Stream;
   Stream << ResultMsg;
   if (Pipe.fSendMessage( Stream ) && ResultMsg.Result ==
TRUE)  {
      DB.Commit();
      return TRUE;
   }
   else  {
      DB.Rollback();
      return FALSE;
   }
}

FLAG fUpdateLicenseStatus( StoreMonitorEventMsg &Msg )
{
   _CTupdateLicenseStatus Rec;
   short dummy1;                    // Used to quiet the
Null validation below.

   fXlatCliCTID( (ULONG&)Rec.CTID, Msg.CTID );
```

```
   strncpy( Rec.Status, Msg.LicenseStatus, sizeof(
Rec.Status ) );

   _fCopyTStoDBVars( Rec.LastCallTS_N,        &dummy1,
Msg.ServerTS,          "LastCallTS"        );
   _fCopyTStoDBVars( Rec.NextCallTS_N,        &dummy1,
Msg.NextCallTS_n,      "NextCallTS"        );
   _fCopyTStoDBVars( Rec.NextCallClientTS_N, &dummy1,
Msg.NextCallClientTS_n, "NextCallClientTS" );

   if (!Msg.NextCallTS_n) strcpy( Rec.NextCallTS_N,
"0001-01-01-00.00.00.000000" );
   if (!Msg.NextCallClientTS_n) strcpy(
Rec.NextCallClientTS_N, "0001-01-01-00.00.00.000000" );

   return _fUpdateLicenseStatus( &Rec );
}


FLAG _fCopyTStoDBVars( char *tsstring, short *indicator,
CTTimestamp &ts, STRING varname )
{
   if (!ts)  {
      if (indicator == NULL)  {
         cout << "INVALID_DATA_ERROR: " << varname << "
is NULL, forcing validation" << endl;
         ts.ForceValidate();
      }
      else  {
         *indicator = DB_NULL;
         tsstring[0] = '\x0';
         return FALSE;
      }
   }
   else if (!ts.fValidate())  {
      cout << "INVALID_DATA_ERROR: " << varname << " is
invalid, forcing validation - " << ts << endl;
      ts.ForceValidate();
   }

   if (indicator != NULL) *indicator = DB_NOT_NULL;
   ts.ToSTRING( tsstring );
   return TRUE;
}


#define INCL_NOPMAPI              // no PM in this program
#define INCL_DOS
#define INCL_BSE
#define INCL_DOSSEMAPHORES
#define INCL_DOSNMPIPES
```

```
#include <os2.h>

#include <ctype.h>
#include <stdlib.h>
#include <iostream.h>
#include <fstream.h>

#include <server.h>

#include <MessagePipe.HPP>
#include <TModem.HPP>

#include "CT_Trans.H"

/*GLOBAL
VARIABLES*******************************************/

HEV hQuitSem;

// Temp, move to thread.
CltMsgPipeFactory *factory;
MessagePipe *pipe;

/********************************************************
**/

FLAG fLoadLineThreads( TModem&, PCSZ, PCSZ );
void _Optlink CT_CommandThread( PVOID );
FLAG fParseCmd( TPort &Port, TConnectInfo *CnctInfo,
STRING buffer );

TPort::ComSettings ComSetting = {
   "COM1",          // port name
   0,               // not used
   38400,           // bps
   8,               // data bits
   TPort::NO,       // no parity
   TPort::ONE       // one stop bit
};

int main( int argc, char *argv[] )
{
   APIRET rc;

   cout << "CompuTrace Server V0.99q" << endl;

// Check arguments.
   if (argc != 4)  {
      cout << "Usage: server <pipe_name> <port_name>
<init_string>" << endl << endl;
      return 0;
   }
```

```
// Create quit semaphore.
   if ((rc = DosCreateEventSem( NULL, &hQuitSem, 0, FALSE
)) != 0)
      return 1;

   factory = new CltMsgPipeFactory( argv[1], 512 );

// Load port server threads.
   TPort Port;
   TModem Modem = Port;
   if (!fLoadLineThreads( Modem, argv[2], argv[3] ))
return 2;

   cout << "Successfully connected to local modem" <<
endl;

// Wait for quit signal.
   DosWaitEventSem( hQuitSem, SEM_INDEFINITE_WAIT );

   return 0;
}

//
// fLoadLineThreads: Loads the threads to operate a
server line.  This function
//                     should be called for each server
line.
//
FLAG fLoadLineThreads( TModem &Modem, PCSZ port_str, PCSZ
init_str )
{
// Start port log.
//   Port.LogOn();

// Open port.
   ComSetting.port_name = port_str;
   if (!Modem.Port().fOpenPort( ComSetting ))   {
      cout << "Error openning port" << endl;
      return FALSE;
   }

// Start the port manage thread.
   if (!Modem.Port().fStartManageThread())   {
      cout << "Thread execution error" << endl;
      return FALSE;
   }

// Initialize the modem.
   STRING result = Modem.strSendCommand( init_str, -1 );
   if (strcmp( result, "OK" ) != 0)   {
      cout << "Error initiallizing modem" << endl;
      return FALSE;
```

```
    }

// Connect pipe to dbserver.
    if (!factory->fCreatePipe( pipe )) return FALSE;
    if (!pipe->fOpenPipe()) return FALSE;

// Start the command thread.
    if (!Modem.Port().fStartCommandThread(
CT_CommandThread, (PVOID)&Modem ))   {
        cout << "Thread execution error" << endl;
        Modem.Port().KillManageThread();
        return FALSE;
    }

    return TRUE;
}


//
// CT_CommandThread: Processes incoming data from a
server line.
//
void _Optlink CT_CommandThread( PVOID ptr )
{
    TModem &Modem = *(TModem*)ptr;          // Alias
(should be optimized out by the compiler).

// Thread local variables
    STRING result;
    TConnectInfo cnct_info;

    while (TRUE)   {
        result = Modem.strGetString( -1 );
    // Parse buffer for cmd.
        if (!fParseCmd( Modem.Port(), &cnct_info, result ))
{
            memset( (PVOID)&cnct_info, '\x0', sizeof
cnct_info );
        }
    }
}

#define CND_DATE_FIELD      "DATE ="
#define CND_TIME_FIELD      "TIME ="
#define CND_NUMBER_FIELD    "NMBR ="

#define CND_NONUM_FIELD     "REASON FOR NO NUMBER:"
#define CND_NAME_FIELD      "CALLER NAME:"
#define CND_NONAME_FIELD    "REASON FOR NO NAME:"

//
// fParseCmd: called when a '\n' has been received, this
function will process the string.
```

```
//              Returns TRUE if a transaction is occuring,
FALSE if the buffers should be cleared.
//

FLAG fParseCmd( TPort &Port, TConnectInfo *cnct_info,
STRING buffer )
{
   const char *index;

// Parse command.
   if (strstr( buffer, "RING" ) != NULL)   {
      cout << "Command parsed as RING" << endl;
   }
   else if ((index = strstr( buffer, CND_DATE_FIELD )) !=
NULL)  {
      index += sizeof CND_DATE_FIELD;
      while (!isdigit( *index )) index++;
   // Grab the month.
      if (!isdigit( *index ) || !isdigit( *(index+1) ))
return FALSE;
      cnct_info->cnd.month = (*index++ - '0') * 10;
      cnct_info->cnd.month += *index++ - '0';
   // Grab the day.
      if (!isdigit( *index ) || !isdigit( *(index+1) ))
return FALSE;
      cnct_info->cnd.day = (*index++ - '0') * 10;
      cnct_info->cnd.day += *index++ - '0';

      cout << buffer << endl;
   }
   else if ((index = strstr( buffer, CND_TIME_FIELD )) !=
NULL)  {
      index += sizeof CND_TIME_FIELD;
      while (!isdigit( *index )) index++;
   // Grab the hour.
      if (!isdigit( *index ) || !isdigit( *(index+1) ))
return FALSE;
      cnct_info->cnd.hour = (*index++ - '0') * 10;
      cnct_info->cnd.hour += *index++ - '0';
   // Grab the minute.
      if (!isdigit( *index ) || !isdigit( *(index+1) ))
return FALSE;
      cnct_info->cnd.minute = (*index++ - '0') * 10;
      cnct_info->cnd.minute += *index++ - '0';

      cout << buffer << endl;
   }
   else if ((index = strstr( buffer, CND_NUMBER_FIELD ))
!= NULL)  {
      index += sizeof CND_NUMBER_FIELD;
      while (isspace( *index )) index++;
   // Grab the number.
      for (int i = 0; i < CND_NUM_MAXLEN; i++)   {
```

```
        if (index[i] == '\x0' || index[i] == '\r')   {
           cnct_info->cnd.number[i] = '\x0';
           break;
        }
        else  {
           cnct_info->cnd.number[i] = index[i];
        }
     }
     cout << buffer << endl;
  }
  else if (strstr( buffer, CND_NONUM_FIELD ) != NULL)   {
     index += sizeof CND_NONUM_FIELD;
  // Grab the string.
     while (isspace( *index )) index++;
     for (int i = 0; i < CND_NUM_MAXLEN; i++)   {
        if (index[i] == '\x0' || index[i] == '\r') {
           cnct_info->cnd.number[i] = '\x0';
           break;
        }
        else  {
           cnct_info->cnd.number[i] = index[i];
        }
     }

     cout << buffer << endl;
  }
  else if (strstr( buffer, CND_NAME_FIELD ) != NULL)   {
     index += sizeof CND_NAME_FIELD;
  // Grab the name.
     while (isspace( *index )) index++;
     for (int i = 0; i < CND_NAME_MAXLEN; i++)   {
        if (index[i] == '\x0' || index[i] == '\r') {
           cnct_info->cnd.name[i] = '\x0';
           break;
        }
        else  {
           cnct_info->cnd.name[i] = index[i];
        }
     }

     cout << buffer << endl;
  }
  else if (strstr( buffer, CND_NONAME_FIELD ) != NULL)
{
     index += sizeof CND_NONAME_FIELD;
  // Grab the string.
     while (isspace( *index )) index++;
     for (int i = 0; i < CND_NAME_MAXLEN; i++)   {
        if (index[i] == '\x0' || index[i] == '\r')   {
           cnct_info->cnd.name[i] = '\x0';
           break;
        }
        else  {
```

```
                cnct_info->cnd.name[i] = index[i];
            }
        }

        cout << buffer << endl;
    }
    else if (strstr( buffer, "CONNECT" ) != NULL)  {
        cout << "Command parsed as CONNECT" << endl;

        SntlConnect( Port, *pipe, cnct_info );
        return FALSE;
    }
    else if (strstr( buffer, "NO CARRIER" ) != NULL)  {
        cout << "Command parsed as NO CARRIER" << endl;
        return FALSE;
    }
    else if (strstr( buffer, "OK" ) != NULL)  {
        cout << "Command parsed as OK" << endl;
        return FALSE;
    }
    else if (strstr( buffer, "ERROR" ) != NULL)  {
        cout << "Command parsed as ERROR" << endl;
        return FALSE;
    }
    else  {
        cout << "Unknown command received: " << buffer <<
endl;
        return FALSE;
    }
    return TRUE;
}

#include <CTIMS.HPP>

//=====================================================
=====================
//
// CTStatus friends and members.
//
CTStatus::CTStatus()
{
    memset( value, ' ', sizeof( value ) );
}

CTStatus::CTStatus( STRING str )
{
    ASSERT( strlen( str ) < sizeof( value ) );
    memcpy( value, str, strlen( str ) );
}


const char CTLicStatus::STR_SET[][CT_TOK_SIZE+1] = {
```

```
            UNUSED_TOK,
            NOTEST_TOK,
            ACTIVE_TOK,
            EXPIRED_TOK
};

CTLicStatus& CTLicStatus::operator = ( STRING str )
{
   for (int i = 0; i <= EXPIRED; i++)  {
      if (strcmp( STR_SET[i], str ) == NULL)  {
         setNotNull();
         value = VALUE( i );
         return *this;
      }
   }
   ASSERT( FALSE );                 // No match was found
for the string.
   return *this;
}

/**********************
FLAG CTOrgnum::fSetPrefix( STRING str )
{
   if (strlen( str ) != ORGNUM_PREFIX_SIZE)  {
      return FALSE;
   }
   else  {
      value[0] = str[0];
      value[1] = str[1];
      value[2] = str[2];
      value[3] = str[3];
      return TRUE;
   }
}

FLAG CTOrgnum::fSetIndex( UINT num )
{
   if (num > 9999)  {
      return FALSE;
   }
   else  {
      value[ORGNUM_PREFIX_SIZE + 0] = (num%10000) / 1000
+ '0';
      value[ORGNUM_PREFIX_SIZE + 1] = (num%1000) / 100 +
'0';
      value[ORGNUM_PREFIX_SIZE + 2] = (num%100) / 10 +
'0';
      value[ORGNUM_PREFIX_SIZE + 3] = (num % 10) + '0';
   }
}

FLAG CTOrgnum::fGetPrefix( char *str ) const
```

```
{
   if (strlen( str ) != ORGNUM_PREFIX_SIZE)   {
      return FALSE;
   }
   else  {
      str[0] = value[0];
      str[1] = value[1];
      str[2] = value[2];
      str[3] = value[3];
      str[4] = '\x0';
   }
}

FLAG CTOrgnum::fGetIndex( UINT &i ) const
{
   i = atoi( &(value[ORGNUM_PREFIX_SIZE]) );
   return TRUE;
}

FLAG CTOrgnum::fGeneratePrefix( STRING org_name )
{
   char pre[ORGNUM_PREFIX_SIZE];

// Grab first four alphanum characters.
   for (int i = 0, j = 0; i < ORGNUM_PREFIX_SIZE;)   {
      if (isalnum( orgname[j++] )) pre[i];
   }
}
**********************/

//*******************************************************
*********************
//
// iostream stream operators.
//
ostream& operator <<( ostream &os, const CTStatus &status
)
{
   return os << (STRING)status;
}

//*******************************************************
*********************
//
// TStream stream operators.
//
TStream& operator << ( TStream &buf, const CTStatus
&status )
{
   buf << *(TNull*)&status;
   if (!status) return buf;
   else return buf.Put( PVOID( status.value ), sizeof(
status.value ) );
```

```
}
TStream& operator >> ( TStream &buf, CTStatus &status )
{
   buf >> *(TNull*)&status;
   if (!status) return buf;
   else return buf.Get( status.value, sizeof(
status.value ) );
}

TStream& operator << ( TStream &buf, const CTCallerID &id
)
{
   buf << *(TNull*)&id;
   if (!id) return buf;
   else return buf.Put( PVOID( id.value ), sizeof(
id.value ) );
}

TStream& operator >> ( TStream &buf, CTCallerID &id )
{
   buf >> *(TNull*)&id;
   if (!id) return buf;
   else return buf.Get( id.value, sizeof( id.value ) );
}

TStream& operator << ( TStream &buf, const CTLicStatus
&lic )
{
   buf << *(TNull*)&lic;
   if (!lic) return buf;
   else return buf << USHORT( lic.value );
}

TStream& operator >> ( TStream &buf, CTLicStatus &lic )
{
   USHORT num;

   buf >> *(TNull*)&lic;
   if (!lic) return buf;
   else  {
      buf >> num;
      lic.value = CTLicStatus::VALUE( num );
      return buf;
   }
}

TStream& operator << ( TStream &buf, const CTOrgnum &num
)
{
   buf << *(TNull*)&num;
   if (!num) return buf;
```

```
   else return buf.Put( PVOID( num.value ), sizeof(
num.value ) );
}

TStream& operator >> ( TStream &buf, CTOrgnum &num )
{
   buf >> *(TNull*)&num;
   if (!num) return buf;
   else return buf.Get( num.value, sizeof( num.value ) );
}


TStream& operator << ( TStream &buf, const CTMonitorEvent
&event )
{
   return buf << event.CTID
              << event.ServerTS
              << event.ClientTS
              << event.TelcoTS_n
              << event.DurationSec_n
              << event.CallerID_n
              << event.LineNum
              << event.LogFlag
              << event.EnvironmentID
              << event.ErrorCnt;
}

TStream& operator >> ( TStream &buf, CTMonitorEvent
&event )
{
   return buf >> event.CTID
              >> event.ServerTS
              >> event.ClientTS
              >> event.TelcoTS_n
              >> event.DurationSec_n
              >> event.CallerID_n
              >> event.LineNum
              >> event.LogFlag
              >> event.EnvironmentID
              >> event.ErrorCnt;
}


#include <CTMessage.HPP>

//*********************************************************
**********************
//
// TStream stream operators.
//
TStream& operator << ( TStream &buf, const
CTMessageHeader &head )
```

```
{
   return buf << head.ID << head.Type << head.Len;
}

TStream& operator >> ( TStream &buf, CTMessageHeader
&head )
{
   buf >> head.ID;
   buf >> head.Type;
   buf >> head.Len;

   return buf;
}

#define INCL_NOPMAPI            // no PM in this program
#define INCL_DOS
#define INCL_BSE
#define INCL_DOSSEMAPHORES
#define INCL_DOSNMPIPES
#include <os2.h>

#include "CT_Buffer.HPP"

CT_Buffer::CT_Buffer()
   :  head( 0 ),
      tail( CT_BUFFER_MAXLEN )
{
// Create the mutex sem.
   rc = DosCreateMutexSem( NULL, &hBufSem, 0, 0 );
   if (rc)  {}

// Create the event sem.
   rc = DosCreateEventSem( NULL, &hReleaseGetSem, 0, 0 );
}

CT_Buffer::~CT_Buffer()
{
   DosCloseMutexSem( hBufSem );
}

void CT_Buffer::Flush()
{
   ULONG post_count;

   DosRequestMutexSem( hBufSem, SEM_INDEFINITE_WAIT );
   head = 0;
   tail = CT_BUFFER_MAXLEN;
   DosResetEventSem( hReleaseGetSem, &post_count );
   DosReleaseMutexSem( hBufSem );
}

FLAG CT_Buffer::fPutChar( char ch )
{
```

```
   FLAG ret_val;

// Get ownership of the semaphore.
   rc = DosRequestMutexSem( hBufSem, SEM_INDEFINITE_WAIT
);
   if (rc) return FALSE;

// First check that the log buffer hasn't overflown.
   if (!fIsFull())  {
   // Store the char, update head, signal the event.
      buffer[head] = ch;
      head = IncBufPtr( head );
      DosPostEventSem( hReleaseGetSem );
      ret_val = TRUE;
   }
   else ret_val = FALSE;

// Release the semaphore.
   DosReleaseMutexSem( hBufSem );

   return ret_val;
}

FLAG CT_Buffer::fGetChar( char &ch )
{
   ULONG post_count;
   FLAG ret_val;

// If empty wait for timeout.
   if (fIsEmpty()) DosWaitEventSem( hReleaseGetSem,
SEM_INDEFINITE_WAIT );

// Get ownership of the semaphore.
   rc = DosRequestMutexSem( hBufSem, SEM_INDEFINITE_WAIT
);
   if (rc) return FALSE;

   if (!fIsEmpty())  {
   // Fetch the char, update tail.
      tail = IncBufPtr( tail );
      ch = buffer[tail];
      ret_val = TRUE;
   }
   else ret_val = FALSE;

   DosResetEventSem( hReleaseGetSem, &post_count );

// Release the semaphore.
   DosReleaseMutexSem( hBufSem );

   return ret_val;
}
```

```
#define INCL_NOPMAPI              // no PM in this program
#define INCL_DOS
#define INCL_BSE
#define INCL_DOSSEMAPHORES
#define INCL_DOSNMPIPES
#include <os2.h>

#include "CT_Log.HPP"

#include <fstream.h>

CT_Log::CT_Log( UINT len )
   :  buf_len( len ),
      index( 0 )
{
   if ((buffer = new BYTE[buf_len]) == NULL)   {
      buf_len = index = 0;
   }
}

CT_Log::~CT_Log()
{
   if (buffer) DosFreeMem( buffer );
}

BOOL CT_Log::fPostChar( char ch )
{
// First check that the log buffer hasn't overflown.
   if (!fIsFull())   {
   // Store the char, update head.
      buffer[index++] = ch;
      return TRUE;
   }
   else return FALSE;
}

BOOL CT_Log::fDumpLog( const char *fname )
{
   fstream dump;

   dump.open( fname, ios::out );
   if (!dump) return FALSE;
   dump.write( buffer, index );
   dump.close();

   return TRUE;
}

#define INCL_DOSNMPIPES
#include <os2.h>

#include <MessagePipe.HPP>
```

```
//*****************************************************
**********************
// SvrMsgPipeFactory Implementation.
//*****************************************************
**********************

SvrMsgPipeFactory::SvrMsgPipeFactory( PCSZ name, UINT
msg_len, UINT pipe_len )
    : MsgPipeFactory( msg_len ),
      pipe_name( name ),
      pipe_len( pipe_len )
{}

FLAG SvrMsgPipeFactory::fCreatePipe( MessagePipe *&ppipe
)
{
   ppipe = new MessagePipe( this );

   return TRUE;
}

FLAG SvrMsgPipeFactory::fDestroyPipe( MessagePipe *ppipe
)
{
   delete ppipe;

   return TRUE;
}

FLAG SvrMsgPipeFactory::fOpenPipe( MessagePipe *pipe )
{
   HPIPE hPipe;

// Create and connect the named pipe.
   pipe->rc = DosCreateNPipe( (PSZ)pipe_name, &hPipe,
                        NP_NOWRITEBEHIND |            //
Data sent to remote pipes immediatly.
                        NP_ACCESS_DUPLEX,             //
Two-way client/server communications.
                        NP_WAIT |                     //
I/O to pipe blocked until data avaliable.
                        NP_TYPE_MESSAGE |             //
Message pipe type.
                        NP_READMODE_MESSAGE |         //
Messafe read mode type.
                        0x00FF,                       //
Infinite number of allowed instances of this pipe.
                        (uMaxMsgLen() + 2) * pipe_len,//
Size of output buffer.
                        (uMaxMsgLen() + 2) * pipe_len,//
Size of input buffer.
                        0                             //
Client open timeout (see DosWaitNPipe).
```

```
                          );
   if (pipe->rc) return FALSE;

   pipe->rc = DosConnectNPipe( hPipe );
   if (pipe->rc) return FALSE;

   pipe->SetHandle( hPipe );
   return TRUE;
}

FLAG SvrMsgPipeFactory::fClosePipe( MessagePipe *pipe )
{
   HPIPE hPipe = pipe->GetHandle();

// Wait till the pipe is empty.
   pipe->rc = DosResetBuffer( hPipe );
   if (pipe->rc) return FALSE;
// Disconnect the pipe handle.
   pipe->rc = DosDisConnectNPipe( hPipe );
   if (pipe->rc) return FALSE;

   return TRUE;
}

//*********************************************************
**********************
// CltMsgPipeFactory Implementation.
//*********************************************************
**********************

CltMsgPipeFactory::CltMsgPipeFactory( PCSZ name, UINT
msg_len )
   : MsgPipeFactory( msg_len ),
     pipe_name( name )
{}

FLAG CltMsgPipeFactory::fCreatePipe( MessagePipe *&ppipe
)
{
   ppipe = new MessagePipe( this );

   return TRUE;
}

FLAG CltMsgPipeFactory::fDestroyPipe( MessagePipe *ppipe
)
{
   delete ppipe;

   return TRUE;
}

FLAG CltMsgPipeFactory::fOpenPipe( MessagePipe *pipe )
```

```
{
   HPIPE hPipe;
   ULONG ulAction;

   pipe->rc = DosOpen( pipe_name, &hPipe, &ulAction, 0,
                  FILE_NORMAL, FILE_OPEN,
                  OPEN_ACCESS_READWRITE |
OPEN_SHARE_DENYNONE,
                  (PEAOP2)NULL );
   if (pipe->rc) return FALSE;

   pipe->SetHandle( hPipe );
   return TRUE;
}

FLAG CltMsgPipeFactory::fClosePipe( MessagePipe *pipe )
{
   HPIPE hPipe = pipe->GetHandle();

// Wait till the pipe is empty.
   pipe->rc = DosResetBuffer( hPipe );
   if (pipe->rc) return FALSE;
// Close the pipe handle.
   rc = DosClose( hPipe );
   if (pipe->rc) return FALSE;

   return TRUE;
}

//**********************************************************
**********************
// MessagePipe Implementation
//**********************************************************
**********************

MessagePipe::MessagePipe( MsgPipeFactory *mom )
   :  factory( mom )
{
   factory->InitPipe( this );
}

MessagePipe::~MessagePipe()
{
   factory->DeinitPipe( this );
}

FLAG MessagePipe::fOpenPipe()
{
   return factory->fOpenPipe( this );
}

FLAG MessagePipe::fClosePipe()
{
```

```
   return factory->fClosePipe( this );
}

FLAG MessagePipe::fSendMessage( PCVOID msg, ULONG msg_len
)
{
   ULONG cbWritten;

   rc = DosWrite( hPipe, (PVOID)msg, msg_len, &cbWritten
);

   return (rc == 0 && msg_len == cbWritten) ? TRUE :
FALSE;
}

FLAG MessagePipe::fGetMessage( PVOID msg, PULONG msg_len
)
{
//   PRECONDITION( msg_len != 0 && *msg_len <=
uMaxMsgLen() );

   rc = DosRead( hPipe, msg, *msg_len, msg_len );

   return (rc == 0) ? TRUE : FALSE;
}

FLAG MessagePipe::fTransact( PCVOID out_msg, ULONG
out_msg_len, PVOID in_msg, PULONG in_msg_len )
{
//   PRECONDITION( in_msg_len != 0 && *in_msg_len <=
uMaxMsgLen() );

   rc = DosTransactNPipe( hPipe, (PVOID)out_msg,
out_msg_len, in_msg, *in_msg_len, in_msg_len );

   return (rc == 0) ? TRUE : FALSE;
}

MessagePipe::PIPE_STATE MessagePipe::eState()
{
   ULONG cbRead;
   AVAILDATA avail;
   ULONG state;

// Use DosPeekNPipe to find the state of the pipe.
   rc = DosPeekNPipe( hPipe, NULL, 0, &cbRead, &avail,
&state );

   return (PIPE_STATE)state;
}

#ifdef __OS2__
   #define INCL_DOSDATETIME
```

```
   #include <os2.h>
#endif

#include <ctype.h>

#include <Objects.HPP>

//**********************************************************
**********************
//
// TFlag members.
//

TFlag::TFlag()
    :  TNull( TRUE )
{}

TFlag::TFlag( FLAG flag )
    :  value( (flag != FALSE) ),
       TNull( FALSE )
{}

TFlag::~TFlag()
{
   #ifdef DEBUG
      fSetNull();
      value = UNINIT_DATA;
   #endif
}

//**********************************************************
**********************
//
// TTimestamp members.
//

const UINT TTimestamp::TSStringLen = 27;

TTimestamp::TTimestamp()
   : TNull( TRUE )
{
   #ifdef DEBUG
      Year = Month = Day = Hour = Minute = Second =
Millisec = UNINIT_DATA;
   #endif
}

TTimestamp::TTimestamp(  USHORT yr, UCHAR mo, UCHAR dy,
                         UCHAR hr, UCHAR mn, UCHAR sc,
USHORT ms )
    :  Year( yr ),
       Month( mo ),
       Day( dy ),
```

```
        Hour( hr ),
        Minute( mn ),
        Second( sc ),
        Millisec( ms ),
        TNull( FALSE )
{}

TTimestamp::~TTimestamp()
{
   #ifdef DEBUG
      fSetNull();
      Year = Month = Day = Hour = Minute = Second =
Millisec = UNINIT_DATA;
   #endif
}

FLAG TTimestamp::fValidate() const
{
   if (fIsNull()) return FALSE;

// Check year.
   if (!Year || Year > 9999) return FALSE;
// Check month and day.
   if (!Day) return FALSE;
   switch (Month)  {
      case 1:
         if (Day > 31) return FALSE;
         break;
      case 2:
         if (Year % 4 == 0 && Year % 100 != 0)          //
Check for a leapyear.
            if (Day > 29) return FALSE;
         else
            if (Day > 28) return FALSE;
         break;
      case 3:
         if (Day > 31) return FALSE;
         break;
      case 4:
         if (Day > 30) return FALSE;
         break;
      case 5:
         if (Day > 31) return FALSE;
         break;
      case 6:
         if (Day > 30) return FALSE;
         break;
      case 7:
         if (Day > 31) return FALSE;
         break;
      case 8:
         if (Day > 31) return FALSE;
         break;
```

```
        case 9:
           if (Day > 30) return FALSE;
           break;
        case 10:
           if (Day > 31) return FALSE;
           break;
        case 11:
           if (Day > 30) return FALSE;
           break;
        case 12:
           if (Day > 31) return FALSE;
           break;
        default:
           return FALSE;
     }
// Check hours.
   if (Hour > 23)  {
      if (Hour > 24 || Minute || Second || Millisec)
return FALSE;
   }
// Check minutes, seconds and milliseconds.
   if (Minute > 59 || Second > 59 || Millisec > 999)
return FALSE;

   return TRUE;
}

void TTimestamp::ForceValidate()
{
   setNotNull();
   Year = Month = Day = 1;
   Hour = Minute = Second = Millisec = 0;
}

FLAG TTimestamp::fIsValidTSString( STRING ts )
{
   if (      isdigit( ts[0] )            // Check Year.
          && isdigit( ts[1] )
          && isdigit( ts[2] )
          && isdigit( ts[3] )
          && ts[4] == '-'
          && isdigit( ts[5] )            // Check Month.
          && isdigit( ts[6] )
          && ts[7] == '-'
          && isdigit( ts[8] )            // Check Day.
          && isdigit( ts[9] )
          && ts[10] == '-'
          && isdigit( ts[11] )           // Check Hour.
          && isdigit( ts[12] )
          && ts[13] == '.'
          && isdigit( ts[14] )           // Check Minute.
          && isdigit( ts[15] )
          && ts[16] == '.'
```

```
        && isdigit( ts[17] )          // Check Second.
        && isdigit( ts[18] )
        && ts[19] == '.'
        && isdigit( ts[20] )          // Check Millisec.
        && isdigit( ts[21] )
        && isdigit( ts[22] )
        && isdigit( ts[23] )
        && isdigit( ts[24] )
        && isdigit( ts[25] )
        && ts[26] == '\x0')
      return TRUE;
   else return FALSE;
}

TTimestamp& TTimestamp::Assign( const TTimestamp &ts )
{
   if (!ts)  {
      fSetNull();
   }
   else  {
      setNotNull();
      Year = ts.Year;
      Month = ts.Month;
      Day = ts.Day;
      Hour = ts.Hour;
      Minute = ts.Minute;
      Second = ts.Second;
      Millisec = ts.Millisec;
   }
   return (*this);
}

TTimestamp& TTimestamp::Assign( USHORT yr, UCHAR mo,
UCHAR dy,
                                UCHAR hr, UCHAR mn, UCHAR
sc, USHORT ms )
{
   setNotNull();

   Year = yr;
   Month = mo;
   Day = dy;
   Hour = hr;
   Minute = mn;
   Second = sc;
   Millisec = ms;

   return (*this);
}

TTimestamp& TTimestamp::Assign( STRING ts, FLAG isnull )
{
   unsigned num;
```

```
   if (isnull)  {
      fSetNull();
      return *this;
   }

   setNotNull();

   ASSERT( fIsValidTSString( ts ) );

/* Convert year */
   num =  (ts[0] - '0') * 1000;
   num += (ts[1] - '0') * 100;
   num += (ts[2] - '0') * 10;
   num += (ts[3] - '0');
   Year = USHORT( num );
/* Convert month */
   num =  (ts[5] - '0') * 10;
   num += (ts[6] - '0');
   Month = UCHAR( num );
/* Convert day */
   num =  (ts[8] - '0') * 10;
   num += (ts[9] - '0');
   Day = UCHAR( num );
/* Convert hour */
   num =  (ts[11] - '0') * 10;
   num += (ts[12] - '0');
   Hour = UCHAR( num );
/* Convert minute */
   num =  (ts[14] - '0') * 10;
   num += (ts[15] - '0');
   Minute = UCHAR( num );
/* Convert second */
   num =  (ts[17] - '0') * 10;
   num += (ts[18] - '0');
   Second = UCHAR( num );
/* Convert millisec */
   num =  (ts[20] - '0') * 100;
   num += (ts[21] - '0') * 10;
   num += (ts[22] - '0');
   Millisec = USHORT( num );

   return *this;
}

#ifdef __OS2__
TTimestamp& TTimestamp::Assign( const DATETIME &Date )
{
   setNotNull();

   Year = Date.year;
   Month = Date.month;
   Day = Date.day;
   Hour = Date.hours;
```

```
   Minute = Date.minutes;
   Second = Date.seconds;
   Millisec = Date.hundredths * 10;

   return (*this);
}
#endif // __OS2__

STRING TTimestamp::ToSTRING( char *ts ) const
{
   unsigned num;

/* Convert year */
   num = Year;
   ts[0] = (num%10000) / 1000 + '0';
   ts[1] = (num%1000) / 100 + '0';
   ts[2] = (num%100) / 10 + '0';
   ts[3] = (num % 10) + '0';
   ts[4] = '-';
/* Convert month */
   num = Month;
   ts[5] = (num%100) / 10 + '0';
   ts[6] = (num % 10) + '0';
   ts[7] = '-';
/* Convert day */
   num = Day;
   ts[8] = (num%100) / 10 + '0';
   ts[9] = (num % 10) + '0';
   ts[10] = '-';
/* Convert hour */
   num = Hour;
   ts[11] = (num%100) / 10 + '0';
   ts[12] = (num % 10) + '0';
   ts[13] = '.';
/* Convert minute */
   num = Minute;
   ts[14] = (num%100) / 10 + '0';
   ts[15] = (num % 10) + '0';
   ts[16] = '.';
/* Convert second */
   num = Second;
   ts[17] = (num%100) / 10 + '0';
   ts[18] = (num % 10) + '0';
   ts[19] = '.';
/* Convert millisec */
   num = Millisec;
   ts[20] = (num%1000) / 100 + '0';
   ts[21] = (num%100) / 10 + '0';
   ts[22] = (num % 10) + '0';
   ts[23] = '0';
   ts[24] = '0';
   ts[25] = '0';
```

```
   ts[26] = '\x0';

   return ts;
}

FLAG TTimestamp::operator >  ( const TTimestamp &ts )
const
{
   useAsValue();

   if (Year > ts.Year) return TRUE;
   else if (Year == ts.Year)  {
      if (Month > ts.Month) return TRUE;
      else if (Month == ts.Month)  {
         if (Day > ts.Day) return TRUE;
         else if (Day == ts.Day)  {
            if (Hour > ts.Hour) return TRUE;
            else if (Hour == ts.Hour)  {
               if (Minute > ts.Minute) return TRUE;
               else if (Minute == ts.Minute)  {
                  if (Second > ts.Second) return TRUE;
                  else if (Second == ts.Second)  {
                     if (Millisec > ts.Millisec) return
TRUE;
                     else return FALSE;
                  }
               }
            }
         }
      }
   }
   return FALSE;
}

FLAG TTimestamp::operator >= ( const TTimestamp &ts )
const
{
   return (*this > ts || *this == ts);
}

FLAG TTimestamp::operator == ( const TTimestamp &ts )
const
{
   useAsValue();

   if (Year == ts.Year &&
       Month == ts.Month &&
       Day == ts.Day &&
       Hour == ts.Hour &&
       Minute == ts.Minute &&
       Second == ts.Second &&
       Millisec == ts.Millisec)  {
      return TRUE;
```

```
      }
      else  {
         return FALSE;
      }
   }

   // Date and time add function.
   TTimestamp& TTimestamp::AddToDate( UINT yr, UINT mon,
   UINT day,
                                      UINT hr, UINT min,
   UINT sec, UINT ms )
   {
      if (!fIsNull())  {
         ms  += Millisec;
         sec += Second;
         min += Minute;
         hr  += Hour;
         day += Day;
         mon += Month;
         yr  += Year;
      }

   // Adjust and carry ms.
      while (ms > usMaxMillisec())  {
         ms -= usMaxMillisec() + 1;
         sec++;
      }
   // Adjust and carry sec.
      while (sec > usMaxSecond())  {
         sec -= usMaxSecond() + 1;
         min++;
      }
   // Adjust and carry min.
      while (min > usMaxMinute())  {
         min -= usMaxMinute() + 1;
         hr++;
      }
   // Adjust and carry hr.
      while (hr > usMaxHour())  {
         hr -= usMaxHour() + 1;
         day++;
      }
   // Adjust and carry mon (day adjust is dependent on mon
   and yr).
      while (mon > usMaxMonth())  {
         mon -= usMaxMonth();
         yr++;
      }
   // Now adjust and carry day now that yr and mon is known.
      while (day > usMaxDay( yr, mon ))  {
         day -= usMaxDay( yr, mon );
         mon++;
         if (mon > usMaxMonth())  {
```

```
            mon -= usMaxMonth();
            yr++;
         }
      }

   // Copy new values to members.

      Assign( yr, mon, day, hr, min, sec, ms );

      CHECK( fValidate() );
      return *this;
   }

   // static member.
   USHORT TTimestamp::usMaxDay( USHORT year, USHORT month )
   {
      switch (month)  {
         case 1:              // Jan.
            return 31;

         case 2:              // Feb.
            return fIsLeapYear( year ) ? 29 : 28;

         case 3:              // Mar.
            return 31;

         case 4:              // Apr.
            return 30;

         case 5:              // May.
            return 31;

         case 6:              // Jun.
            return 30;

         case 7:              // Jul.
            return 31;

         case 8:              // Aug.
            return 31;

         case 9:              // Sep.
            return 30;

         case 10:             // Oct.
            return 31;

         case 11:             // Nov.
            return 30;

         case 12:             // Dec.
            return 31;
```

```
//      default:
//         BOILERPLATE;
   }
}

//**********************************************************
**********************
//
// TStream stream operators.
//
TStream& operator << ( TStream &buf, const TFlag &flag )
{
   if (!flag) return buf << FLAG( TRUE );
   else return buf << FLAG( FALSE ) << flag.value;
}

TStream& operator >> ( TStream &buf, TFlag &flag )
{
   buf >> *(TNull*)&flag;
   if (flag.fIsNull() == FALSE)
      buf >> flag.value;
   return buf;
}

TStream& operator << ( TStream &buf, const TTimestamp &ts
)
{
   if (!ts) return buf << FLAG( TRUE );
   else  {
      return buf << FLAG( FALSE )
                 << ts.Year
                 << ts.Month
                 << ts.Day
                 << ts.Hour
                 << ts.Minute
                 << ts.Second
                 << ts.Millisec;
   }
}

TStream& operator >> ( TStream &buf, TTimestamp &ts )
{
   buf >> *(TNull*)&ts;
   if (!ts)  {
      return buf;
   }
   else  {
      return buf >> ts.Year
                 >> ts.Month
                 >> ts.Day
                 >> ts.Hour
                 >> ts.Minute
                 >> ts.Second
```

```
                    >> ts.Millisec;
   }
}

//**********************************************************
**********************
//
// iostream friend function members.
//

ostream& operator << ( ostream &os, const TFlag &flag )
{
   if (!flag) return os << NULL_TOK;
   else return os << (STRING)flag;
}

/********************
istream& operator << ( istream &is, TFlag &flag )
{
   char ch, buffer[12];

   is >> ws;                              // Extract leading
whitespace.

   for (int i = 0; i < sizeof( buffer ); i++)   {
      is >> buffer[i];
      if (!isalpha( buffer[i] )) break;
   }
   if (i == sizeof( buffer ) ASSERT( FALSE );

   buffer[i] = '\x0';

   if (strcmp( buffer, NULL_TOK) == 0)   {
      fSetNull();
   }
   else if (strcmp( buffer, TRUE_TOK) == 0)   {
      Assign( TRUE );
   }
   else if (strcmp( buffer, FALSE_TOK) == 0)   {
      Assign( FALSE );
   }
   else ASSERT( FALSE );

   return is;
}
********************/

ostream& operator << ( ostream &os, const TTimestamp &ts
)
{
   char tsstring[TTimestamp::TSStringLen];
   if (!ts) return os << "NULL";
   else return os << ts.ToSTRING( tsstring );
```

```
}

#define INCL_NOPMAPI                // no PM in this program
#define INCL_DOS
//#define INCL_BSE
//#define INCL_DOSSEMAPHORES
#include <os2.h>

#include <usertype.h>
#include <TModem.HPP>

TModem::TModem( TPort &_port )
   : port( _port )
{}

TModem::RC TModem::rcSendCommand( STRING, ULONG timeout )
{
   NOTIMPLEMENTED;
}

STRING TModem::strSendCommand( STRING str, ULONG timeout
)
{
   port.fWritePort( str );
   port.fPutChar( '\r' );
   STRING result = strGetString( timeout );
   if (strcmp( str, result ) == 0)  {
      return strGetString( timeout );
   }
   else  {
      return result;
   }
}

STRING TModem::strGetString( ULONG timeout )
{
   UINT i = 0;
   last_result[0] = '\x0';

// Eat Leading CR/NL.
   while (!port.fGetChar( last_result[i] )
            || last_result[i] == '\r'
            || last_result[i] == '\n')  {}
   i++;                        // (already got 1 char ok)
// Grab text until a CR/NL.
   while (port.fGetChar( last_result[i] )
            && last_result[i] != '\n'
            && last_result[i] != '\r'
            && i <= sizeof( last_result ))   {
      i++;
   }
```

```
   last_result[i] = '\x0';          // Null terminate
buffer.
   return last_result;
}

#include <TObject.HPP>

//*******************************************************
**********************
//
// TObject members.
//

TObject::~TObject()
{}

//*******************************************************
**********************
//
// TNull members.
//

TNull::TNull( FLAG is_null )
   :  isnull( is_null )
{}

FLAG TNull::fSetNull()
{
   isnull = TRUE;
   return TRUE;
}


#define INCL_NOPMAPI               // no PM in this program
#define INCL_DOS
#define INCL_BSE
#define INCL_DOSSEMAPHORES
#define INCL_DOSNMPIPES
#include <os2.h>

#include <usertype.h>
#include "TPacket.HPP"

TPacket::TPacket( TPort& p )
    :  Port( p ),
       text_length( 0 ),
       state( TRANS_NULL )
{}

TPacket::TRANS_STATE TPacket::rGetPacket()
{
   enq_count = 0;
```

```
   nak_count = 0;
   text_length = 0;

   if (state != TRANS_NULL) return TRANS_NULL;

// Enquiry Loop.
   while (fSendENQ())
      {
      if ((state = rReceivePacket()) == TRANS_NAK)
         {
         while (fSendNAK())
            if ((state = rReceivePacket()) == TRANS_ACK)

               {
               fSendACK();
               return state;
               }
         }

      else if (state == TRANS_ACK)
         {
         fSendACK();
         return state;
         }
      }
   fSendEOT();
   return state;
}


TPacket::TRANS_STATE TPacket::rReceivePacket()
{
   char ch;
   int i=0,j;

// Get STX.
   if (!Port.fGetChar( ch ))
      return TRANS_ETO;
//   packet_text[i++] = ch;
   if (ch != STX)
      return TRANS_NAK;

// Get Length.
   if (!Port.fGetChar( ch ))
      return TRANS_NAK;
//   packet_text[i++] = ch;

   text_length = (USHORT)ch;

   if (!Port.fGetChar( ch ))
      return TRANS_NAK;
//   packet_text[i++] = ch;
```

```
    text_length = (USHORT)(ch << 8) + text_length;

    if (text_length > MAX_TEXT_LEN)
       return TRANS_NAK;

 // Get Text.

    for (j=0 ; j < text_length; j++ )
    {
       if ( Port.fGetChar( ch ))
          packet_text[ j ] = ch;

       else
          return ( TRANS_NAK );
    }

 // Get ETX.
    if ( Port.fGetChar( ch ))
       {
       if ( ch == ETX )
          ;
 //       packet_text[ i++ ] = ch;

       else
          return ( TRANS_NAK );
       }
    else
       {
       return ( TRANS_NAK );
       }

 // Get LRC.
    if (!Port.fGetChar( ch ))
       return TRANS_NAK;
 //   packet_text[i++]=ch;
    return TRANS_ACK;
 }

 UINT TPacket::cbCopyText( PVOID ptr, UINT len )
 {
    len = len < text_length ? len : text_length;
    memcpy( ptr, packet_text, len );
    return len;
 }

 FLAG TPacket::fSendENQ()
 {
    char enq = ENQ;

    enq_count++;
    if (enq_count > MAX_ENQ) return FALSE;

    Port.FlushInputBuffer();
```

```
   return Port.fWritePort( &enq, 1 );
}

FLAG TPacket::fSendACK()
{
   char ack = ACK;
   Port.FlushInputBuffer();
   return Port.fWritePort( &ack, 1 );
}

FLAG TPacket::fSendNAK()
{
   char nak = NAK;

   nak_count++;
   if (nak_count > MAX_NAK) return FALSE;

   Port.FlushInputBuffer();
   return Port.fWritePort( &nak, 1 );
}

FLAG TPacket::fSendEOT()
{
   char eot = EOT;
   return Port.fWritePort( &eot, 1 );
}


#define INCL_NOPMAPI              // no PM in this program
#define INCL_DOS
#define INCL_BSE
#define INCL_DOSSEMAPHORES
#define INCL_DOSNMPIPES
#define INCL_DOSDEVIOCTL
#include <os2.h>

#define _THREADS                  // This implemetation is
multi-threaded.

#include <process.h>
#include <string.h>
#include <stdlib.h>

#include "TPort.HPP"

TPort::TPort()
   :  manage_thread( -1 ),
      log_flag( FALSE )
{}

TPort::~TPort()
{
   while (manage_thread != -1)  {
```

```
      KillManageThread();
      DosSleep( 1000 );                  // Wait 1 second.
   }
}

FLAG TPort::fOpenPort( const ComSettings &settings )
{
   LINECONTROL lctl;
   DCBINFO dcb;
   ULONG ulAction;
   ULONG ulPio, ulDio;
   ULONG cbTrans;

// Open the port.
   rc = DosOpen( settings.port_name, &hPort, &ulAction,
0, 0, OPEN_ACTION_OPEN_IF_EXISTS,
                 OPEN_FLAGS_WRITE_THROUGH |
OPEN_ACCESS_READWRITE | OPEN_SHARE_DENYREADWRITE, NULL );
   if (rc) return FALSE;

// Set the line speed.
   ulPio = sizeof( settings.bps );
   rc = DosDevIOCtl( hPort, IOCTL_ASYNC,
ASYNC_SETBAUDRATE, (PVOID)&settings.bps,
                     ulPio, &ulPio, NULL, 0, NULL );
   if (rc)  {
      DosClose( hPort );
      return FALSE;
   }

// Set the line characteristics.
   lctl.bDataBits = settings.data_bits;
   lctl.bParity = (BYTE)settings.parity;
   lctl.bStopBits = (BYTE)settings.stop_bits;
   ulPio = sizeof lctl;
   rc = DosDevIOCtl( hPort, IOCTL_ASYNC,
ASYNC_SETLINECTRL, &lctl, ulPio, &ulPio, NULL, 0, NULL );
   if (rc)  {
      DosClose( hPort );
      return FALSE;
   }

// Set the flow control.
   ulDio = sizeof dcb;
   rc = DosDevIOCtl( hPort, IOCTL_ASYNC,
ASYNC_GETDCBINFO, NULL, 0, NULL, &dcb, ulDio, &ulDio );
   if (rc)  {
      DosClose( hPort );
      return FALSE;
   }
/*********************************************************
**********************
   dcb.usReadTimeout = 100;
```

```
   dcb.fbCtlHndShake = MODE_CTS_HANDSHAKE;   // flags1 =
00001000

   dcb.fbFlowReplace &= 0x30;               // flags2 =
00??0000
   dcb.fbFlowReplace |= MODE_RTS_HANDSHAKE;  // flags2 =
10??0000

   dcb.fbTimeout &= 0xF8;                   // flags3 =
?????000
   dcb.fbTimeout |= MODE_WAIT_READ_TIMEOUT;  // flags3 =
?????100
***********************************************************
*********************/
   dcb.usReadTimeout = 300;
   dcb.fbCtlHndShake = MODE_CTS_HANDSHAKE;
   dcb.fbFlowReplace = MODE_RTS_HANDSHAKE;
   dcb.fbTimeout = MODE_NO_WRITE_TIMEOUT |
MODE_WAIT_READ_TIMEOUT;

   rc = DosDevIOCtl( hPort, IOCTL_ASYNC,
ASYNC_SETDCBINFO, &dcb, ulPio, &ulPio, NULL, 0, NULL );
   if (rc)  {
      DosClose( hPort );
      return FALSE;
   }

   fRaiseDTR();

   return TRUE;
}

FLAG TPort::fClosePort()
{
   rc = DosClose( hPort );
   if (rc) return FALSE;
   else return TRUE;
}

void TPort::FlushInputBuffer()
{
   BYTE cmd;                           // Scratch, Needed
by API.
   ULONG len;                          // Scratch, Needed
by API.

   rc = DosDevIOCtl( hPort, IOCTL_GENERAL,
DEV_FLUSHINPUT, &cmd, sizeof( cmd ), &len,
                    &cmd, sizeof( cmd ), &len );

   DosSleep(10);         // Timing Kludge - Give the
Device Driver
```

```
                               // time to flush buffer before
resetting
                               // semaphore stuff.
   buffer.Flush();
}

void TPort::FlushOutputBuffer()
{
   BYTE cmd;                                  // Scratch, Needed
by API.
   ULONG len;                                 // Scratch, Needed
by API.

   rc = DosDevIOCtl( hPort, IOCTL_GENERAL,
DEV_FLUSHOUTPUT, &cmd, sizeof( cmd ), &len,
                     &cmd, sizeof( cmd ), &len );
}

FLAG TPort::fReadPort( PVOID buf, UINT &len )
{
   for (int i = 0; i < len; i++)   {
      if (buffer.fIsEmpty())   {
         len = i;
         return TRUE;
      }
      else buffer.fGetChar( ((char*)buf)[i] );
   }
   return TRUE;
}

FLAG TPort::fWritePort( PVOID buf, UINT len )
{
   ULONG cbWritten;

   rc = DosWrite( hPort, buf, len, &cbWritten );
   if (rc) return FALSE;
   else return TRUE;
}

FLAG TPort::fDropDTR()
{
   ULONG ulPio, ulDio;
   MODEMSTATUS ms;
   ULONG com_err;

   ms.fbModemOn = 0;
   ms.fbModemOff = DTR_OFF;
   ulPio = sizeof ms;
   ulDio = sizeof com_err;
   rc = DosDevIOCtl( hPort, IOCTL_ASYNC,
ASYNC_SETMODEMCTRL, &ms, ulPio, &ulPio, &com_err, ulDio,
&ulDio );
   if (rc) return FALSE;
```

```
   else return TRUE;
}

FLAG TPort::fRaiseDTR()
{
   ULONG ulPio, ulDio;
   MODEMSTATUS ms;
   ULONG com_err;

   ms.fbModemOn = DTR_ON;
   ms.fbModemOff = 0xFF;
   ulPio = sizeof ms;
   ulDio = sizeof com_err;
   rc = DosDevIOCtl( hPort, IOCTL_ASYNC,
ASYNC_SETMODEMCTRL, &ms, ulPio, &ulPio, &com_err, ulDio,
&ulDio );
   if (rc) return FALSE;
   else return TRUE;
}

void _Optlink ManageThread( PVOID );  // Used internally
by fStartManageThread().
void _Optlink ManageThread( PVOID ptr )
{
   ((TPort*)ptr)->ManagePort();
}

FLAG TPort::fStartManageThread()
{
   fManThread = TRUE;
   manage_thread = _beginthread( ManageThread, 8192,
(PVOID)this );
   if (manage_thread == -1) return FALSE;
   else return TRUE;
}

void TPort::ManagePort()
{
   char read_buf[32];
   ULONG cbRead;

   while (TRUE)  {
      rc = DosRead( hPort, read_buf, sizeof read_buf,
&cbRead );
      if (rc)  {
         // handle error here...
      }
      else if (!fManThread) break;
      for (int i = 0; i < cbRead; i++)  {
         if (log_flag) log.fPostChar( read_buf[i] );
         buffer.fPutChar( read_buf[i] );
      }
      buffer.SignalRelease();
```

```
   }
// Signal threads exit.
   manage_thread = -1;
}

FLAG TPort::fStartCommandThread( TTHREAD CommandThread,
PVOID data )
{
   fCmdThread = TRUE;
   command_thread = _beginthread( CommandThread, 8192,
data );
   if (command_thread == -1) return FALSE;
   else return TRUE;
}

#include <TStream.HPP>

#include <debug.h>

#include <string.h>

//*********************************************************
*********************
//
// TStream members.
//
TStream::TStream( UINT buf_size )
   :  buf_len( buf_size ),
      buffer( new BYTE[buf_size] ),
      iptr( buffer ),
      xptr( buffer )
{
   #ifdef DEBUG
      memset( buffer, UNDEF_DATA, buf_len );
   #endif
}

TStream::~TStream()
{
   delete buffer;
}

void TStream::Reset()
{
   iptr = xptr = buffer;
}

TStream& TStream::operator << ( const FLAG flag )
{
   *(FLAG*)iptr = flag;
   return incInserter( sizeof( flag ) );
}
```

```
TStream& TStream::operator << ( const USHORT num )
{
   *(USHORT*)iptr = num;
   return incInserter( sizeof( num ) );
}

TStream& TStream::operator << ( const ULONG num )
{
   *(ULONG*)iptr = num;
   return incInserter( sizeof( num ) );
}

TStream& TStream::operator << ( const char *str )
{
   strcpy( iptr, str );
   return incInserter( strlen( str ) + 1 );
}

TStream& TStream::Put( const PVOID data, UINT size )
{
   memcpy( iptr, data, size );
   return incInserter( size );
}

TStream& TStream::operator >> ( FLAG &flag )
{
   flag = *(FLAG*)xptr;
   return incExtractor( sizeof( flag ) );
}

TStream& TStream::operator >> ( USHORT &num )
{
   num = *(USHORT*)xptr;
   return incExtractor( sizeof( num ) );
}

TStream& TStream::operator >> ( ULONG &num )
{
   num = *(ULONG*)xptr;
   return incExtractor( sizeof( num ) );
}

TStream& TStream::operator >> ( char *str )
{
   strcpy( str, xptr );
   return incExtractor( strlen( str ) + 1 );
}

TStream& TStream::Get( PVOID data, UINT size )
{
   memcpy( data, xptr, size );
   return incExtractor( size );
}
```

```
TStream& TStream::incExtractor( UINT n )
{
   xptr += n;
   ASSERT( xptr <= iptr );
   return *this;
}

TStream& TStream::incInserter( UINT n )
{
   iptr += n;
   ASSERT( iptr <= buffer + buf_len );
   return *this;
}

;*********************************************************
*****************
;*
;*  Copyright (C) 1995 Absolute Software Corporation
;*
;*********************************************************
****************

NAME DBServer WINDOWCOMPAT

IMPORTS      CTIMS.fGenerateSerCTID
             CTIMS.fXlatSerCTID
             CTIMS.fXlatCliCTID
             CTIMS.fGenerateCTCODE
             CTIMS.fConvertStrToCTCODE
             CTIMS.fConvertCTCODEToStr

.\TObject.obj: \
    f:\Server\TObject.CPP \
    DBServer.MAK

.\objects.obj: \
    f:\Server\objects.cpp \
    DBServer.MAK

.\MessagePipe.obj: \
    f:\Server\MessagePipe.CPP \
    DBServer.MAK

.\CTMessage.obj: \
    f:\Server\CTMessage.CPP \
    DBServer.MAK

.\ctims.obj: \
    f:\Server\ctims.cpp \
    DBServer.MAK

.\DBServer.obj: \
```

```
    f:\Server\DBServer.C \

{f:\Server;F:\Server\INCLUDE;E:\SQLLIB;E:\TOOLKT21\CPLUS\
OS2H;E:\Tools\IBMCPP\INCLUDE;}DBServer.H \
    DBServer.MAK

.\TSTREAM.obj: \
    f:\Server\TSTREAM.CPP \
    DBServer.MAK

.\TPacket.obj: \
    f:\Server\TPacket.CPP \

{f:\Server;M:\SRC\Include;M:\CT\Include;$(INCLUDE);}TPack
et.HPP \
    Server.MAK

.\TModem.obj: \
    f:\Server\TModem.CPP \
    Server.MAK

.\CT_Log.obj: \
    f:\Server\CT_Log.CPP \

{f:\Server;M:\SRC\Include;M:\CT\Include;$(INCLUDE);}CT_Lo
g.HPP \
    Server.MAK

.\CT_Buffer.obj: \
    f:\Server\CT_Buffer.CPP \

{f:\Server;M:\SRC\Include;M:\CT\Include;$(INCLUDE);}CT_Bu
ffer.HPP \

{f:\Server;M:\SRC\Include;M:\CT\Include;$(INCLUDE);}serve
r.h \
    Server.MAK

.\Server.obj: \
    f:\Server\Server.C \

{f:\Server;M:\SRC\Include;M:\CT\Include;$(INCLUDE);}CT_Tr
ans.H \

{f:\Server;M:\SRC\Include;M:\CT\Include;$(INCLUDE);}TPack
et.HPP \
    Server.MAK

.\CT_Trans.obj: \
    f:\Server\CT_Trans.C \

{f:\Server;M:\SRC\Include;M:\CT\Include;$(INCLUDE);}CT_Tr
ans.H \
```

```
{f:\Server;M:\SRC\Include;M:\CT\Include;$(INCLUDE);}TPack
et.HPP \
    Server.MAK

.\TPort.obj: \
    f:\Server\TPort.CPP \

{f:\Server;M:\SRC\Include;M:\CT\Include;$(INCLUDE);}TPort
.HPP \

{f:\Server;M:\SRC\Include;M:\CT\Include;$(INCLUDE);}CT_Bu
ffer.HPP \

{f:\Server;M:\SRC\Include;M:\CT\Include;$(INCLUDE);}CT_Lo
g.HPP \

{f:\Server;M:\SRC\Include;M:\CT\Include;$(INCLUDE);}serve
r.h \
    Server.MAK

#ifndef CT_TRANS_H
#define CT_TRANS_H

//#include <DB_Objects.HPP>
#include <MessagePipe.HPP>

#include "TPacket.HPP"

void SntlConnect( TPort &Port, MessagePipe &Pipe,
TConnectInfo *cnct_info );
void SntlDisconnect( TPort &Port, TConnectInfo
&ConnectInfo );
void SendDatePacket( TPort &Port, const SNTL_DATE &date
);

void AddDays( SNTL_DATE *next_call, int days );

FLAG fGetDateTime( PDATETIME );

#endif
#ifndef MESSAGE_H
#define MESSAGE_H

/*********************************************************
**********************
   Message.H

   Defines all valid messages used by the Server and
ServerShell.

**********************************************************
*********************/
```

```
// Define standard types.
#include <os2def.h>

#include <time.h>

// Definition for the Sentinel date packet.
struct CT_DATE {
   BYTE year;
   BYTE month;
   BYTE day;
   BYTE hour;
   BYTE minute;
};

// Definition for the Sentinel serial number packet.
struct CT_SN {
   USHORT sn[3];
   USHORT cksum;
   CT_DATE date;
};

#define CND_NUM_MAXLEN          20
#define CND_NAME_MAXLEN         20

struct CALLERID_INFO {
   BYTE month;
   BYTE day;
   BYTE hour;
   BYTE minute;
   CHAR number[CND_NUM_MAXLEN];
   CHAR name[CND_NAME_MAXLEN];
};

enum TRANS_STATE {
   TRANS_OK        = 0x00,
   TRANS_BAD_CND   = 0x01,
   TRANS_BAD_SN    = 0x02,
   TRANS_BAD_DATE  = 0x04
};

struct CT_Transaction {
   DATETIME start_time;
   CALLERID_INFO cnd;
   CT_SN sn;
   TRANS_STATE state;
   DATETIME end_time;
};

enum CT_SN_QUERY {
   CT_SN_OK        = 0,
   CT_SN_REDFLAG   = 1,
   CT_SN_UNKNOWN   = 2
};
```

```
#define CT_BUFFER_LEN 256                    // Allowable
length of modem communications for a cycle.
#define CT_GUARD_CHAR                  '!'

/* Definitions for stripped CompuTrace messages.
******************/

#define MAX_PHONE_NUM_LEN        16    // Max length of a
phone number string.
#define CT_SERIAL_NUM_LEN        sizeof( CT_SN )  //
Length of serial number packet sent by the modem.
#define MAX_ERROR_STR_LEN        32    // Max length of
an error string.

enum CTMSG_TYPE {
   CTMSG_UNDEF = 0,
   CTMSG_CONNECT,
   CTMSG_SERIAL_NUM,
   CTMSG_ERROR_LOG,
   CTMSG_DISCONNECT
};

struct CT_ConnectMsg {
   time_t connect_time;
   char phone_num[MAX_PHONE_NUM_LEN];
};

struct CT_SerialNumMsg {
   CT_SN serial_num;
};

struct CT_ErrorLogMsg {
   char error_str[MAX_ERROR_STR_LEN];
};

struct CT_DisconnectMsg {
   time_t disconnect_time;
   char log[CT_BUFFER_LEN];
};

struct CTMessage {
   CTMSG_TYPE type;
   union {
      CT_ConnectMsg Connect;
      CT_SerialNumMsg SerialNum;
      CT_ErrorLogMsg ErrorLog;
      CT_DisconnectMsg Disconnect;
   } Msg;
};
```

```
#define MAX_CTMSG_SIZE sizeof( CTMessage )          // Max
size of a stripped (CompuTrace) message.

/* Definitions for pipe messages.
************************************/

// Define all valid events.  The following prefixes are
used:
//    CT_         For general messages
//    CT_SER_     For server originated messages not
related to a transaction.
//    CT_CLI_     For client originated messages not
related to a transaction.
//    CT_SER_MSG_ For server originated messages related
to a transaction.
//    CT_CLI_MSG_ For client originated messages related
to a transaction.
// For more detailed information please see the proper
message structure.
enum EVENT_TYPE {
   CT_SER_MSG_AWK,                 // Server awknowledges
last received message.
   CT_SER_MSG_ERROR,               // Server has had a non-
fatal error.
   CT_SER_MSG_FATAL,               // Server has had a
fatal error and will unconditionally terminate.
   CT_SER_MSG_MESSAGE,             // Server has a message
to be processed by the client.

   CT_SER_STOP,                    // Server requests the
client(s) stop sending messages.
   CT_SER_START,                   // Server allows the
client(s) to continue sending messages.

   CT_SER_ERROR,                   // Server has had an
internal non-fatal error.
   CT_SER_FATAL,                   // Server has had an
internal fatal error and will terminate.
   CT_SER_STRING,                  // Server has a general
string to be stored.
   CT_SER_QUIT,                    // Server has requested
all clients to terminate.

   CT_CLI_MSG_AWK,                 // Client awknowledges
last received message.
   CT_CLI_MSG_ERROR,               // Client has had a non-
fatal error.
   CT_CLI_MSG_FATAL,               // Client has had a
fatal error and will unconditionally terminate.
   CT_CLI_MSG_MESSAGE              // Client has a message
to be processed by the server.
};
```

```
// Define message transfer template used to transfer a
message through a pipe.
struct CT_MessageHead {
   ULONG id;                    // The message id
number.
   EVENT_TYPE type;             // The event type (see
above).
   BYTE len;                    // The length the
message data.
};

struct CT_MessageBuffer {
   CT_MessageHead header;
   char message[MAX_CTMSG_SIZE];
};

#define MAX_MSG_SIZE sizeof( CT_MessageBuffer )
// Max size of a pipe message.

#endif // MESSAGE_H

#ifndef PACKET_H
#define PACKET_H

// Ensure byte alignment enforced!
#pragma pack( 1 )                  // For C-Set++
#pragma option -a1                 // For BC++

/* Packet Level Defines
*****************************************************/
#define STX                        0x02     // Start-of-
text.
#define ETX                        0x03     // End-of-
text.
#define EOT                        0x04     // End-of-
transmission.
#define ENQ                        0x05     // Enquiry.
#define ACK                        0x06     //
Acknowledgement.
#define NAK                        0x15     // Negative-
acknowledgement.

#define MAX_ENQ                    3        // Max
number of ENQs.
#define MAX_NAK                    2        // Max
number of NAKs.

#define MAX_TEXT_LEN               256      // Max size
of a packets TEXT.

struct PKT_HEADER {
   BYTE stx;
   BYTE lsb_length;
```

```
   BYTE msb_length;
};

struct PKT_FOOTER {
   BYTE etx;
   BYTE lrc;
};

/* Packet type definitions
*****************************************************/

// Text Type IDs.
#define CTID_TEXT_TYPE                   (WORD)0x0000        //
Sentinel Subscription Number Packet.
#define NC_TEXT_TYPE                     (WORD)0x0080        //
Server Next Call Packet.

struct SNTL_DATE {
   BYTE year;
   BYTE month;
   BYTE day;
   BYTE hour;
   BYTE minute;
};

struct CTID_TEXT {
   BYTE type;
   BYTE sub_type;
   WORD sn[3];
   SNTL_DATE now_date;
};
#define SN_TEXT CTID_TEXT                     // Old name (uses
should be changed to CTID_TEXT).

struct CTID_PACKET {
   PKT_HEADER header;
   CTID_TEXT text;
   PKT_FOOTER footer;
};
#define SN_PACKET CTID_PACKET                 // Old name (uses
should be changed to CTID_PACKET).

struct NC_TEXT {
   WORD type;
   SNTL_DATE next_call_date;
};

struct NC_PACKET {
   PKT_HEADER header;
   NC_TEXT text;
   PKT_FOOTER footer;
};
```

```
#pragma pack()                              // Back to default.
#pragma option -a.

#endif
#ifndef SERVER_H
#define SERVER_H

#define DEBUG        4

#include <debug.h>
#include <usertype.h>

//
// TConnectInfo definition.
//
#define CND_NUM_MAXLEN           20
#define CND_NAME_MAXLEN          20

struct CALLERID_INFO {
   BYTE month;
   BYTE day;
   BYTE hour;
   BYTE minute;
   CHAR number[CND_NUM_MAXLEN];
   CHAR name[CND_NAME_MAXLEN];
};

struct TConnectInfo {
   DATETIME start_time, end_time;
   CALLERID_INFO cnd;
};
//
// End of TConnectInfo
//

#endif // SERVER_H
#ifndef CT_BUFFER_HPP
#define CT_BUFFER_HPP

#include "server.h"

#define TRUE 1
#define FALSE 0
#define CT_BUFFER_MAXLEN   256

class CT_Buffer {

   char buffer[CT_BUFFER_MAXLEN];
   UINT head, tail;
   HMTX hBufSem;
   HEV hReleaseGetSem;
   APIRET rc;
```

```
    UINT IncBufPtr( UINT ptr ) const
       { return (++ptr >= CT_BUFFER_MAXLEN) ? 0 : ptr; }

public:

    CT_Buffer();
    ~CT_Buffer();

    void Flush();

    BOOL fIsEmpty() const { return head == IncBufPtr( tail
); }
    BOOL fIsFull() const { return head == tail; }

    void SignalRelease() { DosPostEventSem( hReleaseGetSem
); }

    BOOL fPutChar( char );
    BOOL fGetChar( char& );
};

#endif
#ifndef CT_LOG_HPP
#define CT_LOG_HPP

#define TRUE 1
#define FALSE 0

class CT_Log {

    char *buffer;
    UINT index, buf_len;

public:

    CT_Log( UINT = 4096 );
    ~CT_Log();

    void Flush() { index = 0; }

    BOOL fIsEmpty() const { return index == 0; }
    BOOL fIsFull() const { return index >= buf_len; }

    BOOL fPostChar( char );

    BOOL fDumpLog( const char * );
};

#endif
#ifndef TCLIENT_HPP
#define TCLIENT_HPP
```

```
class TClient {

   TConnectInfo ConnectInfo;
   WORD ctid[3];
   SNTL_DATE client_date;

   Pipe

public:


}




#endif // CLIENT_HPP
#ifndef TPACKET_HPP
#define TPACKET_HPP

#include <os2def.h>
#include "packet.h"

#include <TPort.HPP>

//*********************************************************
**********************
// Class TPacket - Encapsulates the reception of a packet
for a port
//
// TPacket::TPacket( TPort& Port ) Initializes internal
state.
//    Arguments:
//        TPort& Port - the port to receive the packet
from.
//
// TRANS_STATE TPacket::rGetPacket()
//    Description:
//        Attempts to receive a packet from Port using the
protocol
//        defined in the CompuTrace Protocol Specification
(CTPSpec).
//
//    Returns: The result of the attempt:
//        TRANS_ACK - packet successfully received as
defined by CTPSpec.
```

```
//        TRANS_NAK - reception aborted due to invalid
reception, EOT sent.
//        TRANS_ETO - ENQ timeout, no date recieved, EOT
sent.
//
// UINT TPacket::cbCopyText( ptr, len )
//    Arguments:
//        PVOID ptr - the buffer to copy data to.
//        UINT len - the maximum number of bytes to copy.
//
//    Description:
//        Copies text from a sucessfully received packet
into buffer pointed to
//        by ptr.  Copies up to len bytes or the size of
the received packet
//        text (whichever is smaller).  Can only be called
if rGetPacket
//        returned TRANS_ACK.
//
//    Returns: number of bytes copied. or 0 if packet not
successfully
//        received.
//
// TRANS_STATE rState() const
//    Returns: the current state of the instance.
//*******************************************************
**********************
class TPacket {
public:

   enum TRANS_STATE {
           TRANS_NULL,                        // No
activity.
           TRANS_ACK,
           TRANS_NAK,
           TRANS_ETO };                       // ETO =
Enquiry time-out.

   TPacket( TPort& );
   TRANS_STATE rGetPacket();
   UINT cbCopyText( PVOID ptr, UINT len );

   TRANS_STATE rState() const { return state; }

protected:

   FLAG fSendENQ();
   FLAG fSendACK();
   FLAG fSendNAK();
   FLAG fSendEOT();

private:
```

```
   TPort& Port;
   int enq_count;
   int nak_count;
   USHORT text_length;
   BYTE packet_text[MAX_TEXT_LEN];
   TRANS_STATE state;

   TRANS_STATE rReceivePacket();
};

#endif
# Created by IBM WorkFrame/2 MakeMake at 17:36:34 on
08/22/95
#
# This makefile should be run in the following directory:
#   d:\Server
#
# The actions included in this makefile are:
#   COMPILE::CLC C++
#   LINK::CLC Link

.all: \
  .\DBServer.EXE

.SUFFIXES:

.SUFFIXES: .C .CPP

.CPP.obj:
      @echo WF::COMPILE::CLC C++
      icc.exe /Tl- /Xi /ID:\Server\INCLUDE /IE:\SQLLIB
/IE:\TOOLKT21\CPLUS\OS2H /IE:\Tools\IBMCPP\INCLUDE
/DDEBUG=4 /Tdp /Q /Wall /Fi /Ti /Gm /G5 /Tm /C %s

.C.obj:
      @echo WF::COMPILE::CLC C++
      icc.exe /Tl- /Xi /ID:\Server\INCLUDE /IE:\SQLLIB
/IE:\TOOLKT21\CPLUS\OS2H /IE:\Tools\IBMCPP\INCLUDE
/DDEBUG=4 /Tdp /Q /Wall /Fi /Ti /Gm /G5 /Tm /C %s

.\DBServer.EXE: \
    .\TObject.obj \
    .\TSTREAM.obj \
    .\DBServer.obj \
    .\ctims.obj \
    .\CTMessage.obj \
    .\MessagePipe.obj \
    .\objects.obj \
    {$(LIB)}DB_Objects.LIB \
    {$(LIB)}SQL_DYN.LIB \
    {$(LIB)}DBServer.DEF \
    DBServer.MAK
      @echo WF::LINK::CLC Link
```

```
     icc.exe @<<
/Tl- /Xi
 /ID:\Server\INCLUDE
 /IE:\SQLLIB
 /IE:\TOOLKT21\CPLUS\OS2H
 /IE:\Tools\IBMCPP\INCLUDE
 /DDEBUG=4
 /Tdp /Q
 /Wall
 /Fi
 /Ti /Gm /G5 /Tm
 /B" /de"
 /FeDBServer.EXE
 DB_Objects.LIB
 SQL_DYN.LIB
 DBServer.DEF
 .\TObject.obj
 .\TSTREAM.obj
 .\DBServer.obj
 .\ctims.obj
 .\CTMessage.obj
 .\MessagePipe.obj
 .\objects.obj
<<

!include DBServer.Dep
# Created by IBM WorkFrame/2 MakeMake at 10:20:11 on
05/30/95
#
# This makefile should be run in the following directory:
#   d:\Server
#
# The actions included in this makefile are:
#   COMPILE::CLC C++
#   LINK::CLC Link

.all: \
  .\Server.EXE

.SUFFIXES:

.SUFFIXES: .C .CPP

.CPP.obj:
      @echo WF::COMPILE::CLC C++
      icc.exe /Tl- /ID:\Server\Include /IM:\CT\Include
/Tdp /Q /Wall /Fi /Si /Ti /O /Gm /G5 /Tm /C %s

.C.obj:
      @echo WF::COMPILE::CLC C++
      icc.exe /Tl- /ID:\Server\Include /IM:\CT\Include
/Tdp /Q /Wall /Fi /Si /Ti /O /Gm /G5 /Tm /C %s
```

```
.\Server.EXE: \
    .\TPacket.obj \
    .\TPort.obj \
    .\CT_Trans.obj \
    .\Server.obj \
    .\CT_Buffer.obj \
    .\CT_Log.obj \
    .\TModem.obj \
    {$(LIB)}CTIMS.LIB \
    {$(LIB)}MessagePipe.LIB \
    Server.MAK
      @echo WF::LINK::CLC Link
      icc.exe @<<
/Tl-
 /ID:\Server\Include
 /IM:\CT\Include
 /Tdp /Q
 /Wall
 /Fi /Si
 /Ti /O /Gm /G5 /Tm
 /B" /de"
 /FeServer.EXE
 CTIMS.LIB
 MessagePipe.LIB
 .\TPacket.obj
 .\TPort.obj
 .\CT_Trans.obj
 .\Server.obj
 .\CT_Buffer.obj
 .\CT_Log.obj
 .\TModem.obj
<<

!include Server.Dep
#define INCL_NOPMAPI                    // no PM in this program.
#define INCL_DOS
#define INCL_BSE
#include <os2.h>
#include <fstream.h>
#include <time.h>

#include <server.h>
#include <DB_Objects.HPP>
#include <CTMessage.HPP>
//#include <packet.h>
#include "CT_Trans.H"

FLAG fQueryCTIDStatus( MessagePipe &Pipe, const
QueryCTIDStatusMsg &Status, CTIDStatusResultMsg &Result
);
FLAG fStoreMonitorEvent( MessagePipe &Pipe, const
StoreMonitorEventMsg &Store, StoreResultMsg &Result );
```

```
FLAG fSignalQuit( MessagePipe &Pipe );

void AssignTS( TTimestamp &ts, const SNTL_DATE &Date );
void AssignSNTL_DATE( SNTL_DATE &Date, const TTimestamp
&ts );

// Temp function.
void ProcessClient( TPort &Port, TConnectInfo
&ConnectInfo, CTID_TEXT *text );

extern MessagePipe *pipe;

//
// SntlConnect: called when a CONNECT comand has been
received, this function processes
//             a transaction between the server and a
Sentinel client.
//
void SntlConnect( TPort &Port, MessagePipe &Pipe,
TConnectInfo *cnct_info )
{
   WORD msg_type;

   DosGetDateTime( &cnct_info->start_time );          //
Fill start time.

   TPacket packet( Port );

   while (TRUE)  {
   // Get a packet.
      if (packet.rGetPacket() != TPacket::TRANS_ACK)  {
         cout << "Packet Error" << endl;
         return;
      }
   // Determine packet type.
      packet.cbCopyText( &msg_type, sizeof( msg_type ) );
      switch( msg_type )  {
         case CTID_TEXT_TYPE:
         // Create a new client object.
//             TClient Client( Port, Pipe, *cnct_info );
         // Get CTID Text and add to Client object.
            CTID_TEXT Text;
            packet.cbCopyText( &Text, sizeof( Text ) );
//             Client.SetCTID( Text );
         // ProcessClient.
//             ProcessClient( Client );
            ProcessClient( Port, *cnct_info, &Text );
            return;
         default:
            return;
      }
   }
}
```

```
void ProcessClient( TPort &Port, TConnectInfo
&ConnectInfo, CTID_TEXT *text )
{
   SNTL_DATE next_call;

// ENTER APPLICATION LAYER...

// Query the Client state.
   QueryCTIDStatusMsg StatusMsg;
   StatusMsg.CTID = (ULONG)text->sn[0] + ((ULONG)text-
>sn[1] << 16);

   CTIDStatusResultMsg Result;

   cout << "QueryCTIDStatus for CTID " << StatusMsg.CTID
<< "... ";

   if (!fQueryCTIDStatus( *pipe, StatusMsg, Result ))  {
      cout << "Error in QueryCTIDStatus!" << endl;
   }
   else  {
      cout << "CTIDStatusResult Received..." << endl;
      cout << "   Status = " << (STRING)Result.Status <<
endl;
      cout << "   PeriodDays = " << Result.PeriodDays <<
endl;
      cout << "   PeriodMinutes = " <<
Result.PeriodMinutes << endl;
      cout << "   StolenFlag = " <<
(STRING)Result.StolenFlag << endl;
      cout << "   SpecialProcess = " <<
Result.SpecialProcess << endl;
      cout << "   Orgnum = " << Result.Orgnum_n << endl;
   }

// Send NextCall Message back to the Client.
   CTTimestamp next_ts;
   AssignTS( next_ts, text->now_date );
   if (next_ts.usYear() < 1900)  {      // If date is not
valid substitute the local date instead.
      next_ts = ConnectInfo.start_time;
   }
   next_ts.AddToDate( 0, 0, Result.PeriodDays, 0,
Result.PeriodMinutes );
   AssignSNTL_DATE( next_call, next_ts );

   SendDatePacket( Port, next_call );
   SntlDisconnect( Port, ConnectInfo );

// Store the Monitor Event.
   StoreMonitorEventMsg Event;
   Event.StoreAsStolen = Result.StolenFlag;
   Event.StoreAsExpire = FALSE;
```

```
   Event.LicenseStatus = Result.Status;
   AssignTS( Event.ClientTS, text->now_date );
   Event.ServerTS = ConnectInfo.start_time;
   Event.NextCallTS_n = Event.ServerTS;
   Event.NextCallTS_n.AddToDate( 0, 0, Result.PeriodDays,
0, Result.PeriodMinutes );
   Event.NextCallClientTS_n = next_ts;
   Event.CTID = StatusMsg.CTID;
   Event.TelcoTS_n.Assign( Event.ServerTS.usYear(),
                           ConnectInfo.cnd.month,
                           ConnectInfo.cnd.day,
                           ConnectInfo.cnd.hour,
                           ConnectInfo.cnd.minute );
   Event.DurationSec_n = 0;
   Event.CallerID_n = (const
char(*)[CALLERID_SIZE])ConnectInfo.cnd.number;
   Event.LineNum = 1;
   Event.LogFlag = FALSE;
   Event.EnvironmentID = "DBS-9508";
   Event.ErrorCnt = 0;

   StoreResultMsg ResultMsg;

   cout << endl << "Storing the MonitorEvent... ";

   if (!fStoreMonitorEvent( *pipe, Event, ResultMsg )) {
      cout << "Error in StoreMonitorEvent!" << endl;
   }
   else {
      cout << "StoreResult = " << (ResultMsg.Result ?
"TRUE" : "FALSE") << endl;
   }
}

void SendDatePacket( TPort& Port, const SNTL_DATE& date )
{
   NC_PACKET packet;

   packet.header.stx = STX;
   packet.header.lsb_length = sizeof( NC_TEXT );
   packet.header.msb_length = 0;

   packet.text.type = NC_TEXT_TYPE;
   packet.text.next_call_date = date;

   packet.footer.etx = ETX;
   packet.footer.lrc = 0;

   Port.fWritePort( (PVOID)&packet, sizeof( packet ) );
}
```

```
FLAG fQueryCTIDStatus( MessagePipe &Pipe, const
QueryCTIDStatusMsg &Status, CTIDStatusResultMsg &Result )
{
   TStream in_strm, out_strm;

   out_strm << Status;
   if (!Pipe.fTransact( out_strm, in_strm )) return
FALSE;
   in_strm >> Result;

   if (Result.eType() == CTID_STATUS_RESULT) return TRUE;
   else return FALSE;
}

FLAG fStoreMonitorEvent( MessagePipe &Pipe, const
StoreMonitorEventMsg &Store, StoreResultMsg &Result )
{
   TStream in_strm, out_strm;

   out_strm << Store;
   if (!Pipe.fTransact( out_strm, in_strm )) return
FALSE;
   in_strm >> Result;

   if (Result.eType() == STORE_RESULT) return TRUE;
   else return FALSE;
}


FLAG fSignalQuit( MessagePipe &Pipe )
{
   TStream stream;
   CliQuitMsg QuitMsg;

   stream << QuitMsg;
   return Pipe.fSendMessage( stream );
}

void SntlDisconnect( TPort &Port, TConnectInfo
&ConnectInfo )
{
// Drop DTR.
   DosSleep( 500 );     // Broc - 13 Feb 95
                        // Add delay to let modem clear xmt
buffer
                        // to fix intermittent modem fault.
   Port.fDropDTR();

   cout << "Disconnecting..." << flush;

   DosGetDateTime( &ConnectInfo.end_time );          //
Fill end time.
```

```
   DosSleep( 200 );

// Raise DTR.
   Port.fRaiseDTR();
}

// *** helper functions.
UCHAR BCD2ToUChar( BYTE bcd )
{
// Convert a two digit bcd number to decinal.
   return (bcd >> 4) * 10 + (bcd & 0x0F);
}

BYTE UCharToBCD2( UCHAR dec )
{
// Convert a 8 bit decimal number to bcd.
   return (dec % 10) + (((dec / 10) % 10) << 4);
}

USHORT BCD4ToUShort( WORD bcd )
{
// Convert a four digit bcd number to decimal.
   return (bcd >> 12) * 1000 + ((bcd & 0x0F00) >> 8) *
100 + ((bcd & 0x00F0) >> 4) * 10 + (bcd & 0x000F);
}

WORD UShortToBCD4( USHORT dec )
{
// Convert a 16 bit decimal number to a 4 digit decimal.
   return (dec % 10) + (((dec / 10) % 10) << 4) + (((dec
/ 100) % 10) << 8) + (((dec / 1000) % 10) << 12);
}

void AssignTS( TTimestamp &ts, const SNTL_DATE &Date )
{
   ts.Assign( BCD2ToUChar( Date.year ),
              BCD2ToUChar( Date.month ),
              BCD2ToUChar( Date.day ),
              BCD2ToUChar( Date.hour ),
              BCD2ToUChar( Date.minute ) );
}

void AssignSNTL_DATE( SNTL_DATE &Date, const TTimestamp
&ts )
{
   Date.year   = UCharToBCD2( ts.usYear() % 100 );
   Date.month  = UCharToBCD2( ts.usMonth() );
   Date.day    = UCharToBCD2( ts.usDay() );
   Date.hour   = UCharToBCD2( ts.usHour() );
   Date.minute = UCharToBCD2( ts.usMinute() );
}
```

```
/*
inline BYTE HiNibble( BYTE b ) { return (BYTE)((b & 0xF0)
>> 4); }
inline BYTE LoNibble( BYTE b ) { return (BYTE)(b & 0x0F);
}

void AddDays( SNTL_DATE *next_call, int days )
{
   static BYTE days_per_month[18] = {
      0x31,
      0x28,
      0x30,       // 0x03 - March
      0x31,
      0x30,
      0x31,       // 0x06 - June
      0x30,
      0x31,
      0x30,       // 0x09 - Sept
      0x00,       // 0x0A
      0x00,       // 0x0B
      0x00,       // 0x0C
      0x00,       // 0x0D
      0x00,       // 0x0E
      0x00,       // 0x0F
      0x31,       // 0x10 - Oct
      0x30,
      0x31        // 0x12 - Dec
   };

   BYTE old_day = next_call->day;
    // Save for BCD adjust.

// Add the days to the current date.
   next_call->day += days;
// Check if we passed the end of the current month.
   if (next_call->day > days_per_month[next_call->month])
{
   // Add one to month.
      if (++next_call->month > 12)  {
         next_call->month = 1;
         ++next_call->year;
      }
      next_call->day -= days_per_month[next_call->month]
- 1;       // Roll over to proper day.
   }
// Adjust the day back to BCD.
   if (LoNibble( next_call->day ) > 0x9 || HiNibble(
next_call->day ) != HiNibble( old_day ))
      next_call->day += 6;

// Adjust the month to BCD.
   if (LoNibble( next_call->month ) > 0x9) next_call-
>month += 6;
```

```
// Adjust the year back to BCD.
   if (LoNibble( next_call->year ) > 0x9) next_call->year
+= 6;
   if (HiNibble( next_call->year ) > 0x9) next_call->year
= LoNibble( next_call->year );
}
*/

#define INCL_DOSNMPIPES
#include <os2.h>

#include <iostream.h>
#include <fstream.h>
#include <string.h>

#include <server.h>

#include "DBServer.H"

#include <usertype.h>
#include <DB_Objects.HPP>
#include <CTID.H>
#include <CTIMS.HPP>
#include <CTMessage.HPP>
#include <MessagePipe.HPP>

FLAG fProcessClientEvent( MessagePipe &Pipe, TStream
&MsgStream );

FLAG fProcessQueryCTIDStatus( MessagePipe &Pipe,
QueryCTIDStatusMsg &Status );
FLAG fProcessStoreMonitorEvent( MessagePipe &Pipe,
StoreMonitorEventMsg &MEvent );
FLAG fUpdateLicenseStatus( StoreMonitorEventMsg& );

// Helper functions.
FLAG _fCopyTStoDBVars( char *tsstring, short *indicator,
CTTimestamp &ts, STRING varname = "Timestamp" );

DataBase DB;

int main( int argc, char *argv[] )
{
   if (argc != 3)  {
      cout << "Usage: dbserver <database_name>
<pipe_name>" << endl;
   }

   DB.SetName( argv[1] );
   SvrMsgPipeFactory Factory( argv[2], 512, 10 );
   MessagePipe *pipe;

   if (!DB.fConnect())  {
```

```
        cout << "Unable to connect to " << argv[1] << "
    SQLCODE = " << (long)DB.ulSQLCode() << endl;
        return 1;
    }
    if (!Factory.fCreatePipe( pipe ))  {
        cout << "Unable to create pipe DosErrorCode = " <<
    Factory.rcDosErrorCode() << endl;
        return 2;
    }

    cout << "Waiting for pipe to connect to client..." <<
    endl;
    if (!pipe->fOpenPipe())  {
        cout << "Error connecting to the client
    DosErrorCode = " << pipe->rcDosErrorCode() << endl;
        return 2;
    }
    cout << "Pipe connected to client." << endl;

    TStream MsgStream;
    while (fProcessClientEvent( *pipe, MsgStream ))
MsgStream.Reset();
    pipe->fClosePipe();
    return 0;
}


FLAG fProcessClientEvent( MessagePipe &Pipe, TStream
&MsgStream )
{
    if (!Pipe.fGetMessage( MsgStream ))  {
        cout << "Error reading message from pipe
DosErrorCode = " << Pipe.rcDosErrorCode() << endl;
        return FALSE;
    }

    CTMessageHeader Header;
    MsgStream >> Header;
    switch (Header.eType())  {
        case QUERY_CTID_STATUS:
        {
            QueryCTIDStatusMsg StatusMsg( Header );
            MsgStream >> *(QueryCTIDStatus*)&StatusMsg;
            if (!fProcessQueryCTIDStatus( Pipe, StatusMsg ))
                cout << "Error in fProcessQueryCTIDStatus,
SQLCODE = " << (long)ulGetSQLCode() << endl;
        }
        break;
        case STORE_MONITOREVENT:
        {
            StoreMonitorEventMsg EventMsg( Header );
            MsgStream >> *(StoreMonitorEvent*)&EventMsg;
```

```
            if (!fProcessStoreMonitorEvent( Pipe, EventMsg
))  {
               cout << "Error in fProcessStoreMonitorEvent,
SQLCODE = " << (long)ulGetSQLCode() << endl;
            }
         }
         break;
      case CLI_QUIT:
         return FALSE;
      default:
         cout << "Unknown Command Received!" << endl;
         return FALSE;
   }
   return TRUE;
}

FLAG fProcessQueryCTIDStatus( MessagePipe &Pipe,
QueryCTIDStatusMsg &CTID )
{
   _CTlicense Rec;
   CTIDStatusResultMsg ResultMsg;

   if (!fXlatCliCTID( CTID.CTID, CTID.CTID ))  {
      cout << "Error converting client CTID to server
CTID" << endl;
      // Proccess error here.
   }

   ResultMsg.QueryResult = _fQueryLicense( &Rec,
CTID.CTID );

   if (!ResultMsg.QueryResult)  {
      ResultMsg.CTID                  = CTID.CTID;
      ResultMsg.Status                =
CTLicStatus::ACTIVE;
      ResultMsg.PeriodDays            = 2;
      ResultMsg.PeriodMinutes         = 0;
      ResultMsg.StolenFlag            = FALSE;
      ResultMsg.SpecialProcess        = 0;
      ResultMsg.Orgnum_n               .fSetNull();
      ResultMsg.LastCallTS_n           .fSetNull();
      ResultMsg.NextCallTS_n           .fSetNull();
      ResultMsg.NextCallClientTS_n     .fSetNull();
      ResultMsg.ProductType            .fSetNull();
   }
   else  {
      ResultMsg.CTID                  = Rec.CTID;
      ResultMsg.Status                = Rec.LicStatus;
      ResultMsg.PeriodDays            = Rec.PeriodDays;
      ResultMsg.PeriodMinutes         = Rec.PeriodMinutes;
      ResultMsg.StolenFlag            = Rec.StolenFlag ==
'Y';
```

```
      ResultMsg.SpecialProcess       = Rec.SpecialProcess;
      ResultMsg.LastCallTS_n           .Assign(
Rec.LastCallTS_N, DB_ISNULL( Rec.IsNull_LastCallTS ) );
      ResultMsg.NextCallTS_n           .Assign(
Rec.NextCallTS_N, DB_ISNULL( Rec.IsNull_NextCallTS ) );
      ResultMsg.NextCallClientTS_n     .Assign(
Rec.NextCallClientTS_N, DB_ISNULL(
Rec.IsNull_NextCallClientTS ) );
      if (DB_ISNULL( Rec.IsNull_Orgnum ))
         ResultMsg.Orgnum_n            .fSetNull();
      else
         ResultMsg.Orgnum_n            = Rec.Orgnum_N;
      ResultMsg.ProductType          = Rec.ProductType;
   }

   cout << "SQLCODE = " << (long)ulGetSQLCode() << endl;

// Return Query results.
   TStream Stream;
   Stream << ResultMsg;
   return Pipe.fSendMessage( Stream );
}

FLAG fProcessStoreMonitorEvent( MessagePipe &Pipe,
StoreMonitorEventMsg &Msg )
{
   StoreResultMsg ResultMsg;

// Prepare reply message.
   ResultMsg.Result = TRUE;

// Prepare the monitorevent data.
   _CTmonitorEvent Rec;

   if (!fXlatCliCTID( (ULONG&)Rec.CTID, Msg.CTID ))  {
      cout << "Error converting client CTID to server
CTID" << endl;
      // Proccess error here.
   }

   _fCopyTStoDBVars( Rec.ServerTS,  NULL,
Msg.ServerTS,  "ServerTS" );
   _fCopyTStoDBVars( Rec.ClientTS,  NULL,
Msg.ClientTS,  "ClientTS" );
   _fCopyTStoDBVars( Rec.TelcoTS_N, &Rec.IsNull_TelcoTS,
Msg.TelcoTS_n, "TelcoTS"  );

   Rec.DurationSec_N = Msg.DurationSec_n;
   Rec.IsNull_DurationSec = DB_NOT_NULL;

   if (!Msg.CallerID_n)  {
      Rec.IsNull_CallerID = DB_NULL;
```

```
    }
    else {
       Rec.IsNull_CallerID = DB_NOT_NULL;
       strncpy( Rec.CallerID_N, Msg.CallerID_n, sizeof(
Rec.CallerID_N ) );
    }

    Rec.LineNum = Msg.LineNum;

    if (!Msg.LogFlag)  {
       cout << "INVALID_DATA_ERROR: LogFlag is NULL,
defaulting to FALSE" << endl;
       Rec.LogFlag = 'N';
    }
    else  {
       Rec.LogFlag = ((STRING)Msg.LogFlag)[0];
    }

    strncpy( Rec.EnvironmentID, Msg.EnvironmentID, sizeof(
Rec.EnvironmentID ) );

    Rec.ErrorCnt = Msg.ErrorCnt;

// Update the License Record.
    if (!fUpdateLicenseStatus( Msg ))  {
       if (ulGetSQLCode() != 100)  {
          cout << "DB2_ERROR: Error updating License
Table, CliCTID = " << Msg.CTID
                << " SQLCODE = " << (long)ulGetSQLCode() <<
endl;
       }
    }

// Perform the insert.
    if (!_fInsertIntoMonitorEvent( &Rec ))  {
       ResultMsg.Result = FALSE;
    }
    else  {
       if (Msg.StoreAsStolen)  {
          if (!_fInsertIntoMonitorEventStolen( &Rec ))  {
             ResultMsg.Result = FALSE;
          }
       }
       if (Msg.StoreAsExpire)  {
          if (!_fInsertIntoMonitorEventExpired( &Rec ))  {
             ResultMsg.Result = FALSE;
          }
       }
    }

    cout << "SQLCODE = " << (long)ulGetSQLCode() << endl;

    TStream Stream;
```

```
   Stream << ResultMsg;
   if (Pipe.fSendMessage( Stream ) && ResultMsg.Result ==
TRUE)  {
      DB.Commit();
      return TRUE;
   }
   else  {
      DB.Rollback();
      return FALSE;
   }
}

FLAG fUpdateLicenseStatus( StoreMonitorEventMsg &Msg )
{
   _CTupdateLicenseStatus Rec;
   short dummy1;                 // Used to quiet the
Null validation below.

   fXlatCliCTID( (ULONG&)Rec.CTID, Msg.CTID );
   strncpy( Rec.Status, Msg.LicenseStatus, sizeof(
Rec.Status ) );

   _fCopyTStoDBVars( Rec.LastCallTS_N,        &dummy1,
Msg.ServerTS,             "LastCallTS"        );
   _fCopyTStoDBVars( Rec.NextCallTS_N,        &dummy1,
Msg.NextCallTS_n,         "NextCallTS"        );
   _fCopyTStoDBVars( Rec.NextCallClientTS_N, &dummy1,
Msg.NextCallClientTS_n, "NextCallClientTS" );

   if (!Msg.NextCallTS_n) strcpy( Rec.NextCallTS_N,
"0001-01-01-00.00.00.000000" );
   if (!Msg.NextCallClientTS_n) strcpy(
Rec.NextCallClientTS_N, "0001-01-01-00.00.00.000000" );

   return _fUpdateLicenseStatus( &Rec );
}

FLAG _fCopyTStoDBVars( char *tsstring, short *indicator,
CTTimestamp &ts, STRING varname )
{
   if (!ts)  {
      if (indicator == NULL)  {
         cout << "INVALID_DATA_ERROR: " << varname << "
is NULL, forcing validation" << endl;
         ts.ForceValidate();
      }
      else  {
         *indicator = DB_NULL;
         tsstring[0] = '\x0';
         return FALSE;
      }
```

```
    }
    else if (!ts.fValidate())  {
        cout << "INVALID_DATA_ERROR: " << varname << " is
invalid, forcing validation - " << ts << endl;
        ts.ForceValidate();
    }

    if (indicator != NULL) *indicator = DB_NOT_NULL;
    ts.ToSTRING( tsstring );
    return TRUE;
}


#define INCL_NOPMAPI               // no PM in this program
#define INCL_DOS
#define INCL_BSE
#define INCL_DOSSEMAPHORES
#define INCL_DOSNMPIPES
#include <os2.h>

#include <ctype.h>
#include <stdlib.h>
#include <iostream.h>
#include <fstream.h>

#include <server.h>

#include <MessagePipe.HPP>
#include <TModem.HPP>

#include "CT_Trans.H"

/*GLOBAL
VARIABLES*********************************************/

HEV hQuitSem;

// Temp, move to thread.
CltMsgPipeFactory *factory;
MessagePipe *pipe;

/**********************************************************
**/

FLAG fLoadLineThreads( TModem&, PCSZ, PCSZ );
void _Optlink CT_CommandThread( PVOID );
FLAG fParseCmd( TPort &Port, TConnectInfo *CnctInfo,
STRING buffer );

TPort::ComSettings ComSetting = {
    "COM1",         // port name
```

```
      0,              // not used
      38400,          // bps
      8,              // data bits
      TPort::NO,      // no parity
      TPort::ONE      // one stop bit
   };

   int main( int argc, char *argv[] )
   {
      APIRET rc;

      cout << "CompuTrace Server V0.99q" << endl;

   // Check arguments.
      if (argc != 4)  {
         cout << "Usage: server <pipe_name> <port_name>
   <init_string>" << endl << endl;
         return 0;
      }

   // Create quit semaphore.
      if ((rc = DosCreateEventSem( NULL, &hQuitSem, 0, FALSE
   )) != 0)
         return 1;

      factory = new CltMsgPipeFactory( argv[1], 512 );

   // Load port server threads.
      TPort Port;
      TModem Modem = Port;
      if (!fLoadLineThreads( Modem, argv[2], argv[3] ))
   return 2;

      cout << "Successfully connected to local modem" <<
   endl;

   // Wait for quit signal.
      DosWaitEventSem( hQuitSem, SEM_INDEFINITE_WAIT );

      return 0;
   }


   //
   // fLoadLineThreads: Loads the threads to operate a
   server line.  This function
   //                     should be called for each server
   line.
   //
   FLAG fLoadLineThreads( TModem &Modem, PCSZ port_str, PCSZ
   init_str )
   {
   // Start port log.
```

```
//   Port.LogOn();

// Open port.
   ComSetting.port_name = port_str;
   if (!Modem.Port().fOpenPort( ComSetting ))  {
      cout << "Error openning port" << endl;
      return FALSE;
   }

// Start the port manage thread.
   if (!Modem.Port().fStartManageThread())  {
      cout << "Thread execution error" << endl;
      return FALSE;
   }

// Initialize the modem.
   STRING result = Modem.strSendCommand( init_str, -1 );
   if (strcmp( result, "OK" ) != 0)  {
      cout << "Error initiallizing modem" << endl;
      return FALSE;
   }

// Connect pipe to dbserver.
   if (!factory->fCreatePipe( pipe )) return FALSE;
   if (!pipe->fOpenPipe()) return FALSE;

// Start the command thread.
   if (!Modem.Port().fStartCommandThread(
CT_CommandThread, (PVOID)&Modem ))  {
      cout << "Thread execution error" << endl;
      Modem.Port().KillManageThread();
      return FALSE;
   }

   return TRUE;
}

//
// CT_CommandThread: Processes incoming data from a
server line.
//
void _Optlink CT_CommandThread( PVOID ptr )
{
   TModem &Modem = *(TModem*)ptr;          // Alias
(should be optimized out by the compiler).

// Thread local variables
   STRING result;
   TConnectInfo cnct_info;

   while (TRUE)  {
      result = Modem.strGetString( -1 );
```

```
      // Parse buffer for cmd.
         if (!fParseCmd( Modem.Port(), &cnct_info, result ))
   {
            memset( (PVOID)&cnct_info, '\x0', sizeof
   cnct_info );
         }
      }
   }

   #define CND_DATE_FIELD      "DATE ="
   #define CND_TIME_FIELD      "TIME ="
   #define CND_NUMBER_FIELD    "NMBR ="

   #define CND_NONUM_FIELD     "REASON FOR NO NUMBER:"
   #define CND_NAME_FIELD      "CALLER NAME:"
   #define CND_NONAME_FIELD    "REASON FOR NO NAME:"

   //
   // fParseCmd: called when a '\n' has been received, this
   function will process the string.
   //             Returns TRUE if a transaction is occuring,
   FALSE if the buffers should be cleared.
   //

   FLAG fParseCmd( TPort &Port, TConnectInfo *cnct_info,
   STRING buffer )
   {
      const char *index;

   // Parse command.
      if (strstr( buffer, "RING" ) != NULL)  {
         cout << "Command parsed as RING" << endl;
      }
      else if ((index = strstr( buffer, CND_DATE_FIELD )) !=
   NULL)  {
         index += sizeof CND_DATE_FIELD;
         while (!isdigit( *index )) index++;
      // Grab the month.
         if (!isdigit( *index ) || !isdigit( *(index+1) ))
   return FALSE;
         cnct_info->cnd.month = (*index++ - '0') * 10;
         cnct_info->cnd.month += *index++ - '0';
      // Grab the day.
         if (!isdigit( *index ) || !isdigit( *(index+1) ))
   return FALSE;
         cnct_info->cnd.day = (*index++ - '0') * 10;
         cnct_info->cnd.day += *index++ - '0';

         cout << buffer << endl;
      }
      else if ((index = strstr( buffer, CND_TIME_FIELD )) !=
   NULL)  {
         index += sizeof CND_TIME_FIELD;
```

```
      while (!isdigit( *index )) index++;
   // Grab the hour.
      if (!isdigit( *index ) || !isdigit( *(index+1) ))
return FALSE;
      cnct_info->cnd.hour = (*index++ - '0') * 10;
      cnct_info->cnd.hour += *index++ - '0';
   // Grab the minute.
      if (!isdigit( *index ) || !isdigit( *(index+1) ))
return FALSE;
      cnct_info->cnd.minute = (*index++ - '0') * 10;
      cnct_info->cnd.minute += *index++ - '0';

      cout << buffer << endl;
   }
   else if ((index = strstr( buffer, CND_NUMBER_FIELD ))
!= NULL)  {
      index += sizeof CND_NUMBER_FIELD;
      while (isspace( *index )) index++;
   // Grab the number.
      for (int i = 0; i < CND_NUM_MAXLEN; i++)  {
         if (index[i] == '\x0' || index[i] == '\r')  {
            cnct_info->cnd.number[i] = '\x0';
            break;
         }
         else  {
            cnct_info->cnd.number[i] = index[i];
         }
      }
      cout << buffer << endl;
   }
   else if (strstr( buffer, CND_NONUM_FIELD ) != NULL)  {
      index += sizeof CND_NONUM_FIELD;
   // Grab the string.
      while (isspace( *index )) index++;
      for (int i = 0; i < CND_NUM_MAXLEN; i++)  {
         if (index[i] == '\x0' || index[i] == '\r') {
            cnct_info->cnd.number[i] = '\x0';
            break;
         }
         else  {
            cnct_info->cnd.number[i] = index[i];
         }
      }

      cout << buffer << endl;
   }
   else if (strstr( buffer, CND_NAME_FIELD ) != NULL)  {
      index += sizeof CND_NAME_FIELD;
   // Grab the name.
      while (isspace( *index )) index++;
      for (int i = 0; i < CND_NAME_MAXLEN; i++)  {
         if (index[i] == '\x0' || index[i] == '\r') {
            cnct_info->cnd.name[i] = '\x0';
```

```
            break;
         }
         else  {
            cnct_info->cnd.name[i] = index[i];
         }
      }

      cout << buffer << endl;
   }
   else if (strstr( buffer, CND_NONAME_FIELD ) != NULL)
{
      index += sizeof CND_NONAME_FIELD;
   // Grab the string.
      while (isspace( *index )) index++;
      for (int i = 0; i < CND_NAME_MAXLEN; i++)   {
         if (index[i] == '\x0' || index[i] == '\r')   {
            cnct_info->cnd.name[i] = '\x0';
            break;
         }
         else  {
            cnct_info->cnd.name[i] = index[i];
         }
      }

      cout << buffer << endl;
   }
   else if (strstr( buffer, "CONNECT" ) != NULL)   {
      cout << "Command parsed as CONNECT" << endl;

      SntlConnect( Port, *pipe, cnct_info );
      return FALSE;
   }
   else if (strstr( buffer, "NO CARRIER" ) != NULL)   {
      cout << "Command parsed as NO CARRIER" << endl;
      return FALSE;
   }
   else if (strstr( buffer, "OK" ) != NULL)   {
      cout << "Command parsed as OK" << endl;
      return FALSE;
   }
   else if (strstr( buffer, "ERROR" ) != NULL)   {
      cout << "Command parsed as ERROR" << endl;
      return FALSE;
   }
   else  {
      cout << "Unknown command received: " << buffer <<
endl;
      return FALSE;
   }
   return TRUE;
}

#include <CTIMS.HPP>
```

```
//======================================================
====================
//
// CTStatus friends and members.
//
CTStatus::CTStatus()
{
   memset( value, ' ', sizeof( value ) );
}

CTStatus::CTStatus( STRING str )
{
   ASSERT( strlen( str ) < sizeof( value ) );
   memcpy( value, str, strlen( str ) );
}


const char CTLicStatus::STR_SET[][CT_TOK_SIZE+1] = {
            UNUSED_TOK,
            NOTEST_TOK,
            ACTIVE_TOK,
            EXPIRED_TOK
};


CTLicStatus& CTLicStatus::operator = ( STRING str )
{
   for (int i = 0; i <= EXPIRED; i++)  {
      if (strcmp( STR_SET[i], str ) == NULL)  {
         setNotNull();
         value = VALUE( i );
         return *this;
      }
   }
   ASSERT( FALSE );                // No match was found
for the string.
   return *this;
}

/***********************
FLAG CTOrgnum::fSetPrefix( STRING str )
{
   if (strlen( str ) != ORGNUM_PREFIX_SIZE)  {
      return FALSE;
   }
   else  {
      value[0] = str[0];
      value[1] = str[1];
      value[2] = str[2];
      value[3] = str[3];
      return TRUE;
   }
```

```
}
FLAG CTOrgnum::fSetIndex( UINT num )
{
   if (num > 9999)  {
      return FALSE;
   }
   else  {
      value[ORGNUM_PREFIX_SIZE + 0] = (num%10000) / 1000
+ '0';
      value[ORGNUM_PREFIX_SIZE + 1] = (num%1000) / 100 +
'0';
      value[ORGNUM_PREFIX_SIZE + 2] = (num%100) / 10 +
'0';
      value[ORGNUM_PREFIX_SIZE + 3] = (num % 10) + '0';
   }
}
FLAG CTOrgnum::fGetPrefix( char *str ) const
{
   if (strlen( str ) != ORGNUM_PREFIX_SIZE)  {
      return FALSE;
   }
   else  {
      str[0] = value[0];
      str[1] = value[1];
      str[2] = value[2];
      str[3] = value[3];
      str[4] = '\x0';
   }
}
FLAG CTOrgnum::fGetIndex( UINT &i ) const
{
   i = atoi( &(value[ORGNUM_PREFIX_SIZE]) );
   return TRUE;
}
FLAG CTOrgnum::fGeneratePrefix( STRING org_name )
{
   char pre[ORGNUM_PREFIX_SIZE];

// Grab first four alphanum characters.
   for (int i = 0, j = 0; i < ORGNUM_PREFIX_SIZE;)  {
      if (isalnum( orgname[j++] )) pre[i];
   }
}
**********************/

//*********************************************************
**********************
//
// iostream stream operators.
```

```
//
ostream& operator <<( ostream &os, const CTStatus &status
)
{
   return os << (STRING)status;
}

//*****************************************************
*********************
//
// TStream stream operators.
//
TStream& operator << ( TStream &buf, const CTStatus
&status )
{
   buf << *(TNull*)&status;
   if (!status) return buf;
   else return buf.Put( PVOID( status.value ), sizeof(
status.value ) );
}

TStream& operator >> ( TStream &buf, CTStatus &status )
{
   buf >> *(TNull*)&status;
   if (!status) return buf;
   else return buf.Get( status.value, sizeof(
status.value ) );
}

TStream& operator << ( TStream &buf, const CTCallerID &id
)
{
   buf << *(TNull*)&id;
   if (!id) return buf;
   else return buf.Put( PVOID( id.value ), sizeof(
id.value ) );
}

TStream& operator >> ( TStream &buf, CTCallerID &id )
{
   buf >> *(TNull*)&id;
   if (!id) return buf;
   else return buf.Get( id.value, sizeof( id.value ) );
}

TStream& operator << ( TStream &buf, const CTLicStatus
&lic )
{
   buf << *(TNull*)&lic;
   if (!lic) return buf;
   else return buf << USHORT( lic.value );
}
```

```
TStream& operator >> ( TStream &buf, CTLicStatus &lic )
{
   USHORT num;

   buf >> *(TNull*)&lic;
   if (!lic) return buf;
   else  {
      buf >> num;
      lic.value = CTLicStatus::VALUE( num );
      return buf;
   }
}

TStream& operator << ( TStream &buf, const CTOrgnum &num
)
{
   buf << *(TNull*)&num;
   if (!num) return buf;
   else return buf.Put( PVOID( num.value ), sizeof(
num.value ) );
}

TStream& operator >> ( TStream &buf, CTOrgnum &num )
{
   buf >> *(TNull*)&num;
   if (!num) return buf;
   else return buf.Get( num.value, sizeof( num.value ) );
}


TStream& operator << ( TStream &buf, const CTMonitorEvent
&event )
{
   return buf << event.CTID
              << event.ServerTS
              << event.ClientTS
              << event.TelcoTS_n
              << event.DurationSec_n
              << event.CallerID_n
              << event.LineNum
              << event.LogFlag
              << event.EnvironmentID
              << event.ErrorCnt;
}

TStream& operator >> ( TStream &buf, CTMonitorEvent
&event )
{
   return buf >> event.CTID
              >> event.ServerTS
              >> event.ClientTS
              >> event.TelcoTS_n
              >> event.DurationSec_n
```

```
                    >> event.CallerID_n
                    >> event.LineNum
                    >> event.LogFlag
                    >> event.EnvironmentID
                    >> event.ErrorCnt;
}


#include <CTMessage.HPP>

//**********************************************************
**********************
//
// TStream stream operators.
//
TStream& operator << ( TStream &buf, const
CTMessageHeader &head )
{
   return buf << head.ID << head.Type << head.Len;
}

TStream& operator >> ( TStream &buf, CTMessageHeader
&head )
{
   buf >> head.ID;
   buf >> head.Type;
   buf >> head.Len;

   return buf;
}

#define INCL_NOPMAPI            // no PM in this program
#define INCL_DOS
#define INCL_BSE
#define INCL_DOSSEMAPHORES
#define INCL_DOSNMPIPES
#include <os2.h>

#include "CT_Buffer.HPP"

CT_Buffer::CT_Buffer()
   :  head( 0 ),
      tail( CT_BUFFER_MAXLEN )
{
// Create the mutex sem.
   rc = DosCreateMutexSem( NULL, &hBufSem, 0, 0 );
   if (rc)  {}

// Create the event sem.
   rc = DosCreateEventSem( NULL, &hReleaseGetSem, 0, 0 );
}
```

```
CT_Buffer::~CT_Buffer()
{
   DosCloseMutexSem( hBufSem );
}

void CT_Buffer::Flush()
{
   ULONG post_count;

   DosRequestMutexSem( hBufSem, SEM_INDEFINITE_WAIT );
   head = 0;
   tail = CT_BUFFER_MAXLEN;
   DosResetEventSem( hReleaseGetSem, &post_count );
   DosReleaseMutexSem( hBufSem );
}

FLAG CT_Buffer::fPutChar( char ch )
{
   FLAG ret_val;

// Get ownership of the semaphore.
   rc = DosRequestMutexSem( hBufSem, SEM_INDEFINITE_WAIT
);
   if (rc) return FALSE;

// First check that the log buffer hasn't overflown.
   if (!fIsFull()) {
   // Store the char, update head, signal the event.
      buffer[head] = ch;
      head = IncBufPtr( head );
      DosPostEventSem( hReleaseGetSem );
      ret_val = TRUE;
   }
   else ret_val = FALSE;

// Release the semaphore.
   DosReleaseMutexSem( hBufSem );

   return ret_val;
}

FLAG CT_Buffer::fGetChar( char &ch )
{
   ULONG post_count;
   FLAG ret_val;

// If empty wait for timeout.
   if (fIsEmpty()) DosWaitEventSem( hReleaseGetSem,
SEM_INDEFINITE_WAIT );

// Get ownership of the semaphore.
   rc = DosRequestMutexSem( hBufSem, SEM_INDEFINITE_WAIT
);
```

```
   if (rc) return FALSE;

   if (!fIsEmpty())  {
   // Fetch the char, update tail.
      tail = IncBufPtr( tail );
      ch = buffer[tail];
      ret_val = TRUE;
   }
   else ret_val = FALSE;

   DosResetEventSem( hReleaseGetSem, &post_count );

// Release the semaphore.
   DosReleaseMutexSem( hBufSem );

   return ret_val;
}

#define INCL_NOPMAPI              // no PM in this program
#define INCL_DOS
#define INCL_BSE
#define INCL_DOSSEMAPHORES
#define INCL_DOSNMPIPES
#include <os2.h>

#include "CT_Log.HPP"

#include <fstream.h>

CT_Log::CT_Log( UINT len )
   : buf_len( len ),
     index( 0 )
{
   if ((buffer = new BYTE[buf_len]) == NULL)  {
      buf_len = index = 0;
   }
}

CT_Log::~CT_Log()
{
   if (buffer) DosFreeMem( buffer );
}

BOOL CT_Log::fPostChar( char ch )
{
// First check that the log buffer hasn't overflown.
   if (!fIsFull())  {
   // Store the char, update head.
      buffer[index++] = ch;
      return TRUE;
   }
   else return FALSE;
```

```
}

BOOL CT_Log::fDumpLog( const char *fname )
{
   fstream dump;

   dump.open( fname, ios::out );
   if (!dump) return FALSE;
   dump.write( buffer, index );
   dump.close();

   return TRUE;
}

#define INCL_DOSNMPIPES
#include <os2.h>

#include <MessagePipe.HPP>

//*******************************************************
**********************
// SvrMsgPipeFactory Implementation.
//*******************************************************
**********************

SvrMsgPipeFactory::SvrMsgPipeFactory( PCSZ name, UINT
msg_len, UINT pipe_len )
   : MsgPipeFactory( msg_len ),
      pipe_name( name ),
      pipe_len( pipe_len )
{}

FLAG SvrMsgPipeFactory::fCreatePipe( MessagePipe *&ppipe
)
{
   ppipe = new MessagePipe( this );

   return TRUE;
}

FLAG SvrMsgPipeFactory::fDestroyPipe( MessagePipe *ppipe
)
{
   delete ppipe;

   return TRUE;
}

FLAG SvrMsgPipeFactory::fOpenPipe( MessagePipe *pipe )
{
   HPIPE hPipe;

// Create and connect the named pipe.
```

```
   pipe->rc = DosCreateNPipe( (PSZ)pipe_name, &hPipe,
                            NP_NOWRITEBEHIND |              //
Data sent to remote pipes immediatly.
                            NP_ACCESS_DUPLEX,               //
Two-way client/server communications.
                            NP_WAIT |                       //
I/O to pipe blocked until data avaliable.
                            NP_TYPE_MESSAGE |               //
Message pipe type.
                            NP_READMODE_MESSAGE |           //
Messafe read mode type.
                            0x00FF,                         //
Infinite number of allowed instances of this pipe.
                            (uMaxMsgLen() + 2) * pipe_len,//
Size of output buffer.
                            (uMaxMsgLen() + 2) * pipe_len,//
Size of input buffer.
                            0                               //
Client open timeout (see DosWaitNPipe).
                          );
   if (pipe->rc) return FALSE;

   pipe->rc = DosConnectNPipe( hPipe );
   if (pipe->rc) return FALSE;

   pipe->SetHandle( hPipe );
   return TRUE;
}

FLAG SvrMsgPipeFactory::fClosePipe( MessagePipe *pipe )
{
   HPIPE hPipe = pipe->GetHandle();

// Wait till the pipe is empty.
   pipe->rc = DosResetBuffer( hPipe );
   if (pipe->rc) return FALSE;
// Disconnect the pipe handle.
   pipe->rc = DosDisConnectNPipe( hPipe );
   if (pipe->rc) return FALSE;

   return TRUE;
}

//*********************************************************
**********************
// CltMsgPipeFactory Implementation.
//*********************************************************
**********************

CltMsgPipeFactory::CltMsgPipeFactory( PCSZ name, UINT
msg_len )
    :  MsgPipeFactory( msg_len ),
       pipe_name( name )
```

```
{}

FLAG CltMsgPipeFactory::fCreatePipe( MessagePipe *&ppipe
)
{
   ppipe = new MessagePipe( this );

   return TRUE;
}

FLAG CltMsgPipeFactory::fDestroyPipe( MessagePipe *ppipe
)
{
   delete ppipe;

   return TRUE;
}

FLAG CltMsgPipeFactory::fOpenPipe( MessagePipe *pipe )
{
   HPIPE hPipe;
   ULONG ulAction;

   pipe->rc = DosOpen( pipe_name, &hPipe, &ulAction, 0,
                  FILE_NORMAL, FILE_OPEN,
                  OPEN_ACCESS_READWRITE |
OPEN_SHARE_DENYNONE,
                  (PEAOP2)NULL );
   if (pipe->rc) return FALSE;

   pipe->SetHandle( hPipe );
   return TRUE;
}

FLAG CltMsgPipeFactory::fClosePipe( MessagePipe *pipe )
{
   HPIPE hPipe = pipe->GetHandle();

// Wait till the pipe is empty.
   pipe->rc = DosResetBuffer( hPipe );
   if (pipe->rc) return FALSE;
// Close the pipe handle.
   rc = DosClose( hPipe );
   if (pipe->rc) return FALSE;

   return TRUE;
}

//**********************************************************
**********************
// MessagePipe Implementation
//**********************************************************
**********************
```

```
MessagePipe::MessagePipe( MsgPipeFactory *mom )
   :  factory( mom )
{
   factory->InitPipe( this );
}

MessagePipe::~MessagePipe()
{
   factory->DeinitPipe( this );
}

FLAG MessagePipe::fOpenPipe()
{
   return factory->fOpenPipe( this );
}

FLAG MessagePipe::fClosePipe()
{
   return factory->fClosePipe( this );
}

FLAG MessagePipe::fSendMessage( PCVOID msg, ULONG msg_len
)
{
   ULONG cbWritten;

   rc = DosWrite( hPipe, (PVOID)msg, msg_len, &cbWritten
);

   return (rc == 0 && msg_len == cbWritten) ? TRUE :
FALSE;
}

FLAG MessagePipe::fGetMessage( PVOID msg, PULONG msg_len
)
{
//   PRECONDITION( msg_len != 0 && *msg_len <=
uMaxMsgLen() );

   rc = DosRead( hPipe, msg, *msg_len, msg_len );

   return (rc == 0) ? TRUE : FALSE;
}

FLAG MessagePipe::fTransact( PCVOID out_msg, ULONG
out_msg_len, PVOID in_msg, PULONG in_msg_len )
{
//   PRECONDITION( in_msg_len != 0 && *in_msg_len <=
uMaxMsgLen() );

   rc = DosTransactNPipe( hPipe, (PVOID)out_msg,
out_msg_len, in_msg, *in_msg_len, in_msg_len );
```

```
   return (rc == 0) ? TRUE : FALSE;
}

MessagePipe::PIPE_STATE MessagePipe::eState()
{
   ULONG cbRead;
   AVAILDATA avail;
   ULONG state;

// Use DosPeekNPipe to find the state of the pipe.
   rc = DosPeekNPipe( hPipe, NULL, 0, &cbRead, &avail,
&state );

   return (PIPE_STATE)state;
}

#ifdef __OS2__
   #define INCL_DOSDATETIME
   #include <os2.h>
#endif

#include <ctype.h>

#include <Objects.HPP>

//**********************************************************
**********************
//
// TFlag members.
//

TFlag::TFlag()
   :  TNull( TRUE )
{}

TFlag::TFlag( FLAG flag )
   :  value( (flag != FALSE) ),
      TNull( FALSE )
{}

TFlag::~TFlag()
{
   #ifdef DEBUG
      fSetNull();
      value = UNINIT_DATA;
   #endif
}

//**********************************************************
**********************
//
// TTimestamp members.
//
```

```
const UINT TTimestamp::TSStringLen = 27;

TTimestamp::TTimestamp()
   : TNull( TRUE )
{
   #ifdef DEBUG
      Year = Month = Day = Hour = Minute = Second =
Millisec = UNINIT_DATA;
   #endif
}

TTimestamp::TTimestamp(  USHORT yr, UCHAR mo, UCHAR dy,
                         UCHAR hr, UCHAR mn, UCHAR sc,
USHORT ms )
   :  Year( yr ),
      Month( mo ),
      Day( dy ),
      Hour( hr ),
      Minute( mn ),
      Second( sc ),
      Millisec( ms ),
      TNull( FALSE )
{}

TTimestamp::~TTimestamp()
{
   #ifdef DEBUG
      fSetNull();
      Year = Month = Day = Hour = Minute = Second =
Millisec = UNINIT_DATA;
   #endif
}

FLAG TTimestamp::fValidate() const
{
   if (fIsNull()) return FALSE;

// Check year.
   if (!Year || Year > 9999) return FALSE;
// Check month and day.
   if (!Day) return FALSE;
   switch (Month)  {
      case 1:
         if (Day > 31) return FALSE;
         break;
      case 2:
         if (Year % 4 == 0 && Year % 100 != 0)         //
Check for a leapyear.
            if (Day > 29) return FALSE;
         else
            if (Day > 28) return FALSE;
         break;
      case 3:
```

```
            if (Day > 31) return FALSE;
            break;
         case 4:
            if (Day > 30) return FALSE;
            break;
         case 5:
            if (Day > 31) return FALSE;
            break;
         case 6:
            if (Day > 30) return FALSE;
            break;
         case 7:
            if (Day > 31) return FALSE;
            break;
         case 8:
            if (Day > 31) return FALSE;
            break;
         case 9:
            if (Day > 30) return FALSE;
            break;
         case 10:
            if (Day > 31) return FALSE;
            break;
         case 11:
            if (Day > 30) return FALSE;
            break;
         case 12:
            if (Day > 31) return FALSE;
            break;
         default:
            return FALSE;
      }
   // Check hours.
      if (Hour > 23)  {
         if (Hour > 24 || Minute || Second || Millisec)
   return FALSE;
      }
   // Check minutes, seconds and milliseconds.
      if (Minute > 59 || Second > 59 || Millisec > 999)
   return FALSE;

      return TRUE;
   }

   void TTimestamp::ForceValidate()
   {
      setNotNull();
      Year = Month = Day = 1;
      Hour = Minute = Second = Millisec = 0;
   }

   FLAG TTimestamp::fIsValidTSString( STRING ts )
   {
```

```
  if (      isdigit( ts[0] )              // Check Year.
         && isdigit( ts[1] )
         && isdigit( ts[2] )
         && isdigit( ts[3] )
         && ts[4] == '-'
         && isdigit( ts[5] )              // Check Month.
         && isdigit( ts[6] )
         && ts[7] == '-'
         && isdigit( ts[8] )              // Check Day.
         && isdigit( ts[9] )
         && ts[10] == '-'
         && isdigit( ts[11] )             // Check Hour.
         && isdigit( ts[12] )
         && ts[13] == '.'
         && isdigit( ts[14] )             // Check Minute.
         && isdigit( ts[15] )
         && ts[16] == '.'
         && isdigit( ts[17] )             // Check Second.
         && isdigit( ts[18] )
         && ts[19] == '.'
         && isdigit( ts[20] )             // Check Millisec.
         && isdigit( ts[21] )
         && isdigit( ts[22] )
         && isdigit( ts[23] )
         && isdigit( ts[24] )
         && isdigit( ts[25] )
         && ts[26] == '\x0')
      return TRUE;
   else return FALSE;
}

TTimestamp& TTimestamp::Assign( const TTimestamp &ts )
{
   if (!ts)  {
      fSetNull();
   }
   else  {
      setNotNull();
      Year = ts.Year;
      Month = ts.Month;
      Day = ts.Day;
      Hour = ts.Hour;
      Minute = ts.Minute;
      Second = ts.Second;
      Millisec = ts.Millisec;
   }
   return (*this);
}

TTimestamp& TTimestamp::Assign( USHORT yr, UCHAR mo,
UCHAR dy,
                                UCHAR hr, UCHAR mn, UCHAR
sc, USHORT ms )
```

```
{
   setNotNull();

   Year = yr;
   Month = mo;
   Day = dy;
   Hour = hr;
   Minute = mn;
   Second = sc;
   Millisec = ms;

   return (*this);
}

TTimestamp& TTimestamp::Assign( STRING ts, FLAG isnull )
{
   unsigned num;

   if (isnull)  {
      fSetNull();
      return *this;
   }

   setNotNull();

   ASSERT( fIsValidTSString( ts ) );

/* Convert year */
   num =  (ts[0] - '0') * 1000;
   num += (ts[1] - '0') * 100;
   num += (ts[2] - '0') * 10;
   num += (ts[3] - '0');
   Year = USHORT( num );
/* Convert month */
   num =  (ts[5] - '0') * 10;
   num += (ts[6] - '0');
   Month = UCHAR( num );
/* Convert day */
   num =  (ts[8] - '0') * 10;
   num += (ts[9] - '0');
   Day = UCHAR( num );
/* Convert hour */
   num =  (ts[11] - '0') * 10;
   num += (ts[12] - '0');
   Hour = UCHAR( num );
/* Convert minute */
   num =  (ts[14] - '0') * 10;
   num += (ts[15] - '0');
   Minute = UCHAR( num );
/* Convert second */
   num =  (ts[17] - '0') * 10;
   num += (ts[18] - '0');
   Second = UCHAR( num );
```

```
/* Convert millisec */
   num =  (ts[20] - '0') * 100;
   num += (ts[21] - '0') * 10;
   num += (ts[22] - '0');
   Millisec = USHORT( num );

   return *this;
}

#ifdef __OS2__
TTimestamp& TTimestamp::Assign( const DATETIME &Date )
{
   setNotNull();

   Year = Date.year;
   Month = Date.month;
   Day = Date.day;
   Hour = Date.hours;
   Minute = Date.minutes;
   Second = Date.seconds;
   Millisec = Date.hundredths * 10;

   return (*this);
}
#endif // __OS2__

STRING TTimestamp::ToSTRING( char *ts ) const
{
   unsigned num;

/* Convert year */
   num = Year;
   ts[0] = (num%10000) / 1000 + '0';
   ts[1] = (num%1000) / 100 + '0';
   ts[2] = (num%100) / 10 + '0';
   ts[3] = (num % 10) + '0';
   ts[4] = '-';
/* Convert month */
   num = Month;
   ts[5] = (num%100) / 10 + '0';
   ts[6] = (num % 10) + '0';
   ts[7] = '-';
/* Convert day */
   num = Day;
   ts[8] = (num%100) / 10 + '0';
   ts[9] = (num % 10) + '0';
   ts[10] = '-';
/* Convert hour */
   num = Hour;
   ts[11] = (num%100) / 10 + '0';
   ts[12] = (num % 10) + '0';
   ts[13] = '.';
/* Convert minute */
```

```
   num = Minute;
   ts[14] = (num%100) / 10 + '0';
   ts[15] = (num % 10) + '0';
   ts[16] = '.';
/* Convert second */
   num = Second;
   ts[17] = (num%100) / 10 + '0';
   ts[18] = (num % 10) + '0';
   ts[19] = '.';
/* Convert millisec */
   num = Millisec;
   ts[20] = (num%1000) / 100 + '0';
   ts[21] = (num%100) / 10 + '0';
   ts[22] = (num % 10) + '0';
   ts[23] = '0';
   ts[24] = '0';
   ts[25] = '0';

   ts[26] = '\x0';

   return ts;
}

FLAG TTimestamp::operator >  ( const TTimestamp &ts )
const
{
   useAsValue();

   if (Year > ts.Year) return TRUE;
   else if (Year == ts.Year)  {
      if (Month > ts.Month) return TRUE;
      else if (Month == ts.Month)  {
         if (Day > ts.Day) return TRUE;
         else if (Day == ts.Day)  {
            if (Hour > ts.Hour) return TRUE;
            else if (Hour == ts.Hour)  {
               if (Minute > ts.Minute) return TRUE;
               else if (Minute == ts.Minute)  {
                  if (Second > ts.Second) return TRUE;
                  else if (Second == ts.Second)  {
                     if (Millisec > ts.Millisec) return
TRUE;
                     else return FALSE;
                  }
               }
            }
         }
      }
   }
   return FALSE;
}
```

```
FLAG TTimestamp::operator >= ( const TTimestamp &ts )
const
{
   return (*this > ts || *this == ts);
}

FLAG TTimestamp::operator == ( const TTimestamp &ts )
const
{
   useAsValue();

   if (Year == ts.Year &&
       Month == ts.Month &&
       Day == ts.Day &&
       Hour == ts.Hour &&
       Minute == ts.Minute &&
       Second == ts.Second &&
       Millisec == ts.Millisec)  {
      return TRUE;
   }
   else  {
      return FALSE;
   }
}

// Date and time add function.
TTimestamp& TTimestamp::AddToDate( UINT yr, UINT mon,
UINT day,
                                   UINT hr, UINT min,
UINT sec, UINT ms )
{
   if (!fIsNull())  {
      ms  += Millisec;
      sec += Second;
      min += Minute;
      hr  += Hour;
      day += Day;
      mon += Month;
      yr  += Year;
   }

// Adjust and carry ms.
   while (ms > usMaxMillisec())  {
      ms -= usMaxMillisec() + 1;
      sec++;
   }
// Adjust and carry sec.
   while (sec > usMaxSecond())  {
      sec -= usMaxSecond() + 1;
      min++;
   }
// Adjust and carry min.
   while (min > usMaxMinute())  {
```

```
        min -= usMaxMinute() + 1;
        hr++;
     }
  // Adjust and carry hr.
     while (hr > usMaxHour())  {
        hr -= usMaxHour() + 1;
        day++;
     }
  // Adjust and carry mon (day adjust is dependent on mon
  and yr).
     while (mon > usMaxMonth())  {
        mon -= usMaxMonth();
        yr++;
     }
  // Now adjust and carry day now that yr and mon is known.
     while (day > usMaxDay( yr, mon ))  {
        day -= usMaxDay( yr, mon );
        mon++;
        if (mon > usMaxMonth())  {
           mon -= usMaxMonth();
           yr++;
        }
     }

  // Copy new values to members.

     Assign( yr, mon, day, hr, min, sec, ms );

     CHECK( fValidate() );
     return *this;
  }

  // static member.
  USHORT TTimestamp::usMaxDay( USHORT year, USHORT month )
  {
     switch (month)  {
        case 1:               // Jan.
           return 31;

        case 2:               // Feb.
           return fIsLeapYear( year ) ? 29 : 28;

        case 3:               // Mar.
           return 31;

        case 4:               // Apr.
           return 30;

        case 5:               // May.
           return 31;

        case 6:               // Jun.
           return 30;
```

```
        case 7:              // Jul.
           return 31;

        case 8:              // Aug.
           return 31;

        case 9:              // Sep.
           return 30;

        case 10:             // Oct.
           return 31;

        case 11:             // Nov.
           return 30;

        case 12:             // Dec.
           return 31;

//      default:
//         BOILERPLATE;
   }
}

//**********************************************************
**********************
//
// TStream stream operators.
//
TStream& operator << ( TStream &buf, const TFlag &flag )
{
   if (!flag) return buf << FLAG( TRUE );
   else return buf << FLAG( FALSE ) << flag.value;
}

TStream& operator >> ( TStream &buf, TFlag &flag )
{
   buf >> *(TNull*)&flag;
   if (flag.fIsNull() == FALSE)
      buf >> flag.value;
   return buf;
}

TStream& operator << ( TStream &buf, const TTimestamp &ts
)
{
   if (!ts) return buf << FLAG( TRUE );
   else  {
      return buf << FLAG( FALSE )
                 << ts.Year
                 << ts.Month
                 << ts.Day
                 << ts.Hour
                 << ts.Minute
```

```
                    << ts.Second
                    << ts.Millisec;
   }
}

TStream& operator >> ( TStream &buf, TTimestamp &ts )
{
   buf >> *(TNull*)&ts;
   if (!ts)  {
      return buf;
   }
   else  {
      return buf >> ts.Year
                 >> ts.Month
                 >> ts.Day
                 >> ts.Hour
                 >> ts.Minute
                 >> ts.Second
                 >> ts.Millisec;
   }
}

//*******************************************************
**********************
//
// iostream friend function members.
//

ostream& operator << ( ostream &os, const TFlag &flag )
{
   if (!flag) return os << NULL_TOK;
   else return os << (STRING)flag;
}

/********************
istream& operator << ( istream &is, TFlag &flag )
{
   char ch, buffer[12];

   is >> ws;                           // Extract leading
whitespace.

   for (int i = 0; i < sizeof( buffer ); i++)  {
      is >> buffer[i];
      if (!isalpha( buffer[i] )) break;
   }
   if (i == sizeof( buffer ) ASSERT( FALSE );

   buffer[i] = '\x0';

   if (strcmp( buffer, NULL_TOK) == 0)  {
      fSetNull();
   }
```

```
   else if (strcmp( buffer, TRUE_TOK) == 0)  {
      Assign( TRUE );
   }
   else if (strcmp( buffer, FALSE_TOK) == 0)  {
      Assign( FALSE );
   }
   else ASSERT( FALSE );

   return is;
}
*********************/

ostream& operator << ( ostream &os, const TTimestamp &ts
)
{
   char tsstring[TTimestamp::TSStringLen];
   if (!ts) return os << "NULL";
   else return os << ts.ToSTRING( tsstring );
}


#define INCL_NOPMAPI              // no PM in this program
#define INCL_DOS
//#define INCL_BSE
//#define INCL_DOSSEMAPHORES
#include <os2.h>

#include <usertype.h>
#include <TModem.HPP>

TModem::TModem( TPort &_port )
   : port( _port )
{}

TModem::RC TModem::rcSendCommand( STRING, ULONG timeout )
{
   NOTIMPLEMENTED;
}

STRING TModem::strSendCommand( STRING str, ULONG timeout
)
{
   port.fWritePort( str );
   port.fPutChar( '\r' );
   STRING result = strGetString( timeout );
   if (strcmp( str, result ) == 0)  {
      return strGetString( timeout );
   }
   else  {
      return result;
   }
}
```

```
STRING TModem::strGetString( ULONG timeout )
{
   UINT i = 0;
   last_result[0] = '\x0';

// Eat Leading CR/NL.
   while (!port.fGetChar( last_result[i] )
            || last_result[i] == '\r'
            || last_result[i] == '\n')  {}
   i++;                        // (already got 1 char ok)
// Grab text until a CR/NL.
   while (port.fGetChar( last_result[i] )
            && last_result[i] != '\n'
            && last_result[i] != '\r'
            && i <= sizeof( last_result ))  {
      i++;
   }
   last_result[i] = '\x0';          // Null terminate
buffer.
   return last_result;
}

#include <TObject.HPP>

//**********************************************************
**********************
//
// TObject members.
//

TObject::~TObject()
{}

//**********************************************************
**********************
//
// TNull members.
//

TNull::TNull( FLAG is_null )
   :  isnull( is_null )
{}

FLAG TNull::fSetNull()
{
   isnull = TRUE;
   return TRUE;
}


#define INCL_NOPMAPI            // no PM in this program
#define INCL_DOS
```

```
#define INCL_BSE
#define INCL_DOSSEMAPHORES
#define INCL_DOSNMPIPES
#include <os2.h>

#include <usertype.h>
#include "TPacket.HPP"

TPacket::TPacket( TPort& p )
   :  Port( p ),
      text_length( 0 ),
      state( TRANS_NULL )
{}

TPacket::TRANS_STATE TPacket::rGetPacket()
{
   enq_count = 0;
   nak_count = 0;
   text_length = 0;

   if (state != TRANS_NULL) return TRANS_NULL;

// Enquiry Loop.
   while (fSendENQ())
      {
      if ((state = rReceivePacket()) == TRANS_NAK)
         {
         while (fSendNAK())
            if ((state = rReceivePacket()) == TRANS_ACK)

               {
               fSendACK();
               return state;
               }
         }

      else if (state == TRANS_ACK)
         {
         fSendACK();
         return state;
         }
      }
    fSendEOT();
    return state;
}

TPacket::TRANS_STATE TPacket::rReceivePacket()
{
   char ch;
   int i=0,j;

// Get STX.
```

```
    if (!Port.fGetChar( ch ))
       return TRANS_ETO;
//    packet_text[i++] = ch;
    if (ch != STX)
       return TRANS_NAK;

// Get Length.
    if (!Port.fGetChar( ch ))
       return TRANS_NAK;
//    packet_text[i++] = ch;

    text_length = (USHORT)ch;

    if (!Port.fGetChar( ch ))
       return TRANS_NAK;
//    packet_text[i++] = ch;

    text_length = (USHORT)(ch << 8) + text_length;

    if (text_length > MAX_TEXT_LEN)
       return TRANS_NAK;

// Get Text.

    for (j=0 ; j < text_length; j++ )
    {
       if ( Port.fGetChar( ch ))
          packet_text[ j ] = ch;

       else
          return ( TRANS_NAK );
    }

// Get ETX.
    if ( Port.fGetChar( ch ))
       {
       if ( ch == ETX )
          ;
//        packet_text[ i++ ] = ch;

       else
          return ( TRANS_NAK );
       }
    else
       {
       return ( TRANS_NAK );
       }

// Get LRC.
    if (!Port.fGetChar( ch ))
       return TRANS_NAK;
//    packet_text[i++]=ch;
    return TRANS_ACK;
```

```
}

UINT TPacket::cbCopyText( PVOID ptr, UINT len )
{
   len = len < text_length ? len : text_length;
   memcpy( ptr, packet_text, len );
   return len;
}

FLAG TPacket::fSendENQ()
{
   char enq = ENQ;

   enq_count++;
   if (enq_count > MAX_ENQ) return FALSE;

   Port.FlushInputBuffer();
   return Port.fWritePort( &enq, 1 );
}

FLAG TPacket::fSendACK()
{
   char ack = ACK;
   Port.FlushInputBuffer();
   return Port.fWritePort( &ack, 1 );
}

FLAG TPacket::fSendNAK()
{
   char nak = NAK;

   nak_count++;
   if (nak_count > MAX_NAK) return FALSE;

   Port.FlushInputBuffer();
   return Port.fWritePort( &nak, 1 );
}

FLAG TPacket::fSendEOT()
{
   char eot = EOT;
   return Port.fWritePort( &eot, 1 );
}


#define INCL_NOPMAPI            // no PM in this program
#define INCL_DOS
#define INCL_BSE
#define INCL_DOSSEMAPHORES
#define INCL_DOSNMPIPES
#define INCL_DOSDEVIOCTL
#include <os2.h>
```

```
#define _THREADS                    // This implemetation is
multi-threaded.

#include <process.h>
#include <string.h>
#include <stdlib.h>

#include "TPort.HPP"

TPort::TPort()
   :  manage_thread( -1 ),
      log_flag( FALSE )
{}

TPort::~TPort()
{
   while (manage_thread != -1)  {
      KillManageThread();
      DosSleep( 1000 );                // Wait 1 second.
   }
}

FLAG TPort::fOpenPort( const ComSettings &settings )
{
   LINECONTROL lctl;
   DCBINFO dcb;
   ULONG ulAction;
   ULONG ulPio, ulDio;
   ULONG cbTrans;

// Open the port.
   rc = DosOpen( settings.port_name, &hPort, &ulAction,
0, 0, OPEN_ACTION_OPEN_IF_EXISTS,
                     OPEN_FLAGS_WRITE_THROUGH |
OPEN_ACCESS_READWRITE | OPEN_SHARE_DENYREADWRITE, NULL );
   if (rc) return FALSE;

// Set the line speed.
   ulPio = sizeof( settings.bps );
   rc = DosDevIOCtl( hPort, IOCTL_ASYNC,
ASYNC_SETBAUDRATE, (PVOID)&settings.bps,
                         ulPio, &ulPio, NULL, 0, NULL );
   if (rc)  {
      DosClose( hPort );
      return FALSE;
   }

// Set the line characteristics.
   lctl.bDataBits = settings.data_bits;
   lctl.bParity = (BYTE)settings.parity;
   lctl.bStopBits = (BYTE)settings.stop_bits;
   ulPio = sizeof lctl;
```

```
   rc = DosDevIOCtl( hPort, IOCTL_ASYNC,
ASYNC_SETLINECTRL, &lctl, ulPio, &ulPio, NULL, 0, NULL );
   if (rc)  {
      DosClose( hPort );
      return FALSE;
   }

// Set the flow control.
   ulDio = sizeof dcb;
   rc = DosDevIOCtl( hPort, IOCTL_ASYNC,
ASYNC_GETDCBINFO, NULL, 0, NULL, &dcb, ulDio, &ulDio );
   if (rc)  {
      DosClose( hPort );
      return FALSE;
   }
/********************************************************
**********************
   dcb.usReadTimeout = 100;

   dcb.fbCtlHndShake = MODE_CTS_HANDSHAKE;   // flags1 =
00001000

   dcb.fbFlowReplace &= 0x30;                // flags2 =
00??0000
   dcb.fbFlowReplace |= MODE_RTS_HANDSHAKE;  // flags2 =
10??0000

   dcb.fbTimeout &= 0xF8;                    // flags3 =
?????000
   dcb.fbTimeout |= MODE_WAIT_READ_TIMEOUT;  // flags3 =
?????100
*********************************************************
*********************/
   dcb.usReadTimeout = 300;
   dcb.fbCtlHndShake = MODE_CTS_HANDSHAKE;
   dcb.fbFlowReplace = MODE_RTS_HANDSHAKE;
   dcb.fbTimeout = MODE_NO_WRITE_TIMEOUT |
MODE_WAIT_READ_TIMEOUT;

   rc = DosDevIOCtl( hPort, IOCTL_ASYNC,
ASYNC_SETDCBINFO, &dcb, ulPio, &ulPio, NULL, 0, NULL );
   if (rc)  {
      DosClose( hPort );
      return FALSE;
   }

   fRaiseDTR();

   return TRUE;
}

FLAG TPort::fClosePort()
{
```

```
   rc = DosClose( hPort );
   if (rc) return FALSE;
   else return TRUE;
}

void TPort::FlushInputBuffer()
{
   BYTE cmd;                              // Scratch, Needed
by API.
   ULONG len;                             // Scratch, Needed
by API.

   rc = DosDevIOCtl( hPort, IOCTL_GENERAL,
DEV_FLUSHINPUT, &cmd, sizeof( cmd ), &len,
                     &cmd, sizeof( cmd ), &len );

   DosSleep(10);            // Timing Kludge - Give the
Device Driver
                            // time to flush buffer before
resetting
                            // semaphore stuff.
   buffer.Flush();
}

void TPort::FlushOutputBuffer()
{
   BYTE cmd;                              // Scratch, Needed
by API.
   ULONG len;                             // Scratch, Needed
by API.

   rc = DosDevIOCtl( hPort, IOCTL_GENERAL,
DEV_FLUSHOUTPUT, &cmd, sizeof( cmd ), &len,
                     &cmd, sizeof( cmd ), &len );
}

FLAG TPort::fReadPort( PVOID buf, UINT &len )
{
   for (int i = 0; i < len; i++)   {
      if (buffer.fIsEmpty())  {
         len = i;
         return TRUE;
      }
      else buffer.fGetChar( ((char*)buf)[i] );
   }
   return TRUE;
}

FLAG TPort::fWritePort( PVOID buf, UINT len )
{
   ULONG cbWritten;

   rc = DosWrite( hPort, buf, len, &cbWritten );
```

```
   if (rc) return FALSE;
   else return TRUE;
}

FLAG TPort::fDropDTR()
{
   ULONG ulPio, ulDio;
   MODEMSTATUS ms;
   ULONG com_err;

   ms.fbModemOn = 0;
   ms.fbModemOff = DTR_OFF;
   ulPio = sizeof ms;
   ulDio = sizeof com_err;
   rc = DosDevIOCtl( hPort, IOCTL_ASYNC,
ASYNC_SETMODEMCTRL, &ms, ulPio, &ulPio, &com_err, ulDio,
&ulDio );
   if (rc) return FALSE;
   else return TRUE;
}

FLAG TPort::fRaiseDTR()
{
   ULONG ulPio, ulDio;
   MODEMSTATUS ms;
   ULONG com_err;

   ms.fbModemOn = DTR_ON;
   ms.fbModemOff = 0xFF;
   ulPio = sizeof ms;
   ulDio = sizeof com_err;
   rc = DosDevIOCtl( hPort, IOCTL_ASYNC,
ASYNC_SETMODEMCTRL, &ms, ulPio, &ulPio, &com_err, ulDio,
&ulDio );
   if (rc) return FALSE;
   else return TRUE;
}

void _Optlink ManageThread( PVOID );  // Used internally
by fStartManageThread().
void _Optlink ManageThread( PVOID ptr )
{
   ((TPort*)ptr)->ManagePort();
}

FLAG TPort::fStartManageThread()
{
   fManThread = TRUE;
   manage_thread = _beginthread( ManageThread, 8192,
(PVOID)this );
   if (manage_thread == -1) return FALSE;
   else return TRUE;
}
```

```
void TPort::ManagePort()
{
   char read_buf[32];
   ULONG cbRead;

   while (TRUE)  {
      rc = DosRead( hPort, read_buf, sizeof read_buf,
&cbRead );
      if (rc)  {
         // handle error here...
      }
      else if (!fManThread) break;
      for (int i = 0; i < cbRead; i++)  {
         if (log_flag) log.fPostChar( read_buf[i] );
         buffer.fPutChar( read_buf[i] );
      }
      buffer.SignalRelease();
   }

// Signal threads exit.
   manage_thread = -1;
}

FLAG TPort::fStartCommandThread( TTHREAD CommandThread,
PVOID data )
{
   fCmdThread = TRUE;
   command_thread = _beginthread( CommandThread, 8192,
data );
   if (command_thread == -1) return FALSE;
   else return TRUE;
}

#include <TStream.HPP>

#include <debug.h>

#include <string.h>

//**********************************************************
**********************
//
// TStream members.
//
TStream::TStream( UINT buf_size )
   :  buf_len( buf_size ),
      buffer( new BYTE[buf_size] ),
      iptr( buffer ),
      xptr( buffer )
{
   #ifdef DEBUG
      memset( buffer, UNDEF_DATA, buf_len );
   #endif
```

```
}

TStream::~TStream()
{
   delete buffer;
}

void TStream::Reset()
{
   iptr = xptr = buffer;
}

TStream& TStream::operator << ( const FLAG flag )
{
   *(FLAG*)iptr = flag;
   return incInserter( sizeof( flag ) );
}

TStream& TStream::operator << ( const USHORT num )
{
   *(USHORT*)iptr = num;
   return incInserter( sizeof( num ) );
}

TStream& TStream::operator << ( const ULONG num )
{
   *(ULONG*)iptr = num;
   return incInserter( sizeof( num ) );
}

TStream& TStream::operator << ( const char *str )
{
   strcpy( iptr, str );
   return incInserter( strlen( str ) + 1 );
}

TStream& TStream::Put( const PVOID data, UINT size )
{
   memcpy( iptr, data, size );
   return incInserter( size );
}

TStream& TStream::operator >> ( FLAG &flag )
{
   flag = *(FLAG*)xptr;
   return incExtractor( sizeof( flag ) );
}

TStream& TStream::operator >> ( USHORT &num )
{
   num = *(USHORT*)xptr;
   return incExtractor( sizeof( num ) );
}
```

```
TStream& TStream::operator >> ( ULONG &num )
{
   num = *(ULONG*)xptr;
   return incExtractor( sizeof( num ) );
}

TStream& TStream::operator >> ( char *str )
{
   strcpy( str, xptr );
   return incExtractor( strlen( str ) + 1 );
}

TStream& TStream::Get( PVOID data, UINT size )
{
   memcpy( data, xptr, size );
   return incExtractor( size );
}

TStream& TStream::incExtractor( UINT n )
{
   xptr += n;
   ASSERT( xptr <= iptr );
   return *this;
}

TStream& TStream::incInserter( UINT n )
{
   iptr += n;
   ASSERT( iptr <= buffer + buf_len );
   return *this;
}
```

```
;************************************************************
*****************
;*
;*  Copyright (C) 1995 Absolute Software Corporation
;*
;************************************************************
****************

NAME DBServer WINDOWCOMPAT

IMPORTS     CTIMS.fGenerateSerCTID
            CTIMS.fXlatSerCTID
            CTIMS.fXlatCliCTID
            CTIMS.fGenerateCTCODE
            CTIMS.fConvertStrToCTCODE
            CTIMS.fConvertCTCODEToStr

.\TObject.obj: \
    f:\Server\TObject.CPP \
    DBServer.MAK
```

```
.\objects.obj: \
    f:\Server\objects.cpp \
    DBServer.MAK

.\MessagePipe.obj: \
    f:\Server\MessagePipe.CPP \
    DBServer.MAK

.\CTMessage.obj: \
    f:\Server\CTMessage.CPP \
    DBServer.MAK

.\ctims.obj: \
    f:\Server\ctims.cpp \
    DBServer.MAK

.\DBServer.obj: \
    f:\Server\DBServer.C \

{f:\Server;F:\Server\INCLUDE;E:\SQLLIB;E:\TOOLKT21\CPLUS\
OS2H;E:\Tools\IBMCPP\INCLUDE;}DBServer.H \
    DBServer.MAK

.\TSTREAM.obj: \
    f:\Server\TSTREAM.CPP \
    DBServer.MAK

.\TPacket.obj: \
    f:\Server\TPacket.CPP \

{f:\Server;M:\SRC\Include;M:\CT\Include;$(INCLUDE);}TPack
et.HPP \
    Server.MAK

.\TModem.obj: \
    f:\Server\TModem.CPP \
    Server.MAK

.\CT_Log.obj: \
    f:\Server\CT_Log.CPP \

{f:\Server;M:\SRC\Include;M:\CT\Include;$(INCLUDE);}CT_Lo
g.HPP \
    Server.MAK

.\CT_Buffer.obj: \
    f:\Server\CT_Buffer.CPP \

{f:\Server;M:\SRC\Include;M:\CT\Include;$(INCLUDE);}CT_Bu
ffer.HPP \

{f:\Server;M:\SRC\Include;M:\CT\Include;$(INCLUDE);}serve
r.h \
```

```
    Server.MAK

.\Server.obj: \
    f:\Server\Server.C \

{f:\Server;M:\SRC\Include;M:\CT\Include;$(INCLUDE);}CT_Tr
ans.H \

{f:\Server;M:\SRC\Include;M:\CT\Include;$(INCLUDE);}TPack
et.HPP \
    Server.MAK

.\CT_Trans.obj: \
    f:\Server\CT_Trans.C \

{f:\Server;M:\SRC\Include;M:\CT\Include;$(INCLUDE);}CT_Tr
ans.H \

{f:\Server;M:\SRC\Include;M:\CT\Include;$(INCLUDE);}TPack
et.HPP \
    Server.MAK

.\TPort.obj: \
    f:\Server\TPort.CPP \

{f:\Server;M:\SRC\Include;M:\CT\Include;$(INCLUDE);}TPort
.HPP \

{f:\Server;M:\SRC\Include;M:\CT\Include;$(INCLUDE);}CT_Bu
ffer.HPP \

{f:\Server;M:\SRC\Include;M:\CT\Include;$(INCLUDE);}CT_Lo
g.HPP \

{f:\Server;M:\SRC\Include;M:\CT\Include;$(INCLUDE);}serve
r.h \
    Server.MAK

#ifndef CT_TRANS_H
#define CT_TRANS_H

//#include <DB_Objects.HPP>
#include <MessagePipe.HPP>

#include "TPacket.HPP"

void SntlConnect( TPort &Port, MessagePipe &Pipe,
TConnectInfo *cnct_info );
void SntlDisconnect( TPort &Port, TConnectInfo
&ConnectInfo );
void SendDatePacket( TPort &Port, const SNTL_DATE &date
);
```

```
void AddDays( SNTL_DATE *next_call, int days );

FLAG fGetDateTime( PDATETIME );

#endif
#ifndef MESSAGE_H
#define MESSAGE_H

/*******************************************************
**********************
   Message.H

   Defines all valid messages used by the Server and
ServerShell.

*******************************************************
*********************/

// Define standard types.
#include <os2def.h>

#include <time.h>

// Definition for the Sentinel date packet.
struct CT_DATE {
   BYTE year;
   BYTE month;
   BYTE day;
   BYTE hour;
   BYTE minute;
};

// Definition for the Sentinel serial number packet.
struct CT_SN {
   USHORT sn[3];
   USHORT cksum;
   CT_DATE date;
};

#define CND_NUM_MAXLEN         20
#define CND_NAME_MAXLEN        20

struct CALLERID_INFO {
   BYTE month;
   BYTE day;
   BYTE hour;
   BYTE minute;
   CHAR number[CND_NUM_MAXLEN];
   CHAR name[CND_NAME_MAXLEN];
};

enum TRANS_STATE {
   TRANS_OK          = 0x00,
```

```
   TRANS_BAD_CND  = 0x01,
   TRANS_BAD_SN   = 0x02,
   TRANS_BAD_DATE = 0x04
};

struct CT_Transaction {
   DATETIME start_time;
   CALLERID_INFO cnd;
   CT_SN sn;
   TRANS_STATE state;
   DATETIME end_time;
};

enum CT_SN_QUERY {
   CT_SN_OK        = 0,
   CT_SN_REDFLAG   = 1,
   CT_SN_UNKNOWN   = 2
};


#define CT_BUFFER_LEN 256                    // Allowable
length of modem communications for a cycle.
#define CT_GUARD_CHAR                  '!'

/* Definitions for stripped CompuTrace messages.
******************/

#define MAX_PHONE_NUM_LEN          16    // Max length of a
phone number string.
#define CT_SERIAL_NUM_LEN          sizeof( CT_SN )  //
Length of serial number packet sent by the modem.
#define MAX_ERROR_STR_LEN          32    // Max length of
an error string.

enum CTMSG_TYPE {
   CTMSG_UNDEF = 0,
   CTMSG_CONNECT,
   CTMSG_SERIAL_NUM,
   CTMSG_ERROR_LOG,
   CTMSG_DISCONNECT
};

struct CT_ConnectMsg {
   time_t connect_time;
   char phone_num[MAX_PHONE_NUM_LEN];
};

struct CT_SerialNumMsg {
   CT_SN serial_num;
};
```

```
struct CT_ErrorLogMsg {
   char error_str[MAX_ERROR_STR_LEN];
};

struct CT_DisconnectMsg {
   time_t disconnect_time;
   char log[CT_BUFFER_LEN];
};

struct CTMessage {
   CTMSG_TYPE type;
   union {
      CT_ConnectMsg Connect;
      CT_SerialNumMsg SerialNum;
      CT_ErrorLogMsg ErrorLog;
      CT_DisconnectMsg Disconnect;
   } Msg;
};

#define MAX_CTMSG_SIZE sizeof( CTMessage )        // Max
size of a stripped (CompuTrace) message.


/* Definitions for pipe messages.
*************************************/

// Define all valid events.  The following prefixes are
used:
//    CT_          For general messages
//    CT_SER_      For server originated messages not
related to a transaction.
//    CT_CLI_      For client originated messages not
related to a transaction.
//    CT_SER_MSG_ For server originated messages related
to a transaction.
//    CT_CLI_MSG_ For client originated messages related
to a transaction.
// For more detailed information please see the proper
message structure.
enum EVENT_TYPE {
   CT_SER_MSG_AWK,                // Server awknowledges
last received message.
   CT_SER_MSG_ERROR,              // Server has had a non-
fatal error.
   CT_SER_MSG_FATAL,              // Server has had a
fatal error and will unconditionally terminate.
   CT_SER_MSG_MESSAGE,            // Server has a message
to be processed by the client.

   CT_SER_STOP,                   // Server requests the
client(s) stop sending messages.
   CT_SER_START,                  // Server allows the
client(s) to continue sending messages.
```

```
   CT_SER_ERROR,                   // Server has had an
internal non-fatal error.
   CT_SER_FATAL,                   // Server has had an
internal fatal error and will terminate.
   CT_SER_STRING,                  // Server has a general
string to be stored.
   CT_SER_QUIT,                    // Server has requested
all clients to terminate.

   CT_CLI_MSG_AWK,                 // Client awknowledges
last received message.
   CT_CLI_MSG_ERROR,               // Client has had a non-
fatal error.
   CT_CLI_MSG_FATAL,               // Client has had a
fatal error and will unconditionally terminate.
   CT_CLI_MSG_MESSAGE              // Client has a message
to be processed by the server.
};

// Define message transfer template used to transfer a
message through a pipe.
struct CT_MessageHead {
   ULONG id;                       // The message id
number.
   EVENT_TYPE type;                // The event type (see
above).
   BYTE len;                       // The length the
message data.
};

struct CT_MessageBuffer {
   CT_MessageHead header;
   char message[MAX_CTMSG_SIZE];
};

#define MAX_MSG_SIZE sizeof( CT_MessageBuffer )
// Max size of a pipe message.

#endif // MESSAGE_H

#ifndef PACKET_H
#define PACKET_H

// Ensure byte alignment enforced!
#pragma pack( 1 )                     // For C-Set++
#pragma option -a1                    // For BC++

/* Packet Level Defines
*********************************************************/
#define STX                           0x02     // Start-of-
text.
#define ETX                           0x03     // End-of-
text.
```

```
#define EOT                                 0x04      // End-of-
transmission.
#define ENQ                                 0x05      // Enquiry.
#define ACK                                 0x06      //
Acknowledgement.
#define NAK                                 0x15      // Negative-
acknowledgement.

#define MAX_ENQ                             3         // Max
number of ENQs.
#define MAX_NAK                             2         // Max
number of NAKs.

#define MAX_TEXT_LEN                        256       // Max size
of a packets TEXT.

struct PKT_HEADER {
   BYTE stx;
   BYTE lsb_length;
   BYTE msb_length;
};

struct PKT_FOOTER {
   BYTE etx;
   BYTE lrc;
};

/* Packet type definitions
*************************************************************/

// Text Type IDs.
#define CTID_TEXT_TYPE                      (WORD)0x0000        //
Sentinel Subscription Number Packet.
#define NC_TEXT_TYPE                        (WORD)0x0080        //
Server Next Call Packet.

struct SNTL_DATE {
   BYTE year;
   BYTE month;
   BYTE day;
   BYTE hour;
   BYTE minute;
};

struct CTID_TEXT {
   BYTE type;
   BYTE sub_type;
   WORD sn[3];
   SNTL_DATE now_date;
};
#define SN_TEXT CTID_TEXT                   // Old name (uses
should be changed to CTID_TEXT).
```

```
struct CTID_PACKET {
   PKT_HEADER header;
   CTID_TEXT text;
   PKT_FOOTER footer;
};
#define SN_PACKET CTID_PACKET          // Old name (uses
should be changed to CTID_PACKET).

struct NC_TEXT {
   WORD type;
   SNTL_DATE next_call_date;
};

struct NC_PACKET {
   PKT_HEADER header;
   NC_TEXT text;
   PKT_FOOTER footer;
};

#pragma pack()                          // Back to default.
#pragma option -a.

#endif
#ifndef SERVER_H
#define SERVER_H

#define DEBUG        4

#include <debug.h>
#include <usertype.h>

//
// TConnectInfo definition.
//
#define CND_NUM_MAXLEN         20
#define CND_NAME_MAXLEN        20

struct CALLERID_INFO {
   BYTE month;
   BYTE day;
   BYTE hour;
   BYTE minute;
   CHAR number[CND_NUM_MAXLEN];
   CHAR name[CND_NAME_MAXLEN];
};

struct TConnectInfo {
   DATETIME start_time, end_time;
   CALLERID_INFO cnd;
};
//
// End of TConnectInfo
//
```

```
#endif // SERVER_H
#ifndef CT_BUFFER_HPP
#define CT_BUFFER_HPP

#include "server.h"

#define TRUE 1
#define FALSE 0
#define CT_BUFFER_MAXLEN   256

class CT_Buffer {

   char buffer[CT_BUFFER_MAXLEN];
   UINT head, tail;
   HMTX hBufSem;
   HEV hReleaseGetSem;
   APIRET rc;

   UINT IncBufPtr( UINT ptr ) const
      { return (++ptr >= CT_BUFFER_MAXLEN) ? 0 : ptr; }

public:

   CT_Buffer();
   ~CT_Buffer();

   void Flush();

   BOOL fIsEmpty() const { return head == IncBufPtr( tail
); }
   BOOL fIsFull() const { return head == tail; }

   void SignalRelease() { DosPostEventSem( hReleaseGetSem
); }

   BOOL fPutChar( char );
   BOOL fGetChar( char& );
};

#endif
#ifndef CT_LOG_HPP
#define CT_LOG_HPP

#define TRUE 1
#define FALSE 0

class CT_Log {

   char *buffer;
   UINT index, buf_len;

public:
```

```
    CT_Log( UINT = 4096 );
    ~CT_Log();

    void Flush() { index = 0; }

    BOOL fIsEmpty() const { return index == 0; }
    BOOL fIsFull() const { return index >= buf_len; }

    BOOL fPostChar( char );

    BOOL fDumpLog( const char * );
};

#endif
#ifndef TCLIENT_HPP
#define TCLIENT_HPP


class TClient {

    TConnectInfo ConnectInfo;
    WORD ctid[3];
    SNTL_DATE client_date;

    Pipe

public:


}



#endif // CLIENT_HPP
#ifndef TPACKET_HPP
#define TPACKET_HPP

#include <os2def.h>
#include "packet.h"

#include <TPort.HPP>

//************************************************************
**********************
```

```
// Class TPacket - Encapsulates the reception of a packet
for a port
//
// TPacket::TPacket( TPort& Port ) Initializes internal
state.
//    Arguments:
//        TPort& Port - the port to receive the packet
from.
//
// TRANS_STATE TPacket::rGetPacket()
//    Description:
//        Attempts to receive a packet from Port using the
protocol
//        defined in the CompuTrace Protocol Specification
(CTPSpec).
//
//    Returns: The result of the attempt:
//        TRANS_ACK - packet successfully received as
defined by CTPSpec.
//        TRANS_NAK - reception aborted due to invalid
reception, EOT sent.
//        TRANS_ETO - ENQ timeout, no date recieved, EOT
sent.
//
// UINT TPacket::cbCopyText( ptr, len )
//    Arguments:
//        PVOID ptr - the buffer to copy data to.
//        UINT len - the maximum number of bytes to copy.
//
//    Description:
//        Copies text from a sucessfully received packet
into buffer pointed to
//        by ptr.  Copies up to len bytes or the size of
the received packet
//        text (whichever is smaller).  Can only be called
if rGetPacket
//        returned TRANS_ACK.
//
//    Returns: number of bytes copied. or 0 if packet not
successfully
//        received.
//
// TRANS_STATE rState() const
//    Returns: the current state of the instance.
//*******************************************************
**********************
class TPacket {
public:

   enum TRANS_STATE {
            TRANS_NULL,                          // No
activity.
            TRANS_ACK,
```

```
            TRANS_NAK,
            TRANS_ETO };                         // ETO =
Enquiry time-out.

    TPacket( TPort& );
    TRANS_STATE rGetPacket();
    UINT cbCopyText( PVOID ptr, UINT len );

    TRANS_STATE rState() const { return state; }

protected:

    FLAG fSendENQ();
    FLAG fSendACK();
    FLAG fSendNAK();
    FLAG fSendEOT();

private:

    TPort& Port;
    int enq_count;
    int nak_count;
    USHORT text_length;
    BYTE packet_text[MAX_TEXT_LEN];
    TRANS_STATE state;

    TRANS_STATE rReceivePacket();
};

#endif
# Created by IBM WorkFrame/2 MakeMake at 17:36:34 on
08/22/95
#
# This makefile should be run in the following directory:
#   d:\Server
#
# The actions included in this makefile are:
#   COMPILE::CLC C++
#   LINK::CLC Link

.all: \
  .\DBServer.EXE

.SUFFIXES:

.SUFFIXES: .C .CPP

.CPP.obj:
      @echo WF::COMPILE::CLC C++
      icc.exe /Tl- /Xi /ID:\Server\INCLUDE /IE:\SQLLIB
/IE:\TOOLKT21\CPLUS\OS2H /IE:\Tools\IBMCPP\INCLUDE
/DDEBUG=4 /Tdp /Q /Wall /Fi /Ti /Gm /G5 /Tm /C %s
```

```
.C.obj:
      @echo WF::COMPILE::CLC C++
      icc.exe /Tl- /Xi /ID:\Server\INCLUDE /IE:\SQLLIB
/IE:\TOOLKT21\CPLUS\OS2H /IE:\Tools\IBMCPP\INCLUDE
/DDEBUG=4 /Tdp /Q /Wall /Fi /Ti /Gm /G5 /Tm /C %s

.\DBServer.EXE: \
    .\TObject.obj \
    .\TSTREAM.obj \
    .\DBServer.obj \
    .\ctims.obj \
    .\CTMessage.obj \
    .\MessagePipe.obj \
    .\objects.obj \
    {$(LIB)}DB_Objects.LIB \
    {$(LIB)}SQL_DYN.LIB \
    {$(LIB)}DBServer.DEF \
    DBServer.MAK
      @echo WF::LINK::CLC Link
      icc.exe @<<
/Tl- /Xi
 /ID:\Server\INCLUDE
 /IE:\SQLLIB
 /IE:\TOOLKT21\CPLUS\OS2H
 /IE:\Tools\IBMCPP\INCLUDE
 /DDEBUG=4
 /Tdp /Q
 /Wall
 /Fi
 /Ti /Gm /G5 /Tm
 /B" /de"
 /FeDBServer.EXE
 DB_Objects.LIB
 SQL_DYN.LIB
 DBServer.DEF
 .\TObject.obj
 .\TSTREAM.obj
 .\DBServer.obj
 .\ctims.obj
 .\CTMessage.obj
 .\MessagePipe.obj
 .\objects.obj
<<

!include DBServer.Dep
# Created by IBM WorkFrame/2 MakeMake at 10:20:11 on
05/30/95
#
# This makefile should be run in the following directory:
#   d:\Server
#
# The actions included in this makefile are:
```

```
#   COMPILE::CLC C++
#   LINK::CLC Link

.all: \
  .\Server.EXE

.SUFFIXES:

.SUFFIXES: .C .CPP

.CPP.obj:
      @echo WF::COMPILE::CLC C++
      icc.exe /Tl- /ID:\Server\Include /IM:\CT\Include
/Tdp /Q /Wall /Fi /Si /Ti /O /Gm /G5 /Tm /C %s

.C.obj:
      @echo WF::COMPILE::CLC C++
      icc.exe /Tl- /ID:\Server\Include /IM:\CT\Include
/Tdp /Q /Wall /Fi /Si /Ti /O /Gm /G5 /Tm /C %s

.\Server.EXE: \
    .\TPacket.obj \
    .\TPort.obj \
    .\CT_Trans.obj \
    .\Server.obj \
    .\CT_Buffer.obj \
    .\CT_Log.obj \
    .\TModem.obj \
    {$(LIB)}CTIMS.LIB \
    {$(LIB)}MessagePipe.LIB \
    Server.MAK
      @echo WF::LINK::CLC Link
      icc.exe @<<
/Tl-
 /ID:\Server\Include
 /IM:\CT\Include
 /Tdp /Q
 /Wall
 /Fi /Si
 /Ti /O /Gm /G5 /Tm
 /B" /de"
 /FeServer.EXE
 CTIMS.LIB
 MessagePipe.LIB
 .\TPacket.obj
 .\TPort.obj
 .\CT_Trans.obj
 .\Server.obj
 .\CT_Buffer.obj
 .\CT_Log.obj
 .\TModem.obj
<<
```

```
!include Server.Dep
#ifndef CTID_H
#define CTID_H

/*** MOVE TO USERTYPE ***/
/*   #define LOWORD( x ) ((WORD)((DWORD)(x)))
   #define HIWORD( x ) ((WORD)((x) >> 16))*/
/************************/

#define CTCODE_STR_LEN        10

typedef WORD *CTCODE;

extern "C" {
//
// fGenerateSerCTID - Creates a new valid Server CTID
value.
//
FLAG APIENTRY fGenerateSerCTID( ULONG &ctid );

//
// fXlatSerCTID - Translates a ServerCTID to a
ClientCTID.
//
FLAG APIENTRY fXlatSerCTID( ULONG &cli_ctid, ULONG
ser_ctid );

//
// fXlatCliCTID - Translates a ClientCTID to a
ServerCTID.
//
FLAG APIENTRY fXlatCliCTID( ULONG &ser_ctid, ULONG
cli_ctid );

//
// fGenerateCTCODE - Creates a 48 bit CTCODE from a valid
Client CTID.
//
FLAG APIENTRY fGenerateCTCODE( CTCODE ctcode, ULONG
cli_ctid );

//
// fConvertStrToCTCODE - Converts a string to CTCODE.
//    Arguments - WORD *ctcode: an array of 3 WORDS to be
set to the 48 bit
//                  binary representation of the input
string.
//               STRING str: the input string of size
CTID_STR_LEN.
//
FLAG APIENTRY fConvertStrToCTCODE( CTCODE ctcode, STRING
str );
```

```
//
// fConvertCTCODEToStr - Converts a CTCODE number to a
string.
//    Arguments - char *str: the output string of size
CTID_STR_LEN.
//                 WORD *ctcode: the input array of 3
WORDS.
//
FLAG APIENTRY fConvertCTCODEToStr( char *str, const
CTCODE ctcode );

}; // end extern "C"

#endif // CTID_H
#ifndef CTIMS_H
#define CTIMS_H

#include <usertype.h>

#ifdef __cplusplus
   extern "C" {
#endif

#define CALLERID_SIZE            21
#define CTSTATUS_SIZE            9
#define CTORGNUM_SIZE            9
#define CTTS_SIZE                27

typedef struct {
   long  CTID;
   char  LicStatus[CTSTATUS_SIZE];
   long  PeriodDays;
   long  PeriodMinutes;
   char  StolenFlag;
   long  SpecialProcess;
   char  LastCallTS_N[CTTS_SIZE];
   short IsNull_LastCallTS;
   char  NextCallTS_N[CTTS_SIZE];
   short IsNull_NextCallTS;
   char  NextCallClientTS_N[CTTS_SIZE];
   short IsNull_NextCallClientTS;
   char  Orgnum_N[CTORGNUM_SIZE];
   short IsNull_Orgnum;
   char  ProductType[CTSTATUS_SIZE];

} _CTlicense;

typedef struct {
   long  CTID;
   char  Status[CTSTATUS_SIZE];
   char  LastCallTS_N[CTTS_SIZE];
   char  NextCallTS_N[CTTS_SIZE];
   char  NextCallClientTS_N[CTTS_SIZE];
```

```
} _CTupdateLicenseStatus;

typedef struct {
   long  CTID;
   char  ServerTS[CTTS_SIZE];
   char  ClientTS[CTTS_SIZE];
   char  TelcoTS_N[CTTS_SIZE];
   short IsNull_TelcoTS;
   short DurationSec_N;
   short IsNull_DurationSec;
   char  CallerID_N[CALLERID_SIZE];
   short IsNull_CallerID;
   short LineNum;
   char  LogFlag;
   char  EnvironmentID[CTSTATUS_SIZE];
   short ErrorCnt;

} _CTmonitorEvent;

/* CTIMS.SQC */
FLAG _fQueryLicense( _CTlicense*, ULONG CTID );
FLAG _fUpdateLicenseStatus( const _CTupdateLicenseStatus*
);

FLAG _fInsertIntoMonitorEvent       ( const
_CTmonitorEvent* );
FLAG _fInsertIntoMonitorEventStolen ( const
_CTmonitorEvent* );
FLAG _fInsertIntoMonitorEventExpired( const
_CTmonitorEvent* );

/* Index.SQC */
long _lLastSQLCODE();
FLAG _fGetNextTableIndex( ULONG *index, ULONG *count,
STRING ViewName );

/* ORG01.SQC */
FLAG _fMayRemoveCustomer( STRING orgnum );              //
Checks if a customer may be removed.
FLAG _fDbArchiveCustomer( STRING orgnum );              //
Archives a customer.
FLAG _fDbDeleteCustomer ( STRING orgnum );              //
Deletes a customer and all associated data.
FLAG _fDbDeleteOrg( STRING orgnum );                    //
Deletes an org and all associated data.
FLAG _fIsACustomer( STRING orgnum, FLAG exclusive );    //
Determines whether an org is a customer.

#ifdef __cplusplus
   }
#endif

#endif // CTIMS_H
```

```
#ifndef DB_H
#define DB_H

#include "DB_Structs.H"

#ifdef __cplusplus
   extern "C" {
#endif

FLAG fInitDB();
FLAG fConnectDB( PCSZ db_str );

ULONG ulGetSQLCode();

void CommitWork();
void RollbackWork();

#ifdef __cplusplus
   }
#endif

#endif // DB_H
#ifndef DBSERVER_H
#define DBSERVER_H

#define SHIP        0
#define DEBUG       4

#include <debug.h>
#include <usertype.h>

#endif // SERVER_H
#ifndef DB_STRUCTS_H
#define DB_STRUCTS_H

#ifdef __cplusplus
   extern "C" {
#endif

#pragma pack( 1 )

typedef struct _TimeStampStruct {
   char year[4];
   char dash1;
   char month[2];
   char dash2;
   char day[2];
   char dash3;
   char hour[2];
   char dot1;
   char minute[2];
   char dot2;
   char second[2];
```

```
   char dot3;
   char microsec[6];
} TimeStampStruct;

typedef struct _MonitorEventStruct {
   ULONG CompuTraceID;
   TimeStampStruct ServerTS;
   TimeStampStruct PropertyTS;
   TimeStampStruct TelcoTS;
   char CallerID[20];
   SHORT CallSeconds;
   char EnvID[8];
} MonitorEventStruct;

#pragma pack()

#ifdef __cplusplus
   }
#endif

#endif // DB_STRUCTS_H
#ifndef DEBUG_H
#define DEBUG_H
//**********************************************************
**********************
//
// DEBUG_H - sets the debug level of the code.
//    #define SHIP = 1 and #undef DEBUG for ship code.
//
//    #define SHIP = 0 and DEBUG is defined for debug
code.
//       DEBUG = 1 - beta level, PRECONDITION active.
//       DEBUG = 2 - alpha level, adds CONDITION.
//       DEBUG = 3 - pre-alpha level, adds CHECK.
//       DEBUG = 4 - sanity check level, adds
SANITYCHECK.
//
//**********************************************************
**********************

#ifdef DEBUG

   #define ASSERT( x )                 assert( x )
   #define NOTIMPLEMENTED              assert( 0 /* Not
implemented error */ )

#else

   #define NDEBUG              // Disables debugging in
assert.h
   #define ASSERT( x )                 (void)0
   #define NOTIMPLEMENTED              (void)0
```

```
#endif // DEBUG

#include <assert.h>

#if DEBUG >= 1
   #define PRECONDITION( x )          assert( x )
#else
   #define PRECONDITION( x )          (void)0
#endif

#if DEBUG >= 2
   #define CONDITION( x )             assert( x )
#else
   #define CONDITION( x )             (void)0
#endif

#if DEBUG >= 3
   #define CHECK( x )                 assert( x )
#else
   #define CHECK( x )                 (void)0
#endif

#if DEBUG >= 4
   #define SANITYCHECK( x )           assert( x )
#else
   #define SANITYCHECK( x )           (void)0
#endif

#define UNDEF_DATA                    0xCC              //
Used to show unallocated memory.
#define JUNK                          UNDEF_DATA
#define UNINIT_DATA                   0xDD              //
Used to show uninitialized data.

#endif // DEBUG_H
#ifndef USERTYPE_H
#define USERTYPE_H

#ifdef __OS2__
   #include <os2def.h>
#endif

#ifndef __CSET__
   #define _Optlink
#endif

// Standard typedef's for Absolute Software.

#define MAX( x, y )         ((x) > (y) ? (x) : (y))
#define MIN( x, y )         ((x) < (y) ? (x) : (y))

#ifndef NULL
   #define NULL 0
```

```
#endif

#define TRUE        1
#define FALSE       0

typedef unsigned char FLAG;
typedef unsigned char BYTE;

typedef unsigned char  UCHAR;
typedef unsigned short USHORT;
typedef unsigned int   UINT;
typedef unsigned long  ULONG;

#ifndef _Windows
   typedef unsigned short WORD;
   typedef unsigned long DWORD;
#endif
typedef const char* STRING;

typedef const void* PCVOID;

#ifdef __OS2__
      typedef void (* _Optlink TTHREAD)( PVOID );
#endif

#ifdef __cplusplus
template <class T1, class T2> FLAG operator == ( T1 c1,
T2 c2 )
{
   return FLAG( c1 == c2 );
}

template <class T1, class T2> FLAG operator != ( T1 c1,
T2 c2 )
{
   return FLAG( c1 != c2 );
}
#endif // __cplusplus

#endif // USERTYPE_H
#ifndef CTIMS_HPP
#define CTIMS_HPP

#include <iostream.h>
#include <string.h>

#define INCL_DOSDATETIME
#include <os2.h>

#include <debug.h>
//#include <packet.h>

#include <Objects.HPP>
```

```
#include <CTIMS.H>

#pragma pack( 1 )                               // Needed for
CTStatus, CTOrgNum.

#define CT_TOK_SIZE          8

#define UNUSED_TOK           "UNUSED  "
#define NOTEST_TOK           "NOTEST  "
#define ACTIVE_TOK           "ACTIVE  "
#define EXPIRED_TOK          "EXPIRED "
#define UNDEFINED_TOK        "        "

//#define Y_TOK                "Y"
//#define N_TOK                "N"
//#define UNDEF_FLAG_TOK       " "

#define ORGNUM_SIZE          8
#define ORGNUM_PREFIX_SIZE 4

//ßßßßßßßßßßßßßßßßßßßßßßßßßßßßßßßßßßßßßßßßßßßßßßßßßßßßßß
ßßßßßßßßßßßßßßßßßßßßßß
//
// CTIMS General types.
//
// The following types are general types used in CTIMS.
They are not specific
//    to a single implementation:
//
//    TFlags - used for boolean fields such as StolenFlag
and InsuredFlag.
//    TTimestamp - used to represent timestamps with
millisecond resolution.
//    TString - represents a string of characters.
//
//
//ßßßßßßßßßßßßßßßßßßßßßßßßßßßßßßßßßßßßßßßßßßßßßßßßßßßßßß
ßßßßßßßßßßßßßßßßßßßßßß

//íííííííííííííííííííííííííííííííííííííííííííííííííííííí
íííííííííííííííííííííí
//
// CTIMS Flag
//
//íííííííííííííííííííííííííííííííííííííííííííííííííííííí
íííííííííííííííííííííí
/******************
class CTFlag : public TFlag {
public:

   CTFlag() : TFlag() {}
   CTFlag( FLAG flag ) : TFlag( flag ) {}
};
```

```
********************/
typedef TFlag CTFlag;

//ÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍ
ÍÍÍÍÍÍÍÍÍÍÍÍÍÍÍÍÍÍÍÍÍÍ
//
// CTIMS Timestamp
//
//ÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍ
ÍÍÍÍÍÍÍÍÍÍÍÍÍÍÍÍÍÍÍÍÍÍ
/******************
class CTTimestamp : public TTimestamp {
public:

   CTTimestamp() : TTimestamp() {}
   CTTimestamp( USHORT yr,
                UCHAR mo,
                UCHAR dy,
                UCHAR hr = 0,
                UCHAR mn = 0,
                UCHAR sc = 0,
                USHORT ms = 0 ) : TTimestamp( yr, mo, dy,
hr, mn, sc, ms ) {}

};
******************/
typedef TTimestamp CTTimestamp;

// UNDER CONSTRUCTION!!!
//ÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍ
ÍÍÍÍÍÍÍÍÍÍÍÍÍÍÍÍÍÍÍÍÍÍ
//
// CTIMS Status
//
//ÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍ
ÍÍÍÍÍÍÍÍÍÍÍÍÍÍÍÍÍÍÍÍÍÍ
class CTStatus : public virtual TNull {
public:

   CTStatus();
   CTStatus( STRING str );

   operator STRING() const { return value; }

   friend ostream& operator << ( ostream&, const
CTStatus& );

   friend TStream& operator << ( TStream&, const
CTStatus& );
   friend TStream& operator >> ( TStream&,
CTStatus& );
```

```
private:
   char value[9];
};


//ßßßßßßßßßßßßßßßßßßßßßßßßßßßßßßßßßßßßßßßßßßßßßßßßßßßßß
ßßßßßßßßßßßßßßßßßßßßßß
//
// CTIMS Specific types.
//
// The following types represent specific data types in
CTIMS.
//
//    CTCallerID - used to store the CallerID data
received from the modem.
//    CTLicStatus - Used in the License table to denote
its status.
//    CTOrgnum - Orginization number used throughout
CTIMS.
//
//ßßßßßßßßßßßßßßßßßßßßßßßßßßßßßßßßßßßßßßßßßßßßßßßßßßßßß
ßßßßßßßßßßßßßßßßßßßßßß

//íííííííííííííííííííííííííííííííííííííííííííííííííííí
íííííííííííííííííííííí
//
// CTIMS CallerID
//
//íííííííííííííííííííííííííííííííííííííííííííííííííííí
íííííííííííííííííííííí
class CTCallerID : public virtual TNull {

public:

   CTCallerID() : TNull( TRUE ) {}
   CTCallerID( const char (*str)[CALLERID_SIZE] ) :
TNull( FALSE )
   {
      memcpy( value, str, sizeof( value ) );
   }
   CTCallerID( STRING str ) : TNull( FALSE )
   {
      memset( value, ' ', sizeof( value ) );
      memcpy( value, str, strlen( str ) );
   }

   CTCallerID& Assign( STRING str )
   {
      setNotNull();
      strncpy( value, str, sizeof( CALLERID_SIZE ) );
      return *this;
   }
```

```
   operator STRING() const { useAsValue(); return value;
}

   friend ostream& operator << ( ostream &os, const
CTCallerID &id )
   {
      if (id.fIsNull()) return os << "NULL";
      else              return os.write( id.value,
sizeof( id.value ) );
   }

   friend TStream& operator << ( TStream&, const
CTCallerID& );
   friend TStream& operator >> ( TStream&,
CTCallerID& );

private:
   char value[CALLERID_SIZE];
};

//ÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍ
ÍÍÍÍÍÍÍÍÍÍÍÍÍÍÍÍÍÍÍÍÍÍ
//
// CTIMS License.Status
//
//ÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍÍ
ÍÍÍÍÍÍÍÍÍÍÍÍÍÍÍÍÍÍÍÍÍÍ
class CTLicStatus : public virtual TNull {

public:

   enum VALUE {
      UNUSED = 0,
      NOTEST = 1,
      ACTIVE = 2,
      EXPIRED = 3
   };

   CTLicStatus() : TNull( TRUE ) {}
   CTLicStatus( VALUE val ) : TNull( FALSE ), value( val
) {}
   CTLicStatus( STRING str );

   CTLicStatus& operator = ( VALUE newval )
   {
      setNotNull();
      value = newval;
      return *this;
   }
   CTLicStatus& operator = ( STRING );

   operator STRING() const { useAsValue(); return
STR_SET[value]; }
```

```
   operator VALUE() const { useAsValue(); return value; }

   FLAG operator == ( const CTLicStatus &status ) const
      { useAsValue(); return FLAG( value == (VALUE)status
); }
   FLAG operator == ( VALUE val ) const
      { useAsValue(); return FLAG( value == val ); }

   friend ostream& operator << ( ostream &os, const
CTLicStatus &lic )
   {
      if (lic.fIsNull()) return os << "NULL";
      else               return os << STRING( lic );
   }

   friend TStream& operator << ( TStream&, const
CTLicStatus& );
   friend TStream& operator >> ( TStream&,
CTLicStatus& );

private:
   static const char STR_SET[][CT_TOK_SIZE+1];
   VALUE value;
};

//íííííííííííííííííííííííííííííííííííííííííííííííííííííí
íííííííííííííííííííííí
//
// CTIMS Orginization Number.
//
//íííííííííííííííííííííííííííííííííííííííííííííííííííííí
íííííííííííííííííííííí
class CTOrgnum : public virtual TNull {

public:

   CTOrgnum() : TNull( TRUE ) {}

   FLAG fSetPrefix( STRING );
   FLAG fSetIndex( UINT );

   FLAG fGetPrefix( char * ) const;
   FLAG fGetIndex( UINT &i ) const;

   FLAG fGeneratePrefix( STRING org_name );

   operator STRING() const;

   CTOrgnum& operator = ( STRING str )
   {
      setNotNull();
      strncpy( value, str, sizeof( value ) );
      return *this;
```

```
    }

    friend ostream& operator << ( ostream &os, const
CTOrgnum &lic )
    {
       if (lic.fIsNull()) return os << "NULL";
       else           return os.write( lic.value, sizeof(
lic.value ) );
    }

    friend TStream& operator << ( TStream&, const
CTOrgnum& );
    friend TStream& operator >> ( TStream&,
CTOrgnum& );

private:
    char value[ORGNUM_SIZE];
};

//ßßßßßßßßßßßßßßßßßßßßßßßßßßßßßßßßßßßßßßßßßßßßßßßßßßßß
ßßßßßßßßßßßßßßßßßßßßßß
//
// CTIMS Records.
//
// The following types represent records stored in CTIMS.
//
//
//ßßßßßßßßßßßßßßßßßßßßßßßßßßßßßßßßßßßßßßßßßßßßßßßßßßßß
ßßßßßßßßßßßßßßßßßßßßßß


//íííííííííííííííííííííííííííííííííííííííííííííííííííí
íííííííííííííííííííííí
//
// CTIMS MonitorEvent
//
//íííííííííííííííííííííííííííííííííííííííííííííííííííí
íííííííííííííííííííííí
struct CTMonitorEvent
{
    ULONG       CTID;
    CTTimestamp ServerTS;
    CTTimestamp ClientTS;
    CTTimestamp TelcoTS_n;
    USHORT      DurationSec_n;
    CTCallerID  CallerID_n;
    USHORT      LineNum;
    CTFlag      LogFlag;
    CTStatus    EnvironmentID;
    USHORT      ErrorCnt;
```

```
   friend ostream& operator << ( ostream&, const
CTMonitorEvent& );

   friend TStream& operator << ( TStream&, const
CTMonitorEvent& );
   friend TStream& operator >> ( TStream&,
CTMonitorEvent& );
};

#pragma pack()

#endif // CTIMS_HPP
#ifndef CTMESSAGE_HPP
#define CTMESSAGE_HPP

#include <stddef.h>

#include <TStream.HPP>
#include <CTIMS.HPP>

//*******************************************************
**********************
//
//
//*******************************************************
**********************

// CT Message Type Enum.
enum CT_MSG_TYPE {
   QUERY_CTID_STATUS,
   CTID_STATUS_RESULT,
   STORE_MONITOREVENT,
   STORE_RESULT,
   CLI_QUIT
};

inline TStream& operator << ( TStream &buf, const
CT_MSG_TYPE type )
{
   return buf << USHORT( type );
}

inline TStream& operator >> ( TStream &buf, CT_MSG_TYPE
&type )
{
   USHORT num;
   buf >> num;
   type = CT_MSG_TYPE( num );
   return buf;
}

//
// Header for all CT Messages.
```

```
//
class CTMessageHeader {
public:

   CTMessageHeader() {}
   CTMessageHeader( ULONG id, CT_MSG_TYPE type, USHORT
len )
      :  ID( id ), Type( type ), Len( len )
   {}

   CT_MSG_TYPE eType() const { return Type; }

   friend TStream& operator << ( TStream&, const
CTMessageHeader& );
   friend TStream& operator >> ( TStream&,
CTMessageHeader& );

protected:
   ULONG ID;                     // The message id
number.
   CT_MSG_TYPE Type;             // The event type (see
above).
   USHORT Len;                   // The length the
message data.
};

//
// Template for message types.
//
template < class TText, CT_MSG_TYPE type >
class CTMessage : public CTMessageHeader, public TText {

public:

   CTMessage()
      :  CTMessageHeader( 0, type, sizeof( *this ) )
   {}

   CTMessage( const CTMessageHeader &Header )
      :  CTMessageHeader( Header )
   {
      ASSERT( Type == type );
   }

   friend TStream& operator << ( TStream &buf, const
CTMessage< TText, type > &msg )
   {
      return buf << *(const CTMessageHeader*)&msg <<
*(const TText*)&msg;
   }
   friend TStream& operator >> ( TStream &buf, CTMessage<
TText, type > &msg )
   {
```

```
        return buf >> *(CTMessageHeader*)&msg >>
*(TText*)&msg;
    }
};
/****************************************
// Doesn't seem to work in OS/2 BC++.
template < class TText, CT_MSG_TYPE type >
TStream& operator << ( TStream &buf, const CTMessage<
TText, type > &msg )
{
    return buf << *(const CTMessageHeader*)&msg << *(const
TText*)&msg;
}

template < class TText, CT_MSG_TYPE type >
TStream& operator >> ( TStream &buf, CTMessage< TText,
type > &msg )
{
    return buf >> *(CTMessageHeader*)&msg >>
*(TText*)&msg;
}
****************************************/

//
// CT Message structures.
//
struct QueryCTIDStatus {
    ULONG CTID;

    friend TStream& operator << ( TStream&, const
QueryCTIDStatus& );
    friend TStream& operator >> ( TStream&,
QueryCTIDStatus& );
};

inline TStream& operator << ( TStream &buf, const
QueryCTIDStatus &rec )
{
    return buf << rec.CTID;
}

inline TStream& operator >> ( TStream &buf,
QueryCTIDStatus &rec )
{
    return buf >> rec.CTID;
}

struct CTIDStatusResult {
    FLAG        QueryResult;

    ULONG       CTID;
    CTLicStatus Status;
```

```
   ULONG       PeriodDays;
   ULONG       PeriodMinutes;
   CTFlag      StolenFlag;
   ULONG       SpecialProcess;
   CTTimestamp LastCallTS_n;
   CTTimestamp NextCallTS_n;
   CTTimestamp NextCallClientTS_n;
   CTOrgnum    Orgnum_n;
   CTStatus    ProductType;

   friend TStream& operator << ( TStream&, const
CTIDStatusResult& );
   friend TStream& operator >> ( TStream&,
CTIDStatusResult& );
};

inline TStream& operator << ( TStream &buf, const
CTIDStatusResult &rec )
{
   return buf << rec.QueryResult
              << rec.CTID
              << rec.Status
              << rec.PeriodDays
              << rec.PeriodMinutes
              << rec.StolenFlag
              << rec.SpecialProcess
              << rec.LastCallTS_n
              << rec.NextCallTS_n
              << rec.NextCallClientTS_n
              << rec.Orgnum_n
              << rec.ProductType;
}

inline TStream& operator >> ( TStream &buf,
CTIDStatusResult &rec )
{
   return buf >> rec.QueryResult
              >> rec.CTID
              >> rec.Status
              >> rec.PeriodDays
              >> rec.PeriodMinutes
              >> rec.StolenFlag
              >> rec.SpecialProcess
              >> rec.LastCallTS_n
              >> rec.NextCallTS_n
              >> rec.NextCallClientTS_n
              >> rec.Orgnum_n
              >> rec.ProductType;
}

struct StoreMonitorEvent : public CTMonitorEvent {

// Control.
```

```
    FLAG StoreAsStolen;
    FLAG StoreAsExpire;

// Data.
    CTLicStatus      LicenseStatus;
    CTTimestamp      NextCallTS_n;
    CTTimestamp      NextCallClientTS_n;

    friend TStream& operator << ( TStream&, const
StoreMonitorEvent& );
    friend TStream& operator >> ( TStream&,
StoreMonitorEvent& );
};

inline TStream& operator << ( TStream &buf, const
StoreMonitorEvent &rec )
{
    return buf << rec.StoreAsStolen
               << rec.StoreAsExpire
               << rec.LicenseStatus
               << rec.NextCallTS_n
               << rec.NextCallClientTS_n
               << (const CTMonitorEvent&)rec;
}

inline TStream& operator >> ( TStream &buf,
StoreMonitorEvent &rec )
{
    return buf >> rec.StoreAsStolen
               >> rec.StoreAsExpire
               >> rec.LicenseStatus
               >> rec.NextCallTS_n
               >> rec.NextCallClientTS_n
               >> (CTMonitorEvent&)rec;
}

struct StoreResult {
    FLAG Result;

    friend TStream& operator << ( TStream&, const
StoreResult& );
    friend TStream& operator >> ( TStream&,
StoreResult& );
};

inline TStream& operator << ( TStream &buf, const
StoreResult &rec )
{
    return buf << rec.Result;
}

inline TStream& operator >> ( TStream &buf, StoreResult
&rec )
```

```
{
   return buf >> rec.Result;
}

struct CliQuit {
   friend TStream& operator << ( TStream &buf, const
CliQuit& ) { return buf; }
   friend TStream& operator >> ( TStream &buf,
CliQuit& ) { return buf; }
};

typedef CTMessage< QueryCTIDStatus, QUERY_CTID_STATUS >
QueryCTIDStatusMsg;
typedef CTMessage< CTIDStatusResult, CTID_STATUS_RESULT >
CTIDStatusResultMsg;

typedef CTMessage< StoreMonitorEvent, STORE_MONITOREVENT
> StoreMonitorEventMsg;
typedef CTMessage< StoreResult, STORE_RESULT >
StoreResultMsg;

typedef CTMessage< CliQuit, CLI_QUIT > CliQuitMsg;

#endif // CTMESSAGE_HPP
#ifndef DB_OBJECTS_HPP
#define DB_OBJECTS_HPP

#include <DB.H>

#define DB_NULL          -1
#define DB_NOT_NULL      0
#define DB_ISNULL( n )   (FLAG( (n) < 0 ))

class DataBase {

   PCSZ name;

public:

   DataBase() { fInitDB(); }
   DataBase( PCSZ db_name ) : name( db_name ) {
fInitDB(); }

   void SetName( PCSZ str ) { name = str; }
   FLAG fConnect() { return fConnectDB( name ); }

   ULONG ulSQLCode() const { return ulGetSQLCode(); }

   void Commit() { CommitWork(); }
   void Rollback() { RollbackWork(); }
};

#endif // DB_OBJECTS_HPP
```

```
#ifndef MESSAGEPIPE_HPP
#define MESSAGEPIPE_HPP

#include <debug.h>
#include <usertype.h>
#include <TStream.HPP>

//**********************************************************
**********************
// MsgPipeFactory - Factory to create MessagePipe
instances.
//    Each MessagePipe instance represents a connection
between a
//    client and the server.
//
// *** PUBLIC INTERFACE ***
//
// FLAG fCreatePipe( MessagePipe& *pipe )
//    Description:
//        Creates a MessagePipe instance and returns a
pointer to it (via pipe).
//    Returns:
//        TRUE if the operation is successful.
//        FALSE if the operation fails.
//
// FLAG fDestroyPipe( MessagePipe *pipe )
//    Description:
//        Destroys the MessagePipe instance pointed to by
pipe.
//    Returns:
//        TRUE if the operation is successful.
//        FALSE if the operation fails.
//
// *** PROTECTED INTERFACE ***
//
// virtual void InitPipe( MessagePipe *pipe )
// virtual void DeinitPipe( MessagePipe *pipe )
//    Description:
//        Called by the constructor or destructor of
MessagePipe respectively.
//        Manages any internal work needed to support an
MessagePipe instance.
//
// virtual FLAG fOpenPipe( MessagePipe* )
// virtual FLAG fClosePipe( MessagePipe* )
//    Description:
//        Called by MessagePipe::fOpenPipe and
MessagePipe::fClosePipe.  This
//        in turn allocates/deallocated a pipe using the
needed OS API calls.
//
//**********************************************************
**********************
```

```
class MsgPipeFactory {

   friend class MessagePipe;

public:

   MsgPipeFactory( UINT msg_len )
      :  max_msg_len( msg_len ),
         rc( 0 )
   {}
   virtual ~MsgPipeFactory() {}

   virtual FLAG fCreatePipe( MessagePipe*& ) = 0;
   virtual FLAG fDestroyPipe( MessagePipe* ) = 0;

   UINT uMaxMsgLen() const { return max_msg_len; }
   APIRET rcDosErrorCode() const { return rc; }

protected:

   virtual void InitPipe( MessagePipe* ) {}
   virtual void DeinitPipe( MessagePipe* ) {}

   virtual FLAG fOpenPipe( MessagePipe* ) = 0;
   virtual FLAG fClosePipe( MessagePipe* ) = 0;

   APIRET rc;

private:

   UINT max_msg_len;
};

//*******************************************************
**********************
// SvrMsgPipeFactory - Factory to create MessagePipe
instances from the
//    Server process.
//
// See MsgPipeFactory.
//
//*******************************************************
**********************
class SvrMsgPipeFactory : public MsgPipeFactory {

public:

   SvrMsgPipeFactory( PCSZ pipe_name, UINT max_msg_size,
UINT max_msg_num );
   ~SvrMsgPipeFactory() {}

   FLAG fCreatePipe( MessagePipe*& );
   FLAG fDestroyPipe( MessagePipe* );
```

```
protected:

//   void InitPipe( MessagePipe* );
//   void DeinitPipe( MessagePipe* );

   FLAG fOpenPipe( MessagePipe* );
   FLAG fClosePipe( MessagePipe* );

private:

   PCSZ pipe_name;
   UINT pipe_len;
};

//*********************************************************
**********************
// CltMsgPipeFactory - Factory to create MessagePipe
instances from the
//    Client process.
//
// See MsgPipeFactory.
//
//*********************************************************
**********************
class CltMsgPipeFactory : public MsgPipeFactory {

public:

   CltMsgPipeFactory( PCSZ pipe_name, UINT max_msg_size
);
   ~CltMsgPipeFactory() {}

   FLAG fCreatePipe( MessagePipe*& );
   FLAG fDestroyPipe( MessagePipe* );

protected:

//   void InitPipe( MessagePipe* );
//   void DeinitPipe( MessagePipe* );

   FLAG fOpenPipe( MessagePipe* );
   FLAG fClosePipe( MessagePipe* );

private:

   PCSZ pipe_name;
};

//*********************************************************
**********************
// Class MessagePipe - Implements a message pipe
connection between the client
```

```
//    and the server.  This same class is used for both
the client and the
//    server sides.  MsgPipeFactory is used to hide the
connection differences.
//
// FLAG fOpenPipe()
// FLAG fClosePipe()
//    Description:
//        Called to open/close a valid connection between
the client and the
//        server.  fOpenPipe must be called before any
data can be transfered.
//
// FLAG fSendMessage( PCVOID msg, ULONG msg_len )
//    Description:
//        Sends msg[msg_len] through the pipe as raw data.
//    Returns: TRUE = success; FALSE = failure.
//
// FLAG fGetMessage( PVOID msg, PULONG msg_len )
//    Description:
//        Receives up to msg_len byte into msg.  Does not
return until a message
//        is recieved.
//    Returns: TRUE = success; FALSE = failure.
//
// FLAG fTransact( PCVOID out_msg, ULONG out_msg_len,
PVOID in_msg,
//                    PULONG in_msg_len )
//    Description:
//        Sends out_msg and then receives in_msg.  Does
not return until a
//        message has been received.
//    Returns: TRUE = success; FALSE = failure.
//
// PIPE_STATE eState()
//    Returns:
//        The current state of the pipe:
//            DISCONNECTED - the pipe is not connected to
another process.
//            LISTENING - the pipe is waiting for the two
sides to connect.
//            CONNECTED - the pipe is connected; data
transfer is allowed.
//            CLOSING - pipe is waiting for one side to
acknowledge closure.
//
// UINT uMaxMsgLen() const
//    Returns:
//        The maximun message length that can be sent or
received.
//
// APIRET rcDosErrorCode() const
//    Returns:
```

```
//       The OS API return code of the last API
operation.  Commonly used
//       to determine the type of error once a FALSE has
been returned by
//       one of the member functions above.
//
//*******************************************************
**********************
class MessageBuffer;          // Forward declaration.

class MessagePipe {

   friend class SvrMsgPipeFactory;
   friend class CltMsgPipeFactory;

   MessagePipe( MsgPipeFactory* );
   ~MessagePipe();

public:

// Pipe state enum.  Fixed numbers are set to match API
state (see impementation)!
   enum PIPE_STATE {
      DISCONNECTED = 1,
      LISTENING = 2,
      CONNECTED = 3,
      CLOSING = 4
   };

   FLAG fOpenPipe();
   FLAG fClosePipe();

   FLAG fSendMessage( PCVOID msg, ULONG msg_len );
   FLAG fGetMessage( PVOID msg, PULONG msg_len );
   FLAG fTransact( PCVOID out_msg, ULONG out_msg_len,
PVOID in_msg, PULONG in_msg_len );

   FLAG fSendMessage( TStream& );
   FLAG fGetMessage( TStream& );
   FLAG fTransact( TStream &out, TStream &in );

   PIPE_STATE eState();
   UINT uMaxMsgLen() const { return factory-
>uMaxMsgLen(); }
   APIRET rcDosErrorCode() const { return rc; }

protected:

   void SetHandle( HPIPE h ) { hPipe = h; }
   HPIPE GetHandle() const { return hPipe; }

private:
```

```
   MsgPipeFactory *factory;
   HPIPE hPipe;
   APIRET rc;
};

//*******************************************************
**********************
//
// MessagePipe inline members.
//

inline FLAG MessagePipe::fSendMessage( TStream &stream )
{
   return fSendMessage( stream.buffer, stream.iptr -
stream.buffer );
}

inline FLAG MessagePipe::fGetMessage( TStream &stream )
{
   ULONG get_len = stream.buf_len;
   if (fGetMessage( stream.buffer, &get_len ))  {
      stream.iptr = stream.buffer + get_len;
      return TRUE;
   }
   else return FALSE;
}

inline FLAG MessagePipe::fTransact( TStream &out_strm,
TStream &in_strm )
{
   ULONG get_len = in_strm.buf_len;
   if (fTransact( out_strm.buffer, out_strm.iptr -
out_strm.buffer, in_strm.buffer, &get_len )) {
      in_strm.iptr = in_strm.buffer + get_len;
      return TRUE;
   }
   else return FALSE;
}

#endif // MESSAGEPIPE_HPP
#ifndef OBJECTS_HPP
#define OBJECTS_HPP

#include <iomanip.h>

#include <TObject.HPP>

//íííííííííííííííííííííííííííííííííííííííííííííííííííííííí
ííííííííííííííííííííí
//
// TFlag (used for boolean fields such as StolenFlag and
InsuredFlag).
```

```
//
//    TFlag - sets initial value.
//
//    typecast operators:
//       FLAG - throws exception if NULL.
//       STRING - throws exception if NULL.
//
//    assignment operators:
//       =
//
//    comparison operators:
//       == - boolean compare. throws exception if NULL.
//       !=
//
//    iostream operators (friend operators).
//       <<
//       >>
//
//ííííííííííííííííííííííííííííííííííííííííííííííííííííííí
íííííííííííííííííííííí

#define NULL_TOK        "NULL"

#define TRUE_TOK        "Y"
#define FALSE_TOK       "N"

class TFlag : public virtual TNull {

public:

   TFlag();
   TFlag( FLAG flag );
   ~TFlag();

   virtual void SetDefault();

   TFlag& Assign( const TFlag& );
   TFlag& Assign( FLAG );

   operator FLAG() const;
   operator FLAG() { return value; }
   operator STRING() const;

   TFlag& operator = ( FLAG );
   TFlag& operator = ( const TFlag& );

   FLAG operator == ( const TFlag& ) const;
   FLAG operator == (       FLAG   ) const;
   FLAG operator == (       int    ) const;
   FLAG operator != ( const TFlag& ) const;
   FLAG operator != (       FLAG   ) const;
   FLAG operator != (       int    ) const;
```

```
   friend ostream& operator << ( ostream&, const TFlag&
);
   friend istream& operator >> ( istream&,       TFlag&
);

   friend TStream& operator << ( TStream&, const TFlag&
);
   friend TStream& operator >> ( TStream&,       TFlag&
);

//---------------- PRIVATE IMPLEMENTATION -------------
------
protected:
   FLAG value;
};

//íííííííííííííííííííííííííííííííííííííííííííííííííííííí
íííííííííííííííííííííí
//
// TTimestamp
//
//    fValidate - returns TRUE if object contains a valid
timestamp.
//    ForceValidate - sets value to a known valid value.
//    ToSTRING - converts timestamp to a string
representation: "YYYY-MM-DD-HH.mm.ss.uuuuuu".
//    static fIsValidTSString - checks a string to verify
it's a valid timestamp.
//    UINT TSStringLen - value equals the length of the
string representation of a timestamp.
//
//    manipulator operators:
//       =
//       +=
//
//    typecase operators:
//       STRING
//
//    comparison operators:
//       ==
//       !=
//       <
//       >
//       <=
//       >=
//
//íííííííííííííííííííííííííííííííííííííííííííííííííííííí
íííííííííííííííííííííí
struct TTimestamp : public virtual TNull {

   TTimestamp();
   TTimestamp( USHORT yr,
               UCHAR mo,
```

```
                    UCHAR dy,
                    UCHAR hr = 0,
                    UCHAR mn = 0,
                    UCHAR sc = 0,
                    USHORT ms = 0 );
   ~TTimestamp();

   FLAG fValidate() const;
   void ForceValidate();
   STRING ToSTRING( char * ) const;
   virtual void SetDefault();

   static FLAG fIsValidTSString( STRING );
   static const UINT TSStringLen;

   TTimestamp& Assign( const TTimestamp& );
   TTimestamp& Assign( USHORT, UCHAR, UCHAR, UCHAR = 0,
UCHAR = 0, UCHAR = 0, USHORT = 0 );
   TTimestamp& Assign( STRING, FLAG isnull = FALSE );
#ifdef __OS2__
   TTimestamp& Assign( const DATETIME& );
#endif

// *** manipulator operators
   TTimestamp& operator = ( const TTimestamp& );
#ifdef __OS2__
   TTimestamp& operator = ( const DATETIME& );
#endif

   operator += ( const TTimestamp& );

// *** typecast opertors
   operator STRING() const;

// *** accessors
   USHORT usYear()      const;
   USHORT usMonth()     const;
   USHORT usDay()       const;
   USHORT usHour()      const;
   USHORT usMinute()    const;
   USHORT usSecond()    const;
   USHORT usMillisec()  const;

// *** comparison operators
   FLAG operator == ( const TTimestamp &ts ) const;
   FLAG operator != ( const TTimestamp &ts ) const;
   FLAG operator <  ( const TTimestamp &ts ) const;
   FLAG operator >  ( const TTimestamp &ts ) const;
   FLAG operator <= ( const TTimestamp &ts ) const;
   FLAG operator >= ( const TTimestamp &ts ) const;

   FLAG operator == ( STRING ) const;
```

```
   friend ostream& operator << ( ostream&, const
TTimestamp& );

   friend TStream& operator << ( TStream&, const
TTimestamp& );
   friend TStream& operator >> ( TStream&,
TTimestamp& );

   TTimestamp& AddToDate( UINT yr, UINT mon, UINT day,
                  UINT hr = 0, UINT min = 0, UINT sec =
0, UINT ms = 0 );

// Class properties.
   static FLAG fIsLeapYear( USHORT year );
   static USHORT usMaxMonth();
   static USHORT usMaxDay( USHORT year, USHORT month );
   static USHORT usMaxHour();
   static USHORT usMaxMinute();
   static USHORT usMaxSecond();
   static USHORT usMaxMillisec();

//---------------- PROTECTED IMPLEMENTATION ------------
-----
protected:
   USHORT Year;
   UCHAR Month;
   UCHAR Day;
   UCHAR Hour;
   UCHAR Minute;
   UCHAR Second;
   USHORT Millisec;
};

//ííííííííííííííííííííííííííííííííííííííííííííííííííííí
íííííííííííííííííííííí
//
// TString
//
//ííííííííííííííííííííííííííííííííííííííííííííííííííííí
íííííííííííííííííííííí
class TString {
};

#include <Objects.INL>

#endif // OBJECTS_HPP
#ifndef POINTER_HPP
#define POINTER_HPP

template <class T> class TPointer {

   TPointer();
```

```
   FLAG operator !() const { return fIsNull(); }
         operator const T& () const { return
useAsRValue(); }
         operator       T& ()       { return
useAsLValue(); }
   const T& operator ()       () const { return
useAsRValue(); }
         T& operator ()       ()       { return
useAsLValue(); }
   const T* operator ->       () const { return
&useAsRValue(); }
         T* operator ->       ()       { return
&useAsLValue(); }
   const T& operator *        () const { return
useAsRValue(); }
         T& operator *        ()       { return
useAsLValue(); }

//   operator = () {

private:
   T *ptr;
};

#endif POINTER_HPP
#ifndef BITFLAGS_HPP
#define BITFLAGS_HPP

#include <TStream.HPP>

template <class Enum> class TBitflag {

public:

   TBitflag( Enum );
   TBitflag();

   Enum Assign( Enum );

   Enum Set( Enum );
   Enum Clear( Enum );
   Enum Change( Enum mask, Enum setting );

   FLAG fIsSet( Enum ) const;
   FLAG fIsClear( Enum ) const;
   FLAG fIsAnySet( Enum ) const;
   FLAG fIsAnyClear( Enum ) const;

   Enum operator = ( Enum );

   operator ULONG () const;
   operator Enum () const;
```

```
   friend TStream& operator << ( TStream&, const
TBitflag<Enum>& );
   friend TStream& operator >> ( TStream&,
TBitflag<Enum>& );

private:
   ULONG flags;
};

template <class Enum> TBitflag<Enum>::TBitflag( Enum e )
   :  flags( e )
{}

template <class Enum> TBitflag<Enum>::TBitflag()
{
#ifdef DEBUG
   flags = UNINIT_DATA;
#endif
}

template <class Enum> inline Enum TBitflag<Enum>::Assign(
Enum e )
{
   return Enum( flags = e );
}

template <class Enum> inline Enum TBitflag<Enum>::Set(
Enum e )
{
   return Enum( flags |= e );
}

template <class Enum> inline Enum TBitflag<Enum>::Clear(
Enum e )
{
   return Enum( flags &= ~((ULONG)e) );
}

template <class Enum> inline Enum TBitflag<Enum>::Change(
Enum mask, Enum settings )
{
   return Enum( flags = (flags & ~mask) | (settings &
mask) );
}

template <class Enum> inline FLAG TBitflag<Enum>::fIsSet(
Enum e ) const
{
   return FLAG( (flags & e) == e );
}

template <class Enum> inline FLAG
TBitflag<Enum>::fIsClear( Enum e ) const
```

```
{
   return FLAG( (flags & e) == 0 );
}

template <class Enum> inline FLAG
TBitflag<Enum>::fIsAnySet( Enum e ) const
{
   return !fIsClear( e );
}

template <class Enum> inline FLAG
TBitflag<Enum>::fIsAnyClear( Enum e ) const
{
   return !fIsSet( e );
}

template <class Enum> inline Enum
TBitflag<Enum>::operator = ( Enum e )
{
   return Assign( e );
}

template <class Enum> inline TBitflag<Enum>::operator
ULONG () const
{
   return flags;
}

template <class Enum> inline TBitflag<Enum>::operator
Enum () const
{
   return (Enum)flags;
}

template <class Enum> inline TStream& operator << (
TStream &str, const TBitflag<Enum> &bf )
{
   return str << bf.flags;
}

template <class Enum> inline TStream& operator >> (
TStream &str, TBitflag<Enum> &bf )
{
   return str >> bf.flags;
}

#endif // BITFLAGS_HPP
#ifndef TBUFFER_HPP
#define TBUFFER_HPP

#include <iostream.h>

#include <debug.h>
```

```
#include <TBitflag.HPP>
#include <TStream.HPP>

#define BUFFER_UNIT          16

//=========================================================
=====================
//
// class TBaseBuffer - implements a simple variable
length memory block.
//
class TBaseBuffer {

public:

   TBaseBuffer();
   TBaseBuffer( UINT bufsize );
   ~TBaseBuffer();

   BYTE* Buf();
   const BYTE* Buf() const;

   FLAG fRealloc( UINT new_size );

   friend TStream& operator << ( TStream&, const
TBaseBuffer& );
   friend TStream& operator >> ( TStream&,
TBaseBuffer& );

protected:
   TBaseBuffer( const TBaseBuffer& );  // Copy
constructor.
   static UINT alloc_limit( UINT ); // Given a number,
returns a valid adjustment.
   BYTE*        _buf()       { return buffer; }
   const BYTE* _buf() const { return buffer; }
   BYTE* _newBuf( UINT new_limit );

//---------------- private implementation -------------
----------------------
private:
   BYTE *buffer;                     // Beginning of
buffer.
   UINT limit;                       // Current
allocated buffer size.
};

inline BYTE* TBaseBuffer::Buf()
{
   return buffer;
}

inline const BYTE* TBaseBuffer::Buf() const
```

```
{
   return buffer;
}

//==========================================================
=====================
//
// class TBuffer - implements a sofisticated memory
block.
//    includes reference counting, operators, generic
properties, etc.
//
class TBuffer : private TBaseBuffer {
public:

// Type for properties of TBuffer.
   enum PROPS {
      DEFAULT  = 0,

      FIXED    = 0x00000001,  // Lock the size of the
buffer.
      READONLY = 0x00000002,  // Block any attempt to
modify.
      SHARED   = 0x00000004,  // Changes to this string
are shared by all.

      USER1    = 0x01000000,  // User settings for
general use.
      USER2    = 0x02000000,
      USER3    = 0x04000000,
      USER4    = 0x08000000,
      USER5    = 0x10000000,
      USER6    = 0x20000000,
      USER7    = 0x40000000
//      USER8    = 0x80000000          // Too big???
(give compiler error with CSet++ 2.1)
   };
   typedef TBitflag< PROPS > TProps;

// Construction/Destruction.
   TBuffer( PROPS = DEFAULT );
   TBuffer( UINT length, PROPS = DEFAULT );
   TBuffer( TBuffer& );                  // copy
constructor.
   ~TBuffer();

// Attribute access.
   UINT uLength() const;                 // Returns the
length of the buffer.
   FLAG fResize( UINT new_size );        // Shink or grow
to a new size, returns TRUE if successful.
```

```
   void Resize( UINT new_size );       // Throws an
exception if fails.
   const BYTE* Buf() const;            // Read-only
access to data.
   BYTE* Buf();                        // Access to data,
throws exeption if READONLY or !SHARED && ref_c > 1.
   const BYTE* Buf( UINT index ) const;// Returns Buf() +
index. checks range.
   BYTE* Buf( UINT index );            // Returns Buf() +
index. checks range.

// Reference counting.
   UINT uRef();                        // Add a
reference.
   UINT uDeref();                      // Remove a
reference.
   UINT uRefCount() const;             // Return the
reference count.
   TBuffer& PrepareToChange();         // Makes a copy of
needed (if COPYMOD=1)
   TBuffer& Copy();                    // Makes a new
copy of this TBuffer.

// Generic property interface.
   FLAG fQueryProperty( PROPS ) const; // Returns TRUE if
specified props are set.
   PROPS SetProperty( PROPS );         // Sets specified
props.
   PROPS ClearProperty( PROPS );       // Clears
specified props.

// Specific propery interface.
   FLAG fQueryReadOnly() const;        // TRUE if this
buffer is read-only.
   FLAG fSetReadOnly( FLAG setting );
   FLAG fQueryFixed() const;           // TRUE if this
buffer's length is fixed.
   FLAG fSetFixed( FLAG setting );
   FLAG fQueryShared() const;          // TRUE if this
buffer's value is shared.
   FLAG fSetShared( FLAG setting );

// String functions.
   TBuffer& StrCopy( const TBuffer& );
   TBuffer& StrCopy( STRING );
   TBuffer& StrConcat( const TBuffer& );
   TBuffer& StrConcat( STRING );
   TBuffer& StrTrunc( UINT index );
   TBuffer& StrGrow( UINT index );
   TBuffer& StrGrow( UINT index, BYTE pad );

// stream operators.
```

```
   friend TStream& operator << ( TStream&, const TBuffer&
);
   friend TStream& operator >> ( TStream&,       TBuffer&
);

   friend ostream& operator <<( ostream &os, const
TBuffer &Buf );

//---------------- protected implementation -----------
---------------------
protected:
// direct buffer manipulation functions.
   TBuffer& _strCopy( const TBuffer& );
   TBuffer& _strCopy( STRING );
   TBuffer& _strConcat( const TBuffer& );
   TBuffer& _strConcat( STRING );
   TBuffer& _strTrunc( UINT index );
   TBuffer& _strGrow( UINT index );                //
Grows buffer (pads with eos).
   TBuffer& _strGrow( UINT index, BYTE pad );      //
Grows and pads buffer.

//---------------- private implementation -------------
---------------------
private:

//   static TBufferHeap *heap;        // Manages all
TBuffers.

   UINT length;                      // Length of
allocated data (actual buffer is
                                          // guaranteed 1
byte larger for eos).
   UINT ref_c;                       // Reference Count.
   TProps props;                     // Attribute
properties.
};

#include <TBuffer.INL>

#endif // TBUFFER_HPP
#ifndef TMSG_HPP
#define TMSG_HPP

typedef ULONG MSG_ID;
enum MSG_TYPE              // Derived event classtype.
{
   TSYSMSG,                // TSysMsg type.
   TOBJMSG                 // TObjMsg type.
}

//=====================================================
====================
```

```
//
// TMessageHandlerObject - Abstract base class for
TMessage aware objects.
//     AKA - TMsgHObj.
//
class TMessageHandlerObject {
public:

   friend class TMessage;
   typedef FLAG (TMessageHandlerObject::*
fHandleMessage)( TMessage * );

protected:

   virtual FLAG handleMessage( TMessage* ) = 0;
   virtual FLAG postMessage   ( TMessage* ) = 0;

};
typedef TMessageHandlerObject TMsgHObj;             //
Define synonym.

//======================================================
=====================
//
// TMessage - Abstract base class for all messages.
//
class TMessage {
public:

   enum STATE {
      PRODUCED,
      POSTED,
      PENDING,
      EXECUTING,
      CONSUMED
   };

   TMessage( TMsgHObj *source, MSG_ID id, PVOID data );
   virtual ~TMessage();

// Message Properties.
   virtual const TMsgHObj* Source() const { return
source; }
   virtual const STATE     State()  const { return state;
}
   virtual const MSG_ID    Id()     const { return id; }
   virtual const MSG_TYPE  Type()   const = 0;
   virtual       PVOID     Data()         { return data;
}

// Message Methods.
   virtual FLAG fSend() = 0;
```

```
protected:
   STATE state;

private:
   TMsgHObj *source;
   MSG_ID id;
   PVOID data;
};

//
//
//
class TSysMsg : public TMessage {
public:

   static void SetSystemHandler( TMsgHObj *syshnd ) {
system_handler = syshnd; }

   TSysMsg( TMsgHObj *source, MSG_ID id, PVOID data );

   virtual const MSG_TYPE Type() const { return TSYSMSG;
}
   virtual FLAG fSend();

private:
   static TMsgHObj *system_handler;
};

class TObjMsg : public TMessage {
public:

   TObjMsg( TMsgHObj *source, TMsgHObj *target, MSG_ID
id, PVOID data );

   virtual const MSG_TYPE Type() const { return TOBJMSG;
}
   virtual FLAG fSend();

private:
   TMsgHObj *target;
};


class TEModem : public TModem, public
TMessageHandlerObject {
public:

   FLAG handleMessage( TMessage* );
   FLAG postMessage  ( TMessage* );
```

```
};

FLAG TEModem::handleMessage( TMessage *event )
{
   if (event->Source() == &Port())   {
      if (fResultReceived())   {

         TModemMessage event = new TModemMessage( this,
rcResultCode() );

         event->fSend( ModemHandler );
// --> ModemHandler.handleMessage( event );
      }
   }
   else return FALSE;
}

FLAG TEConnect::handleModemMessage( TModemMessage *event
)
{
   if (event->ResultCode() == TModem::CONNECT)   {
      waitForEnq();
      return TRUE;
   }
}

#endif // TMSG_HPP
#ifndef TEXCEPTION_HPP
#define TEXCEPTION_HPP

#include <iostream.h>

#include <usertype.h>

typedef ULONG ERROR_ID;

#define EXP_STRLIST_SIZE   10

class TException {
public:

   enum SEVERITY {
      UNRECOVERABLE,
      RECOVERABLE
   };

   TException( STRING string, ERROR_ID id = 0, SEVERITY =
UNRECOVERABLE );
   TException( const TException& );
   ~TException();

   TException& AddString( STRING error_str );
//   TException& AppendString( STRING error_str );
```

```
   TException& SetSeverity( SEVERITY sev ) { severity =
sev; return *this; }
   TException& SetErrorId( ERROR_ID id ) { error_id = id;
return *this; }

   virtual FLAG fIsRecoverable() const { return severity
== RECOVERABLE; }
   virtual STRING GetName() const { return "TException";
}

   STRING GetString( UINT i = 0 ) const { return
strlist[i]; }
   UINT uGetStringCount() const { return str_count; }
   ERROR_ID GetErrorId() const { return error_id; }

private:
   STRING strlist[EXP_STRLIST_SIZE];
   UINT str_count;
   ERROR_ID error_id;
   SEVERITY severity;
};

ostream& operator << ( ostream&, const TException& );

#endif // TEXCEPTION_HPP

#ifndef TMESSAGE_HPP
#define TMESSAGE_HPP

#include <usertype.h>

typedef ULONG MSG_ID;
enum MSG_TYPE              // Derived event classtype.
{
   TSYSMSG,                // TSysMsg type.
   TOBJMSG,                // TObjMsg type.
   TSPECMSG                // TSpecMsg type.
};

//=======================================================
=====================
//
// TMessageHandlerObject - Abstract base class for
TMessage aware objects.
//    AKA - TMsgHObj.
//
class TMessageHandlerObject {
public:

   friend class TMessage;
   typedef FLAG (TMessageHandlerObject::*HANDLER)(
TMessage* );
```

```
   FLAG fHandleMessage( TMessage* );      // Front-end
for virtual function handlerMessage().

private:
   virtual FLAG handleMessage( TMessage* ) = 0; //
Should'nt call directly (call fHandleMessage() instead).
};
typedef TMessageHandlerObject TMsgHObj;           //
Define synonym.

//=====================================================
=====================
//
// TMessage - Abstract base class for all messages.
//
class TMessage {
public:

   enum STATE {
      PRODUCED,            // Message has been created
but not used.
      PENDING,             // Message has been sent and
is pending execution.
      EXECUTING,           // Message has been sent and
is being executed.
      CONSUMED             // Message was consumed and
can be destroyed.
   };

   TMessage( TMsgHObj *source, MSG_ID id, PVOID data );
   virtual ~TMessage();

// Message Properties.
   virtual const TMsgHObj* Source() const { return
source; }
   virtual const STATE     State()  const { return state;
}
   virtual const MSG_ID    Id()     const { return id; }
   virtual const MSG_TYPE  Type()   const = 0;
   virtual       PVOID     Data()         { return data;
}

// Message Methods.
   FLAG fSend();     // Front-end to the send() virtual
function.

// State changes.
   void StateToPending()   { state = PENDING; }
   void StateToExecute()   { state = EXECUTING; }
   void StateToConsumed()  { state = CONSUMED; }

private:
```

```
   virtual FLAG send() = 0;   // Should not call directly
(call fSend() instead).

   STATE state;
   TMsgHObj *source;
   MSG_ID id;
   PVOID data;
};

//
//
//
class TSysMsg : public TMessage {
public:

   static void SetSystemHandler( TMsgHObj *syshnd ) {
system_handler = syshnd; }

   TSysMsg( TMsgHObj *source, MSG_ID id, PVOID data );

   virtual const MSG_TYPE Type() const { return TSYSMSG;
}

private:
   virtual FLAG send();

   static TMsgHObj *system_handler;
};

//
//
//
class TObjMsg : public TMessage {
public:

   TObjMsg( TMsgHObj *source, TMsgHObj *target, MSG_ID =
0, PVOID data = NULL );

   virtual const MSG_TYPE Type() const { return TOBJMSG;
}

protected:
   virtual FLAG send();

   TMsgHObj *target;
};

class TSpecMsg : public TObjMsg {
public:

   TSpecMsg( TMsgHObj *src, TMsgHObj *trt,
TMsgHObj::HANDLER, MSG_ID = 0, PVOID data = NULL );
```

```
   virtual const MSG_TYPE Type() const { return TSPECMSG;
}

private:
   virtual FLAG send();

   TMsgHObj::HANDLER handler;
};

/****************************************
class TEModem : public TModem, public
TMessageHandlerObject {
public:

   FLAG handleMessage( TMessage* );
   FLAG postMessage   ( TMessage* );

};

FLAG TEModem::handleMessage( TMessage *event )
{
   if (event->Source() == &Port())   {
      if (fResultReceived())   {

         TModemMessage event = new TModemMessage( this,
rcResultCode() );

         event->fSend( ModemHandler );
// --> ModemHandler.handleMessage( event );
      }
   }
   else return FALSE;
}

FLAG TEConnect::handleModemMessage( TModemMessage *event
)
{
   if (event->ResultCode() == TModem::CONNECT)   {
      waitForEnq();
      return TRUE;
   }
}
****************************************/

#endif // TMESSAGE_HPP
#ifndef TMODEM_HPP
#define TMODEM_HPP

#include <TPort.HPP>

//íííííííííííííííííííííííííííííííííííííííííííííííííííííí
ííííííííííííííííííííí
//
```

```
// class TModem -
//
//
//
//ííííííííííííííííííííííííííííííííííííííííííííííííííííííí
íííííííííííííííííííííí
class TModem {

public:

   enum RC {
      OK             = 0,
      CONNECT        = 1,
      RING           = 2,
      NO_CARRIER     = 3,
      ERROR          = 4,
      CONNECT_1200   = 5,
      NO_DIALTONE    = 6,
      BUSY           = 7,
      NO_ANSWER      = 8,
      EXTENDED_RC    = 9
   };

   enum EVENT {
      EV_ANYCMD,
      EV_OK,
      EV_CONNECT,
      EV_RING,
      EV_NOCARR,
      EV_ERROR
   };

   TModem( TPort &port );

   FLAG fSendCommand( STRING );
   FLAG fResultReceived();
   RC rcResultCode() const;
   STRING strResultCode() const;

   RC rcSendCommand( STRING, ULONG timeout );
   STRING strSendCommand( STRING str, ULONG timeout );
   STRING strGetString( ULONG timeout );

   const TPort& Port() const { return port; }
   TPort& Port()             { return port; }

#ifndef _THREADS
   void ManageEvents();              // For single
threaded usage.
#endif

//---------------- PRIVATE IMPLEMENTATION --------------
------
```

```
private:
   TPort& port;

   char last_command[80];
   char last_result[80];
   RC last_rc;
};


#endif // TMODEM_HPP
#ifndef TOBJECT_HPP
#define TOBJECT_HPP

#include <usertype.h>
#include <debug.h>

#include <TStream.HPP>

#include <iostream.h>

//ßßßßßßßßßßßßßßßßßßßßßßßßßßßßßßßßßßßßßßßßßßßßßßßßßßßßß
ßßßßßßßßßßßßßßßßßßßßßß
//
// CTIMS Root types.
//
// These types are used by derivation only.  They are not
meant to be
//    implemented.
//
//    TObject -
//    TNull -
//
//ßßßßßßßßßßßßßßßßßßßßßßßßßßßßßßßßßßßßßßßßßßßßßßßßßßßßß
ßßßßßßßßßßßßßßßßßßßßßß

//íííííííííííííííííííííííííííííííííííííííííííííííííííí
íííííííííííííííííííííí
//
// Object root class.
//
//íííííííííííííííííííííííííííííííííííííííííííííííííííí
íííííííííííííííííííííí
class TObject {

public:

   virtual ~TObject();

   // ...
   // not implemented.
   // ...
};
```

```
//íííííííííííííííííííííííííííííííííííííííííííííííííííííííí
íííííííííííííííííííííí
//
// CTIMS Nullable Object root class.
//
// Public interface:
//
//    TNull - sets initial value.
//          TRUE = object is NULL.
//          FALSE = object has a value.
//    fIsNull - returns TRUE if NULL.
//    fSetNull - sets object to NULL.
//    fSetDefault - sets object to its default value.
(pure virtual).
//
//    operator ! - returns TRUE if object is NULL.
//
//íííííííííííííííííííííííííííííííííííííííííííííííííííííííí
íííííííííííííííííííííí
class TNull : public virtual TObject {

public:

   TNull( FLAG isnull = TRUE );

   FLAG fIsNull() const;
   virtual FLAG fSetNull();
   virtual void SetDefault() {}        // This should be
pure virtual!!!

   FLAG operator !() const;

   friend TStream& operator << ( TStream&, const TNull&
);
   friend TStream& operator >> ( TStream&,       TNull&
);

//---------------- PROTECTED IMPLEMENTATION ------------
------
protected:

   virtual void setNotNull();        // called when used
as an L-Value.
   virtual void useAsValue() const; // called when used
as an R-Value.

//---------------- PRIVATE IMPLEMENTATION --------------
------
private:
   FLAG isnull;
};

#include <TObject.INL>
```

```
#endif // TOBJECT_HPP
#ifndef TPOINTER_HPP
#define TPOINTER_HPP

#include <debug.h>

template <class T> class TPointer {
public:

   TPointer() : ptr( NULL ) {}
   TPointer( T *pt ) : ptr( pt ) {}

   FLAG operator !() const { return ptr == NULL; }

            operator const T* () const { return
useAsRValue(); }
            operator       T* ()       { return
useAsLValue(); }
   const T* operator ->       () const { return
useAsRValue(); }
         T* operator ->       ()       { return
useAsLValue(); }
   const T& operator *        () const { return
*useAsRValue(); }
         T& operator *        ()       { return
*useAsLValue(); }

   TPointer& operator = ( T* pt ) { ptr = pt; return
*this; }

   FLAG operator == ( PVOID p ) const { return (PVOID)ptr
== p; }
   FLAG operator != ( PVOID p ) const { return !(*this ==
p); }

protected:
   const T* useAsRValue() const { ASSERT( ptr != NULL );
return ptr; }
         T* useAsLValue()       { ASSERT( ptr != NULL );
return ptr; }

private:
   T *ptr;
};

#endif // TPOINTER_HPP
#ifndef TPORT_HPP
#define TPORT_HPP

#include <debug.h>

#ifdef __OS2__
   #define _THREADS
```

```
   #include "CT_Buffer.HPP"
   #include "CT_Log.HPP"
#endif

#ifdef _Windows
   // Windows includes here.
#endif

//ííííííííííííííííííííííííííííííííííííííííííííííííííííííí
íííííííííííííííííííííí
//
// TPort - implements a com port as an object.
//
//    fOpenPort - opens the port, initializes it to
desired settings.
//    fClosePort - closes the port.
//
//    FlushInputBuffer - flushes the input buffer.
//    FlushOutputBuffer - flushes the output buffer.
//    fIsEmpty - returns TRUE if the Ports buffers are
empty.
//    fIsFull - returns TRUE if the Ports buffers are
full.
//
//    fGetChar - gets a character from the input buffer.
//    fPutChar - puts a character into the output buffer.
//    fReadPort - reads a block of data from the input
buffer.
//    fWritePort - reads a block of data to the output
buffer.
//    fDropDTR - drops DTR (signals that the computer is
not ready).
//    fRaiseDTR - raises DTR (signals that the computer
is ready).
//
//    StartLog - start logging all incoming characters.
//    StopLog - stops logging incoming characters.
//    fDumpLog - writes the log to a file and resets the
log.
//    rcErrorCode - returns the os specific error code
from the last operation.
//
//ííííííííííííííííííííííííííííííííííííííííííííííííííííííí
íííííííííííííííííííííí
class TPort {

public:

#ifdef __OS2__
   enum PARITY {
      NO = 0,             // No parity.
      ODD = 1,            // Odd parity.
      EVEN = 2,           // Even parity.
```

```
        MARK = 3,            // Mark parity (parity bit always
1).
        SPACE = 4            // Space parity (parity bit
always 0).
     };
     enum STOP_BITS {
        ONE = 0,             // 1 stop bit.
        ONE_AND_HALF = 1,    // 1.5 stop bits (valid with 5
data bit length only).
        TWO = 2              // 2 stop bits (not valid with 5
bit WORD length).
     };
#endif // __OS2__
#ifdef _Windows
     enum PARITY {
        NO,                  // No parity.
        ODD,                 // Odd parity.
        EVEN,                // Even parity.
        MARK,                // Mark parity (parity bit always
1).
        SPACE                // Space parity (parity bit
always 0).
     };
     enum STOP_BITS {
        ONE,                 // 1 stop bit.
        ONE_AND_HALF,        // 1.5 stop bits (valid with 5
data bit length only).
        TWO                  // 2 stop bits (not valid with 5
bit WORD length).
     };
#endif // _Windows

     struct ComSettings {
        STRING port_name;
        UINT port_num;
        UINT bps;
        UINT data_bits;
        PARITY parity;
        STOP_BITS stop_bits;
     };

     TPort();
     ~TPort();

     FLAG fOpenPort( const ComSettings &settings );
     FLAG fClosePort();

     void FlushInputBuffer();
     void FlushOutputBuffer();

     FLAG fIsEmpty() const;
     FLAG fIsFull() const;
```

```
   FLAG fGetChar( char &ch );
   FLAG fPutChar( char ch );

   FLAG fReadPort( PVOID, UINT & );
   FLAG fWritePort( PVOID, UINT );
   FLAG fWritePort( PCSZ sz );

   FLAG fDropDTR();
   FLAG fRaiseDTR();

#ifdef _THREADS
   FLAG fStartManageThread();
   void ManagePort();                    // Default manage
thread.
   void KillManageThread();

   FLAG fStartCommandThread( TTHREAD );
   FLAG fStartCommandThread( TTHREAD, PVOID data );
   void KillCommandThread();
#endif

   void StartLog();
   void StopLog();
   FLAG fDumpLog( const char *fname );

   ULONG rcErrorCode() const;

//---------------- PRIVATE IMPLEMENTATION -------------
------
private:

#ifdef __OS2__
   HFILE hPort;
   CT_Buffer buffer;
   CT_Log log;
   int manage_thread, command_thread;
   APIRET rc;
   FLAG fManThread, fCmdThread, log_flag;
#endif
#ifdef _Windows

   // Windows variables inserted here.

#endif
};

// Include inline functions.
#ifdef __OS2__
   #include <tport.os2>
#endif
#ifdef _Windows
   #include <tport.win>
#endif
```

```
#endif // TPORT_HPP
#ifndef TSTREAM_HPP
#define TSTREAM_HPP

#include <usertype.h>

#define MAX_CTMSG_SIZE      512
#define DEF_TSTREAM_SIZE    512

//
// TStream
//
class TStream {

public:

   TStream( UINT buf_size = DEF_TSTREAM_SIZE );
   ~TStream();

   void Reset();

   TStream& operator << ( const FLAG   );
   TStream& operator << ( const USHORT );
   TStream& operator << ( const UINT   );
   TStream& operator << ( const ULONG  );
   TStream& operator << ( const char*  );

   TStream& operator >> ( FLAG&   );
   TStream& operator >> ( USHORT& );
   TStream& operator >> ( UINT&   );
   TStream& operator >> ( ULONG&  );
   TStream& operator >> ( char*   );

   TStream& Put( const PVOID data, UINT size );
   TStream& Get(       PVOID data, UINT size );

protected:
   TStream& incExtractor( UINT );
   TStream& incInserter( UINT );

private:
   ULONG buf_len;
   BYTE *buffer;
   BYTE *iptr, *xptr;

   friend class MessagePipe;
   // KLUDGE for DBServer.C
};

/*******************************************************
**********************
template <class T> TStream& operator << ( TStream&, const
T& );
```

```
template <class T> TStream& operator >> ( TStream&,
T& );

template <class T> TStream& operator << ( TStream
&stream, const T &t )
{
   return stream.Put( PVOID( &t ), sizeof( T ) );
}

template <class T> TStream& operator >> ( TStream
&stream, T &t )
{
   return stream.Get( PVOID( &t ), sizeof( T ) );
}
*******************************************************
********************/

#endif // TSTREAM_HPP
#ifndef TSTRING_HPP
#define TSTRING_HPP

#include <iostream.h>

#include <usertype.h>
#include <debug.h>

#include <TStream.HPP>
#include <TBuffer.HPP>

FLAG fIsNull( STRING str );
FLAG fIsNotNull( STRING str );
FLAG fStrCmpE( STRING str1, STRING str2 );
FLAG fStrCmpL( STRING str1, STRING str2 );
FLAG fStrCmpG( STRING str1, STRING str2 );
FLAG operator == ( STRING str1, STRING str2 );
FLAG operator != ( STRING str1, STRING str2 );
FLAG operator <  ( STRING str1, STRING str2 );
FLAG operator <= ( STRING str1, STRING str2 );
FLAG operator >  ( STRING str1, STRING str2 );
FLAG operator >= ( STRING str1, STRING str2 );
#include <StrOps.INL>

class TString {

public:

   TString();                        // Constructs null
string.
   TString( const TString & );       // Copy
constructor.
   TString( STRING );                // Copy
constructor.
```

```
   TString( STRING, STRING );          // Constructs a
concatinaton of two strings.
   ~TString();

// *** Testing functions.
   FLAG fIsAlphanumeric () const;      // TRUE if entire
string is alpha-num.
   FLAG fIsAlphabetic   () const;      // TRUE if entire
string is alphabetic.
   FLAG fIsUpperCase    () const;      // TRUE if entire
string is upper case.
   FLAG fIsLowerCase    () const;      // TRUE if entire
string is lower case.
   FLAG fIsWhiteSpace   () const;      // TRUE if entire
string is whitespace.
   FLAG fIsPrintable    () const;      // TRUE if entire
string is printable.
   FLAG fIsPunctuation  () const;      // TRUE if entire
string is punctuation.
   FLAG fIsControl      () const;      // TRUE if entire
string is control characters.
   FLAG fIsGraphics     () const;      // TRUE if entire
string is alphabetic.

   FLAG fIsASCII        () const;      // TRUE if entire
string is ASCII.

   FLAG fIsDigits       () const;      // TRUE if entire
string is decimal.
   FLAG fIsHexDigits    () const;      // TRUE if entire
string is hexadecimal.
   FLAG fIsBinaryDigits () const;      // TRUE if entire
string is binary.

// *** manipulator operators.
   TString& operator =  ( const TString &str );
   TString  operator ~  (          ) const;
   TString& operator += ( STRING );
   TString& operator &= ( STRING );
   TString& operator |= ( STRING );
   TString& operator ^= ( STRING );

   friend TString operator + ( STRING str1, STRING str2
);
   friend TString operator & ( STRING str1, STRING str2
);
   friend TString operator | ( STRING str1, STRING str2
);
   friend TString operator ^ ( STRING str1, STRING str2
);

// *** accessors.
   UINT uLength() const;
```

```
   TString subString( UINT start_pos ) const;
   TString subString( UINT startPos, UINT length, char
pad_char = ' ' ) const;

   char& operator []        ( unsigned index );
   const char& operator [] ( unsigned index ) const;

// *** typecase operators.
   operator STRING          () const;
   operator unsigned char* ();
   operator char*           ();

// *** stream operators.
   TString& operator << ( const TString& );
   TString& operator << ( char );
   TString& operator << ( int );
   TString& operator << ( long );

   friend TStream& operator << ( TStream&, const TString&
);
   friend TStream& operator >> ( TStream&,       TString&
);

   friend ostream& operator <<( ostream &os, const
TString &Str );

// *** properties.
   FLAG fQueryReadOnly() const;          // TRUE if this
string is read-only.
   FLAG fSetReadOnly( FLAG setting );
   FLAG fQueryFixed() const;             // TRUE if this
string's length is fixed.
   FLAG fSetFixed( FLAG setting );
   FLAG fQueryShared() const;            // TRUE if this
string's value is shared.
   FLAG fSetShared( FLAG setting );

private:

   TString( TBuffer *pBuffer );          // Create a new
TString based on a TBuffer.
   void prepareToChange();               // Called before
any change to the string is made.

   TBuffer* assignBuffer( TBuffer* );  // Assigns the new
buffer to the old one.

   TBuffer *buffer;                      // Pointer to
allocated memory block.
};

template <class base> class TSTRING {
```

```
};

template <UINT length, char padding> class TCharArray {

   TCharArray();                          // Constructs
padded array.
   TCharArray( STRING );                  // STRING Copy
constructor.

private:

};

#include <TString.INL>

#endif // TSTRING_HPP

//*******************************************************
**********************
//
// TFlag inline members.
//

inline void TFlag::SetDefault()
{
}

inline TFlag& TFlag::Assign( const TFlag &flag )
{
   setNotNull();
   value = flag.value;
   return (*this);
}

inline TFlag& TFlag::Assign( FLAG flag )
{
   setNotNull();
   value = FLAG( flag != FALSE );
   return (*this);
}

inline TFlag::operator FLAG() const
{
   useAsValue();
   return FLAG( value != FALSE );
}

inline TFlag::operator STRING() const
{
   useAsValue();
```

```
   return (value) ? TRUE_TOK : FALSE_TOK;
}

inline TFlag& TFlag::operator = ( const TFlag &flag )
{
   return Assign( flag );
}

inline TFlag& TFlag::operator = ( FLAG flag )
{
   return Assign( flag );
}

// *** Comparison operators ***

inline FLAG TFlag::operator == ( const TFlag &flag )
const
{
   useAsValue();
   return FLAG( value == FLAG( flag ) );
}

inline FLAG TFlag::operator == ( FLAG flag ) const
{
   useAsValue();
   return FLAG( value == flag );
}

inline FLAG TFlag::operator == ( int flag ) const
{
   useAsValue();
   return FLAG( value == (flag != 0) );
}

inline FLAG TFlag::operator != ( const TFlag &flag )
const
{
   useAsValue();
   return FLAG( (*this == flag) == 0 );
}

inline FLAG TFlag::operator != ( FLAG flag ) const
{
   useAsValue();
   return FLAG( (*this == flag) == 0 );
}

inline FLAG TFlag::operator != ( int flag ) const
{
   useAsValue();
   return FLAG( (*this == flag) == 0 );
}
```

```
//*************************************************************
**********************
//
// TTimestamp inline members.
//
inline void TTimestamp::SetDefault()
{
   ForceValidate();
}

inline TTimestamp& TTimestamp::operator = ( const
TTimestamp &ts )
{
   return Assign( ts );
}

#ifdef __OS2__
inline TTimestamp& TTimestamp::operator = ( const
DATETIME &Date )
{
   return Assign( Date );
}
#endif // __OS2__

inline USHORT TTimestamp::usYear() const
{
   return Year;
}

inline USHORT TTimestamp::usMonth() const
{
   return Month;
}

inline USHORT TTimestamp::usDay() const
{
   return Day;
}

inline USHORT TTimestamp::usHour() const
{
   return Hour;
}

inline USHORT TTimestamp::usMinute() const
{
   return Minute;
}

inline USHORT TTimestamp::usSecond() const
{
   return Second;
```

```
}
inline USHORT TTimestamp::usMillisec() const
{
   return Millisec;
}
inline FLAG TTimestamp::operator <  ( const TTimestamp
&ts ) const
{
   return FLAG( !(*this >= ts) );
}
inline FLAG TTimestamp::operator <= ( const TTimestamp
&ts ) const
{
   return FLAG( !(*this > ts) );
}
inline FLAG TTimestamp::operator != ( const TTimestamp
&ts ) const
{
   return FLAG( !(*this == ts) );
}
// static member.
inline FLAG TTimestamp::fIsLeapYear( USHORT year )
{
   if (year % 4 && !(year % 100 || !(year % 400))) return
TRUE;
   else return FALSE;
}
// static member.
inline USHORT TTimestamp::usMaxMonth()
{
   return 12;
}
// static member.
inline USHORT TTimestamp::usMaxHour()
{
   return 23;
}
// static member.
inline USHORT TTimestamp::usMaxMinute()
{
   return 59;
}
// static member.
inline USHORT TTimestamp::usMaxSecond()
```

```
{
   return 59;
}

// static member.
inline USHORT TTimestamp::usMaxMillisec()
{
   return 999;
}


//-----------------------------------------------------
---------------------
//
// Inline members of TBuffer.
//
inline UINT TBuffer::uLength() const
{
   return length;
}

inline void TBuffer::Resize( UINT new_size )
{
   if (!fResize( new_size )) ASSERT( FALSE );
}

inline const BYTE* TBuffer::Buf() const
{
   return TBaseBuffer::Buf();
}

inline BYTE* TBuffer::Buf()
{
   ASSERT( fQueryProperty( READONLY ) == FALSE );
   ASSERT( fQueryProperty( SHARED ) == TRUE ||
uRefCount() == 1 );
   return TBaseBuffer::Buf();
}

inline const BYTE* TBuffer::Buf( UINT index ) const
{
   ASSERT( index < uLength() );
   return Buf() + index;
}

inline BYTE* TBuffer::Buf( UINT index )
{
   ASSERT( index < uLength() );
   return Buf() + index;
}

inline UINT TBuffer::uRef()
```

```
{
   return ++ref_c;
}
inline UINT TBuffer::uDeref()
{
// Decrement ref_c. If ref_c = 0 then delete this object.
   if (--ref_c) return ref_c;
   else  {
      delete this;
      return 0;
   }
}
inline UINT TBuffer::uRefCount() const
{
   return ref_c;
}
inline FLAG TBuffer::fQueryProperty( PROPS prop ) const
{
   return props.fIsSet( prop );
}
inline TBuffer::PROPS TBuffer::SetProperty( PROPS prop )
{
   return props.Set( prop );
}
inline TBuffer::PROPS TBuffer::ClearProperty( PROPS prop
)
{
   return props.Clear( prop );
}
inline FLAG TBuffer::fQueryReadOnly() const
{
   return props.fIsSet( READONLY );
}
inline FLAG TBuffer::fSetReadOnly( FLAG f )
{
   return FLAG( ((f ? props.Set( READONLY ) :
props.Clear( READONLY )) | READONLY) == TRUE );
}
inline FLAG TBuffer::fQueryFixed() const
{
   return props.fIsSet( FIXED );
}
inline FLAG TBuffer::fSetFixed( FLAG f )
{
```

```
   return FLAG( ((f ? props.Set( FIXED ) : props.Clear(
FIXED )) | FIXED) == TRUE );
}

inline FLAG TBuffer::fQueryShared() const
{
   return props.fIsSet( SHARED );
}

inline FLAG TBuffer::fSetShared( FLAG f )
{
   return FLAG( ((f ? props.Set( SHARED ) : props.Clear(
SHARED )) | SHARED) == TRUE );
}

// String functions.
inline TBuffer& TBuffer::StrCopy( const TBuffer &buf )
{
   return PrepareToChange()._strCopy( buf );
}

inline TBuffer& TBuffer::StrCopy( STRING str )
{
   return PrepareToChange()._strCopy( str );
}

inline TBuffer& TBuffer::StrConcat( const TBuffer &buf )
{
   return PrepareToChange()._strConcat( buf );
}

inline TBuffer& TBuffer::StrConcat( STRING str )
{
   return PrepareToChange()._strConcat( str );
}

inline TBuffer& TBuffer::StrTrunc( UINT index )
{
   return PrepareToChange()._strTrunc( index );
}

inline TBuffer& TBuffer::StrGrow( UINT index )
{
   return PrepareToChange()._strGrow( index );
}

inline TBuffer& TBuffer::StrGrow( UINT index, BYTE pad )
{
   return PrepareToChange()._strGrow( index, pad );
}
//**********************************************************
**********************
//
```

```
// TNull inline members.
//

inline FLAG TNull::fIsNull() const
{
   return isnull;
}

inline FLAG TNull::operator ! () const
{
   return fIsNull();
}

inline void TNull::setNotNull()
{
   isnull = FALSE;
}

inline void TNull::useAsValue() const
{
// This funciton is called when a TObject is used is such
a way that it must
//    have a value.
//
// Once the exception layer is implemented this routine
will throw an exception.
//
   ASSERT( isnull == FALSE );
}

inline TStream& operator << ( TStream &stream, const
TNull &null )
{
   return stream << FLAG( null.isnull );
}

inline TStream& operator >> ( TStream &stream, TNull
&null )
{
   FLAG isnl;
   stream >> isnl;

   if (isnl) null.fSetNull();
   else null.setNotNull();

   return stream;
}


#include <string.h>

// Private members.
inline void TString::prepareToChange()
```

```
{
   buffer = &buffer->PrepareToChange();
}

// *** typecast operators.
inline TString::operator STRING () const
{
   return buffer->Buf();
}

inline TString::operator unsigned char* ()
{
   return buffer->Buf();
}

inline TString::operator char* ()
{
   return (char*)buffer->Buf();
}

inline TString& TString::operator += ( STRING str )
{
   buffer = &buffer->StrConcat( str );
   return *this;
}

TString operator + ( STRING str1, STRING str2 )
{
   return TString( str1, str2 );
}

inline UINT TString::uLength() const
{
   return buffer->uLength();
}

inline char& TString::operator [] ( unsigned index )
{
   prepareToChange();
   return *((char*)buffer->Buf( index ));
}

inline const char& TString::operator [] ( unsigned index
) const
{
   return *((const char*)buffer->Buf( index ));
}

// *** friend stream operators.
inline TStream& operator << ( TStream &buf, const TString
&str )
{
   return buf << *(str.buffer);
```

```
}
inline TStream& operator >> ( TStream &buf, TString &str
)
{
   return buf >> *(str.buffer);
}
inline ostream& operator << ( ostream &os, const TString
&Str )
{
   return os << *(Str.buffer);
}
inline FLAG TString::fQueryReadOnly() const
{
   return buffer->fQueryReadOnly();
}
inline FLAG TString::fSetReadOnly( FLAG setting )
{
   prepareToChange();
   return buffer->fSetReadOnly( setting );
}
inline FLAG TString::fQueryFixed() const
{
   return buffer->fQueryFixed();
}
inline FLAG TString::fSetFixed( FLAG setting )
{
   prepareToChange();
   return buffer->fSetFixed( setting );
}
inline FLAG TString::fQueryShared() const
{
   return buffer->fQueryShared();
}
inline FLAG TString::fSetShared( FLAG setting )
{
   prepareToChange();
   return buffer->fSetShared( setting );
}

#include <string.h>

//ííííííííííííííííííííííííííííííííííííííííííííííííííííííííííííí
ííííííííííííííííííííííí
//
```

```
// TPort OS/2 inline functions.
//
//ííííííííííííííííííííííííííííííííííííííííííííííííííííííí
íííííííííííííííííííííí

inline FLAG TPort::fIsEmpty() const
{
   return buffer.fIsEmpty();
}

inline FLAG TPort::fIsFull() const
{
   return buffer.fIsFull();
}

inline FLAG TPort::fPutChar( char ch )
{
   return fWritePort( &ch, sizeof( ch ) );
}

inline FLAG TPort::fGetChar( char &ch )
{
   return buffer.fGetChar( ch );
}

inline FLAG TPort::fWritePort( PCSZ sz )
{
   return fWritePort( (PVOID)sz, strlen( sz ) );
}

#ifdef _THREADS
inline FLAG TPort::fStartCommandThread( TTHREAD thread )
{
   return fStartCommandThread( thread, (PVOID)this );
}

inline void TPort::KillManageThread()
{
   fManThread = FALSE;
}

inline void TPort::KillCommandThread()
{
   fCmdThread = FALSE;
}
#endif // _THREADS

inline void TPort::StartLog()
{
   log_flag = TRUE;
}

inline void TPort::StopLog()
```

```
{
   log_flag = FALSE;
}

inline FLAG TPort::fDumpLog( const char *fname )
{
   return log.fDumpLog( fname );
}

inline ULONG TPort::rcErrorCode() const
{
   return rc;
}


/*
*********************************************************
***************  *
 *     bpb.h      *
 *
*********************************************************
***************  */

#ifndef     _BPB_INC
#define     _BPB_INC

#include    <standard.h>

#pragma pack (1)

struct BPB {
    WORD wBytesPerSector;
    BYTE cSectorsPerCluster;
    WORD wReservedSectors;
    BYTE cFATs;
    WORD wRootDirEntries;
    WORD wSectors;
    BYTE cMediaDescriptor;
    WORD wSectorsPerFAT;
    WORD wSectorsPerTrack;
    WORD wHeads;
    DWORD dwHiddenSectors;
    DWORD dwHugeSectors;
};

#pragma pack ()

#endif

/*
*********************************************************
***************  */
```

```
/*
*************************************************************
***************  *
 *     cds.h      *
 *
*************************************************************
***************  */

#ifndef     _CDS_INC
#define     _CDS_INC

#include    <dpb.h>
#include    <standard.h>

#pragma pack (1)

struct CDS {
    struct CDS3 {
CHAR cDirectory [0x43];
WORD wFlags;
struct DPB _far *lpDPB;
union {
    WORD wStartingCluster;
    DWORD lpRedirBlock;
};
WORD wUserValue;
WORD wRootCount;
    };
    BYTE cDeviceID;
    void _far *lpIFS;
    WORD wIFSValue;
};

#define CDS_CDROM    0x0080
#define CDS_SUBST    0x1000
#define CDS_JOIN     0x2000
#define CDS_VALID    0x4000
#define CDS_REMOTE   0x8000

#pragma pack ()

#endif

/*
*************************************************************
***************  */


/*
*************************************************************
***************  *
 *     dpb.h      *
```

```
 *
****************************************************************
***************  */

#ifndef     _DPB_INC
#define     _DPB_INC

#include    <driver.h>
#include    <standard.h>

#pragma pack (1)

struct DPB {
    BYTE cDrive;
    BYTE cUnit;
    WORD wBytesPerSector;
    BYTE cClusterMask;
    BYTE cClusterShift;
    WORD wFirstFATSector;
    BYTE cFATs;
    WORD wRootDirEntries;
    WORD wFirstDataSector;
    WORD wMaxCluster;
    WORD wSectorsPerFAT;
    WORD wRootDirSector;
    struct DRIVER_HEADER _far *lpDriver;
    BYTE cMediaDescriptor;
    BYTE cAccessFlag;
    struct DPB _far *lpNext;
    WORD wNextCluster;
    WORD wFreeClusters;
};

#pragma pack ()

#endif

/*
****************************************************************
***************  */


/*
****************************************************************
***************  *
 *   driver.h      *
 *
****************************************************************
***************  */

#ifndef     _DRIVER_INC
#define     _DRIVER_INC
```

```
#include    <standard.h>

#pragma pack (1)

/*  Device driver header  */

struct DRIVER_HEADER {
    struct DRIVER_HEADER _far *lpNext;
    WORD wAttribute;
#ifdef __BORLANDC__
    WORD *pStrategy;
    WORD *pInterrupt;
#else
    void _based ((_segment) _self) *pStrategy;
    void _based ((_segment) _self) *pInterrupt;
#endif
    union {
CHAR cName [8];
BYTE cUnitsSupported;
    };
};

/*  Attribute values  */

#define     IS_STDIN    0x0001
#define     IS_STDOUT    0x0002
#define     IS_HUGE_BLOCK    0x0002
#define     IS_NUL    0x0004
#define     IS_CLOCK    0x0008
#define     INT29H_OK    0x0010
#define     GIOCTL_OK    0x0040
#define     GIOCTL_QUERY_OK    0x0080
#define     OCRM_OK    0x0800
#define     OTB_OK    0x2000
#define     FAT_REQUIRED    0x2000
#define     IOCTL_OK    0x4000
#define     IS_CHAR_DEVICE    0x8000

/*  Device driver commands  */

#define     D_INIT    0x00
#define     D_MEDIA_CHECK    0x01
#define     D_BUILD_BPB    0x02
#define     D_IOCTL_READ    0x03
#define     D_READ    0x04
#define     D_NONDESTRUCTIVE_READ    0x05
#define     D_INPUT_STATUS    0x06
#define     D_INPUT_FLUSH    0x07
#define     D_WRITE    0x08
#define     D_WRITE_WITH_VERIFY    0x09
#define     D_OUTPUT_STATUS    0x0A
#define     D_OUTPUT_FLUSH    0x0B
#define     D_IOCTL_WRITE    0x0C
```

```
#define     D_OPEN_DEVICE      0x0D
#define     D_CLOSE_DEVICE     0x0E
#define     D_REMOVABLE_MEDIA     0x0F
#define     D_OUTPUT_UNTIL_BUSY     0x10
#define     D_GENERIC_IOCTL     0x13
#define     D_GET_LOGICAL_DEVICE     0x17
#define     D_SET_LOGICAL_DEVICE     0x18
#define     D_IOCTL_QUERY     0x19

#define     MAX_DRIVER_COMMAND     0x19

/*  Driver status values  */

#define     D_DONE     0x0100
#define     D_BUSY     0x0200
#define     D_ERROR     0x8000

/*  Driver error values  */

#define     D_WRITE_PROTECTED     0x00
#define     D_BAD_UNIT     0x01
#define     D_NOT_READY     0x02
#define     D_BAD_COMMAND     0x03
#define     D_BAD_CRC     0x04
#define     D_BAD_HEADER     0x05
#define     D_SEEK_FAILURE     0x06
#define     D_BAD_MEDIA     0x07
#define     D_SECTOR_NOT_FOUND     0x08
#define     D_NO_PAPER     0x09
#define     D_WRITE_ERROR     0x0A
#define     D_READ_ERROR     0x0B
#define     D_GENERAL_FAILURE     0x0C
#define     D_BAD_DISK_CHANGE     0x0F

/*  Request header structure  */

struct REQUEST_HEADER {

    /*The format of the request header's first portion is
common to all
commands.  */

    BYTE cHeaderLength;
    BYTE cUnit;
    BYTE cCommand;
    WORD wStatus;
    char cReserved [8];

    /*No further fields are required for commands

    06h (input status)07h (input flush)
    0Ah (output status) 0Bh (output flush)
    0Dh (open device)0Eh (close device)
```

```
    17h (get logical device)18h (set logical device)

The request header format for the remaining commands can
be
handled by a set of overlapping structures.  */

    union {

struct {

    /*command 00h (initialise driver)  */

    BYTE cUnitsSupported;
    void _far *lpEndOfMemory;
    union {
CHAR _far *lpCommandLine;
void _far *lpBPBTable;
    };
    BYTE cDrive;
    WORD wMessageFlag;
};

/*  Many commands are provided with a media descriptor
byte at the
    first location in the variable portion of the request
header -
    hence another set of overlapping structures.  */

struct {

    BYTE cMediaDescriptor;

    union {
struct {

    /*command 01h (media check)  */

    BYTE cChangeStatus;
    CHAR _far *lpVolumeIDForCheck;
};
struct {

    /*command 02h (build BPB)  */

    void _far *lpFATSector;
    void _far *lpBPB;
};
struct {

    /*Commands 03h (IOCTL Read), 04h (Read), 08h (Write),
09h (Write with verify) and 0Ch (IOCTL Write) all
transfer data to or from a buffer, though only some
of these commands require all the following fields.  */
```

```
    BYTE _far *lpBuffer;
    WORD wCount;
    WORD wStart;
    CHAR _far *lpVolumeIDForIO;
    DWORD dwHugeStart;
};
    };
};

/*  Command 05h (non-destructive read) simply returns a
character
    waiting for input, if one is present and requires
only one
    field in its request header.  */

CHAR cCharWaiting;

struct {

    /*Commands 13h (Generic IOCTL) and 19h (IOCTL query)
*/

    BYTE cCategory;
    BYTE cMinorCode;
    WORD wGIOCTLReserved;
    BYTE _far *lpData;
};
    };
};

#pragma pack ()

#endif

/*
*************************************************************
***************  */


/*
*************************************************************
***************  *
 *    iosys.h      *
 *
*************************************************************
***************  */

#ifndef     _IOSYS_INC
#define     _IOSYS_INC

#include    <bpb.h>
#include    <standard.h>
```

```
#pragma pack (1)

struct IOSYSDRIVETABLE {
    struct IOSYSDRIVETABLE _far *lpNext;
    BYTE cBIOSDrive;
    BYTE cDOSDrive;
    struct BPB DiskBPB;
    BYTE cFileSystemFlag;
    WORD wOpenCloseCount;
    BYTE cDeviceType;
    WORD wFlags;
    WORD wCylinders;
    struct BPB DriveBPB;
    BYTE cReserved [6];
    BYTE cLastTrack;
    union {
DWORD dwLastTime;
struct {
    WORD wPartitionFlag;
    WORD wStartingCylinder;
};
    };
    CHAR cVolumeLabel [12];
    DWORD dwSerialNumber;
    CHAR cFileSystem [9];
};

#pragma pack ()

#endif

/*
***********************************************************
***************  */


/*
***********************************************************
***************  *
 *     sft.h      *
 *
***********************************************************
***************  */

#ifndef     _SFT_INC
#define     _SFT_INC

#include    <dpb.h>
#include    <driver.h>
#include    <standard.h>

#pragma pack (1)
```

```
/*  System File Table Header  */

struct SFT_HEADER {
    struct SFT_HEADER _far *lpNext;
    WORD wCount;
};

/*  System File Table  */

struct SFT {
    WORD wHandles;
    WORD wAccess;
    BYTE cAttribute;
    WORD wMode;
    union {
struct DPB _far *lpDPB;
struct DRIVER_HEADER _far *lpDriver;
    };
    WORD wStartingCluster;
    WORD wTime;
    WORD wDate;
    DWORD dwSize;
    DWORD dwFilePointer;
    WORD wRelativeCluster;
    DWORD dwDirSector;
    BYTE cDirSectorEntry;
    CHAR cName [11];
    struct SFT _far *lpNextShare;
    WORD wMachine;
#ifdef __BORLANDC__
    void _seg *spOwner;
    WORD pSharingRecord;
#else
    _segment spOwner;
    void _based (void) *pSharingRecord;
#endif
    WORD wAbsoluteCluster;
    void _far *lpIFS;
};

#pragma pack ()

#endif

/*
************************************************************
***************  */


/*
************************************************************
***************  *
 *   standard.h      *
```

```
 *
*************************************************************
***************  */

#ifndef     _STANDARD_INC
#define     _STANDARD_INC

/*  Logical operators and values  */

#define     AND     &&
#define     NOT     !
#define     OR      ||

#define     FALSE   0
#define     TRUE    1     // for consistency with TRUE =
NOT FALSE

#define     OFF     0
#define     ON    1

#define     CLEAR   0
#define     SET     1

/*  Convenient data types  */

typedef unsigned charBYTE;
typedef unsigned shortWORD;
typedef unsigned longDWORD;

typedef signed charSBYTE;
typedef signed intSWORD;
typedef signed longSDWORD;

typedef unsigned charCHAR;

typedef intBOOL;

/*  Macro for generating a far pointer from segment and
offset*/

#ifndef MK_FP
   #define MK_FP(seg,off) (((_segment) (seg)) :> ((void
_based (void) *) (off)))
#endif

/*  The above form for MK_FP has a problem (at least in C
6.00) with
    multiple dereferencing through structures.On the
other hand, the
    compiler generates much more efficient code with it.
As an alternative,
    keep the more familiar macro on standby.  */
```

```
#if FALSE
#define MK_FP(seg,off) ((void _far *) (((DWORD) (seg) <<
16) | ((WORD) (off))))
#endif

/* Macros to decompose 16-bit and 32-bit objects into
high and low
    components and to reconstitute them */

#define HIGHBYTE(x) ((BYTE) ((x) >> 8))
#define LOWBYTE(x)  ((BYTE) (x))

#define MK_WORD(high,low)  (((WORD) (high) << 8) | (low))

#define HIGHWORD(x) ((WORD) ((x) >> 16))
#define LOWWORD(x)  ((WORD) (x))

#define MK_DWORD(high,low) (((DWORD) (high) << 16) |
(low))

/* Macros for directing the compiler to use current
segment register
    values rather than generate relocatable references*/

#define     CODESEG     _based (_segname ("_CODE"))
#define     CONSTSEG    _based (_segname ("_CONST"))
#define     DATASEG     _based (_segname ("_DATA"))
#define     STACKSEG    _based (_segname ("_STACK"))

/* Macro for NULL in case using STDLIB.H would be
inappropriate */

#ifndef NULL
#define NULL ((void *) 0)
#endif

#endif

/*
***********************************************************
***************  */


;
***********************************************************
***************
;   *   driver.inc   *
;
***********************************************************
***************

;   Device driver header
```

```
DRIVER_HEADERSTRUCT
  lpNextdd0FFFFFFFFh
  wAttributedw0000h
  pStrategydw0000h
  pInterruptdw0000h
  UNION
    cNamedb"        "
    cUnitsSupporteddb?
  ENDS
DRIVER_HEADERENDS

;   Attribute values

IS_STDINEQU0001h
IS_STDOUTEQU0002h
IS_HUGE_BLOCKEQU0002h
IS_NULEQU0004h
IS_CLOCKEQU0008h
INT29H_OKEQU0010h
GIOCTL_OKEQU0040h
GIOCTL_QUERY_OK EQU0080h
OCRM_OK EQU0800h
OTB_OKEQU2000h
FAT_REQUIREDEQU2000h
IOCTL_OKEQU4000h
IS_CHAR_DEVICEEQU8000h

;   Device driver commands - these do not follow the
upper case convention
;   because they are used to generate the names of the
procedures for each
;   driver command.

D_INITEQU00h
D_MEDIA_CHECKEQU01h
D_BUILD_BPBEQU02h
D_IOCTL_READEQU03h
D_READEQU04h
D_NONDESTRUCTIVE_READEQU05h
D_INPUT_STATUSEQU06h
D_INPUT_FLUSHEQU07h
D_WRITE EQU08h
D_WRITE_WITH_VERIFYEQU09h
D_OUTPUT_STATUS EQU0Ah
D_OUTPUT_FLUSHEQU0Bh
D_IOCTL_WRITEEQU0Ch
D_OPEN_DEVICEEQU0Dh
D_CLOSE_DEVICEEQU0Eh
D_REMOVABLE_MEDIAEQU0Fh
D_OUTPUT_UNTIL_BUSYEQU10h
D_GENERIC_IOCTL EQU13h
D_GET_LOGICAL_DEVICEEQU17h
D_SET_LOGICAL_DEVICEEQU18h
```

```
D_IOCTL_QUERYEQU19h

MAX_DRIVER_COMMANDEQU19h

;   Driver status values

D_DONEEQU0100h
D_BUSYEQU0200h
D_ERROR EQU8000h

;   Driver error values

D_WRITE_PROTECTEDEQU00h
D_BAD_UNITEQU01h
D_NOT_READYEQU02h
D_BAD_COMMANDEQU03h
D_BAD_CRCEQU04h
D_BAD_HEADEREQU05h
D_SEEK_FAILUREEQU06h
D_BAD_MEDIAEQU07h
D_SECTOR_NOT_FOUNDEQU08h
D_NO_PAPEREQU09h
D_WRITE_ERROREQU0Ah
D_READ_ERROREQU0Bh
D_GENERAL_FAILUREEQU0Ch
D_BAD_DISK_CHANGEEQU0Fh

;   Request Header structure

REQUEST_HEADERSTRUCT
  cHeaderLength db?
  cUnit db?
  cCommanddb?
  wStatusdw?
  cReserveddb08h DUP (?)
  UNION
    STRUCT
      cUnitsSupporteddb?
      lpEndOfMemorydd?
      UNION
lpCommandLinedd?
lpBPBTabledd?
      ENDS
      cDrivedb?
      wMessageFlagdw?
    ENDS
    STRUCT
      cMediaDescriptordb?
      UNION
STRUCT
  cChangeStatus db?
  lpVolumeIDForCheckdd?
ENDS
```

```
STRUCT
  lpFATSectordd?
  lpBPB dd?
ENDS
STRUCT
  lpBufferdd?
  wCountdw?
  wStartdw?
  lpVolumeIDForIOdd?
  dwHugeStartdd?
ENDS
      ENDS
    ENDS
    cCharWaitingdb?
    STRUCT
      cCategory db?
      cMinorCodedb?
      wGIOCTLReserveddw?
      lpDatadd?
    ENDS
  ENDS
REQUEST_HEADERENDS

;
***********************************************************
***************


;
***********************************************************
***************
;   *    sft.inc    *
;
***********************************************************
***************

;   System File Table Header

SFT_HEADERSTRUCT
  lpNextdd0FFFFFFFFh
  wCountdw0000h
SFT_HEADERENDS

;   System File Table (with default initialisation
suitable for use with
;   FCBs)

SFTSTRUCT
  wHandlesdw0000h
  wAccessdw'AA'
  cAttributedb'A'
  wMode dw'AA'
  UNION
```

```
    lpDPBdd'AAAA'
    lpDriverdd'AAAA'
  ENDS
  wStartingClusterdw'AA'
  wTime dw'AA'
  wDate dw'AA'
  dwSizedd'AAAA'
  dwFilePointer dd00000000h
  wRelativeClusterdw'AA'
  dwDirSectordd'AAAA'
  cDirSectorEntrydb'A'
  cName db'AAAAAAAAAAA'
  lpNextSharedd'AAAA'
  wMachinedw'AA'
  spOwnerdw'AA'
  pSharingRecorddw'AA'
  wAbsoluteClusterdw'AA'
  lpIFS dd'AAAA'
SFTENDS

;
***********************************************************
***************


;
***********************************************************
***************
;   *  standard.inc    *
;
***********************************************************
***************

.NOCREF standard_inc
IFNDEFstandard_inc

;   Logical symbols

.NOCREF FALSE, TRUE

FALSEEQU0
TRUEEQU(NOT FALSE)

standard_inc = TRUE
ENDIF

;
***********************************************************
***************
```

What is claimed is:

1. A method for tracing an electronic device having an unique identifying indicia, said electronic device connectable to a telecommunications interface having a unique address within a telecommunications system to which it is connected, said unique address used for providing location information, said telecommunications system connected to a host system, said method comprising the steps:

establishing an interface between said electronic device and a telecommunications system through said telecommunications interface for communicating with said host system;

providing said host system with said identifying indicia, comprising a string of characters, for said electronic device to determine the identity of said electronic device, including transmitting said string of characters which comprise said identifying indicia to said host system through two or more transmissions wherein each of said transmissions contains a segment of said identifying indicia; and providing said host system with said unique address of said telecommunications interface associated with said electronic device to enable the determination of the location of said electronic device.

2. The method of claim 1 further including the step of disposing an agent within said electronic device for initiating communication with said host system such that said agent evades detection and resists disablement.

3. The method of claim 2 wherein said agent evades detection and resists disablement by incorporating deflection methods which prevent discovery.

4. The method of claim 3 wherein said deflection methods deflect read and write attempts to the location on said hard drive where said agent is installed.

5. The method of claim 2 wherein said agent is a terminated and stay resident program which does not interfere with other running applications.

6. The method of claim 2 wherein said agent initiates the step of providing said identifying indicia automatically and without user intervention.

7. The method of claim 6 wherein said step of providing said host system with identifying indicia for said electronic device occurs without causing audible or visible signals to be emitted from said electronic device.

8. The method of claim 1 further including the step of determining the appropriate time for said electronic device to communicate with said host system.

9. The method of claim 1 wherein said unique address of said telecommunications interface is provided to said host system from said telecommunications system.

10. The method of claim 9 wherein said step of providing said unique address of said telecommunications interface to said host system further includes the step of sending said unique address from said host system to a remote location.

11. The method of claim 10 wherein said step of sending said unique address to a remote location uses facsimile mechanisms to transmit said unique address.

12. The method of claim 10 wherein said step of sending said unique address to a remote location uses electronic mail to transmit said unique address.

13. The method of claim 10 wherein said step of sending said unique address to a remote location uses radio frequency signals to transmit said unique address.

14. The method of claim 10 wherein said step of sending said unique address to a remote location uses telephone lines to transmit said unique address.

15. The method of claim 1 further including the steps of providing a list of lost or stolen electronic devices to said host system and comparing said list with said identifying indicia provided by said electronic device to determine if said electronic device is lost or stolen.

16. The method of claim 15 further including the step of obtaining from said telecommunications system said unique address of the telecommunications interface associated with said electronic device if said electronic device is lost or stolen.

17. The method of claim 1 wherein said telecommunications system is a wireless system and said method further including the step of providing said identifying indicia to said host system over said wireless system.

18. The method of claim 17 wherein said step of providing said identifying indicia to said host system over said wireless system utilizes radio frequency signals.

19. The method of claim 18 wherein said step of providing said identifying indicia to said host system over said wireless system utilizes microwave signals.

20. The method of claim 1 wherein said telecommunications system is a Land Line system and said method further including the step of providing said identifying indicia to said host system over said Land Line system.

21. The method of claim 20 wherein said Land Line system utilizes telephone lines.

22. The method of claim 20 wherein said Land Line system is a cablevision network which utilizes cable lines.

23. The method of claim 1 wherein said step of providing said host system with said identifying indicia for each of said electronic devices further includes the step of encoding said identifying indicia by a predetermined scheme.

24. The method of claim 1 wherein said step for providing said host system with identifying indicia occurs periodically at predetermined time intervals.

25. The method of claim 24 wherein said step for providing said host system with identifying indicia is initiated upon the occurrence of one or more predetermined events.

26. A method for tracing an electronic device having a hard drive and an unique identifying indicia, said electronic device connectable to a telecommunications interface having a unique address within a telecommunications system to which it is connected, said unique address used for providing location information, said telecommunications system connected to a host system, said method comprising the steps:

disposing an agent within the boot sector of said hard drive for initiating communication with said host system such that said agent evades detection and resists disablement;

establishing an interface between said electronic device and a telecommunications system through said telecommunications interface for communicating with said host system;

providing said host system with said identifying indicia for said electronic device to determine the identity of said electronic device; and providing said host system with said unique address of said telecommunications interface associated with said electronic device to enable the determination of the location of said electronic device.

27. A method for tracing an electronic device having a hard drive and an unique identifying indicia, said electronic device connectable to a telecommunications interface having a unique address within a telecommunications system to which it is connected, said unique address used for providing location information, said telecommunications system connected to a host system, said method comprising the steps:

disposing an agent within the partition sector of said hard drive for initiating communication with said host system such that said agent evades detection and resists disablement;

establishing an interface between said electronic device and a telecommunications system through said telecommunications interface for communicating with said host system;

providing said host system with said identifying indicia for said electronic device to determine the identity of said electronic device; and providing said host system with said unique address of said telecommunications interface associated with said electronic device to enable the determination of the location of said electronic device.

28. A method for tracing an electronic device having a hard drive and an unique identifying indicia, said electronic device connectable to a telecommunications interface having a unique address within a telecommunications system to which it is connected, said unique address used for providing location information, said telecommunications system connected to a host system, said method comprising the steps:

disposing an agent within an operating system file IO.SYS for a MS-DOS operating system in the electronic device for initiating communication with said host system such that said agent evades detection and resists disablement;

establishing an interface between said electronic device and a telecommunications system through said telecommunications interface for communicating with said host system;

providing said host system with said identifying indicia for said electronic device to determine the identity of said electronic device; and providing said host system with said unique address of said telecommunications interface associated with said electronic device to enable the determination of the location of said electronic device.

29. The method of claim 28 wherein said electronic device has a non-volatile memory and said operating system file is stored in said non-volatile memory.

30. A method for tracing an electronic device having a hard drive and an unique identifying indicia, said electronic device connectable to a telecommunications interface having a unique address within a telecommunications system to which it is connected, said unique address used for providing location information, said telecommunications system connected to a host system, said method comprising the steps:

disposing an agent within an operating system file IBMBIO.SYS for a PC-DOS operating system in the electronic device for initiating communication with said host system such that said agent evades detection and resists disablement;

establishing an interface between said electronic device and a telecommunications system through said telecommunications interface for communicating with said host system;

providing said host system with said identifying indicia for said electronic device to determine the identity of said electronic device; and providing said host system with said unique address of said telecommunications interface associated with said electronic device to enable the determination of the location of said electronic device.

31. A method for tracing an electronic device having a hard drive and an unique identifying indicia, said electronic device connectable to a telecommunications interface having a unique address within a telecommunications system to which it is connected, said unique address used for providing location information, said telecommunications system connected to a host system, said method comprising the steps:

disposing an agent on a ROM BIOS in the electronic device for initiating communication with said host system such that said agent evades detection and resists disablement;

establishing an interface between said electronic device and a telecommunications system through said telecommunications interface for communicating with said host system;

providing said host system with said identifying indicia for said electronic device to determine the identity of said electronic device; and providing said host system with said unique address of said telecommunications interface associated with said electronic device to enable the determination of the location of said electronic device.

32. A method for tracing an electronic device having an unique identifying indicia, said electronic device connectable to a telecommunications interface having a unique address within a telecommunications system to which it is connected, said unique address used for providing location information, said telecommunications system connected to a host system, said method comprising the steps:

establishing an interface between said electronic device and a telecommunications system through said telecommunications interface for communicating with said host system;

providing said host system with said identifying indicia for said electronic device to determine the identity of said electronic device, wherein said identifying indicia is encoded within one or more telephone numbers used by said telecommunications interface to call said host system; and providing said host system with said unique address of said telecommunications interface associated with said electronic device to enable the determination of the location of said electronic device.

33. The method of claim 32 wherein said telephone numbers are transmitted with a prefix from a stored list of telephone prefixes.

34. The method of claim 33 wherein each entry on said list of telephone prefixes is individually attached as a prefix to said telephone number until a communication through said telecommunications system is successful.

35. The method of claim 32 wherein said telecommunications interface comprises a modem.

36. The method of claim 32 wherein said host system decodes said identifying indicia transmitted through said one or more telephone numbers and only answers said call if said identifying indicia matches an entry on said list of lost or stolen electronic devices.

37. A method for remotely tracing an electronic device from a host system, said host system connected to a telecommunications device for receiving transmissions from said electronic device, said electronic device connectable to a telecommunications interface having a unique address within a telecommunications system to which it is connected, said unique address for providing location information, said telecommunications system connected to said host system, said method comprising the steps:

receiving through one or more telephone calls identifying indicia from said electronic device for determining the identity of said electronic device;

comparing said identifying indicia against a list of lost or stolen electronic devices to determine if said electronic device is lost or stolen, wherein said host system only accepts said one or more telephone calls if said identifying indicia transmitted within said one or more telephone calls is on the list of lost or stolen electronic devices; and receiving said unique address of said telecommunications interface connected to said electronic device for enabling the determination of the location of said electronic device.

38. An apparatus for remotely tracing an electronic device from a host system, said host system connected to a telecommunications device for receiving transmissions from said electronic device, said electronic device connectable to a telecommunications interface having a unique address within a telecommunications system to which it is connected, said unique address for providing location information, said telecommunications system connected to said host system, said apparatus comprising:

means for receiving through one or more telephone calls identifying indicia from said electronic device for determining the identity of said electronic device;

means for comparing said identifying indicia against a list of lost or stolen electronic devices to determine if said electronic device is lost or stolen, wherein said host system only accepts said one or more telephone calls if said identifying indicia transmitted within said one or more telephone calls is on the list of lost or stolen electronic devices; and means for receiving said unique address of said telecommunications interface connected to said electronic device for enabling the determination of the location of said electronic device.

39. The apparatus of claim 38 wherein said telecommunications system is a wireless system and said apparatus further including means for receiving said identifying indicia from said electronic device over said wireless system.

40. The apparatus of claim 39 wherein said means for receiving said identifying indicia from said electronic device over said wireless system utilizes radio frequency signals.

41. The apparatus of claim 40 wherein said means for receiving said identifying indicia from said electronic device over said wireless system utilizes microwave signals.

42. The apparatus of claim 38 wherein said telecommunications system is a Land Line system.

43. The apparatus of claim 42 wherein said Land Line system utilizes telephone lines.

44. The apparatus of claim 42 wherein said Land Line system is a cablevision network which utilizes cable lines.

45. The apparatus of claim 38 wherein said telecommunications device comprises a modem.

46. The apparatus of claim 38 wherein said identifying indicia is received in encoded form through said one or more telephone calls.

47. A method of encoding and transmitting an identification number associated with an electronic device through a modem to a host system through a sequence of calling numbers said method comprising the steps;

identifying said electronic device by a unique string of numbers comprising said identification number;

assigning one or more digits in each of said calling numbers to correspond to one or more digits within said identification number;

assigning an indicator digit to indicate which digit or digits within said identification number that said one or more digits represent.

* * * * *